United States Patent
So et al.

(10) Patent No.: US 10,025,305 B2
(45) Date of Patent: Jul. 17, 2018

(54) CLEANING ROBOT AND REMOTE CONTROLLER INCLUDED THEREIN

(71) Applicant: Samsung Electronics Co., Ltd., Suwon-si (KR)

(72) Inventors: Jea Yun So, Suwon-si (KR); Jin Hee Kim, Incheon (KR); Won Min Lee, Suwon-si (KR); Gwang Jin Jung, Suwon-si (KR); Sang Hwa Choi, Seoul (KR); Shin Kim, Hwaseong-si (KR); Sang Sik Yoon, Yongin-si (KR); Byoung In Lee, Suwon-si (KR); Hyun Soo Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 15/035,658

(22) PCT Filed: Feb. 27, 2015

(86) PCT No.: PCT/KR2015/001946
§ 371 (c)(1),
(2) Date: May 10, 2016

(87) PCT Pub. No.: WO2015/130134
PCT Pub. Date: Sep. 3, 2015

(65) Prior Publication Data
US 2016/0274579 A1    Sep. 22, 2016

(30) Foreign Application Priority Data
Feb. 28, 2014 (KR) .................. 10-2014-0024565

(51) Int. Cl.
*G05D 1/00* (2006.01)
*A47L 11/24* (2006.01)
(Continued)

(52) U.S. Cl.
CPC .......... *G05D 1/0016* (2013.01); *A47L 9/2852* (2013.01); *A47L 9/2857* (2013.01);
(Continued)

(58) Field of Classification Search
CPC ............... G05D 1/0016; G05D 1/0033; G05D 2201/0203; A47L 11/4011; A47L 11/24;
(Continued)

(56) References Cited

U.S. PATENT DOCUMENTS 7,526,362 B2 * 4/2009 Kim ..................... G08C 23/04
318/567
8,606,404 B1 * 12/2013 Huffman ............... B25J 9/1697
700/259
(Continued)

FOREIGN PATENT DOCUMENTS

DE    102009059215    1/2011
DE    102011053386    1/2013
(Continued)

OTHER PUBLICATIONS

Extended European Search Report dated Dec. 18, 2017 in European Patent Application No. 15754690.0.
(Continued)

*Primary Examiner* — Michael J Zanelli
(74) *Attorney, Agent, or Firm* — Staas & Halsey LLP

(57) ABSTRACT

A cleaning robot includes a navigator to move a main body, a remote controller to output a modulated infrared ray in accordance with a control command of a user and to form a light spot, a light receiver to receive the infrared ray from the remote controller, and a controller to control the navigator such that the main body tracks the light spot when the modulated infrared ray is received in accordance with the control command. Because the cleaning robot tracks a position indicated by the remote controller, a user may conveniently move the cleaning robot.

20 Claims, 110 Drawing Sheets

(51) Int. Cl.
*A47L 11/40* (2006.01)
*A47L 9/28* (2006.01)

(52) U.S. Cl.
CPC ............ *A47L 9/2894* (2013.01); *A47L 11/24* (2013.01); *A47L 11/4011* (2013.01); *A47L 11/4013* (2013.01); *G05D 1/0033* (2013.01); *A47L 2201/04* (2013.01); *A47L 2201/06* (2013.01); *G05D 2201/0203* (2013.01)

(58) Field of Classification Search
CPC .. A47L 9/2894; A47L 9/2857; A47L 2201/04; A47L 2201/06
See application file for complete search history.

(56) References Cited

U.S. PATENT DOCUMENTS

| | | | | |
|---|---|---|---|---|
| 2002/0027652 | A1* | 3/2002 | Paromtchik | G05D 1/0236 356/141.1 |
| 2005/0027399 | A1* | 2/2005 | Koh | G05D 1/0221 700/258 |
| 2006/0025887 | A1* | 2/2006 | Park | G05D 1/0242 700/245 |
| 2010/0292839 | A1 | 11/2010 | Hong et al. | |
| 2013/0278398 | A1* | 10/2013 | Smetanin | A63H 30/04 340/12.52 |
| 2014/0180525 | A1* | 6/2014 | Tsuboi | G05D 1/0033 701/23 |

FOREIGN PATENT DOCUMENTS

| | | |
|---|---|---|
| JP | 2013-85606 | 5/2013 |
| KR | 10-2006-0011552 | 2/2006 |
| KR | 10-2006-0081131 | 7/2006 |
| KR | 10-2006-0110479 | 10/2006 |

OTHER PUBLICATIONS

International Search Report and Written Opinion of the International Searching Authority dated Jun. 3, 2015 in International Patent Application No. PCT/KR2015/001946.

\* cited by examiner (b)

Fig. 8
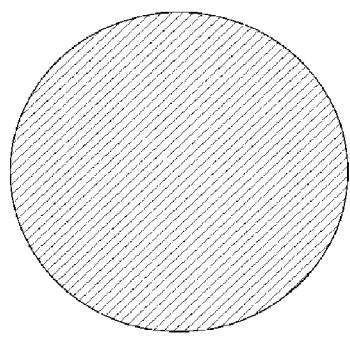
(a)
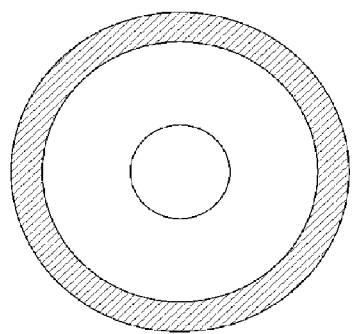
(b)
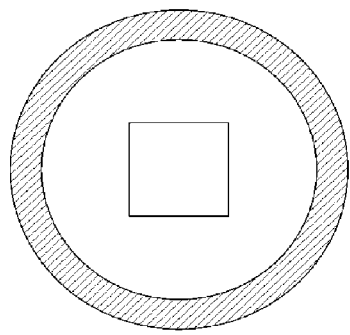
(c)
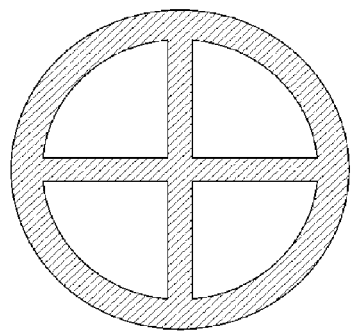
(d)
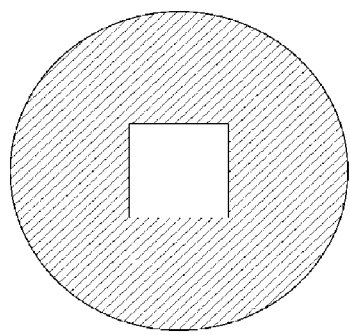
(e)
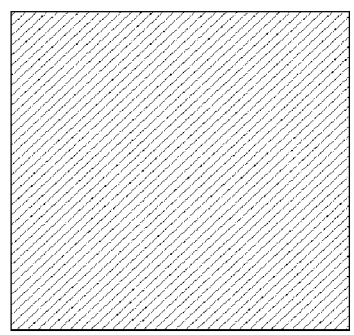
(f)

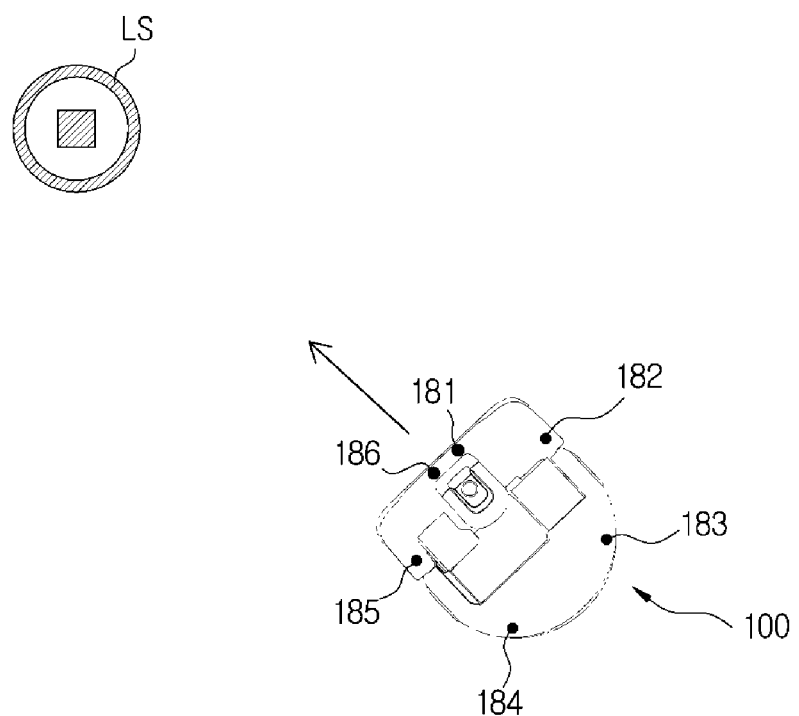

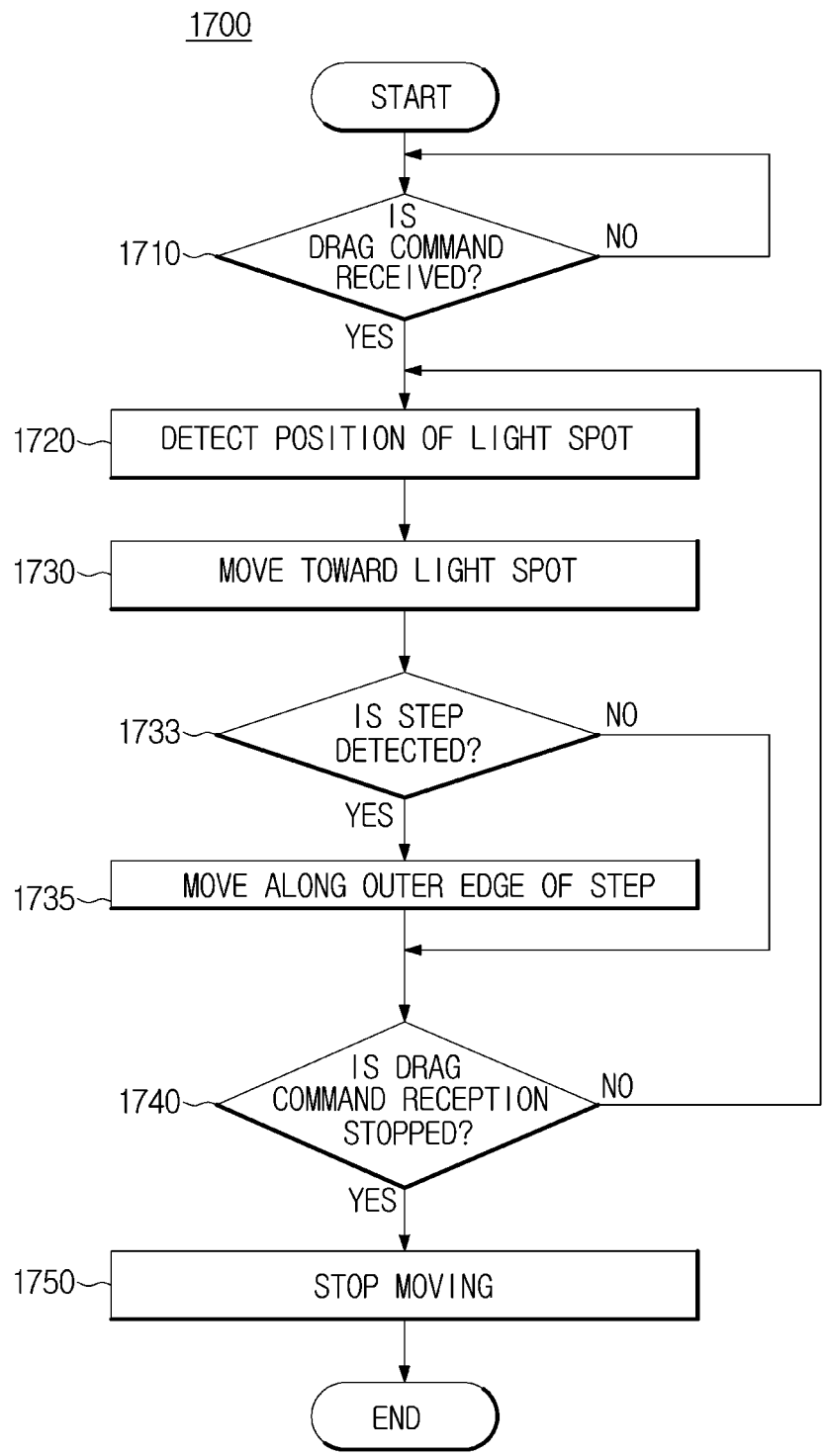

Fig. 42
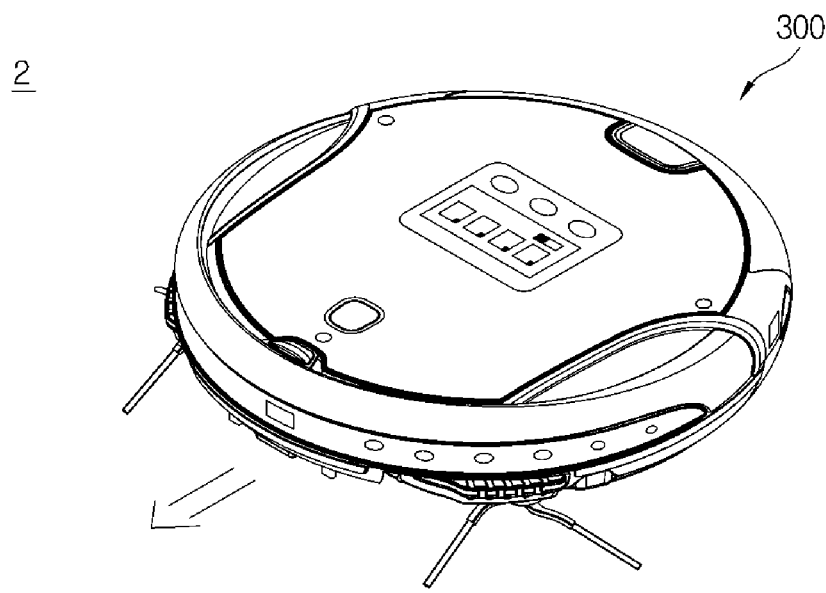
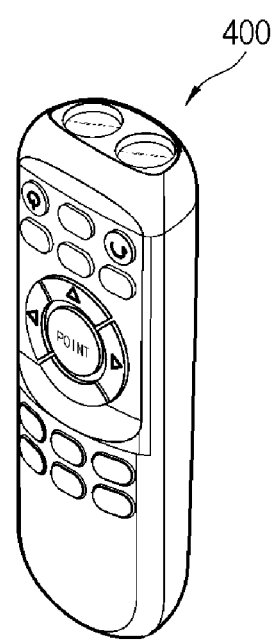

Fig. 65
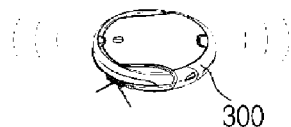

Fig. 66C
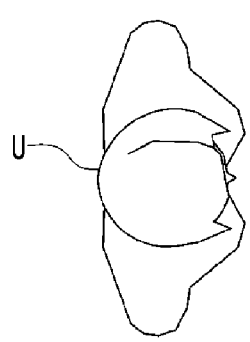
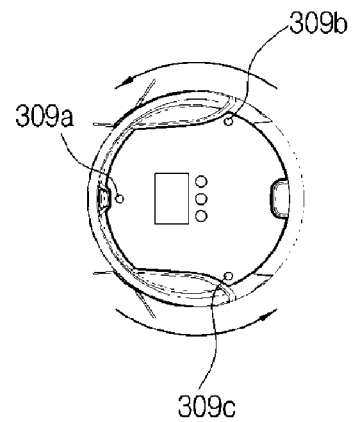

CLEANING ROBOT AND REMOTE CONTROLLER INCLUDED THEREIN

CROSS-REFERENCE TO RELATED APPLICATIONS

This application is a Continuation of International Application No. PCT/KR2015/001946, filed Feb. 27, 2015, which claims the benefit of Korean Application No. 10-2014-0024565, filed Feb. 28, 2014, in the Korean Intellectual Property Office, the disclosures of which are incorporated herein by reference.

BACKGROUND

1. Field

The following description relates to a cleaning robot and a remote controller included therein, and more particularly, to a cleaning robot moving to a position indicated by a remote controller, and the remote controller included therein.

2. Description of the Related Art

A cleaning robot is an apparatus that automatically cleans a cleaning area by suctioning foreign substances, such as dust accumulated on a floor, while navigating the cleaning area without a user's manipulation. That is, the cleaning robot cleans the cleaning area while navigating the cleaning area.

In a case of a conventional cleaning robot, when a user wanted to clean a particular location first within the cleaning area, the user had to directly check a position of the cleaning robot and move the cleaning robot to the particular location using a remote controller.

However, the user had to find the cleaning robot when the user did not know the position of the cleaning robot, and it was difficult for the user to find the cleaning robot when the cleaning robot was cleaning under a sofa or a bed.

In addition, there was an inconvenience of requiring the user to manipulate the navigation of the cleaning robot using the remote controller to move the cleaning robot to the particular location.

In addition, recently, a study on a method of moving a cleaning robot to a particular location without the above inconvenience is vigorously being carried out.

SUMMARY

The following description relates to a cleaning robot that tracks a position indicated by a remote controller and the remote controller included therein.

The following description relates to a cleaning robot that calculates a distance from a remote controller and a direction of the remote controller detected by a plurality of signal detection units, a cleaning robot system, and a method of controlling the cleaning robot system.

A cleaning robot may include a navigator to move a main body, a remote controller to output a modulated infrared ray in accordance with a control command of a user and to form a light spot, a light receiver to receive the infrared ray from the remote controller, and a controller to control the navigator such that the main body tracks the light spot when the modulated infrared ray is received in accordance with the control command.

According to an embodiment, the remote controller may include a user interface to receive the control command of the user, and an optical transmitter to modulate an infrared ray in accordance with the control command and to transmit the modulated infrared ray.

According to an embodiment, the optical transmitter may include an infrared ray modulator to generate a modulation signal in accordance with the control command of the user, an infrared ray transmitter to transmit an infrared ray in accordance with the modulation signal, and a visible light transmitter to transmit visible light in order to form the light spot.

According to an embodiment, the light reception unit may include a plurality of infrared ray receivers to receive the infrared ray, and an infrared ray demodulator to acquire the control command by demodulating the received infrared ray.

According to an embodiment, the plurality of infrared ray receivers may include a first infrared ray receiver disposed in front of the main body, and at least two infrared ray receivers disposed along an outer edge of the main body.

According to an embodiment, the controller may determine a position of the light spot in accordance with the infrared ray receiver that receives the infrared ray among the plurality of infrared ray receivers.

According to an embodiment, the controller may move the main body such that the first infrared ray receiver receives the infrared ray.

According to an embodiment, the controller may rotate the main body such that the first infrared ray receiver receives the infrared ray and move the main body in a straight line toward the light spot.

According to an embodiment, the controller may move the main body in a curve such that the first infrared ray receiver receives the infrared ray.

According to an embodiment, when a drag command is received from the remote controller while moving along an automatic cleaning path, the controller may control the navigator such that the main body moves along a movement path of the light spot.

According to an embodiment, when the reception of the drag command stops, the controller may stop the movement of the main body and control the navigator such that the main body returns to the automatic cleaning path.

According to an embodiment, when a path save command is received, the controller may control the main body to move along the movement path of the light spot and save a movement path of the main body.

According to an embodiment, when an automatic cleaning command is received, the controller may control the navigator such that the main body moves along the movement path of the main body.

According to an embodiment, when an intensive cleaning command is received, the controller may control the navigator such that the main body moves within the movement path of the main body.

According to an embodiment, when an entry forbiddance command is received, the controller may control the navigator such that the main body does not enter into the movement path of the main body.

According to an embodiment, the cleaning robot may further include an obstacle detection unit to detect an obstacle that obstructs a movement of the main body.

According to an embodiment, when an obstacle is detected on the movement path of the light spot, the controller may control the navigator such that the main body tracks the light spot along an outer edge of the obstacle.

According to an embodiment, the cleaning robot may further include a step detection unit to detect a step that obstructs the movement of the main body.

According to an embodiment, when a step is detected on the movement path of the light spot, the controller may control the navigator such that the main body tracks the light spot along an outer edge of the step.

According to an embodiment, when the movement path of the light spot is determined as passing through an entry-forbidden area, the controller may control the navigator such that the main body tracks the light spot along an outer edge of the entry-forbidden area.

A remote controller may include a user interface to receive a control command of a user, a light transmitter to modulate an infrared ray and to transmit the modulated infrared ray, and a controller to control the light transmitter to transmit the modulated infrared ray in accordance with the control command, wherein the light transmitter may include an infrared ray modulator to generate a modulation signal in accordance with the control command of the user, an infrared ray transmitter to transmit an infrared ray in accordance with the modulation signal, and a visible light transmitter to transmit visible light to form the light spot.

According to an embodiment, the infrared ray transmitter may include an infrared ray light-emitting diode to transmit the infrared ray, a light collecting plate to reflect the infrared ray in order to focus the infrared ray, and a light collecting lens to refract the infrared ray in order to focus the infrared ray.

According to an embodiment, the visible light transmitter may include a visible light light-emitting diode to transmit the visible light, a light collecting plate to reflect the visible light in order to focus the visible light, and a light collecting lens to refract the visible light in order to focus the visible light.

According to an embodiment, an infrared ray spot formed by the infrared ray transmitter and a visible light spot formed by the visible light transmitter may be formed by overlapping each other.

A cleaning robot may include a plurality of signal reception units to receive at least one of an infrared signal and an ultrasonic signal output from a remote controller, and a control unit to calculate a distance from the remote controller and a direction of the remote controller using at least one of the received infrared signal and the ultrasonic signal.

According to an embodiment, the signal reception units may include a plurality of light reception units to receive an infrared signal output from the remote controller, and a plurality of sonic wave reception units to receive an ultrasonic signal output from the remote controller.

According to an embodiment, the control unit may calculate the distance from the remote controller based on a difference between a time at which the infrared signal is received and a time at which the ultrasonic signal is received.

According to an embodiment, the signal reception units may receive a plurality of infrared rays which are different for each predetermined distance, and the control unit may calculate the distance from the remote controller based on types of the received infrared signals.

According to an embodiment, the control unit may calculate the direction of the remote controller in accordance with the intensity of each ultrasonic signal received by the plurality of signal reception units.

According to an embodiment, the control unit may calculate the direction of the remote controller in accordance with the reception time of each ultrasonic signal received by the plurality of signal reception units.

According to an embodiment, the control unit may calculate the direction of the remote controller using a position of the signal reception unit that has received an infrared signal among the plurality of signal reception units.

According to an embodiment, the cleaning robot may further include a navigation unit to move a body, and the control unit may control the navigation unit to rotate the body until a predetermined signal reception unit among the plurality of signal reception units receives the infrared signal.

According to an embodiment, the light reception units may include an infrared ray receiver to receive an infrared signal, and a light reception driving motor to rotate an upper portion of the body, and the control unit may control the light reception driving motor to rotate an upper portion of the cleaning robot on which the plurality of light reception units are provided until a predetermined light reception unit among the plurality of light reception units receives the infrared signal.

According to an embodiment, the cleaning robot may further include a navigation unit to move the body, and a first communication unit to receive from the remote controller a motion detected at a time of indicating a designated starting area and a motion detected at a time of indicating a designated ending area, and the control unit may set coordinates of the designated ending area based on the motion at the time of indicating the designated starting area and the motion at the time of indicating the designated ending area, and control the navigation unit such that the body moves to the set coordinates.

A cleaning robot system may include a remote controller to output at least one of an infrared signal and an ultrasonic signal, and a signal reception unit to receive at least one of the output infrared signal and the ultrasonic signal, and a cleaning robot to calculate a distance from the remote controller and a direction of the remote controller using at least one of the received infrared signal and the ultrasonic signal.

A method of controlling a cleaning robot system may include outputting, by a remote controller, at least one of an infrared signal and an ultrasonic signal, receiving, by a plurality of signal reception units, at least one of the output infrared signal and the ultrasonic signal, and calculating a distance from the remote controller and a direction of the remote controller using at least one of the received infrared signal or the ultrasonic signal.

A cleaning robot may track a position indicated by a remote controller such that a user can conveniently move the cleaning robot.

Start and end areas may be designated such that the cleaning robot can be moved to the designated ending area.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 illustrates an example of the light spot generated by the remote controller according to an embodiment.

FIGS. 16A, 16B, 17A, and 17B illustrate an example of the cleaning robot according to an embodiment tracking the light spot.

FIG. 33 illustrates a light spot tracking method in which the cleaning robot according to an embodiment tracks a light spot while avoiding a step.

FIG. 42 is a perspective view of a cleaning robot system according to an embodiment.

FIGS. 65, 66A, 66B and 66C are conceptual views of the method illustrated in FIG. 64.

DETAILED DESCRIPTION

Figure 1:
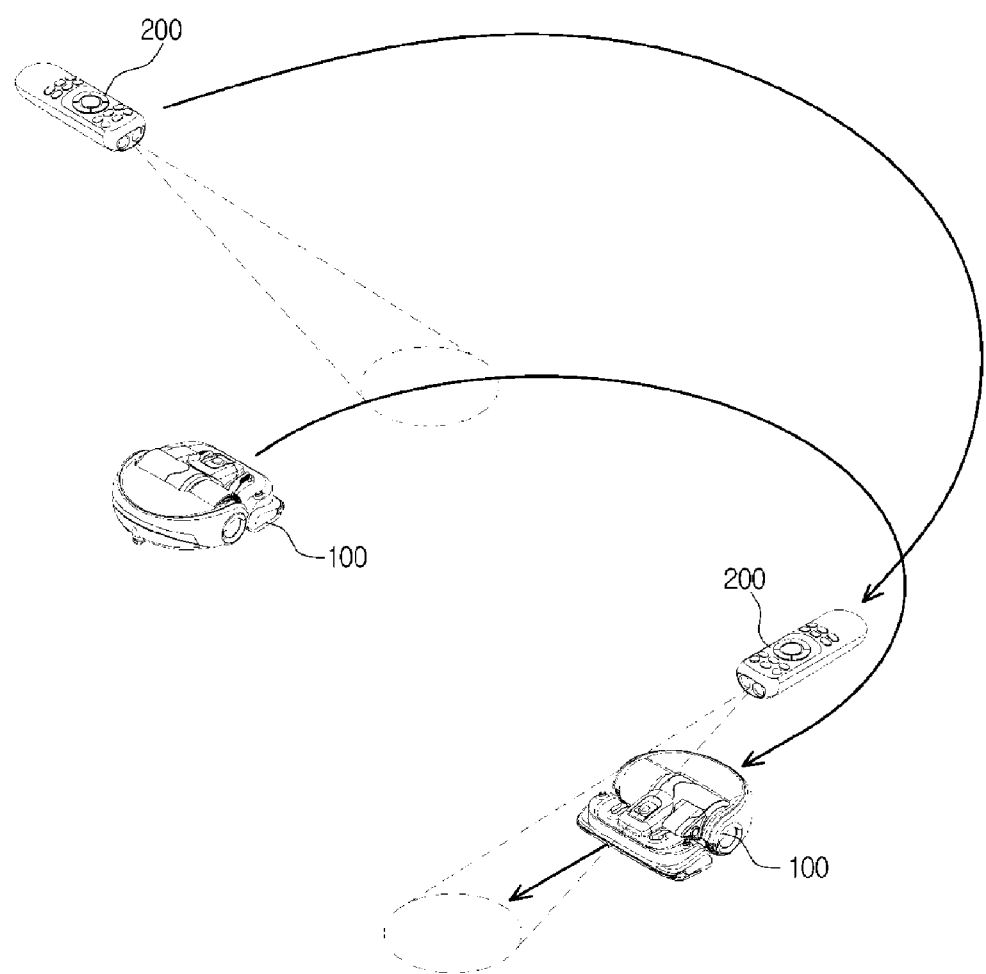
FIG. 1 briefly illustrates operations of a cleaning robot and a remote controller according to an embodiment.

Reference will now be made in detail to the embodiments, examples of which are illustrated in the accompanying drawings, wherein like reference numerals refer to the like elements throughout. The embodiments are described below to explain the present disclosure by referring to the figures.

Embodiments described in the present specification and configurations illustrated in the drawings are merely embodiments of the disclosed disclosure, and various modified embodiments that are capable of substituting for the embodiments and the drawings of the present specification may exist at the time of applying the present application.

The terms used in the present specification are used to describe the embodiments and are not intended to restrict and/or limit the disclosed embodiment.

Specifically, a singular expression in the present specification may include a plural expression unless clearly defined otherwise.

In addition, the terms such as "include" or "have" used in the present specification are to designate that a characteristic, a number, a step, an operation, an element, a part, described in the specification or combinations thereof exist, and do not exclude in advance the existence of or the possibility of adding one or more other characteristics, numbers, steps, operations, elements, parts, or combinations thereof.

In addition, the terms including ordinals such as "first," "second," and the like used in the present specification may be used to describe various elements, but the elements are not limited by the terms, and the terms are used to only distinguish one element from another element.

In addition, terms such as "-unit," "-er," "-block," "-member," "-module," and the like used in the present specification may represent a unit of processing at least one function or operation. For example, the terms may represent software stored in a memory and hardware such as a field-programmable gate array (FPGA) or an application specific integrated circuit (ASIC). However, meanings of "-unit," "-er," "-block," "-member," "-module," and the like are not limited to software or hardware, and "-unit," "-er," "-block," "-member," "-module," and the like may be an element stored in an accessible storage medium and performed by one or more processors.

Hereinafter, an embodiment of the disclosed disclosure will be described in detail with reference to the accompanying drawings. The same reference numerals or marks shown in the accompanying drawings may represent a part or an element performing substantially the same function.

Hereinafter, an embodiment of the disclosed disclosure will be described in detail with reference to the accompanying drawings.

Figure 2:
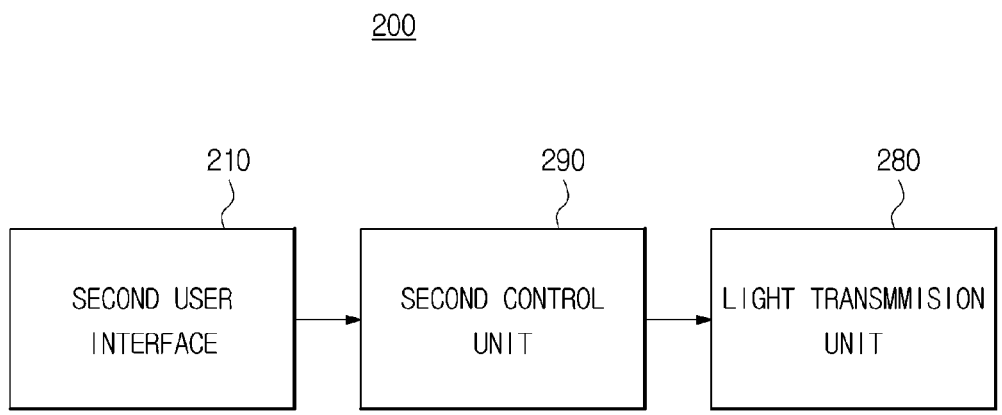
FIG. 2 briefly illustrates a configuration of the remote controller according to an embodiment.
Figure 3:
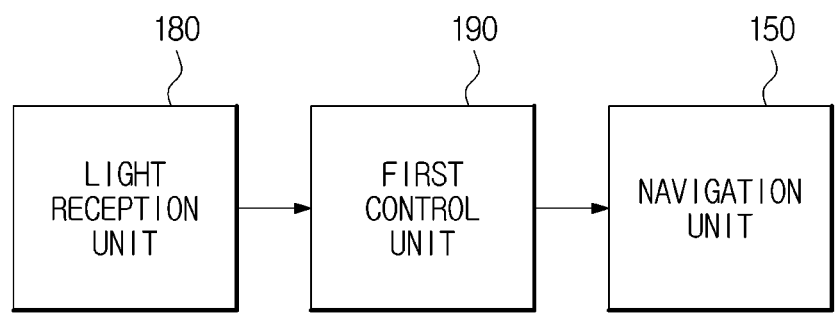
FIG. 3 briefly illustrates a configuration of the cleaning robot according to an embodiment.

FIG. 1 briefly illustrates operations of a cleaning robot and a remote controller according to an embodiment, FIG. 2 briefly illustrates a configuration of the remote controller according to an embodiment, and FIG. 3 briefly illustrates a configuration of the cleaning robot according to an embodiment.

The operations and configurations of the cleaning robot and the remote controller according to an embodiment will be briefly described with reference to FIGS. 1, 2, and 3.

A cleaning robot 100 cleans a cleaning area while navigating the cleaning area. A remote controller 200 is input with a control command from a user and transmits the input control command to the cleaning robot 100.

The remote controller 200 includes a second user interface 210 to receive the control command from the user, a light transmission unit 280 to transmit visible light and an infrared ray, and a second control unit 290 to control the light transmission unit 280 to transmit the visible light and the infrared ray in accordance with the user's control command.

Particularly, the light transmission unit 280 modulates the infrared ray in accordance with the control command input by the user and transmits the modulated infrared ray. For example, the light transmission unit 280 may transmit a first infrared pulse of a wide width and a second infrared pulse of a narrow width in a predetermined order in accordance with the control command.

In addition, the cleaning robot 100 includes a light reception unit 180 to receive an infrared ray transmitted by the remote controller 200, a navigation unit 150 to move the cleaning robot 100, and a first control unit 190 to control the navigation unit 150 such that the cleaning robot 100 moves in accordance with a control command included in the infrared ray received by the light reception unit 180.

The cleaning robot 100 moves along a movement path of a light spot LS at a position indicated by the user using the remote controller 200.

Specifically, when the user inputs a drag, or track, command to the remote controller 200 through the second user interface 210, the remote controller 200 radiates visible light and an infrared ray through the light transmission unit 280.

The visible light allows the user to confirm a position indicated by the user. The user may recognize the position indicated by the user through a visible light spot formed by a projection of the visible light radiated from the remote controller 200 on the cleaning area.

The infrared ray transmits a position indicated by the user to the cleaning robot 100. The cleaning robot 100 may recognize the position indicated by the user through an infrared ray spot formed by a projection of the infrared ray radiated from the remote controller 200 on the cleaning area.

In addition, the infrared ray includes the drag command input by the user. As mentioned above, the infrared ray is transmitted by the remote controller 200 after being modulated in accordance with the drag command. Accordingly, when the infrared ray is modulated, the cleaning robot 100 may acquire the drag command.

Like this, the infrared ray transmitted by the remote controller 200 not only transmits the control command but also provides the position indicated by the user to the cleaning robot 100.

The cleaning robot 100 receives the infrared ray through the light reception unit 180. Here, the cleaning robot may acquire the drag command input by the user and a position indicated by the remote controller 200 through the infrared ray. Also, when the drag command is received, the cleaning robot 100 moves toward the position indicated by the remote controller 200.

Here, when the user changes the position indicated by the remote controller 200, the cleaning robot 100 moves toward the changed position. That is, the cleaning robot 100 moves along a movement path of the position indicated by the remote controller 200.

By the above method, the user may generate a movement path along which the cleaning robot 100 will move using the remote controller 200, and the cleaning robot 100 moves along the movement path generated by the user.

Figure 4:
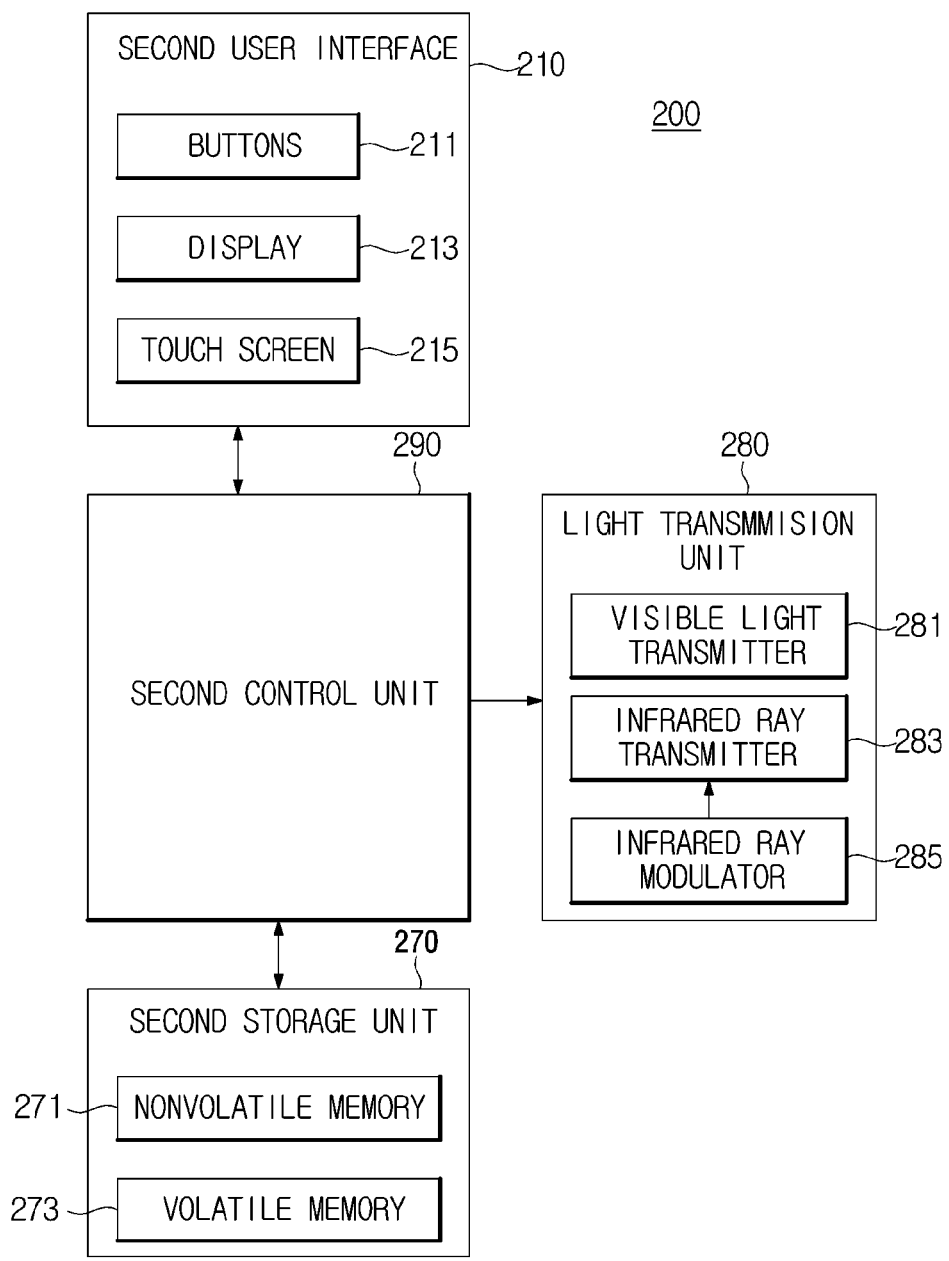
FIG. 4 illustrates the configuration of the remote controller according to an embodiment.
Figure 5:
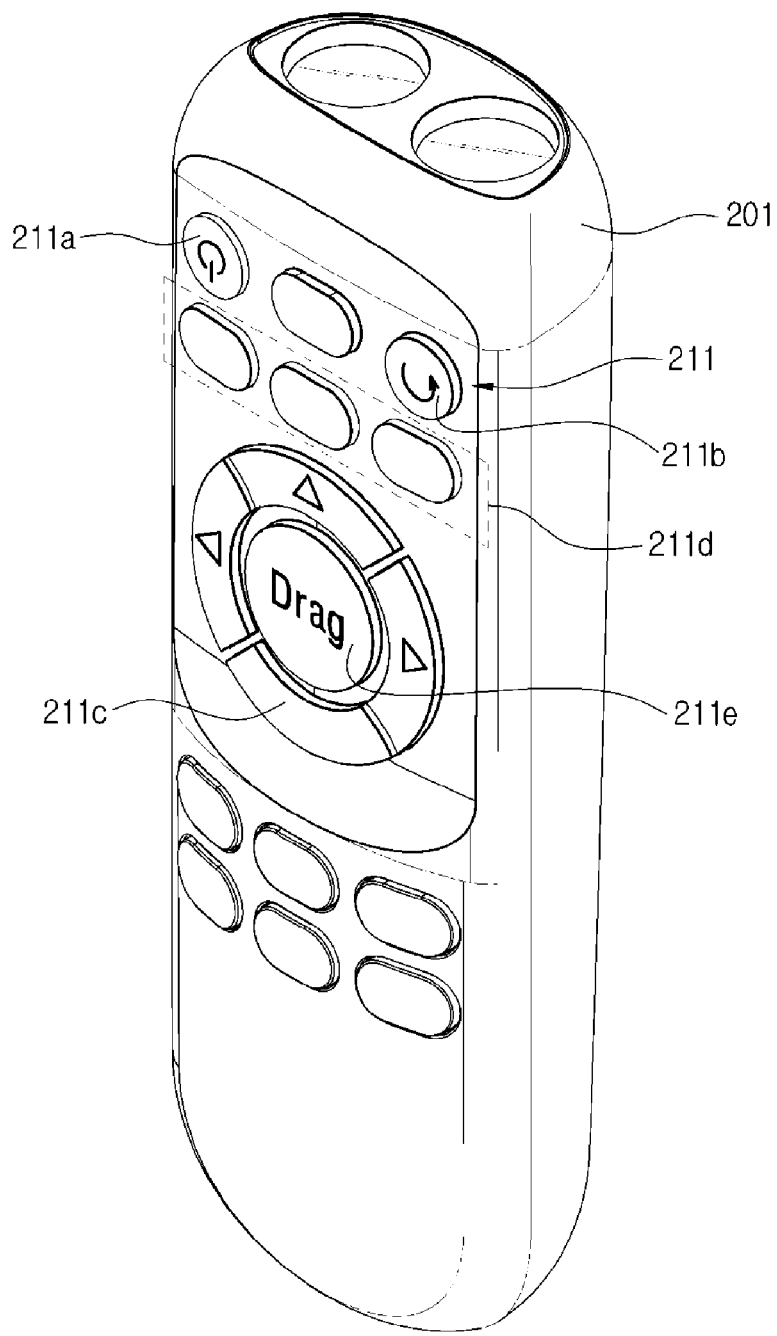
FIG. 5 illustrates an exterior of the remote controller according to an embodiment.

FIG. 4 illustrates the configuration of the remote controller according to an embodiment, and FIG. 5 illustrates an exterior of the remote controller according to an embodiment.

Referring to FIGS. 4 and 5, the remote controller 200 further includes a second storage unit 270 in addition to the above-mentioned second user interface 210, light transmission unit 280, and second control unit 290.

The second user interface 210 interacts with the user, and includes a plurality of buttons 211.

The plurality of buttons 211 are provided at an upper surface of a main body 201 forming an exterior of the remote controller 200 and are used to input a control command from the user.

The plurality of buttons 211 may include a power button 211*a* to turn on or off the cleaning robot 100, a return button 211*b* to return the cleaning robot 100 to a charging station (not shown) for charging the power, an operation button 211*c* to operate or stop the cleaning robot 100, a cleaning mode button 211*d* to select a cleaning mode of the cleaning robot 100, etc.

In addition, the plurality of buttons 211 include a drag button 211*e* to input the drag command for moving the cleaning robot 100 along the movement path of the light spot LS.

The plurality of buttons 211 described above may employ a microswitch that detects a user's pressure, a membrane switch, or a touch switch that detects a user's contact.

In addition, although not illustrated in FIG. 5 that illustrates the exterior of the remote controller 200, the remote controller 200 may further include a display 213 or a touch screen 215 according to an embodiment.

The display 213 may display operation information of the cleaning robot 100 in accordance with the control command input by the user. For example, the display 213 may display an operation state, a power state, a cleaning mode selected by the user, a malfunction state, etc. of the cleaning robot 100.

The display 213 described above may employ a liquid crystal display (LCD), a light emitting diode (LED), or an organic light emitting diode (OLED).

The touch screen 215 may be provided by an integration of a touch panel that detects contact coordinates of the user and a display panel that displays a control command capable of being input by the user.

The touch screen 215 may display a plurality of control commands capable of being input by the user, and receive a control command selected by the user among the plurality of displayed control commands. Specifically, the touch screen 215 may detect coordinates touched by the user, and compare the detected touch coordinates with coordinates at which the control command is displayed in order to recognize the control command input by the user.

The second storage unit 270 may include a nonvolatile memory 271 such as a hard disk drive, a solid state drive, a read only memory, an erasable programmable read only memory (EPROM), and an electrically erasable programmable read only memory (EEPROM) which permanently store a control program or control data to control the operation of the remote controller 200, and a volatile memory 273 such as a D-RAM, and an S-RAM which temporarily stores temporary data generated in a process of controlling the operation of the remote controller 200.

The light transmission unit 280 transmits the visible light and the infrared ray in accordance with the user's control command as mentioned above. Particularly, the infrared ray transmitted by the light transmission unit 280 includes the control command input by the user.

Specifically, the light transmission unit 280 transmits a modulated infrared ray in accordance with the control command input by the user to be described below. For example, the light transmission unit 280 may transmit a pulse type infrared ray with a modulated pulse width in accordance with the control command input by the user.

The light transmission unit 280 will be described in more detail below.

The second control unit 290 generally controls the operation of the remote controller 200.

Specifically, the second control unit 290 outputs a control signal to control the light transmission unit 280 in accordance with the user's control command input through the second user interface 210.

For example, the second control unit 290 may control the light transmission unit 280 such that both of the visible light and the infrared ray are transmitted when the user inputs the drag command, and the second control unit 290 may control the light transmission unit 280 such that only the infrared ray is transmitted when the user inputs the operation command.

In addition, the second control unit 290 transmits the control command input by the user to the light transmission unit 280 such that the light transmission unit 280 transmits the modulated infrared ray in accordance with the control command.

For example, when the user presses or touches the operation button 211*c*, the second control unit 290 may transmit the operation command to the light transmission unit 280.

For an example, when the user presses or touches the drag button 211*e*, the second control unit 290 may transmit the drag command to the light transmission unit 280.

Particularly, when the drag command is input, the second control unit 290 may continuously transmit the drag command to the light transmission unit 280 while the user presses or touches the drag button 211e, or continuously transmit the drag command to the light transmission unit 280 until the user presses or touches the drag button 211e again.

The second control unit 290 described above may include one or more microprocessors to control the operation of the remote controller 200, and the operation of the remote controller 200 to be described below is performed by the control signal output by the second control unit 290.

Hereinafter, a configuration of the light transmission unit 280 will be described.

Figure 6A:
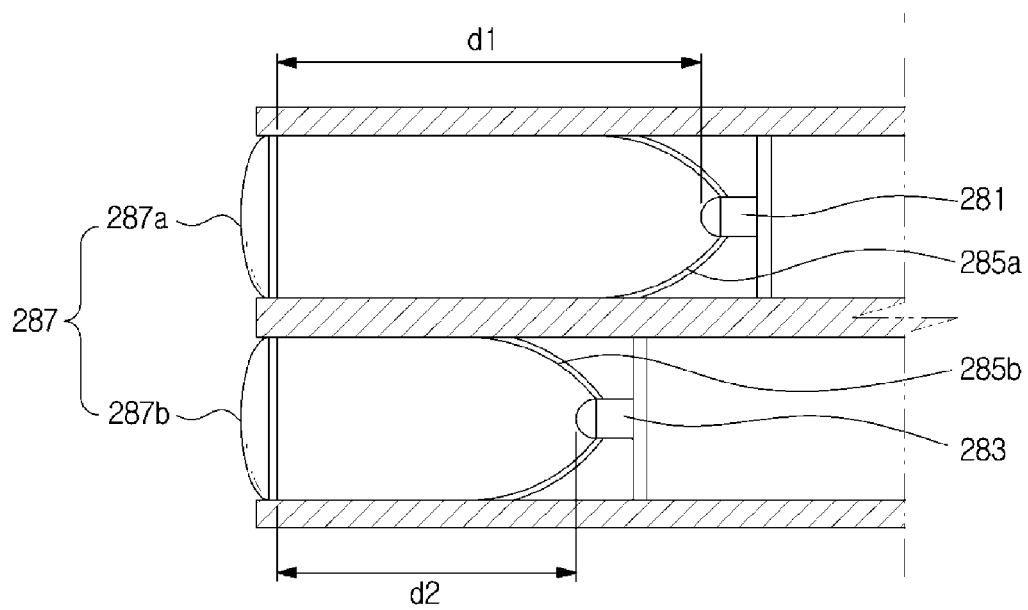
FIGS. 6A and 6B illustrate a light transmission unit included in the remote controller according to an embodiment.
Figure 6B:
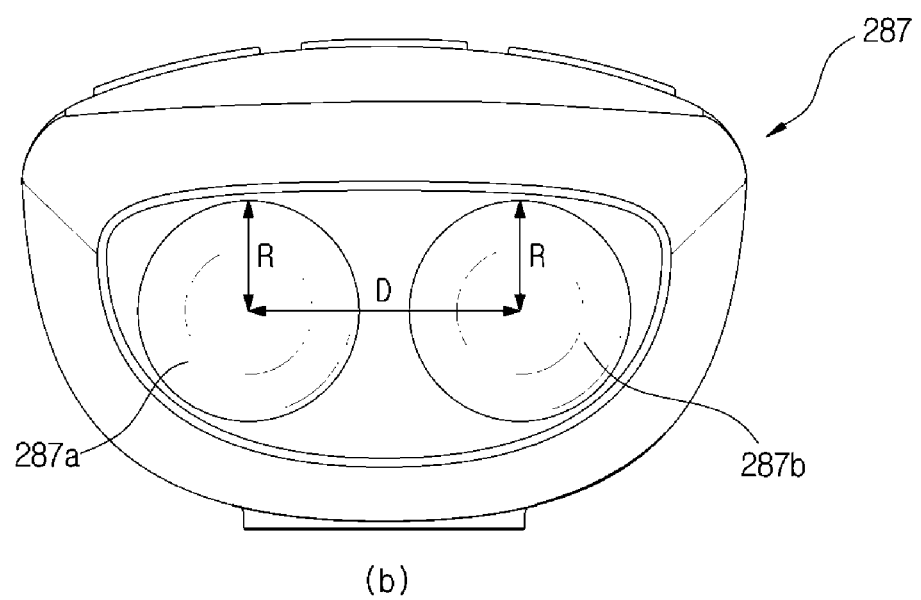
Figure 7:
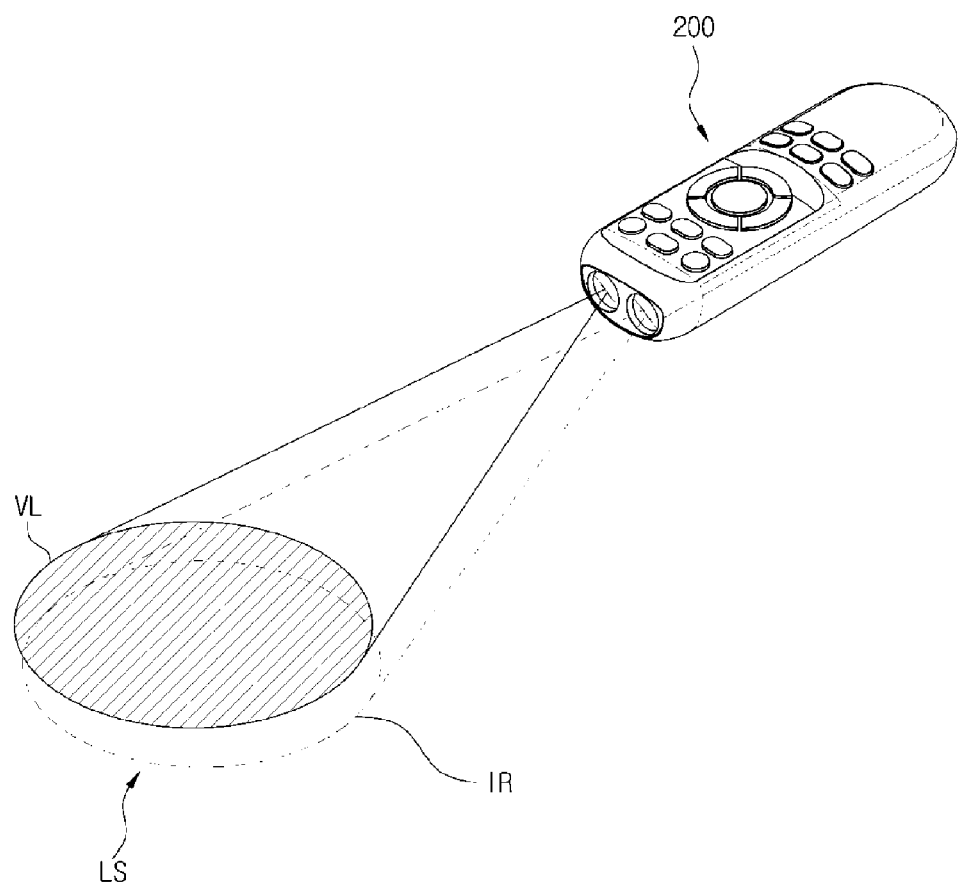
FIG. 7 illustrates a light spot generated when the remote controller according to an embodiment radiates light to a cleaning area.

FIGS. 6A and 6B illustrate a light transmission unit included in the remote controller according to an embodiment, and FIG. 7 illustrates a light spot generated when the remote controller according to an embodiment radiates light to a cleaning area. Also, FIG. 8 illustrates an example of the light spot generated by the remote controller according to an embodiment.

Referring to FIGS. 6A, 6B, 7, and 8, the light transmission unit 280 may include a visible light transmitter 281 to transmit visible light that may be recognized by the user as mentioned above, an infrared ray transmitter 283 to transmit an infrared ray that may be recognized by the cleaning robot 100, and an infrared ray modulator 285 to modulate the infrared ray transmitted by the infrared ray transmitter 283.

In addition, the light transmission unit 280 may further include light collecting plates 285a and 285b and a lens module 287 in addition to the visible light transmitter 281, the infrared ray transmitter 283, and the infrared ray modulator 285.

The visible light transmitter 281 transmits the visible light in accordance with the control signal output by the second control unit 290 as mentioned above, and the visible light transmitter 281 described above may employ a visible light LED or a visible light laser diode which transmit the visible light.

The infrared ray modulator 285 outputs a modulation signal to modulate the infrared ray in accordance with the control command input by the user.

For example, the infrared ray modulator 285 may generate the modulation signal to modulate the width of the infrared pulse in accordance with the control command input by the user. Specifically, the infrared ray modulator 285 may output a first modulation signal to output an infrared pulse of a large width representing "1" or output a second modulation signal to output an infrared pulse of a small width representing "0."

The infrared ray transmitter 283 transmits the infrared ray in accordance with the modulation signal output by the infrared ray modulator 285, and the infrared ray transmitter 283 described above may employ an infrared ray LED or an infrared ray laser diode which transmit the infrared ray.

The light collecting plates 285a and 285b may include a first reflective plate 285a that reflects the visible light to focus the visible light transmitted by the visible light transmitter 281, and a second reflective plate 285b that reflects the infrared ray to focus the infrared ray transmitted by the infrared ray transmitter 283.

The light collecting plates 285a and 285b may be formed in conical shapes with convex inclined surfaces such that cross-sections are formed in parabolic shapes, and may be formed of metal materials with superior efficiency of reflecting the visible light and the infrared ray in order to focus the visible light and the infrared ray.

The lens module 287 may include a first lens 287a that refracts the visible light to focus the visible light transmitted by the visible light transmitter 281, and a second lens 287b that refracts the infrared ray to focus the infrared ray transmitted by the infrared ray transmitter 283.

When the light transmission unit 280 radiates the visible light and the infrared ray toward a floor of the cleaning area, the radiated visible light and the infrared ray are projected on the floor of the cleaning area, and a visible light spot VL and an infrared ray spot IR are formed as illustrated in FIG. 7.

The user may recognize the position indicated by the remote controller 200 through the visible light spot VL, and the cleaning robot 100 may recognize the position indicated by the remote controller 200 through the infrared ray spot IR.

In addition, the infrared ray transmitted by the light transmission unit 280 of the remote controller 200 is modulated by the user's control command, and the cleaning robot 100 may demodulate the modulated infrared ray to acquire the user's control command.

Because the infrared ray transmitted by the remote controller 200 includes information on the user's control command and information on the position indicated by the user as described above, the two types of information may be transmitted using one infrared ray transmitter 283. Also, an infrared ray transmitter to transmit the user's control command and an infrared ray transmitter to show the position indicated by the user may not be provided separately.

The visible light spot VL and the infrared ray spot IR overlap each other such that the position recognized by the user and the position recognized by the cleaning robot 100 are the same, and the light spot LS is formed by the overlapping visible light spot VL and the infrared ray spot IR. The user and the cleaning robot 100 may recognize the position indicated by the remote controller 200 by the light spot LS formed as above.

In addition, a radius R of the first lens 287a and the second lens 287b, a distance d1 between the first lens 287a and the visible light transmitter 281, and a distance d2 between the second lens 287b and the infrared ray transmitter 283 may be adjusted such that the visible light spot VL may be clearly identified by the user and the infrared ray spot IR may be clearly identified by the cleaning robot 100.

For example, the visible light spot VL and the infrared ray spot IR brightens whereas the size of the visible light spot VL and the infrared ray spot IR reduces as the radius R of the first lens 287a and the second lens 287b become larger.

In addition, the visible light spot VL and the infrared ray spot IR brightens even more as the distance d1 between the first lens 287a and the visible light transmitter 281 and the distance d2 between the second lens 287b and the infrared ray transmitter 283 become farther.

The radius R of the first lens 287a and the second lens 287b may be approximately 15 mm or less to form the visible light spot VL and the infrared ray spot IR of proper brightness and proper size.

The distance d1 between the first lens 287a and the visible light transmitter 281 may be approximately 30 mm or less, and the distance d2 between the second lens 287b and the infrared ray transmitter 283 may be approximately 40 mm or less. Because the wavelength of the visible light and the wavelength of the infrared ray are different from each other, the distance d1 between the first lens 287a and the visible light transmitter 281 and the distance d2 between the second lens 287b and the infrared ray transmitter 283 may be different from each other.

In addition, a distance D between the center of the first lens 287a and the center of the second lens 287b may be adjusted to increase a ratio in which the visible light spot VL and the infrared ray spot IR overlap each other.

When the radius R of the first lens 287a and the second lens 287b, the distance d1 between the first lens 287a and the visible light transmitter 281, and the distance d2 between the second lens 287b and the infrared ray transmitter 283 are set as mentioned above, the distance D between the center of the first lens 287a and the center of the second lens 287b may be set as approximately 20 mm or less.

When the distance D between the center of the first lens 287a and the center of the second lens 287b is set as approximately 20 mm or less as mentioned above, the ratio in which the visible light spot VL and the infrared ray spot IR overlap each other becomes approximately 90% or higher.

In addition, the light spot LS may have various forms as illustrated in FIG. 8 such that the user may clearly recognize the position indicated by the remote controller 200.

Because the user recognizes the position indicated by the remote controller 200 through the visible light spot VL, the visible light spot VL may have various forms as illustrated in FIG. 8.

To enable the visible light spot VL to have various forms, a pattern corresponding to a shape of the light spot LS illustrated in FIG. 8 may be formed at the first lens 287a. Additionally or alternatively, a light penetration member (not shown) at which an opaque pattern corresponding to the shape of the light spot LS illustrated in FIG. 8 parts (a)-(f) may be provided between the first lens 287a and the visible light transmitter 281.

Figure 9:
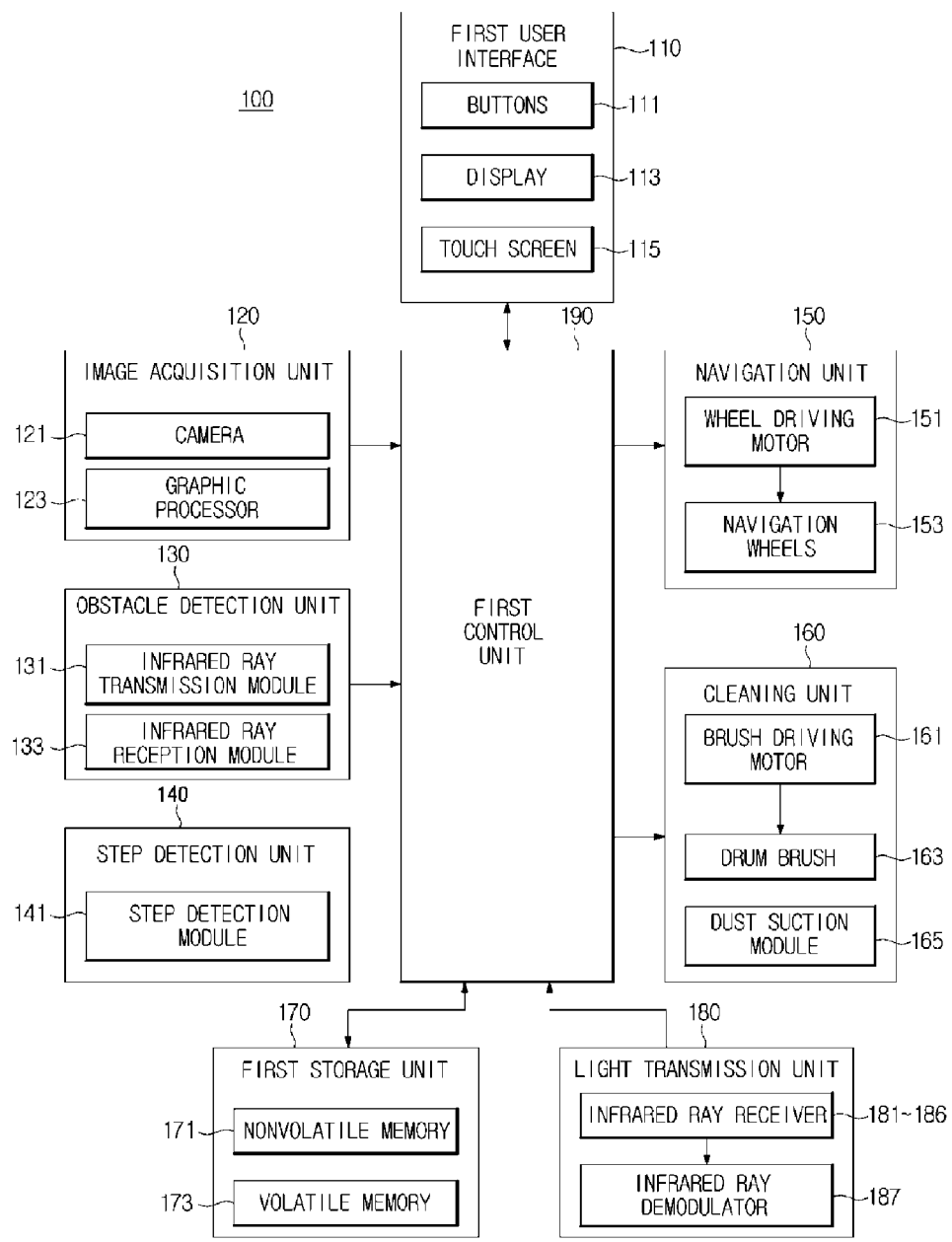
FIG. 9 illustrates the configuration of the cleaning robot according to an embodiment.
Figure 10:
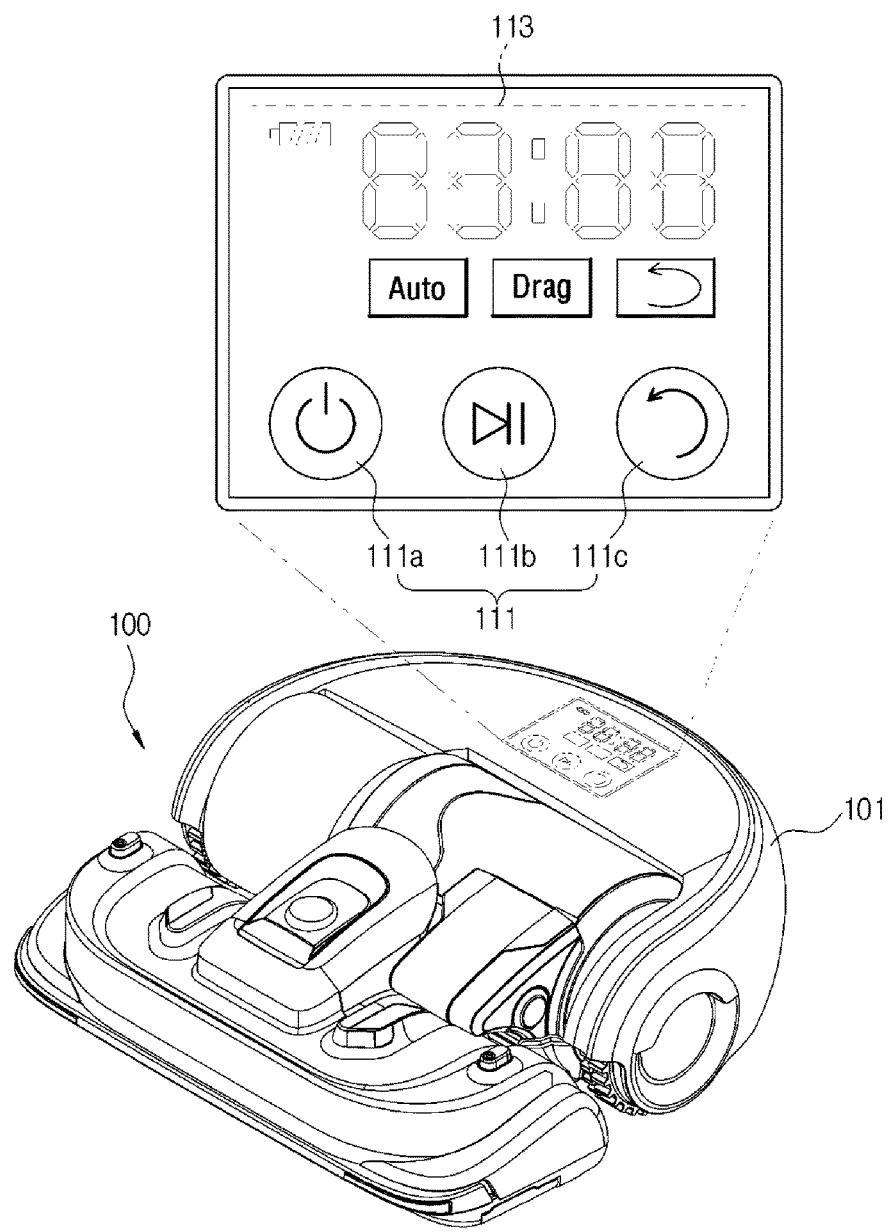
FIG. 10 illustrates an exterior of the cleaning robot according to an embodiment.
Figure 11:
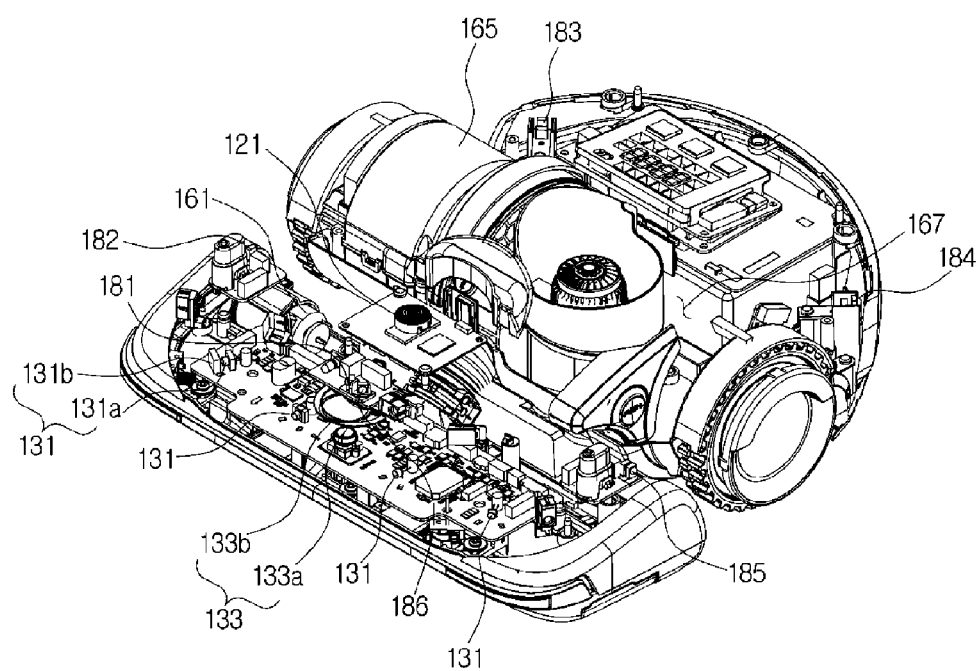
FIG. 11 illustrates an inside of the cleaning robot according to an embodiment.
Figure 12:
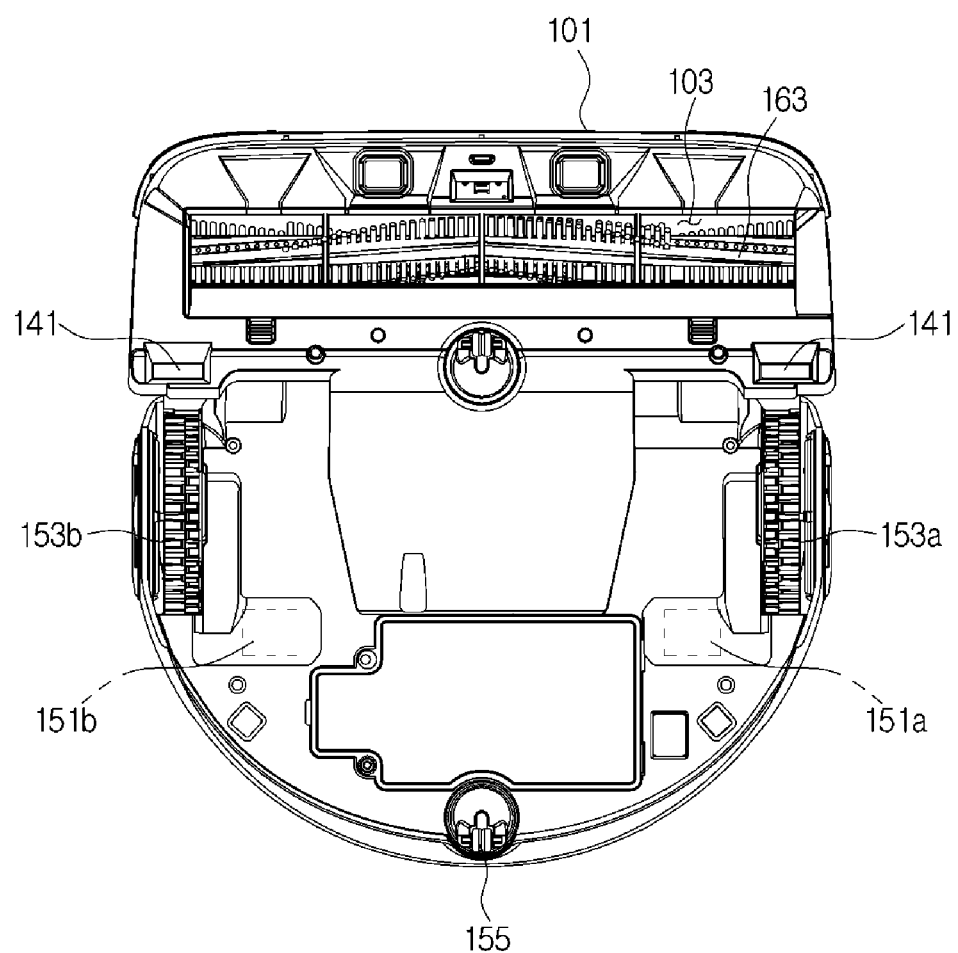
FIG. 12 illustrates a bottom surface of the cleaning robot according to an embodiment.

FIG. 9 illustrates the configuration of the cleaning robot according to an embodiment, FIG. 10 illustrates an exterior of the cleaning robot according to an embodiment, FIG. 11 illustrates an inside of the cleaning robot according to an embodiment, and FIG. 12 illustrates a bottom surface of the cleaning robot according to an embodiment.

Referring to FIGS. 9, 10, 11, and 12, the cleaning robot 100 further includes a first user interface 110, an image acquisition unit 120, an obstacle detection unit 130, a step detection unit 140, a cleaning unit 160, and a first storage unit 170 in addition to the above-mentioned light reception unit 180, navigation unit 150, and first control unit 190.

The first user interface 110 interacts with the user and includes a plurality of buttons 111 and a display 113.

The plurality of buttons 111 are provided at an upper surface of a main body 101 forming the exterior of the cleaning robot 100 as illustrated in FIG. 10 and are input with the control command from the user.

The plurality of buttons 111 may include a power button 111a to turn on or off the cleaning robot 100, an operation button 111b to operate or stop the cleaning robot 100, a return button 111c to return the cleaning robot 100 to a charging station (not shown), etc.

In addition, the plurality of buttons 111 may employ a microswitch that detects a user's pressure, a membrane switch, or a touch switch that detects a user's contact.

The display 113 displays operation information of the cleaning robot 100 in accordance with the control command input by the user. For example, the display 113 may display an operation state, a power state, a cleaning mode selected by the user, a charging station (not shown) return state, etc. of the cleaning robot 100.

In addition, the display 113 may employ a liquid crystal display (LCD), a light emitting diode (LED), or an organic light emitting diode (OLED).

In addition, although not illustrated in the drawing that illustrates the exterior of the cleaning robot 100, the cleaning robot 100 may further include a touch screen 115 in which a touch panel that detects contact coordinates of the user and a display panel that displays a control command capable of being input by the user are integrated according to an embodiment.

The touch screen 115 may display a plurality of control commands capable of being input by the user, and receive a control command selected by the user among the plurality of displayed control commands. Specifically, the touch screen 115 may detect coordinates touched by the user, and compare the detected touch coordinates with coordinates at which the control command is displayed in order to recognize the control command input by the user.

The image acquisition unit 120 acquires an image around the cleaning robot 100, and may include an image sensor 121 and a graphic processor 123.

The image sensor 121 is provided at the upper surface of the main body 101 to acquire an upper image of the cleaning robot 100. For example, the upper image acquired by the image sensor 121 may be used in calculating the position of the cleaning robot 100 by the first control unit 190 to be described later.

In addition, the image sensor 121 may include a complementary metal oxide semiconductor (CMOS) sensor or a charge coupled device (CCD) sensor which converts the upper image of the cleaning robot 100 to an electrical signal.

The graphic processor 123 converts an image acquired by the image sensor 121 to a form capable of being processed by the first control unit 190 to be described later. For example, the graphic processor 123 may perform a simple image processing operation such as changing a resolution of the image acquired by the image sensor 121 or changing the size of the image acquired by the image sensor 121.

The obstacle detection unit 130 detects an obstacle obstructing a movement of the cleaning robot 100 without coming in contact with the obstacle.

The obstacle represents everything that protrudes from the floor of the cleaning area and obstructs the movement of the cleaning robot 100. For example, the obstacle may not only refer to a piece of furniture, table, and sofa provided in a living room, but also refer to a separate obstacle dividing the cleaning area.

Specifically, the obstacle detection unit 130 transmits an infrared ray (or an ultrasonic wave), detects the infrared ray (or the ultrasonic wave) reflected from the obstacle, and outputs to the first control unit 190 the intensity of the detected infrared ray (or ultrasonic wave) or a time of flight (TOF) until the reflected infrared ray (or ultrasonic wave) is detected after the infrared ray (or the ultrasonic wave) is transmitted.

The first control unit 190 may determine the existence of the obstacle in accordance with the existence of the infrared ray (or the ultrasonic wave) reflected from the obstacle, and may also calculate a distance from the obstacle based on the intensity of the infrared ray (or the ultrasonic wave) reflected from the obstacle or the time of flight (TOF) until the reflected infrared ray (or ultrasonic wave) is detected after the infrared ray (or the ultrasonic wave) is transmitted.

In addition, as illustrated in FIG. 11, the obstacle detection unit 130 may include an infrared ray transmission module 131 to transmit the infrared ray, and an infrared ray reception module 133 to receive the infrared ray reflected from the obstacle.

The infrared ray transmission module 131 may be provided at a front portion of the main body 101 to transmit the infrared ray toward the front of the main body 101. Also, according to an embodiment, the infrared ray transmission module 131 may include an infrared ray LED 131a to generate the infrared ray and a wide-angle lens 131b to diffuse the infrared ray in all directions by refracting the transmitted infrared ray.

The infrared ray reception module 133 may be provided at the front portion of the main body 101 to detect an obstacle located in front of the main body 101. Also, according to an embodiment, the infrared ray reception module 133 may include an infrared ray sensor 133a to detect the infrared ray reflected from the obstacle and a reflection mirror 133b to reflect the infrared ray reflected from the obstacle toward the infrared ray sensor.

Although FIGS. 9 and 11 have illustrated an infrared ray sensor module as an example of the obstacle detection unit 130, the obstacle detection unit 130 is not limited to the infrared ray sensor and may also employ an ultrasonic wave sensor module or a microwave sensor module, for example.

The step detection unit 140 detects a step obstructing the movement of the cleaning robot 100.

Opposite to the obstacle protruding from the floor of the cleaning area and obstructing the movement of the cleaning robot 100, a step refers to a structure being recessed from the floor of the cleaning area and obstructing the movement of the cleaning robot 100. For example, an entrance provided at a living room is a typical example of the step.

According to an embodiment, the step detection unit 140 may include a step detection module 141 provided at a bottom surface of the main body 101. The step detection module 141 may transmit an infrared ray or an ultrasonic wave toward the floor of the cleaning area, and detect the infrared ray or the ultrasonic wave reflected from the floor of the cleaning area.

Specifically, the step detection module 141 outputs to the first control unit 190 the intensity of the infrared ray (or ultrasonic wave) reflected from the floor of the cleaning area or the time of flight (TOF) until the reflected infrared ray (or ultrasonic wave) is detected after the infrared ray (or the ultrasonic wave) is transmitted.

The first control unit 190 may determine the existence of the step in accordance with the intensity of the infrared ray (or ultrasonic wave) reflected from the floor of the cleaning area or the time of flight (TOF) until the reflected infrared ray (or ultrasonic wave) is detected after the infrared ray (or the ultrasonic wave) is transmitted.

Specifically, the first control unit 190 may determine that the step exists when the intensity of the infrared ray (or ultrasonic wave) reflected from the floor of the cleaning area is equal to or less than a predetermined reference intensity, or determine that the step exists when the time of flight (TOF) until the reflected infrared ray (or ultrasonic wave) is detected after the infrared ray (or the ultrasonic wave) is transmitted is equal to or longer than a predetermined reference TOF.

The navigation unit 150 moves the main body 101 of the cleaning robot 100, and may include a wheel driving motor 151, navigation wheels 153, and a castor wheel 155.

The navigation wheels 153 move the main body 101 by rotation, are respectively provided at both ends of the bottom surface of the main body 101, and include a left navigation wheel 153a provided at the left of the main body 101 and a right navigation wheel 153b provided at the right of the main body 101 with respect to the front of the main body 101.

The navigation wheels 153 allow the main body 101 to move forward, move backward, or rotate.

For example, the main body 101 may move forward in a straight line when both of the left and right navigation wheels 153a and 153b rotate in a first direction toward the front, and the main body 101 may move backward in a straight line when both of the left and right navigation wheels 153a and 153b rotate in a second direction toward the rear.

In addition, the main body 101 may move to the right or the left in a curve when the left and right navigation wheels 153a and 153b rotate in the same direction but rotate at different speeds, and the main body 101 may rotate to the left or the right at the same spot when the left and right navigation wheels 153a and 153b rotate in different directions.

The wheel driving motor 151 generates a rotary force to rotate the navigation wheels 153, and may include a left driving motor 151a to rotate the left navigation wheel 153a and a right driving motor 151b to rotate the right navigation wheel 153b.

Each of the left and right driving motors 151a and 151b may operate independently from each other by the control signal of the first control unit 190, and the main body 101 may move forward, move backward, or rotate in accordance with motions of the left and right driving motors 151a and 151b.

In addition, each of the left and right driving motors 151a and 151b may include a rotation detection sensor (not shown) or a position detection sensor (not shown) to detect rotational speeds or rotational displacements of the left and right driving motors 151a and 151b.

The castor wheel 155 is installed at the bottom surface of the main body 101 to rotate along a moving direction of the main body 101, and allows the main body 101 to move while maintaining a stable posture.

The cleaning unit 160 includes a drum brush 163 to scatter dust on the floor of the cleaning area, a brush driving motor 161 to rotate the drum brush 163, a dust suction module 165 to suction the scattered dust, and a dust storage 167 to store the suctioned dust.

The drum brush 163 is provided at a dust inlet 103 formed at the bottom surface of the main body 101, and scatters the dust on the floor of the cleaning area into the dust inlet 103 while rotating about a rotation shaft provided in a direction perpendicular to the forward moving direction of the main body 101.

The brush driving motor 161 rotates the drum brush 163 in accordance with the control signal of the first control unit 190.

The dust suction module 165 suctions the dust scattered by the drum brush 163 into the dust storage 167, and may include a dust suction fan to generate a suction force for suctioning the dust into the dust storage 167, and a dust suction motor to rotate the dust suction fan.

The dust storage 167 stores the dust suctioned by the dust suction module 165.

The first storage unit 170 may include a nonvolatile memory 171 such as a hard disk drive, a solid state drive, a read only memory, an erasable programmable read only memory (EPROM), and an electrically erasable programmable read only memory (EEPROM) which permanently store a control program or control data to control the operation of the cleaning robot 100, and a volatile memory 173 such as a D-RAM and an S-RAM which temporarily stores temporary data generated in a process of controlling the operation of the cleaning robot 100.

The light reception unit 180 includes a plurality of infrared ray receivers 181, 182, 183, 184, 185, and 186 to receive the infrared ray transmitted by the remote controller 200, and an infrared ray demodulator 187 to demodulate the infrared ray received by the plurality of infrared ray receivers 181 to 186 in order to acquire the user's control command.

The plurality of infrared ray receivers 181 to 186 include a first infrared ray receiver 181 provided at the front portion of the main body 101, a second infrared ray receiver 182 provided at a right portion of the main body 101, a third infrared ray receiver 183 provided at a rear right portion of the main body 101, a fourth infrared ray receiver 184 provided at a rear left portion of the main body 101, a fifth infrared ray receiver 185 provided at a left portion of the main body 101, and a sixth infrared ray receiver 186 provided at the front portion of the main body 101.

The plurality of infrared ray receivers 181 to 186 may be provided along the outer edge of the main body 101 to receive the infrared ray transmitted from all directions. Also, the position indicated by the remote controller 200 (the position of the light spot) may be determined in accordance with a position of the infrared ray receiver that receives the infrared ray transmitted by the remote controller 200 among the plurality of infrared ray receivers 181 to 186.

For example, the remote controller 200 may be determined as indicating the front portion of the main body 101 when the first infrared ray receiver 181 and the sixth infrared ray receiver 186 receive the infrared ray, and the remote controller 200 may be determined as indicating the right portion of the main body 101 when the second infrared ray receiver 182 receives the infrared ray. Also, the remote controller 200 may be determined as indicating the rear portion of the main body 101 when the third infrared ray receiver 183 and the fourth infrared ray receiver 184 receive the infrared ray, and the remote controller 200 may be determined as indicating the left portion of the main body 101 when the fifth infrared ray receiver 185 receives the infrared ray.

The infrared ray demodulator 187 demodulates the infrared ray received by the infrared ray receivers 181 to 186. The remote controller 200 modulates the infrared ray in accordance with the user's control command, and the infrared ray demodulator 187 demodulates the infrared ray modulated by the remote controller 200 and acquires the user's control command.

In addition, the infrared ray demodulator 187 provides the acquired control command to the first control unit 190.

The first control unit 190 generally controls the operation of the cleaning robot 100.

The first control unit 190 controls the navigation unit 150 and the cleaning unit 160 in accordance with the control command input by the user through the remote controller 200, the image acquired by the image acquisition unit 120, the output of the obstacle detection unit 130, and the output of the step detection unit 140.

For example, when an automatic cleaning command is received from the remote controller 200, the first control unit 190 controls the navigation unit 150 such that the cleaning robot 100 moves while avoiding the obstacle detected by the obstacle detection unit 130 and the step detected by the step detection unit 140.

In addition, when a drag command is received from the remote controller 200, the first control unit 190 controls the navigation unit 150 such that the cleaning robot 100 moves toward the light spot LS in accordance with the position of the infrared ray receiver that receives the infrared ray including the drag command among the plurality of infrared ray receiver 181 to 186.

The first control unit 190 described above may include either one or more or two or more microprocessors to control the operation of the cleaning robot 100, and the operation of the cleaning robot 100 to be described below is performed by the control signal output by the first control unit 190.

Figure 13:
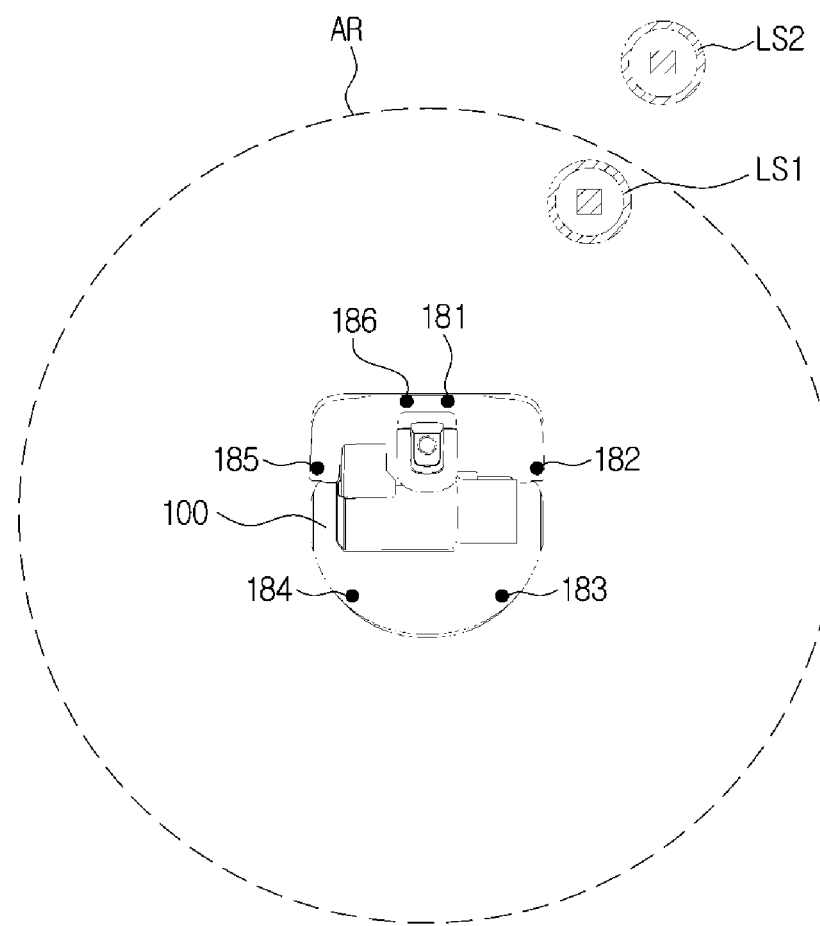
FIG. 13 illustrates an infrared ray detection range in which the cleaning robot according to an embodiment is capable of detecting an infrared ray.
Figure 14A:
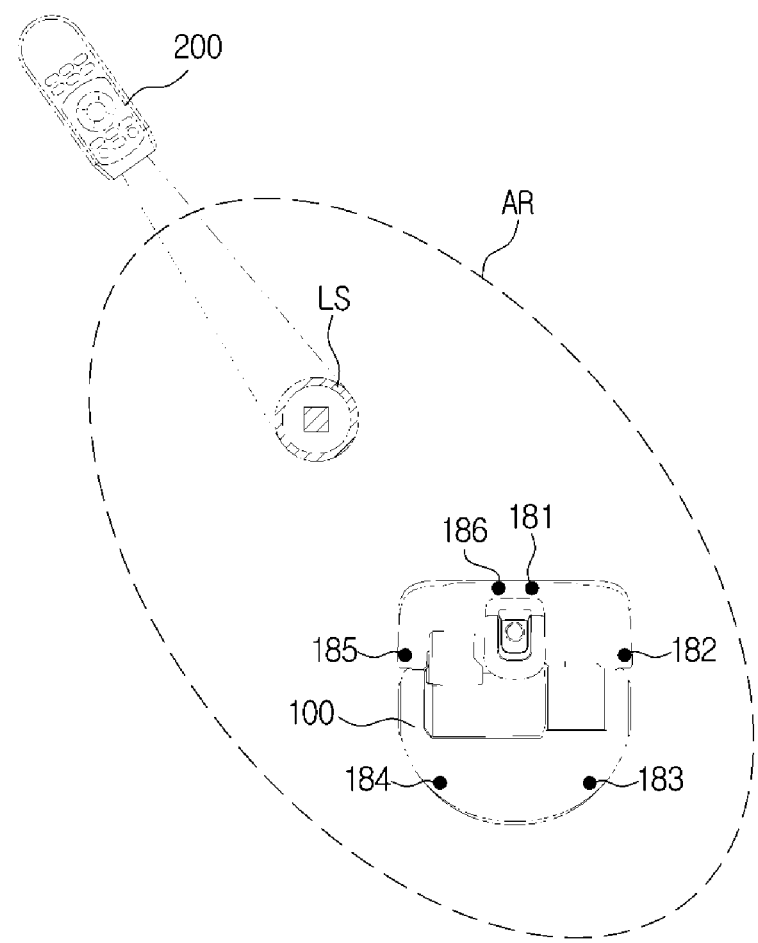
FIGS. 14A and 14B illustrate changes in the infrared ray detection range of the cleaning robot according to an embodiment in accordance with a position of the remote controller according to an embodiment.
Figure 14B:
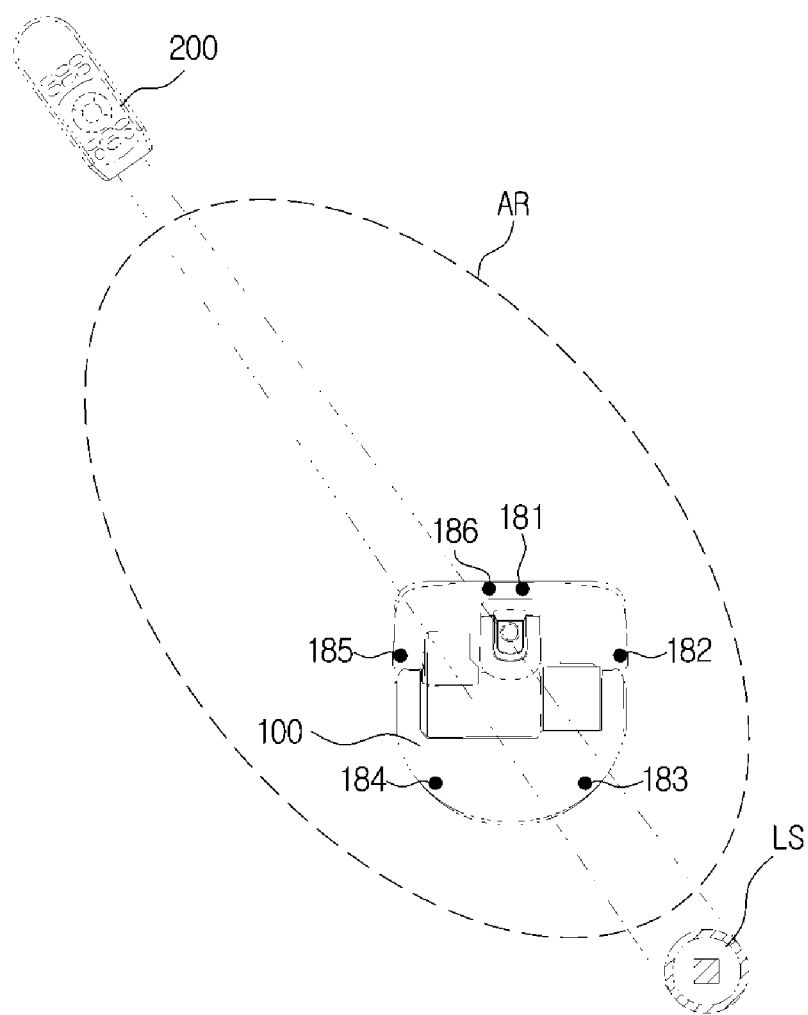

FIG. 13 illustrates an infrared ray detection range in which the cleaning robot according to an embodiment is capable of detecting an infrared ray, and FIGS. 14a and 14b illustrate changes in the infrared ray detection range of the cleaning robot according to an embodiment in accordance with a position of the remote controller according to an embodiment.

When the user moves the cleaning robot 100 using the remote controller 200, the remote controller 200 transmits an infrared ray toward a position to which the cleaning robot 100 will move, and the cleaning robot 100 receives the infrared ray reflected from the position indicated by the remote controller 200.

Because the reflected infrared ray has a shorter wavelength compared to an infrared ray directly transmitted from the remote controller 200, the cleaning robot 100 may receive an infrared ray reflected within an infrared ray reception range AR illustrated in FIG. 13 but may not receive an infrared ray reflected outside the infrared ray reception range AR.

In other words, when the light spot LS is located within the infrared ray reception range AR, the cleaning robot 100 may receive the user's control command and detect the position of the light spot LS. For example, as illustrated in FIG. 13, the cleaning robot 100 may detect a first light spot LS1 located within the infrared ray reception range AR, but may not detect a second light spot LS2 located outside the infrared ray reception range AR.

Here, the shape of the infrared ray reception range is not limited to a circular shape with the cleaning robot 100 as the center as illustrated in FIG. 13.

Specifically, the infrared ray reception range AR may have an oval shape by being expanded toward the remote controller 200 with the cleaning robot 100 as the center and being reduced at the opposite side of the remote controller 200.

For example, as illustrated in FIGS. 14A and 14B, when the remote controller 200 is located at the front left side of the cleaning robot 100, the infrared ray reception range AR may be expanded to the front left side and reduced to the rear right side with the cleaning robot 100 as the center.

As a result, as illustrated in FIG. 14A, the cleaning robot 100 may detect the position of the light spot LS and receive the user's control command when the light spot LS formed by the remote controller 200 is located in a direction near the remote controller 200.

On the other hand, the cleaning robot 100 may not detect the position of the light spot LS and not receive the user's control command when the light spot LS is located in a direction far from the remote controller 200 even if the light spot LS is equidistant from the cleaning robot 100.

In the above, configurations of the cleaning robot 100 and the remote controller 200 according to an embodiment have been described.

Hereinafter, operations of the cleaning robot 100 and the remote controller 200 according to an embodiment will be described.

Figure 15:
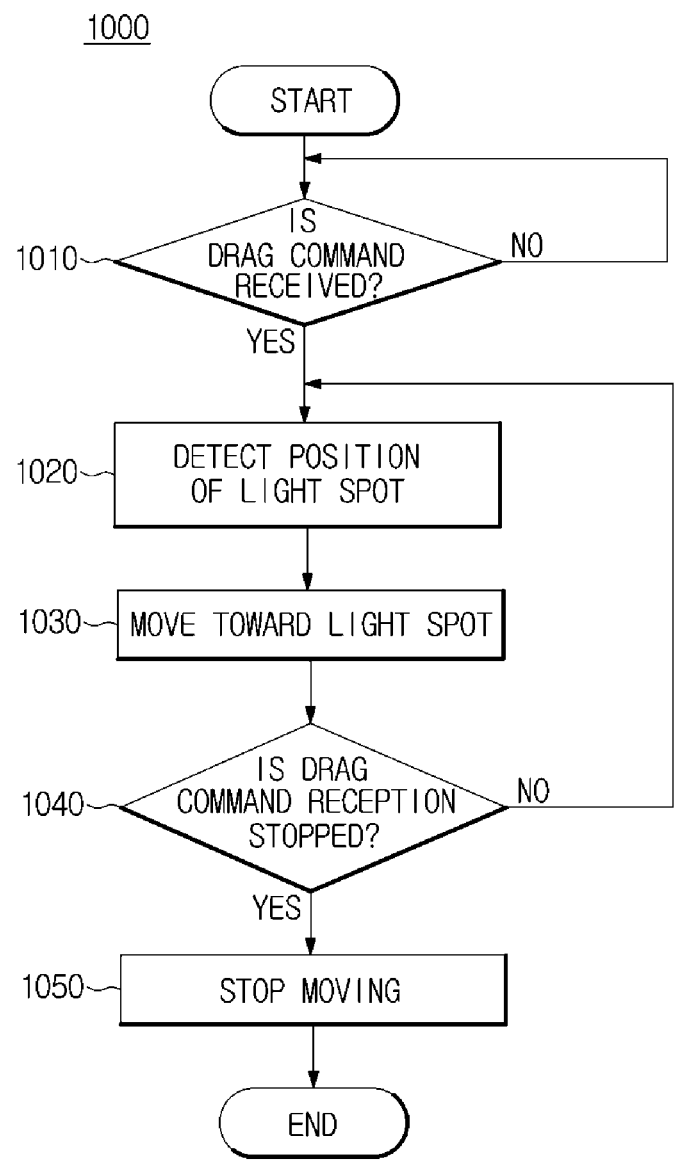
FIG. 15 illustrates a light spot tracking method in which the cleaning robot according to an embodiment tracks a light spot.

FIG. 15 illustrates a light spot tracking method in which the cleaning robot according to an embodiment tracks a light spot, and FIGS. 16A, 16B, 17A, and 17B illustrate an example of the cleaning robot according to an embodiment tracking the light spot.

The cleaning robot 100 moves along a movement path of the position indicated by the remote controller 200. That is, the cleaning robot 100 tracks the light spot LS formed by the remote controller 200.

Referring to FIGS. 15, 16A, 16B, 17A, and 17B, a light spot tracking method 1000 in which the cleaning robot 100 tracks the light spot LS will be described.

First, the cleaning robot 100 determines whether a drag, or track, command has been received from the remote controller 200 (operation 1010).

The user may input the drag command to the cleaning robot 100 through the second user interface 210 of the remote controller 200.

When the user inputs the drag command to the remote controller 200 while indicating a position (a floor of a cleaning area) to which the cleaning robot 100 will move, the remote controller 200 modulates an infrared ray in accordance with the drag command, and radiates the modulated infrared ray, together with the visible light, to the position to which the cleaning robot 100 will move.

Like this, the visible light and the infrared ray transmitted by the remote controller 200 form the light spot LS at the position to which the cleaning robot will move and are reflected from the floor of the cleaning area.

Here, the cleaning robot 100 may acquire the drag command by receiving the infrared ray reflected from the floor of the cleaning area through the light reception unit 180 and demodulating the received infrared ray.

When the drag command is not received (NO to S1010), the cleaning robot 100 continues an ongoing operation.

When the drag command is received (YES to S1010), the cleaning robot 100 detects the position of the light spot LS by the light reception unit 180 (operation 1020).

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect a relative position of the light spot LS based on the position of the infrared ray receiver that has received the infrared ray with the strongest intensity.

After detecting the relative position of the light spot LS, the cleaning robot 100 moves toward the detected light spot LS (operation 1030).

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

Figure 16A:
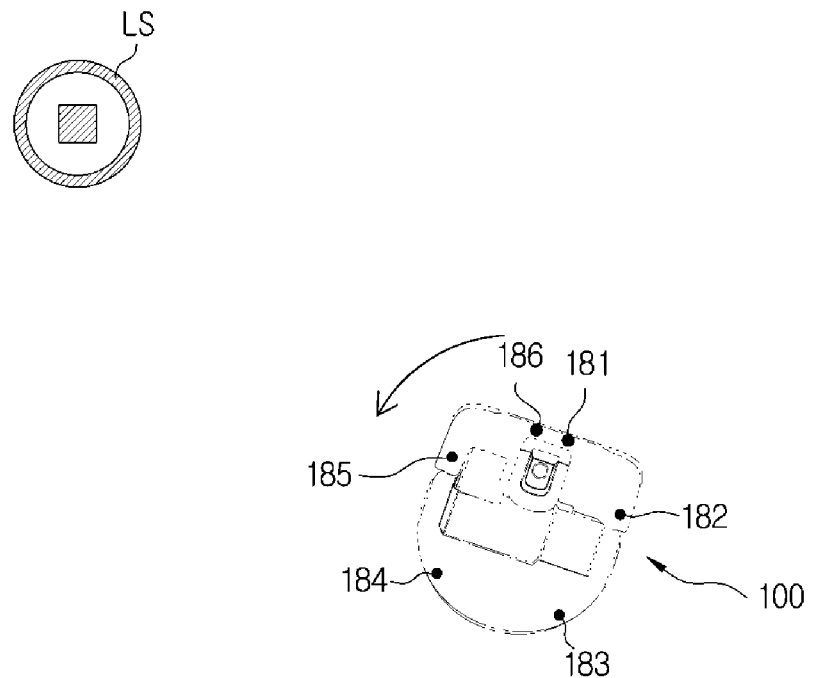

For example, when the relative position of the light spot LS is detected, the cleaning robot 100 may stop and rotate to allow the first infrared ray receiver 181 and the sixth infrared ray receiver 186 to receive the infrared ray as illustrated in FIG. 16A.

Specifically, when the fourth or fifth infrared ray receiver 184 or 185 provided at the left portion of the cleaning robot 100 receives the infrared ray, the cleaning robot 100 may rotate counterclockwise at the same spot to allow the first infrared ray receiver 181 and the sixth infrared ray receiver 186 to receive the infrared ray. Conversely, when the second or third infrared ray receiver 182 or 183 provided at the right portion of the cleaning robot 100 receives the infrared ray, the cleaning robot 100 may rotate counterclockwise at the same spot to allow the first infrared ray receiver 181 and the sixth infrared ray receiver 186 to receive the infrared ray.

When the infrared ray is received by the first infrared ray receiver 181 and the sixth infrared ray receiver 186, the cleaning robot 100 moves toward the light spot LS as illustrated in FIG. 16B.

Figure 17A:
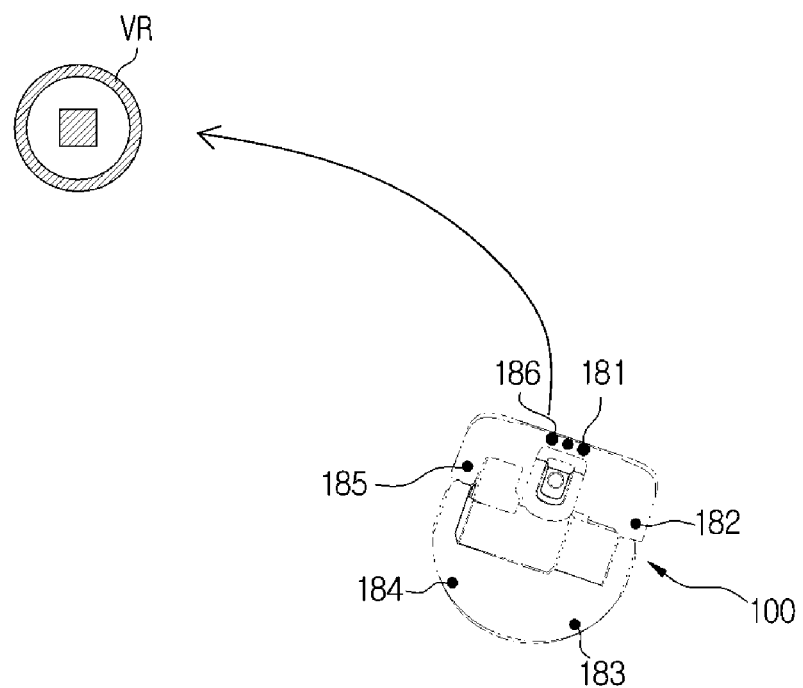

In an example, when the relative position of the light spot LS is detected, the cleaning robot 100 may move in a curve without stopping to allow the first infrared ray receiver 181 and the sixth infrared ray receiver 186 to receive the infrared ray as illustrated in FIG. 17A.

Specifically, when the fourth or fifth infrared ray receiver 184 or 185 provided at the left portion of the cleaning robot 100 receives the infrared ray, the cleaning robot 100 may move without stopping while rotating counterclockwise to allow the first infrared ray receiver 181 and the sixth infrared ray receiver 186 to receive the infrared ray. Conversely, when the second or third infrared ray receiver 182 or 183 provided at the right portion of the cleaning robot 100 receives the infrared ray, the cleaning robot 100 may move without stopping while rotating counterclockwise to allow the first infrared ray receiver 181 and the sixth infrared ray receiver 186 to receive the infrared ray.

Figure 17B:
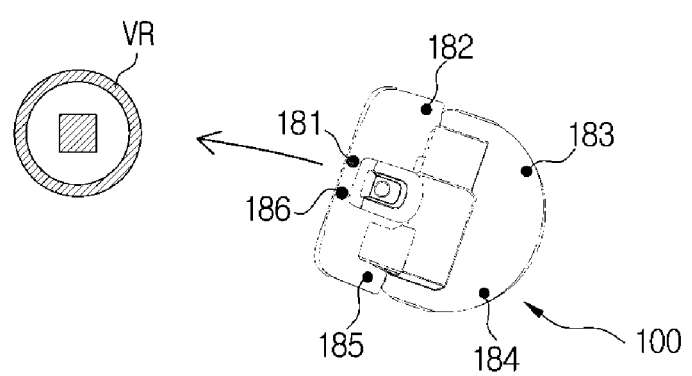

When the cleaning robot 100 moves in a curve without stopping as illustrated in FIG. 17B, the cleaning robot 100 may rapidly reach the position of the light spot LS due to moving without stopping.

Then, the cleaning robot 100 determines whether the reception of the drag command is stopped (operation 1040). Specifically, the cleaning robot 100 determines whether the infrared ray including the drag command is detected by the light receiving unit 180.

The reception of the drag command may be stopped due to various reasons.

For example, when the user stops the drag command, the cleaning robot 100 may not be able to receive the infrared ray including the drag command.

The user may stop the drag command when the cleaning robot 100 has reached the position of the light spot LS. That is, the user may stop pressing the drag button 211e of the remote controller 200.

Like this, when the cleaning robot 100 has reached a designated position, the reception of the drag command may be stopped.

In an example, when the light spot LS deviates from a range in which the cleaning robot 100 may receive the infrared ray, the cleaning robot 100 may not be able to receive the infrared ray including the drag command.

When the user rapidly moves a position indicated by the remote controller 200, the light spot LS deviates from the infrared ray reception range of the cleaning robot 100.

Like this, when the light spot LS deviates from the infrared ray reception range of the cleaning robot 100, the cleaning robot 100 cannot receive the infrared ray including the drag command, and thus the reception of the drag command is stopped.

Like this, when the cleaning robot 100 reaches the designated position or the user commands a position outside the infrared ray reception range of the cleaning robot 100, the cleaning robot 100 may not be able to receive the infrared ray including the drag command.

When the reception of the drag command is continued (NO to S1040), the cleaning robot 100 repeats the position detection of the light spot LS and the movement toward the light spot LS.

When the reception of the drag command is stopped (YES to S1040), the cleaning robot 100 stops moving (operation 1050).

Because it signifies that the cleaning robot 100 has reached the designated position or the user is indicating a position outside the infrared ray detection range of the cleaning robot 100 when the reception of the infrared ray including the drag command is stopped, the cleaning robot 100 stops moving and waits for the user's next command.

Figure 18:
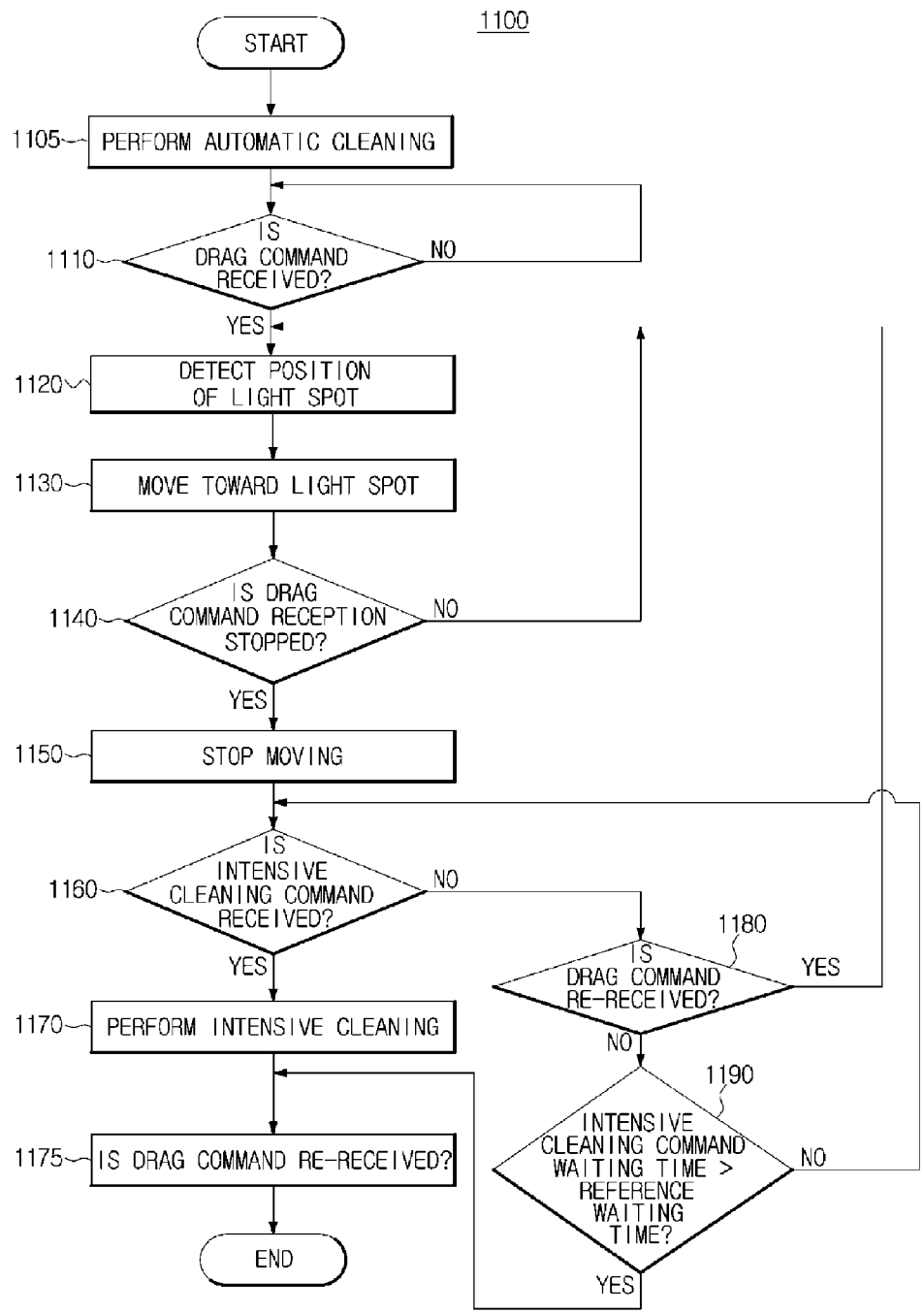
FIG. 18 illustrates an intensive cleaning method in which the cleaning robot according to an embodiment intensively cleans a designated area.
Figure 19A:
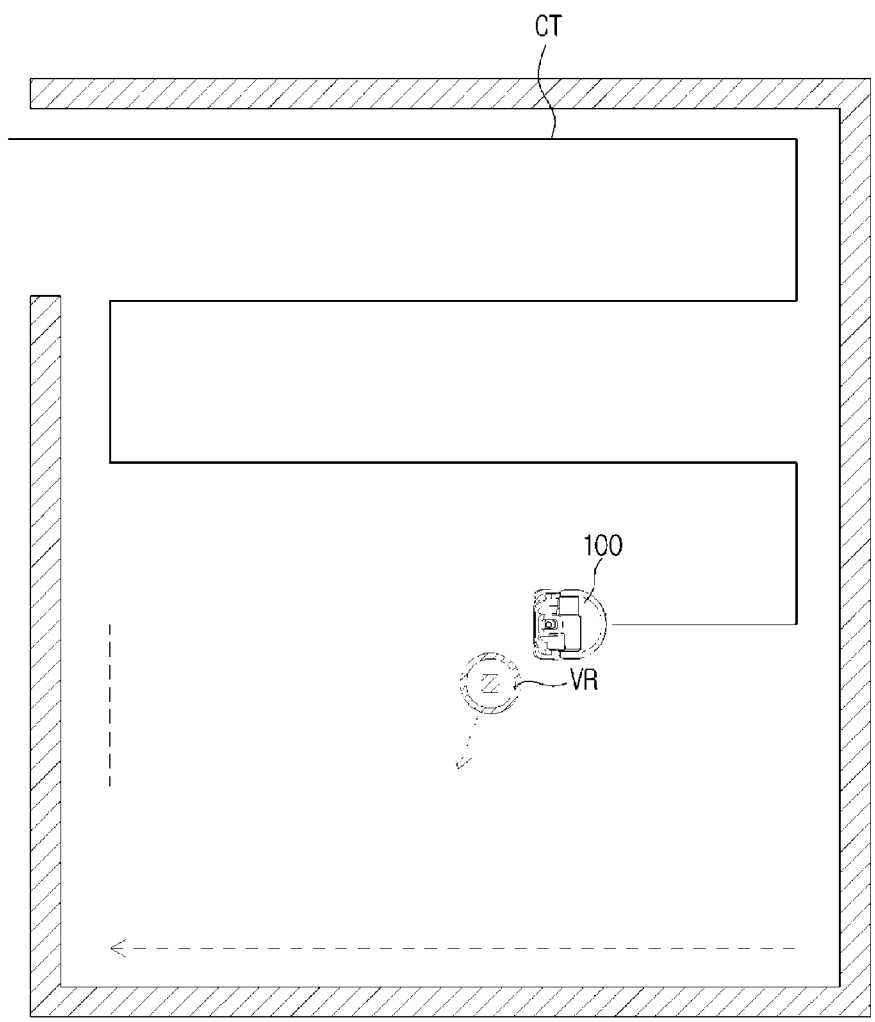
FIGS. 19A, 19B, and 19C illustrate an example of the cleaning robot according to an embodiment intensively cleaning the designated area.
Figure 19B:
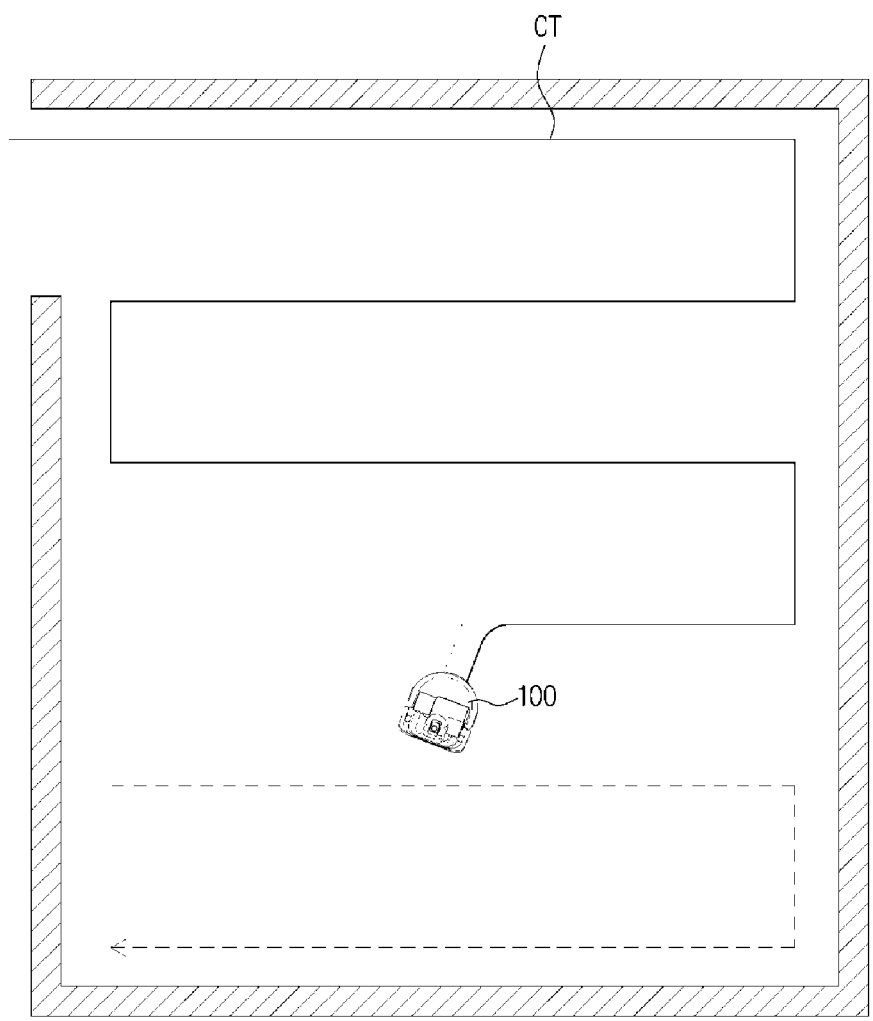
Figure 19C:
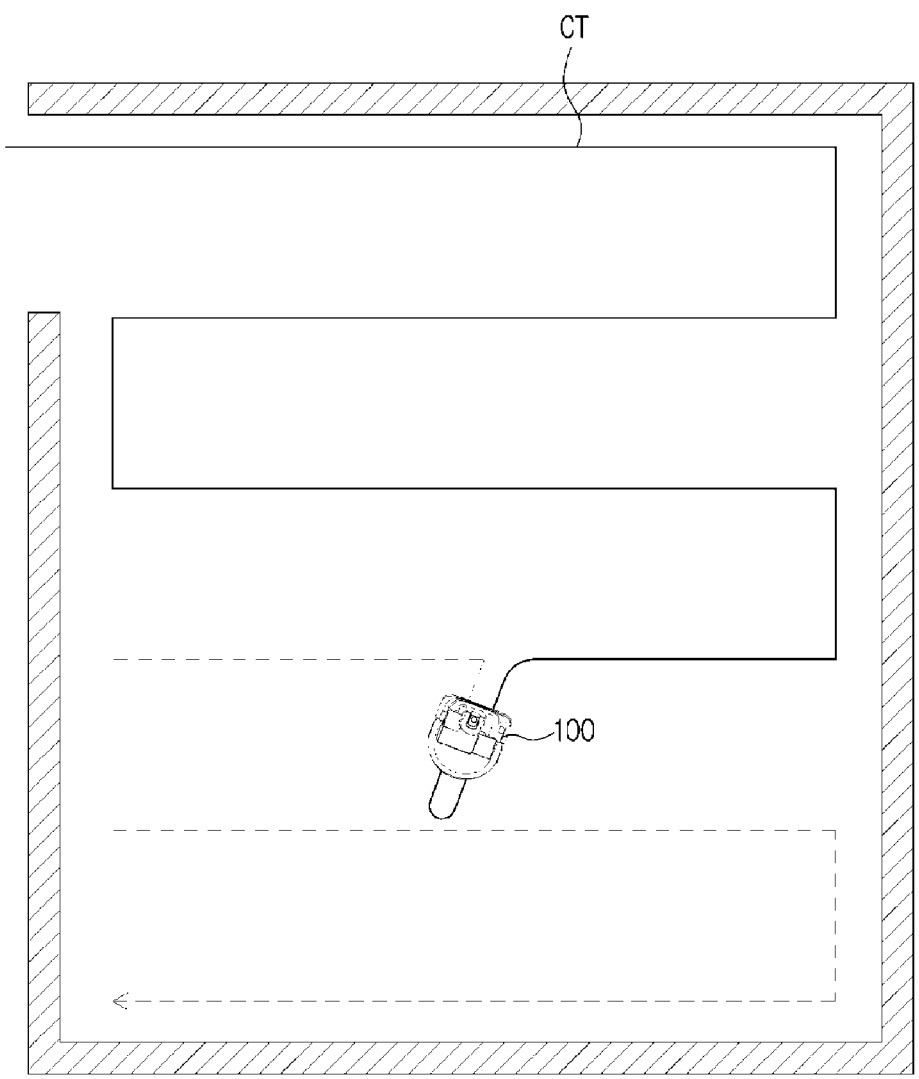

FIG. 18 illustrates an intensive cleaning method in which the cleaning robot according to an embodiment intensively cleans a designated area, and FIGS. 19A, 19B, and 19C illustrate an example of the cleaning robot according to an embodiment intensively cleaning the designated area.

During the automatic cleaning, the cleaning robot 100 cleans the cleaning area while moving along the cleaning path. The user may move the cleaning robot 100, that was performing the automatic cleaning, to the designated position using the remote controller 200 and may enable the cleaning robot 100 to intensively clean the designated position.

An intensive cleaning method 1100 in which the cleaning robot 100, that was performing the automatic cleaning operation, intensively cleans a designated position will be described with reference to FIGS. 18, 19A, 19B, and 19C.

First, the cleaning robot 100 automatically cleans a cleaning area by the user's automatic cleaning command (operation 1105).

For example, as illustrated in FIG. 19A, the cleaning robot 100 may clean the cleaning area while moving along a predetermined automatic cleaning path.

However, the automatic cleaning operation is not limited to that illustrated in FIG. 19A, and the cleaning robot 100 may also clean while randomly moving. Specifically, the cleaning robot 100 may move along a random direction, and, when an obstacle or an entry-forbidden area that obstructs the movement of the cleaning robot 100 is detected, change the moving direction to a random direction and move.

During the automatic cleaning operation, the cleaning robot 100 determines whether the drag command is received from the remote controller 200 (operation 1110).

The user may input the drag command to the cleaning robot 100 through the second user interface 210 of the remote controller 200.

When the user inputs the drag command to the remote controller 200 while indicating a position (the floor of the cleaning area) to which the cleaning robot 100 will move, the remote controller 200 modulates the infrared ray in accordance with the drag command and radiates the modulated infrared ray, together with the visible light, to the position to which the cleaning robot 100 will move.

The visible light and the infrared ray transmitted by the remote controller 200 as above form the light spot LS at the position to which the cleaning robot will move and are reflected from the floor of the cleaning area.

Here, the cleaning robot 100 receives the infrared ray reflected from the floor of the cleaning area through the light reception unit 180, and demodulates the received infrared ray, thereby acquiring the drag command.

When the drag command is not received (NO to S1110), the cleaning robot 100 continues to perform the automatic cleaning operation.

When the drag command is received (YES to S1110), the cleaning robot 100 detects the position of the light spot LS by the light reception unit 180 (operation 1120). For example, as illustrated in FIG. 19A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1130). For example, as illustrated in FIG. 19B, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and move toward the light spot LS.

In an example, the cleaning robot 100 may move in a curve without stopping such that the first infrared ray receiver 181 and the sixth infrared ray receiver 186 receive the infrared ray.

Then, the cleaning robot 100 determines whether the reception of the drag command is stopped (operation 1140). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1140), the cleaning robot 100 repeats the position detection of the light spot LS and the movement toward the light spot LS.

When the reception of the drag command is stopped (YES to S1140), the cleaning robot 100 stops moving (operation 1150).

Then, the cleaning robot 100 determines whether the intensive cleaning command is received from the remote controller 200 (operation 1160).

When the cleaning robot 100 reaches the designated position, the user may stop the drag command and input the intensive cleaning command to the cleaning robot 100 through the remote controller 200.

When the intensive cleaning command is received (YES to S1160), the cleaning robot 100 performs the intensive cleaning operation at the stopped position (operation 1170).

For example, the cleaning robot 100 may clean the cleaning area while moving along a spiral cleaning path within a predetermined range from the stopped position.

In an example, the cleaning robot 100 may clean the cleaning area for a predetermined amount of time while moving along a random navigation path within the predetermined range from the stopped position.

When the intensive cleaning operation is finished, the cleaning robot 100 performs the automatic cleaning operation (operation 1175).

For example, as illustrated in FIG. 19C, the cleaning robot 100 may return to the automatic cleaning path CT from the position at which the intensive cleaning operation is finished. Then, the cleaning robot 100 may move along the automatic cleaning path CT.

In an example, the cleaning robot 100 may move in a random direction from the position at which the intensive cleaning operation is finished. Then, when the obstacle or the entry-forbidden area that obstructs the movement of the cleaning robot 100 is detected, the cleaning robot 100 may change the moving direction to a random direction and move.

When the intensive cleaning method is not received (NO to S1160), the cleaning robot 100 determines whether the drag command is re-received from the remote controller 200 (operation 1180).

When the position indicated by the remote controller 200, i.e. the light spot LS, moves extremely rapidly and the light spot LS is deviated from the range in which the cleaning robot 100 may receive the infrared ray, the user may input the drag command again to the cleaning robot 100 through the remote controller 200.

When the drag command is re-received (YES to S1180), the cleaning robot 100 repeats the position detection of the light spot LS and the movement toward the light spot LS.

When the drag command is not re-received (NO to S1180), the cleaning robot 100 determines whether a time of waiting for the intensive cleaning command is equal to or longer than a first reference waiting time (operation 1190).

When the time of waiting for the intensive cleaning command is less than the first reference waiting time (NO to S1190), the cleaning robot 100 re-determines whether the intensive cleaning command or the drag command is received.

When the time of waiting for the intensive cleaning command is equal to or longer than the first reference waiting time (YES to S1190), the cleaning robot 100 re-performs the automatic cleaning operation (operation 1175).

When the intensive cleaning command or the drag command is not input for the first reference waiting time after the reception of the drag command is stopped, the cleaning robot 100 may determine that the user has no intention to input the intensive cleaning command. Due to this reason, the cleaning robot 100 re-performs the automatic cleaning operation that was performed before the drag command.

Figure 20:
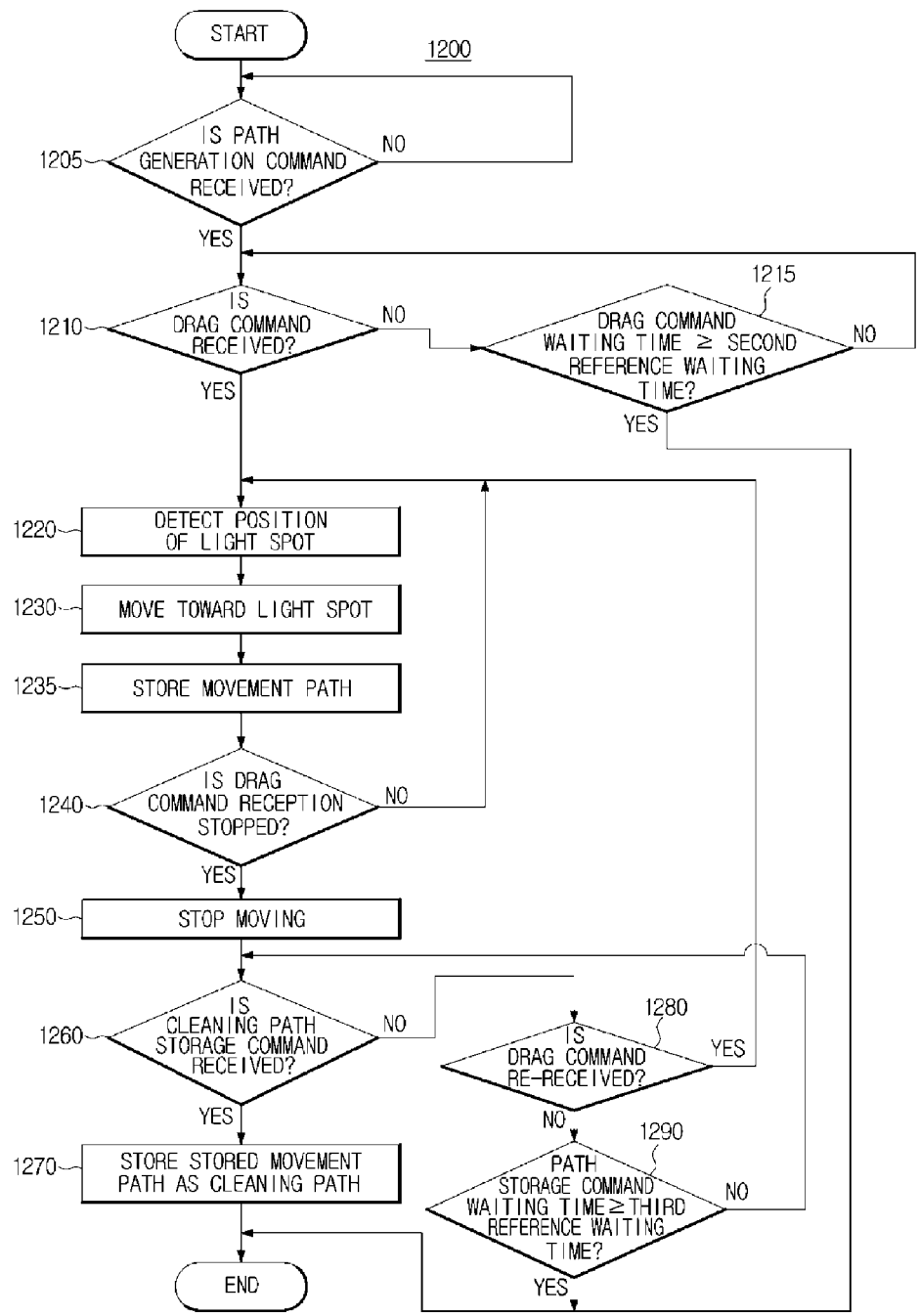
FIG. 20 illustrates a cleaning path generation method in which the cleaning robot according to an embodiment generates a new cleaning path.
Figure 21A:
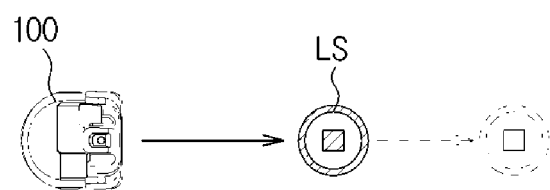
FIGS. 21A, 21B, and 21C illustrate an example of the cleaning robot according to an embodiment generating a cleaning path.
Figure 21B:
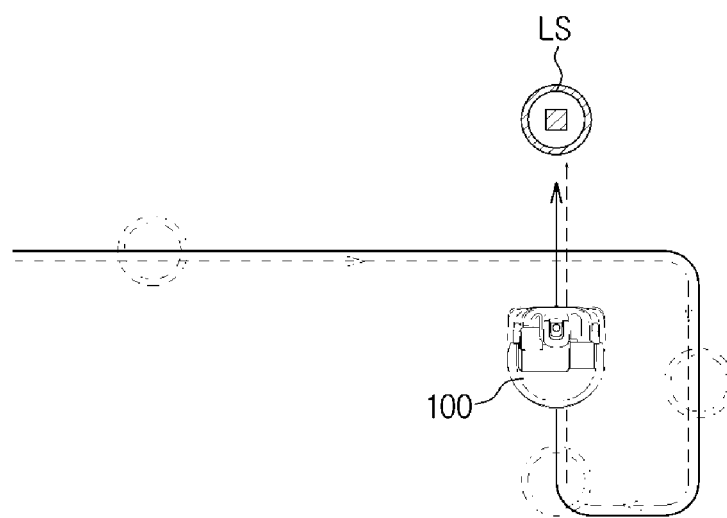
Figure 21C:
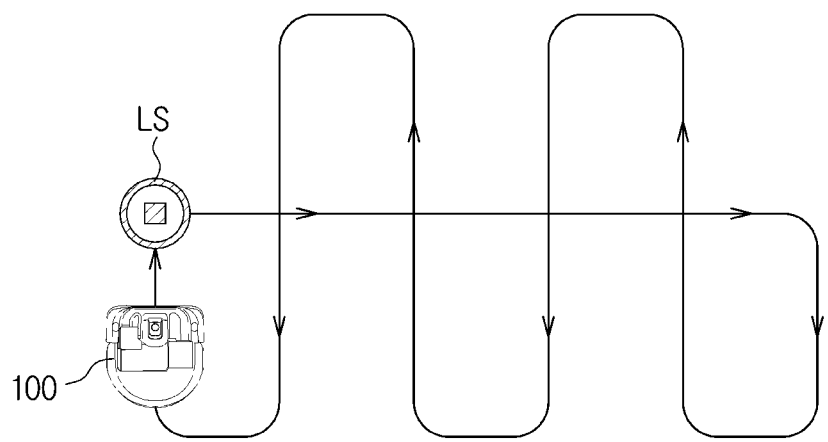

FIG. 20 illustrates a cleaning path generation method in which the cleaning robot according to an embodiment generates a new cleaning path, and FIGS. 21A, 21B, and 21C illustrate an example of the cleaning robot according to an embodiment generating a cleaning path.

Figure 22:
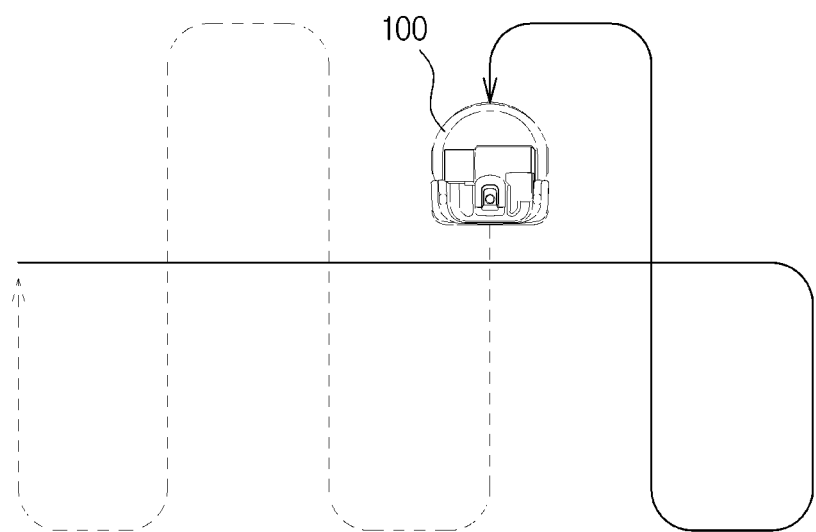
FIG. 22 illustrates an example of the cleaning robot according to an embodiment moving along the cleaning path generated by the method illustrated in FIG. 20.

In addition, FIG. 22 illustrates an example of the cleaning robot according to an embodiment moving along the cleaning path generated by the method illustrated in FIG. 20.

The user may generate a cleaning path using points in which the cleaning robot 100 moves along the movement path of the light spot LS, and allow the cleaning robot 100 to store the generated cleaning path.

A cleaning path generation method 1200 of generating a cleaning path will be described with reference to FIGS. 20, 21A, 21B, and 21C.

First, the cleaning robot 100 determines whether a cleaning path generation command is received from the remote controller 200 (operation 1205).

The user aiming to generate a new cleaning method may input the cleaning path generation command to the cleaning robot 100 through the remote controller 200.

The user may move the cleaning robot 100 using the drag command up to a position at which the new cleaning path will be generated, and input the cleaning path generation command to the cleaning robot 100 through the remote controller 200.

When the cleaning path generation command is received (YES to S1205), the cleaning robot 100 determines whether the drag command is received (operation 1210).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates the infrared ray in accordance with the drag command, and radiates the modulated infrared ray, together with the visible light, to the position to which the cleaning robot 100 will move.

As above, the visible light and the infrared ray transmitted by the remote controller 200 form the light spot LS at the position to which the cleaning robot will move and are reflected from the floor of the cleaning area.

Here, the cleaning robot 100 receives the infrared ray reflected from the floor of the cleaning area through the light reception unit 180, and demodulates the received infrared ray, thereby acquiring the drag command.

According to an embodiment, the cleaning robot 100 that has received the cleaning path generation command may stop moving and wait for the drag command.

When the drag command is not received (NO to S1210), the cleaning robot 100 determines whether a time of waiting for the drag command is equal to or longer than a second reference waiting time (operation 1215).

When the time of waiting for the drag command is less than the second reference waiting time (NO to S1215), the cleaning robot 100 re-determines whether the drag command is received.

When the time of waiting for the drag command is equal to or longer than the second reference waiting time (YES to S1215), the cleaning robot 100 ends the operation of generating the cleaning path and performs a previous operation.

When the time of waiting for the drag command is equal to or longer than the second reference waiting time, the cleaning robot 100 may determine that the user has no intention to generate the new cleaning path, and thus the cleaning robot 100 performs an operation that was performed before the cleaning path generation command.

When the drag command is received (YES to S1210), the cleaning robot 100 detects the position of the light spot LS by the light reception unit 180 (operation 1220). For example, as illustrated in FIG. 21A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1230). For example, as illustrated in FIG. 21B, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and then straightly move toward the light spot LS.

In an example, the cleaning robot 100 may move in a curve without stopping such that the first infrared ray receiver 181 and the sixth infrared ray receiver 186 receive the infrared ray.

While tracking the light spot LS, the cleaning robot 100 stores the movement path along which the cleaning robot 100 moves (operation 1235).

For example, the cleaning robot 100 may calculate the movement path (moving distance and moving coordinates) of the cleaning robot 100 based on a rotational displacement of the left navigation wheel 153a and a rotational displacement of the right navigation wheel 153b, and store the calculated movement path in the first storage unit 170.

A multiplication between the rotational displacement of the left navigation wheel 153a and the diameter of the left navigation wheel 153a represents a distance at which the left navigation wheel 153a has moved by the rotation of the left navigation wheel 153a, and a multiplication between the rotational displacement of the right navigation wheel 153b and the diameter of the right navigation wheel 153b represents a distance at which the right navigation wheel 153b has moved by the rotation of the right navigation wheel 153b.

When the distance at which the left navigation wheel 153a has moved and the distance at which the right navigation wheel 153b has moved are the same, the cleaning robot 100 may determine that the cleaning robot 100 has straightly moved, and the cleaning robot 100 may calculate the moving distance and the moving coordinates of the cleaning robot 100 while straightly moving.

In addition, when the distance at which the left navigation wheel 153a has moved and the distance at which the right navigation wheel 153b has moved are different, the cleaning robot 100 may determine that the cleaning robot 100 has moved in a curve, and the cleaning robot 100 may calculate the moving distance and the moving coordinates of the cleaning robot 100 while moving in a curve.

In addition, when a rotation direction of the left navigation wheel 153a and a rotation direction of the right navigation wheel 153b are different, the cleaning robot 100 may determine that the cleaning robot 100 has rotated at the same spot.

Like this, the cleaning robot 100 may compare the distance at which the left navigation wheel 153a has moved to the distance at which the right navigation wheel 153b has moved in order to calculate the movement path of the cleaning robot 100.

While moving toward the light spot LS, the cleaning robot 100 may temporarily store the movement path calculated by the above-mentioned method in the volatile memory 173 of the first storage unit 170.

Then, the cleaning robot 100 determines whether the reception of the drag command is stopped (operation 1240). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1240), the cleaning robot 100 repeats the position detection of the light spot LS, the movement toward the light spot LS, and the storage of the movement path.

When the position detection of the light spot LS, the movement toward the light spot LS, and the storage of the movement path are repeated, a movement path of a particular shape is generated as illustrated in FIG. 21C, and the generated movement path is stored in the first storage unit 170.

When the reception of the drag command is stopped (YES to S1240), the cleaning robot 100 stops moving (operation 1250).

Then, the cleaning robot 100 determines whether a cleaning path storage command is received from the remote controller 200 (operation 1260).

When a desired cleaning path is completed, the user may stop the drag command and input the cleaning path storage command to the cleaning robot 100 through the remote controller 200.

When the cleaning path storage command is received (YES to S1260), the cleaning robot 100 generates a new cleaning path based on the movement path stored in the first storage unit 170 (operation 1270).

Specifically, the cleaning robot 100 secures a storage space in the nonvolatile memory 171 to store the new cleaning path, and stores the movement path stored in the volatile memory 173 in the secured storage space of the nonvolatile memory 171.

In addition, the cleaning robot 100 stores information related to the new cleaning path, such as a name, stored position, etc. of the cleaning path, in the nonvolatile memory 171.

For example, when the cleaning path storage command is received, the cleaning robot 100 may store the movement path along which the cleaning robot 100 has moved as illustrated in FIG. 21C in the first storage unit 170 as the cleaning path.

When the cleaning path storage command is not received (NO to S1260), the cleaning robot 100 determines whether the drag command is re-received from the remote controller 200 (operation 1280).

When the position indicated by the remote controller 200, i.e. the light spot LS, moves extremely rapidly and the light spot LS is deviated from the range in which the cleaning robot 100 may receive the infrared ray, the user may input the drag command again to the cleaning robot 100 through the remote controller 200.

When the drag command is re-received (YES to S1280), the cleaning robot 100 repeats again the position detection of the light spot LS, the movement toward the light spot LS, and the storage of the movement path.

When the drag command is not re-received (NO to S1280), the cleaning robot 100 determines whether a time of waiting for the cleaning path storage command is equal to or longer than a third reference waiting time (operation 1290).

When the time of waiting for the cleaning path storage command is less than the third reference waiting time (NO to S1290), the cleaning robot 100 re-determines whether the cleaning path storage command or the drag command is received.

When the time of waiting for the cleaning path storage command is equal to or longer than the third reference waiting time (YES to S1290), the cleaning robot 100 ends the operation of generating the cleaning path and performs the previous operation.

When the time of waiting for the cleaning path storage command is equal to or longer than the third reference waiting time, the cleaning robot 100 ends the operation of generating the cleaning path because the cleaning robot 100 may determine that the user has no intention to generate the cleaning path.

When the new cleaning path is generated by the cleaning path generation method 1200 illustrated in FIG. 20, the cleaning robot 100 may clean the cleaning area while moving along the cleaning path that has been newly generated in accordance with the user's control command.

For example, when the cleaning robot 100 has generated the cleaning path illustrated in FIG. 21C, the user may input the automatic cleaning command to the cleaning robot 100 such that the cleaning robot 100 cleans along the generated cleaning path, and when the automatic cleaning command is received, the cleaning robot 100 cleans while moving along the cleaning path as illustrated in FIG. 22.

Figure 23:
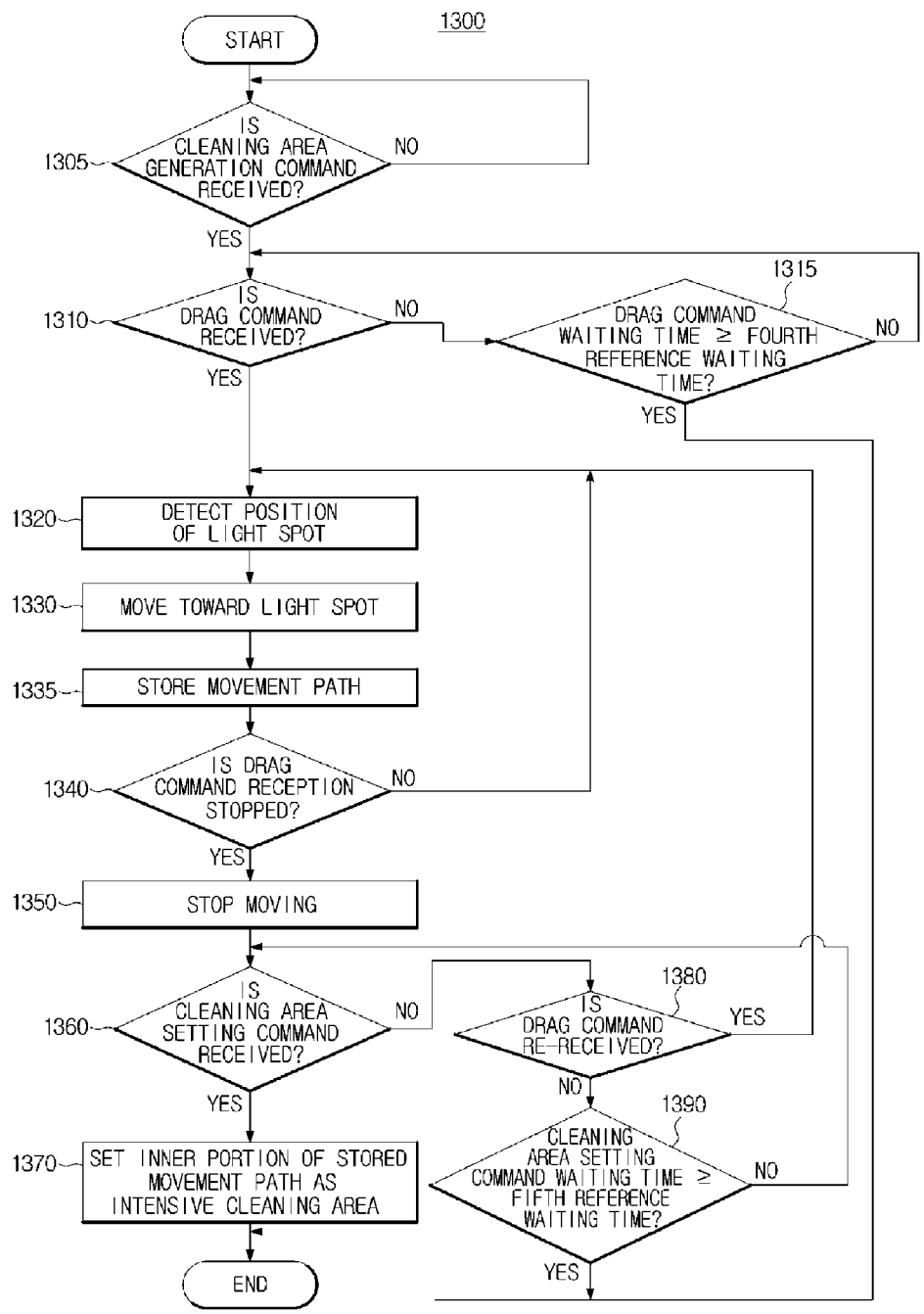
FIG. 23 illustrates an intensive cleaning area generation method in which the cleaning robot according to an embodiment generates an intensive cleaning area.
Figure 24A:
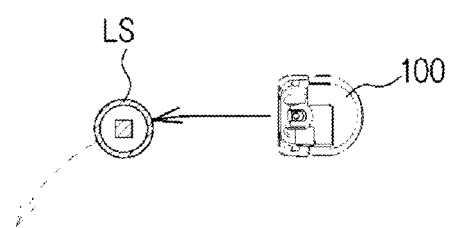
FIGS. 24A, 24B, and 24C illustrate an example of the cleaning robot according to an embodiment generating an intensive cleaning area.
Figure 24B:
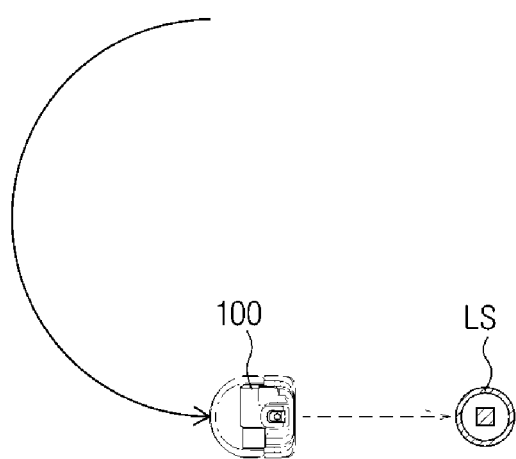
Figure 24C:
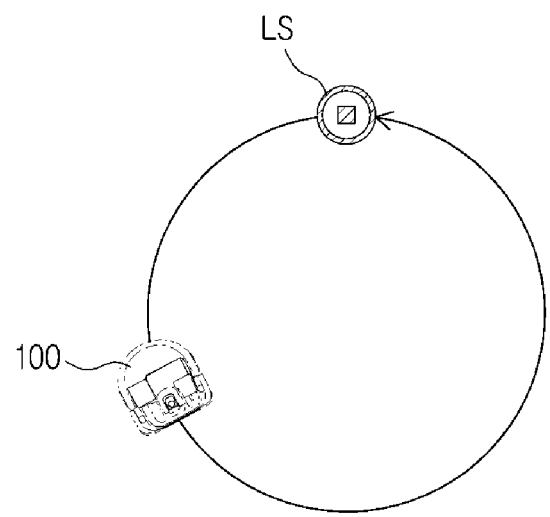

FIG. 23 illustrates an intensive cleaning area generation method in which the cleaning robot according to an embodiment generates an intensive cleaning area, and FIGS. 24A, 24B, and 24C illustrate an example of the cleaning robot according to an embodiment generating the intensive cleaning area.

Figure 25:
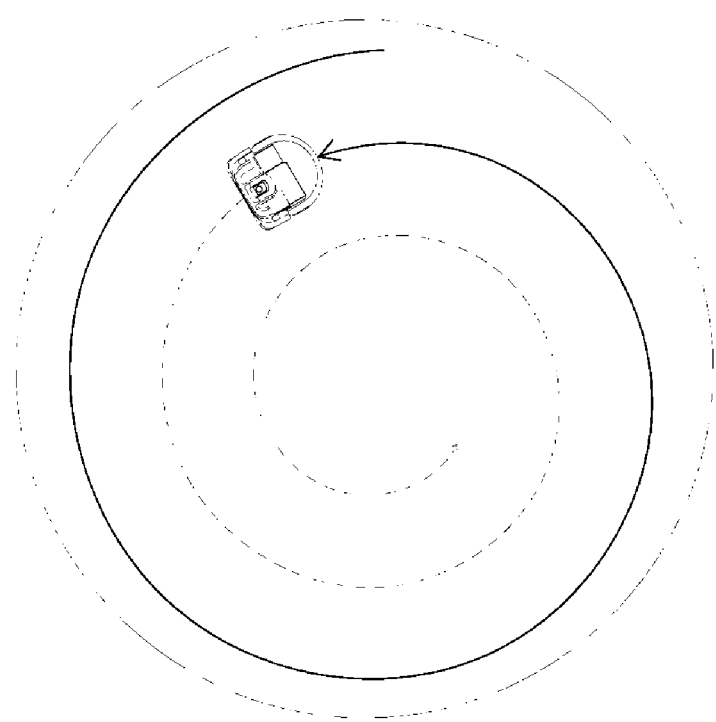
FIG. 25 illustrates an example of the cleaning robot according to an embodiment cleaning the intensive cleaning area generated by the method illustrated in FIG. 23.

FIG. 25 illustrates an example of the cleaning robot according to an embodiment cleaning the intensive cleaning area generated by the method illustrated in FIG. 23.

The user may generate an intensive cleaning area in which the cleaning robot 100 intensively cleans using points in which the cleaning robot 100 moves along the movement path of the light spot LS, and allow the cleaning robot 100 to store the generated intensive cleaning area.

An intensive cleaning area generation method 1300 of generating an intensive cleaning area will be described with reference to FIGS. 23, 24A, 24B, and 24C.

First, the cleaning robot 100 determines whether a cleaning area generation command is received from the remote controller 200 (operation 1305).

The user may move the cleaning robot 100 using the drag command up to a position at which the intensive cleaning area will be generated, and input the cleaning area generation command to the cleaning robot 100 through the remote controller 200.

When the cleaning area generation command is received (YES to S1305), the cleaning robot 100 determines whether the drag command is received (operation 1310).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates the infrared ray in accordance with the drag command, and radiates the modulated infrared ray, together with the visible light, to the position to which the cleaning robot 100 will move.

As above, the visible light and the infrared ray transmitted by the remote controller 200 form the light spot LS at the position to which the cleaning robot will move and are reflected from the floor of the cleaning area.

Here, the cleaning robot 100 receives the infrared ray reflected from the floor of the cleaning area through the light reception unit 180, and demodulates the received infrared ray, thereby acquiring the drag command.

According to an embodiment, the cleaning robot 100 that has received the cleaning area generation command may stop moving and wait for the drag command.

When the drag command is not received (NO to S1310), the cleaning robot 100 determines whether the time of waiting for the drag command is equal to or longer than a fourth reference waiting time (operation 1315).

When the time of waiting for the drag command is less than the fourth reference waiting time (NO to S1315), the cleaning robot 100 re-determines whether the drag command is received.

When the time of waiting for the drag command is equal to or longer than the fourth reference waiting time (YES to S1315), the cleaning robot 100 ends the operation of generating the intensive cleaning area and performs a previous operation.

When the time of waiting for the drag command is equal to or longer than the fourth reference waiting time, the cleaning robot 100 may determine that the user has no intention to generate the intensive cleaning area, and thus the cleaning robot 100 performs an operation that was performed before the cleaning area generation command.

When the drag command is received (YES to S1310), the cleaning robot 100 detects the position of the light spot LS by the light reception unit 180 (operation 1320). For example, as illustrated in FIG. 24A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1330). For example, as illustrated in FIG. 24B, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and then straightly move toward the light spot LS.

In an example, the cleaning robot 100 may move in a curve without stopping such that the first infrared ray receiver 181 and the sixth infrared ray receiver 186 receive the infrared ray.

While tracking the light spot LS, the cleaning robot 100 stores the movement path along which the cleaning robot 100 moves (operation 1335).

For example, the cleaning robot 100 may calculate the movement path (moving distance and moving coordinates) of the cleaning robot 100 based on the rotational displacement of the left navigation wheel 153*a* and the rotational displacement of the right navigation wheel 153*b*, and store the calculated movement path in the first storage unit 170.

Then, the cleaning robot 100 determines whether the reception of the drag command is stopped (operation 1340). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1340), the cleaning robot 100 repeats the position detection of the light spot LS, the movement toward the light spot LS, and the storage of the movement path.

When the position detection of the light spot LS, the movement toward the light spot LS, and the storage of the movement path are repeated, a movement path of a particular shape is generated as illustrated in FIG. 24C, and the generated movement path is stored in the first storage unit 170.

When the reception of the drag command is stopped (YES to S1340), the cleaning robot 100 stops moving (operation 1350).

Then, the cleaning robot 100 determines whether a cleaning area setting command is received from the remote controller 200 (operation 1360).

When the cleaning robot 100 completely forms a boundary line of the intensive cleaning area, the user may stop the drag command and input the cleaning area setting command to the cleaning robot 100 through the remote controller 200.

Here, the movement path that generates the intensive cleaning area is generated in a closed curve as illustrated in FIG. 24C but not limited thereto, and the closed curve may also be formed by combining the movement path of the cleaning robot 100 and a boundary line of an obstacle, and the like.

When the cleaning area setting command is received (YES to S1360), the cleaning robot 100 sets an inner portion of the movement path stored in the first storage unit 170 as the intensive cleaning area (operation 1370).

Specifically, the cleaning robot 100 secures a storage space in the nonvolatile memory 171 to store a new intensive cleaning area, and stores the new intensive cleaning area and information related to the new intensive cleaning area in the secured storage space.

For example, when the cleaning area setting command is received, the cleaning robot 100 may store the inner portion of the movement path along which the cleaning robot 100 has moved as illustrated in FIG. 24C in the first storage unit 170 as the intensive cleaning area.

When the cleaning area setting command is not received (NO to S1360), the cleaning robot 100 determines whether the drag command is re-received from the remote controller 200 (operation 1380).

When the position indicated by the remote controller 200, i.e. the light spot LS, moves extremely rapidly and the light spot LS is deviated from the range in which the cleaning robot 100 may receive the infrared ray, the user may input the drag command again to the cleaning robot 100 through the remote controller 200.

When the drag command is re-received (YES to S1380), the cleaning robot 100 repeats again the position detection of the light spot LS, the movement toward the light spot LS, and the storage of the movement path.

When the drag command is not re-received (NO to S1380), the cleaning robot 100 determines whether a time of waiting for the cleaning area setting command is equal to or longer than a fifth reference waiting time (operation 1390).

When the time of waiting for the cleaning area setting command is less than the fifth reference waiting time (NO to S1390), the cleaning robot 100 re-determines whether the cleaning area setting command or the drag command is received.

When the time of waiting for the cleaning area setting command is equal to or longer than the fifth reference waiting time (YES to S1390), the cleaning robot 100 ends the operation of generating the intensive cleaning area and performs the previous operation.

When the time of waiting for the cleaning area setting command is equal to or longer than the predetermined fifth reference waiting time, the cleaning robot 100 ends the operation of generating the intensive cleaning area because the cleaning robot 100 may determine that the user has no intention to generate the intensive cleaning area.

When the intensive cleaning area is generated by the cleaning area generation method 1300 illustrated in FIG. 23, the cleaning robot 100 may intensively clean the intensive cleaning area that has been newly generated in accordance with the user's control command.

For example, when the cleaning robot 100 has generated the intensive cleaning area illustrated in FIG. 24C, the cleaning robot 100 cleans the inner portion of the intensive cleaning area as illustrated in FIG. 25 when the user inputs the intensive cleaning command to the cleaning robot 100 so that the cleaning robot 100 cleans the intensive cleaning area.

Figure 26:
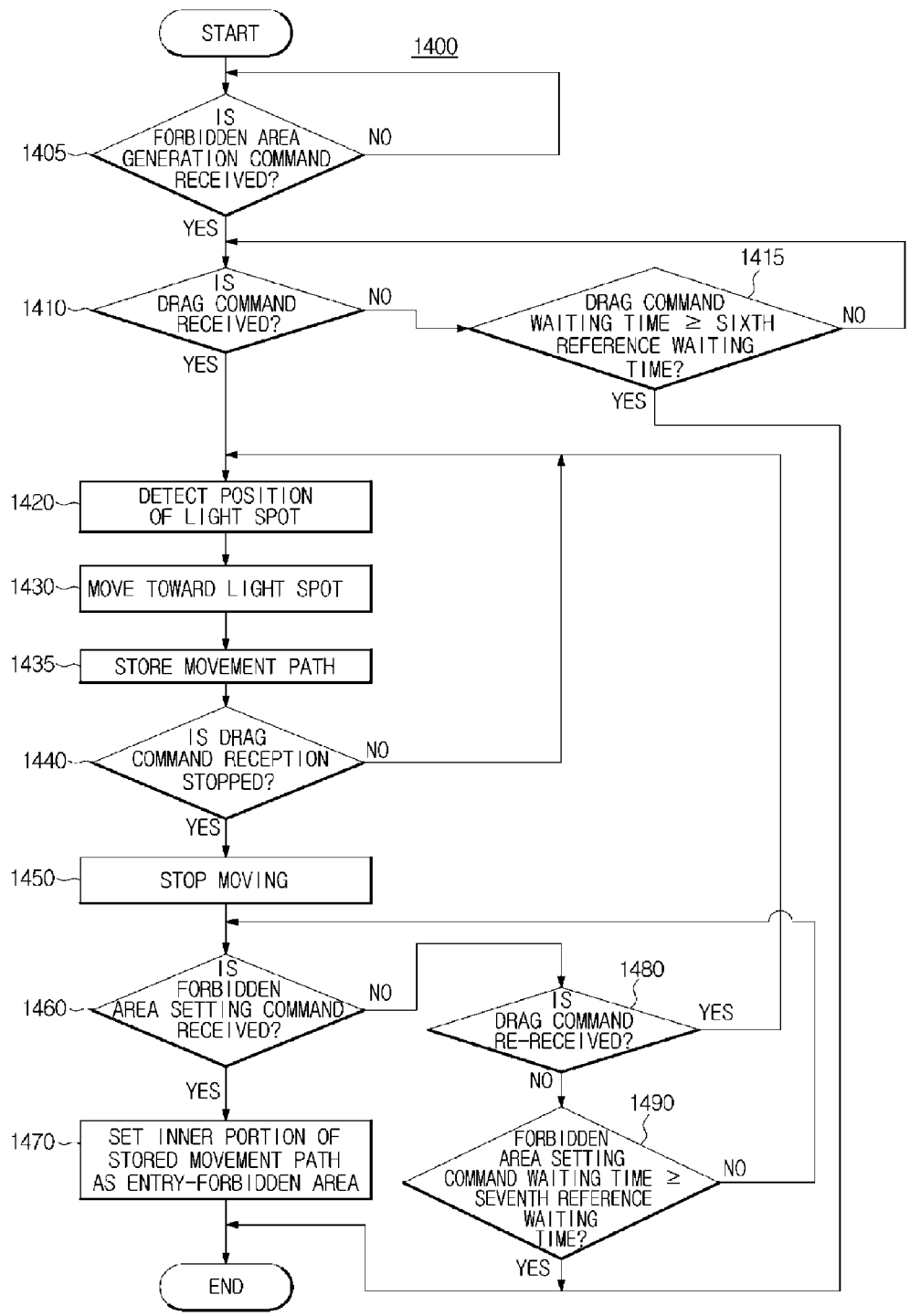
FIG. 26 illustrates an entry-forbidden area generation method in which the cleaning robot according to an embodiment generates an entry-forbidden area.
Figure 27A:
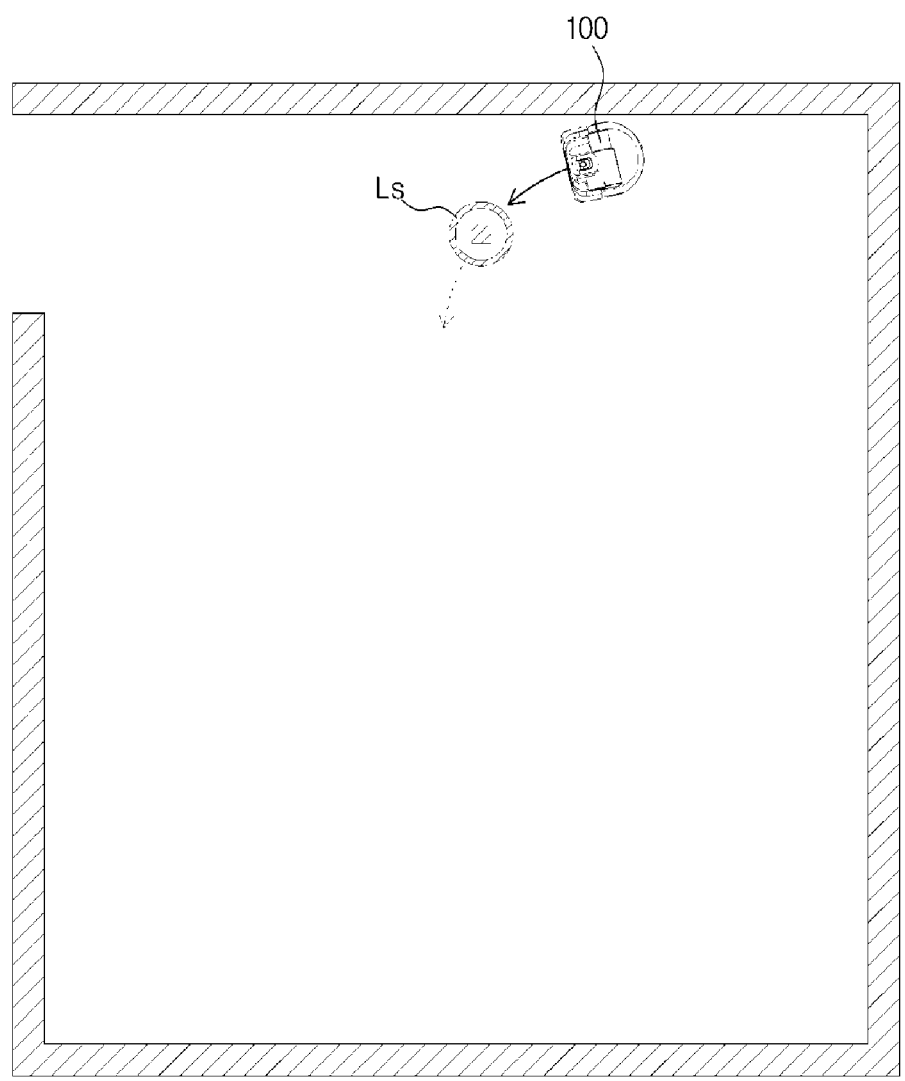
FIGS. 27A, 27B, and 27C illustrate an example of the cleaning robot according to an embodiment generating an entry-forbidden area.
Figure 27B:
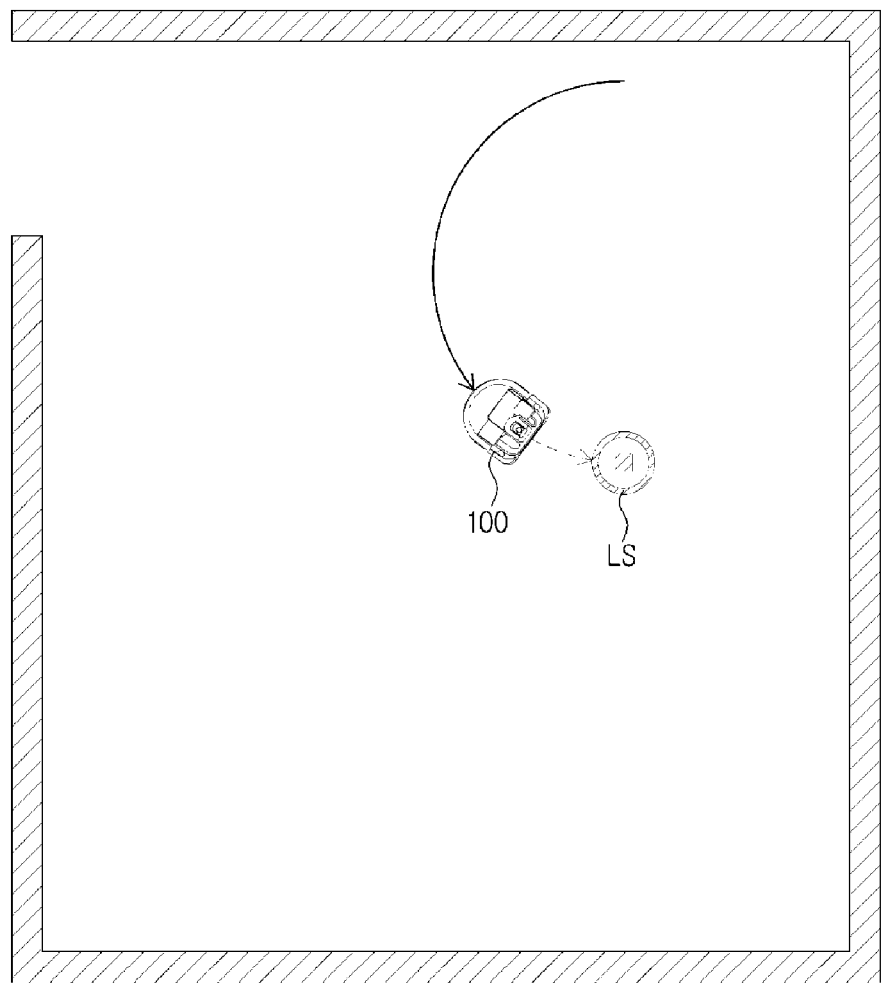
Figure 27C:
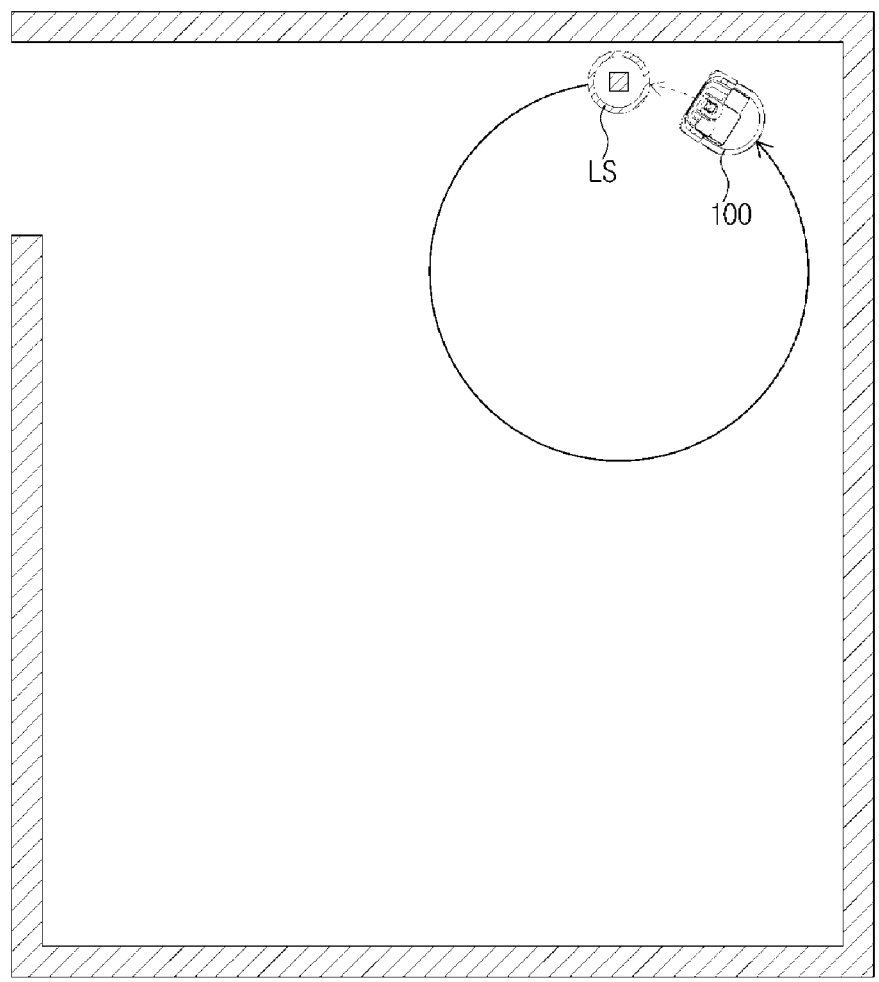

FIG. 26 illustrates an entry-forbidden area generation method in which the cleaning robot according to an embodiment generates an entry-forbidden area, and FIGS. 27A, 27B, and 27C illustrate an example of the cleaning robot according to an embodiment generating an entry-forbidden area.

Figure 28:
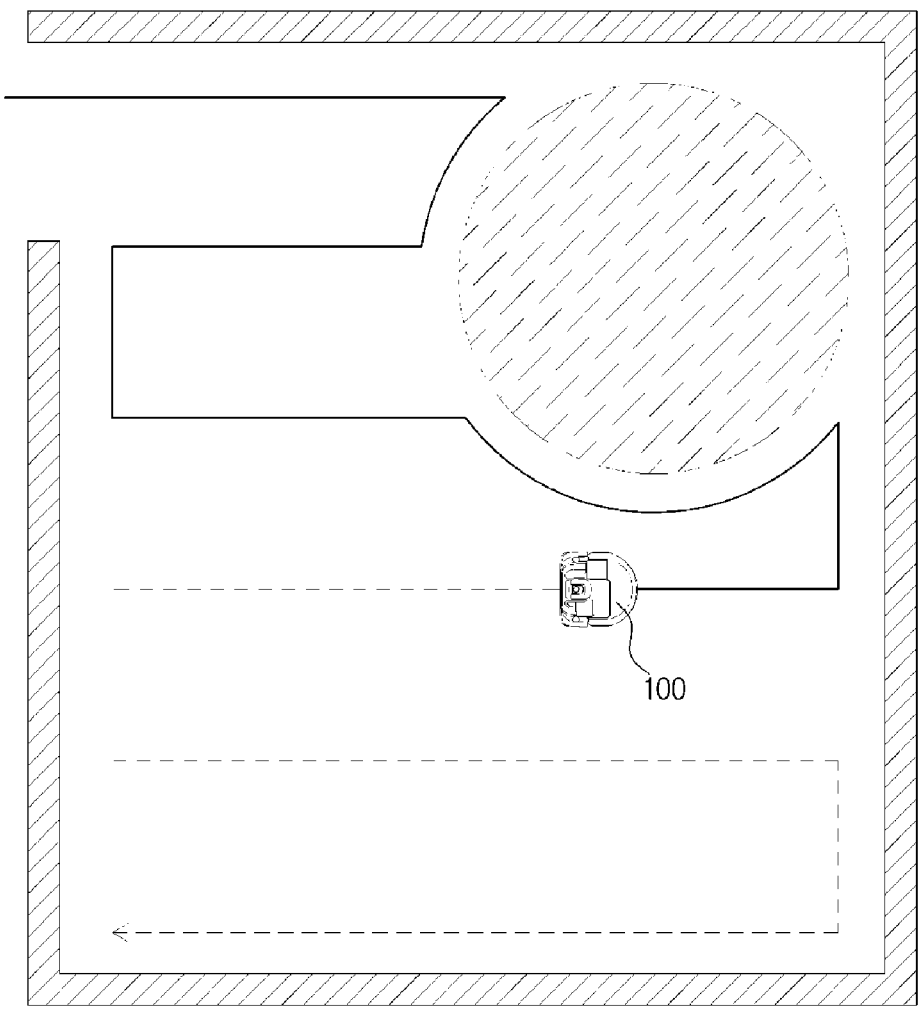
FIG. 28 illustrates an example of the cleaning robot according to an embodiment avoiding the entry-forbidden area generated by the method illustrated in FIG. 26.

FIG. 28 illustrates an example of the cleaning robot according to an embodiment avoiding the entry-forbidden area generated by the method illustrated in FIG. 26.

The user may generate the entry-forbidden area that prohibits the entry of the cleaning robot 100 using points in which the cleaning robot 100 moves along the movement path of the light spot LS, and allow the cleaning robot 100 to store the generated intensive cleaning area.

An entry-forbidden area generation method 1400 of generating an entry-forbidden area will be described with reference to FIGS. 26, 27A, 27B, and 27C.

First, the cleaning robot 100 determines whether a forbidden area generation command is received from the remote controller 200 (operation 1405).

The user may move the cleaning robot 100 using the drag command up to a position at which the entry-forbidden area will be generated, and input the forbidden area generation command to the cleaning robot 100 through the remote controller 200.

When the forbidden area generation command is received (YES to S1405), the cleaning robot 100 determines whether the drag command is received (operation 1410).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates the infrared ray in accordance with the drag command, and radiates the modulated infrared ray, together with the visible light, to the position to which the cleaning robot 100 will move.

As above, the visible light and the infrared ray transmitted by the remote controller 200 form the light spot LS at the position to which the cleaning robot will move and are reflected from the floor of the cleaning area.

Here, the cleaning robot 100 receives the infrared ray reflected from the floor of the cleaning area through the light reception unit 180, and demodulates the received infrared ray, thereby acquiring the drag command.

According to an embodiment, the cleaning robot 100 that has received the forbidden area generation command may stop moving and wait for the drag command.

When the drag command is not received (NO to S1410), the cleaning robot 100 determines whether the time of waiting for the drag command is equal to or longer than a sixth reference waiting time (operation 1415).

When the time of waiting for the drag command is less than the sixth reference waiting time (NO to S1415), the cleaning robot 100 re-determines whether the drag command is received.

When the time of waiting for the drag command is equal to or longer than the sixth reference waiting time (YES to S1415), the cleaning robot 100 ends the operation of generating the entry-forbidden area and performs a previous operation.

When the time of waiting for the drag command is equal to or longer than the sixth reference waiting time, the cleaning robot 100 may determine that the user has no intention to generate the entry-forbidden area, and thus the cleaning robot 100 performs an operation that was performed before the forbidden area generation command.

When the drag command is received (YES to S1410), the cleaning robot 100 detects the position of the light spot LS by the light reception unit 180 (operation 1420). For example, as illustrated in FIG. 27A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1430). For example, as illustrated in FIG. 27B, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and then straightly move toward the light spot LS.

In an example, the cleaning robot 100 may move in a curve without stopping such that the first infrared ray receiver 181 and the sixth infrared ray receiver 186 receive the infrared ray.

While tracking the light spot LS, the cleaning robot 100 stores the movement path along which the cleaning robot 100 moves (operation 1435).

For example, the cleaning robot 100 may calculate the movement path (moving distance and moving coordinates) of the cleaning robot 100 based on the rotational displacement of the left navigation wheel 153a and the rotational displacement of the right navigation wheel 153b, and store the calculated movement path in the first storage unit 170.

Then, the cleaning robot 100 determines whether the reception of the drag command is stopped (operation 1440). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1440), the cleaning robot 100 repeats the position detection of the light spot LS, the movement toward the light spot LS, and the storage of the movement path.

When the position detection of the light spot LS, the movement toward the light spot LS, and the storage of the movement path are repeated, a movement path of a particular shape is generated as illustrated in FIG. 27C, and the generated movement path is stored in the first storage unit 170.

When the reception of the drag command is stopped (YES to S1440), the cleaning robot 100 stops moving (operation 1450).

Then, the cleaning robot 100 determines whether a forbidden area setting command is received from the remote controller 200 (operation 1460).

When the cleaning robot 100 completely forms a boundary line of the entry-forbidden area, the user may stop the drag command and input the forbidden area setting command to the cleaning robot 100 through the remote controller 200.

Here, the movement path that generates the entry-forbidden area is generated in a closed curve as illustrated in FIG. 27C but not limited thereto, and the closed curve may also be formed by combining the movement path of the cleaning robot 100 and the boundary line of the obstacle, and the like.

When the forbidden area setting command is received (YES to S1460), the cleaning robot 100 sets an inner portion of the movement path stored in the first storage unit 170 as the entry-forbidden area (operation 1470).

Specifically, the cleaning robot 100 secures a storage space in the nonvolatile memory 171 to store a new entry-forbidden area, and stores the new entry-forbidden area and information related to the new entry-forbidden area in the secured storage space.

For example, when the forbidden area setting command is received, the cleaning robot 100 may store the inner portion of the movement path along which the cleaning robot 100 has moved as illustrated in FIG. 27C in the first storage unit 170 as the entry-forbidden area.

When the forbidden area setting command is not received (NO to S1460), the cleaning robot 100 determines whether the drag command is re-received from the remote controller 200 (operation 1480).

When the position indicated by the remote controller 200, i.e. the light spot LS, moves extremely rapidly and the light spot LS is deviated from the range in which the cleaning robot 100 may receive the infrared ray, the user may input the drag command again to the cleaning robot 100 through the remote controller 200.

When the drag command is re-received (YES to S1480), the cleaning robot 100 repeats again the position detection of the light spot LS, the movement toward the light spot LS, and the storage of the movement path.

When the drag command is not re-received (NO to S1480), the cleaning robot 100 determines whether a time of waiting for the forbidden area setting command is equal to or longer than a seventh reference waiting time (operation 1490).

When the time of waiting for the forbidden area setting command is less than the seventh reference waiting time (NO to S1490), the cleaning robot 100 re-determines whether the forbidden area setting command or the drag command is received.

When the time of waiting for the forbidden area setting command is equal to or longer than the seventh reference waiting time (YES to S1490), the cleaning robot 100 ends the operation of generating the entry-forbidden area and performs the previous operation.

When the time of waiting for the forbidden area setting command is equal to or longer than the predetermined seventh reference waiting time, the cleaning robot 100 ends the operation of generating the entry-forbidden area because the cleaning robot 100 may determine that the user has no intention to generate the entry-forbidden area.

When the entry-forbidden area is generated by the forbidden area generation method 1400 illustrated in FIG. 26, the cleaning robot 100 may intensively clean the entry-forbidden area that has been newly generated in accordance with the user's control command.

For example, when the cleaning robot 100 has generated the entry-forbidden area illustrated in FIG. 27C, the cleaning robot 100 moves while avoiding the entry-forbidden area as illustrated in FIG. 28 when the user commands the cleaning robot 100 to automatically clean the cleaning area in which the entry-forbidden area is included.

Figure 29:
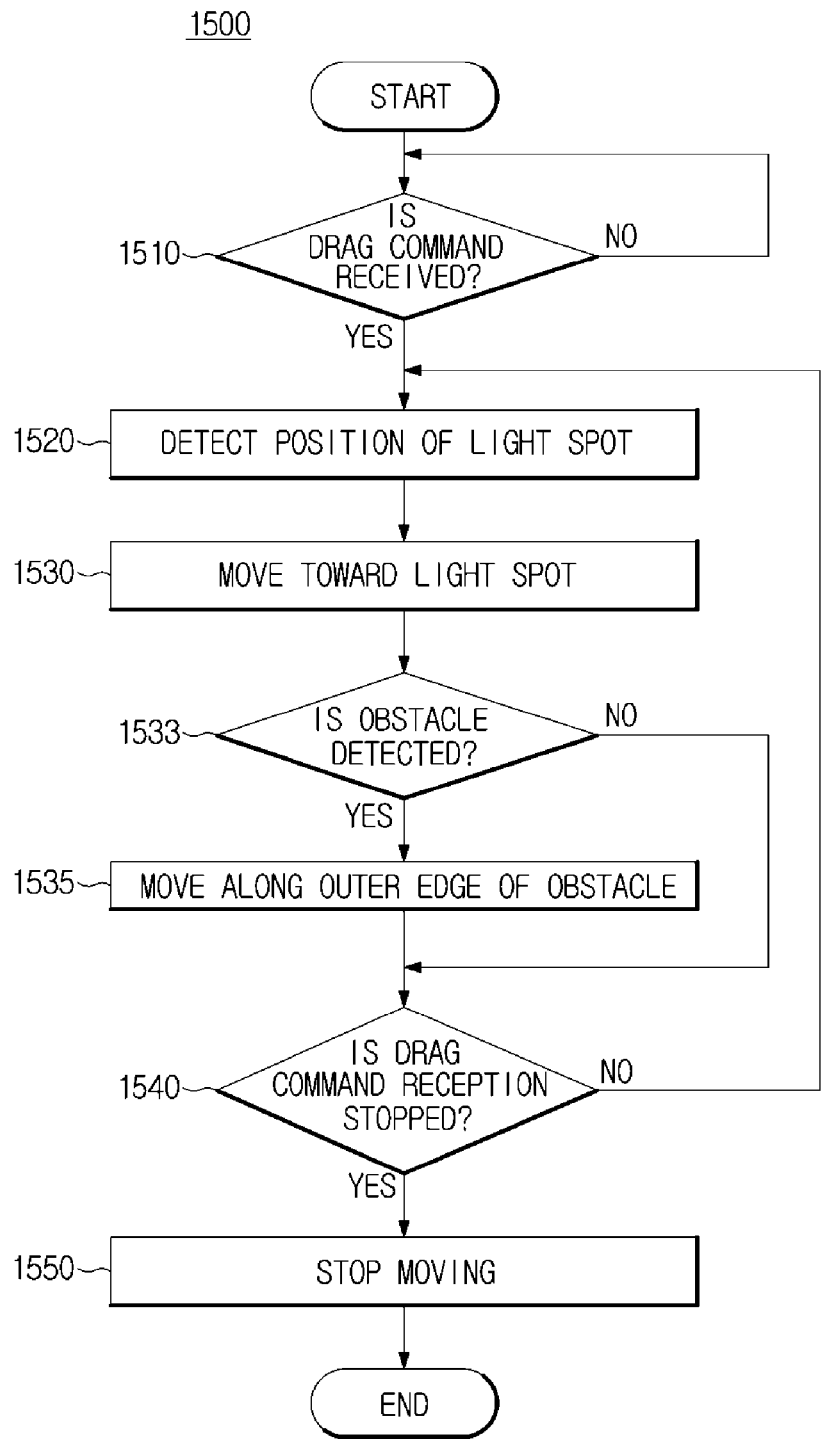
FIG. 29 illustrates a light spot tracking method in which the cleaning robot according to an embodiment tracks a light spot while avoiding an obstacle.
Figure 30A:
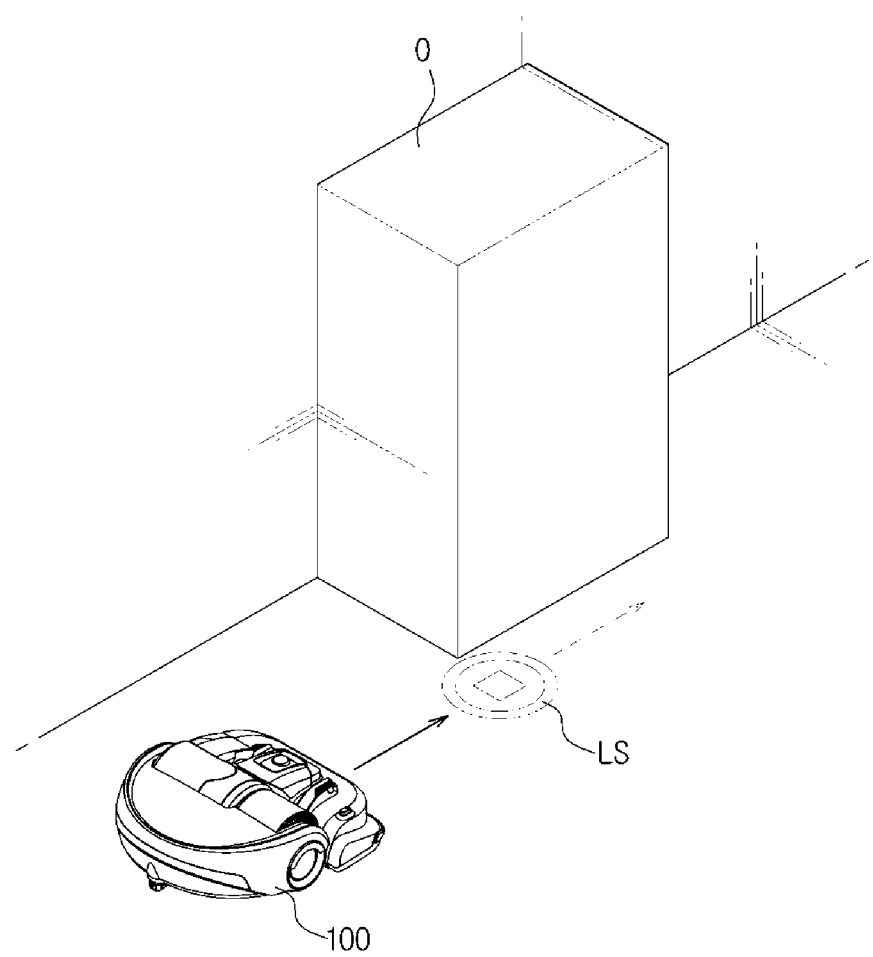
FIGS. 30A, 30B, and 30C illustrate an example of the cleaning robot according to an embodiment tracking a light spot while avoiding an obstacle.
Figure 30B:
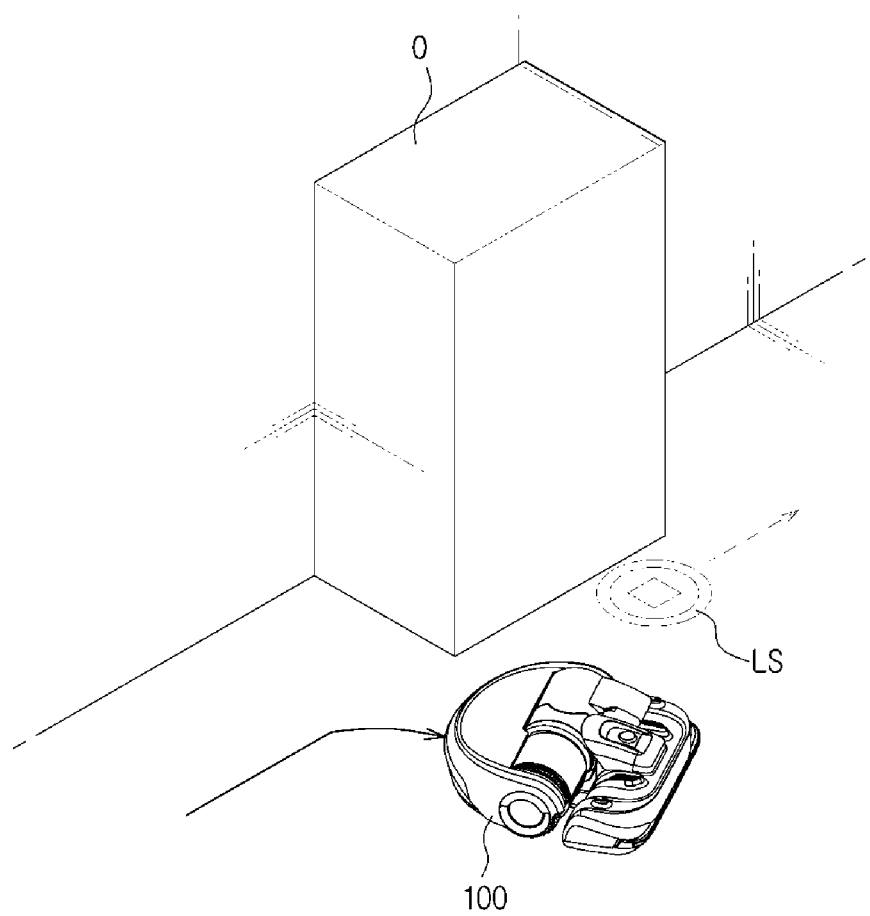
Figure 30C:
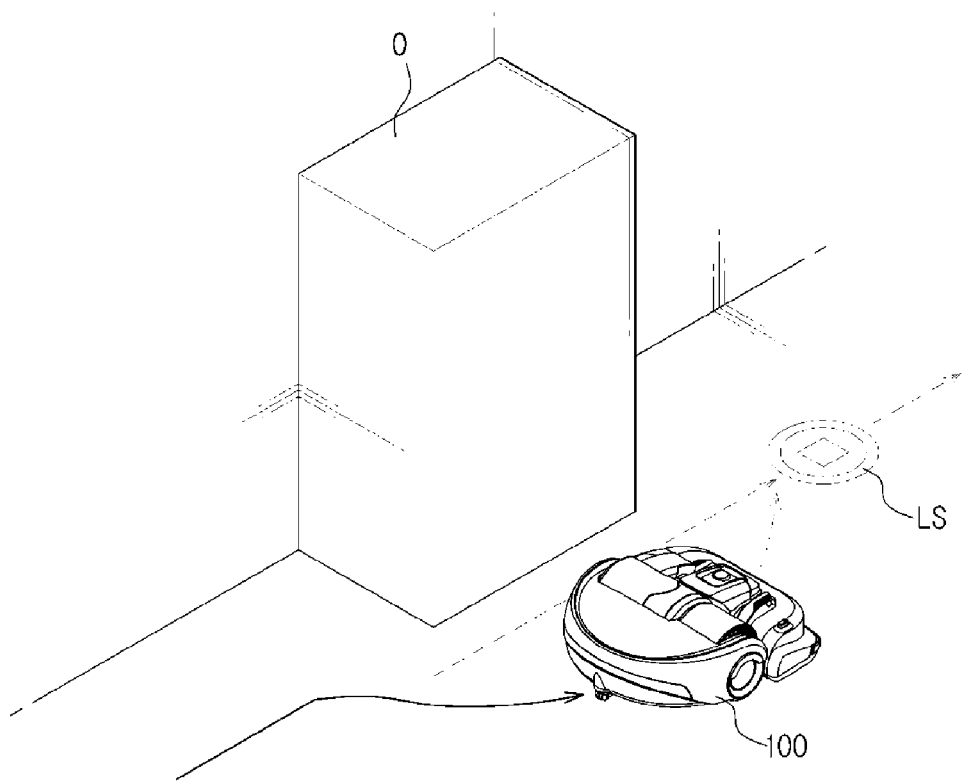

FIG. 29 illustrates a light spot tracking method in which the cleaning robot according to an embodiment tracks a light spot while avoiding an obstacle, and FIGS. 30A, 30B, and 30C illustrate an example of the cleaning robot according to an embodiment tracking a light spot while avoiding an obstacle.

The cleaning robot 100 moves along the movement path of the position indicated by the remote controller 200. That is, the cleaning robot 100 tracks the light spot LS formed by the remote controller 200. Also, when an obstacle O is placed on the path along which the cleaning robot 100 will move, the cleaning robot 100 moves while avoiding the obstacle O.

A light spot tracking method 1500 in which the cleaning robot 100 tracks the light spot LS while avoiding the obstacle O will be described with reference to FIGS. 29, 30A, 30B, and 30C.

First, the cleaning robot 100 determines whether the drag command is received (operation 1510).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates an infrared ray in accordance with the drag command, and radiates the modulated infrared ray, together with the visible light, to the position to which the cleaning robot 100 will move.

Like this, the visible light and the infrared ray transmitted by the remote controller 200 form the light spot LS at the position to which the cleaning robot will move and are reflected from the floor of the cleaning area.

Here, the cleaning robot 100 may acquire the drag command by receiving the infrared ray reflected from the floor of the cleaning area through the light reception unit 180 and demodulating the received infrared ray.

When the drag command is not received (NO to S1510), the cleaning robot 100 continues an ongoing operation.

When the drag command is received (YES to S1510), the cleaning robot 100 detects the position of the light spot LS by the light reception unit 180 (operation 1520). For example, as illustrated in FIG. 30A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1530). For example, as illustrated in FIG. 30A, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and then straightly move toward the light spot LS.

In an example, the cleaning robot 100 may move in a curve without stopping to allow the first infrared ray receiver 181 and the sixth infrared ray receiver 186 to receive the infrared ray.

While tracking the light spot LS, the cleaning robot 100 detects the obstacle O on the path along which the cleaning robot 100 will move (operation 1533).

For example, the cleaning robot 100 transmits the infrared ray or the ultrasonic wave toward the front of the cleaning robot 100 and detects the infrared ray or the ultrasonic wave reflected from the obstacle O, thereby detecting whether the obstacle O is placed in front of the cleaning robot 100 and a distance up to the obstacle O.

When the obstacle O is detected (YES to S1533), the cleaning robot 100 moves along a boundary line of the obstacle O (operation 1535).

For example, as illustrated in FIG. 30B, when the obstacle O placed in front of the cleaning robot 100 is detected while the cleaning robot 100 tracks the light spot LS, the cleaning robot 100 may track the light spot LS while maintaining a predetermined distance from the obstacle O.

When the cleaning robot 100 continues to track the light spot LS while maintaining the predetermined distance from the obstacle O, the cleaning robot 100 gets to move in parallel with the boundary line of the obstacle O as illustrated in FIG. 30C.

When the obstacle O is not detected (NO to S1533), the cleaning robot 100 tracks the light spot LS via the shortest path from the light spot LS.

Then, the cleaning robot 100 determines whether the reception of the drag command is stopped (operation 1540). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1540), the cleaning robot 100 repeats the position detection of the light spot LS and the tracking of the light spot LS.

When the reception of the drag command is stopped (YES to S1540), the cleaning robot 100 stops moving (operation 1550).

Because it signifies that the cleaning robot 100 has reached the designated position or the user is indicating a position outside the infrared ray detection range of the cleaning robot 100 when the reception of the infrared ray including the drag command is stopped, the cleaning robot 100 stops moving and waits for the user's next command.

Figure 31:
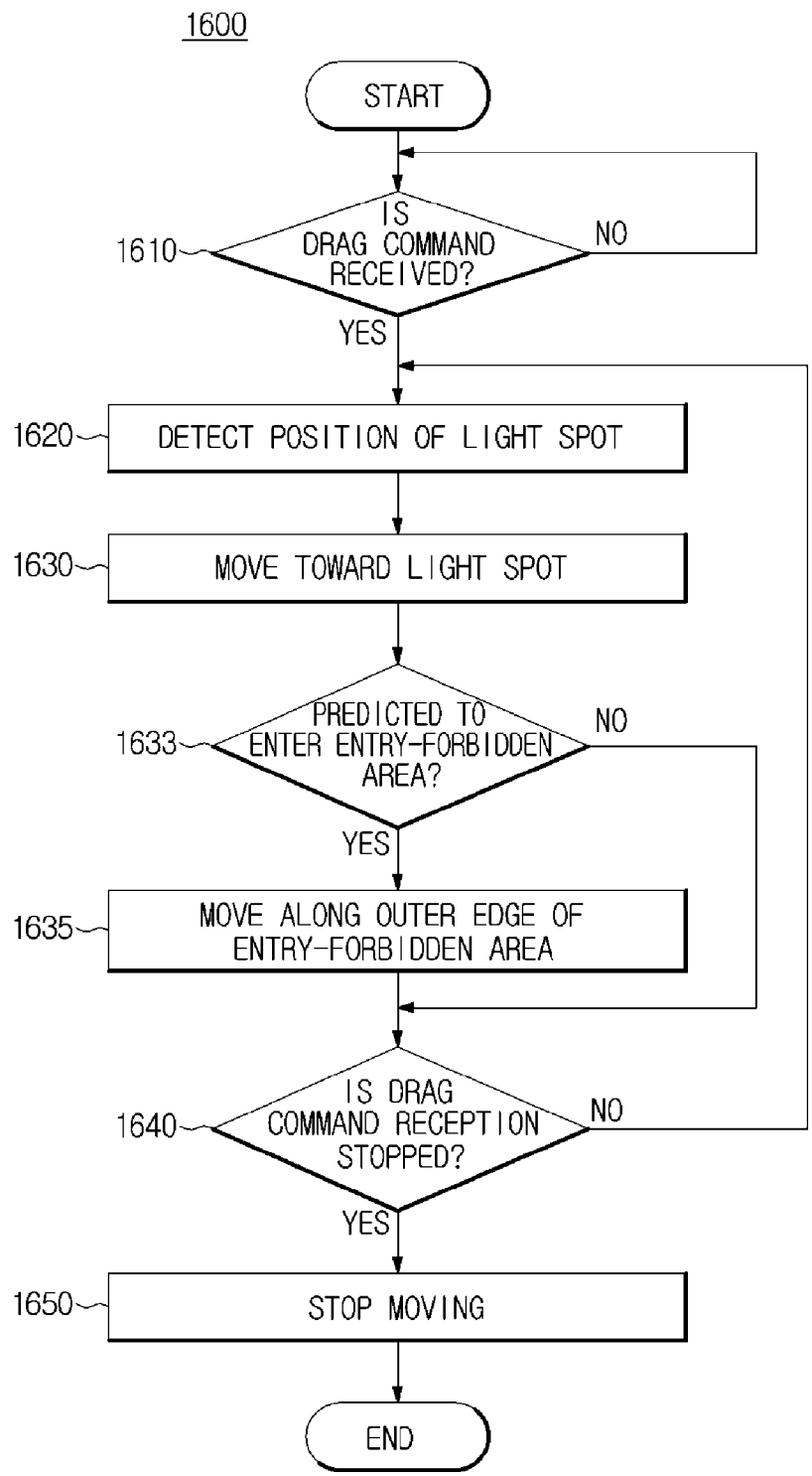
FIG. 31 illustrates a light spot tracking method in which the cleaning robot according to an embodiment tracks a light spot while avoiding an entry-forbidden area.
Figure 32A:
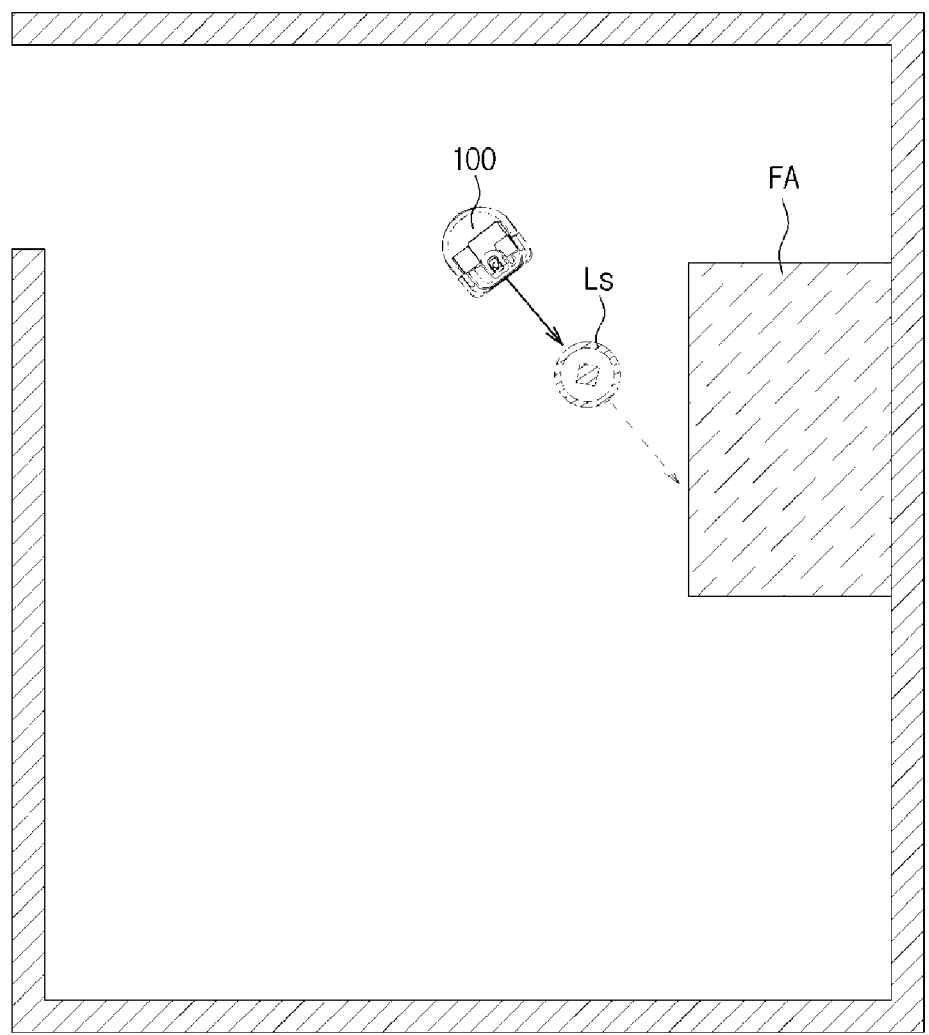
FIGS. 32A, 32B, and 32C illustrate an example of the cleaning robot according to an embodiment tracking a light spot while avoiding the entry-forbidden area.
Figure 32B:
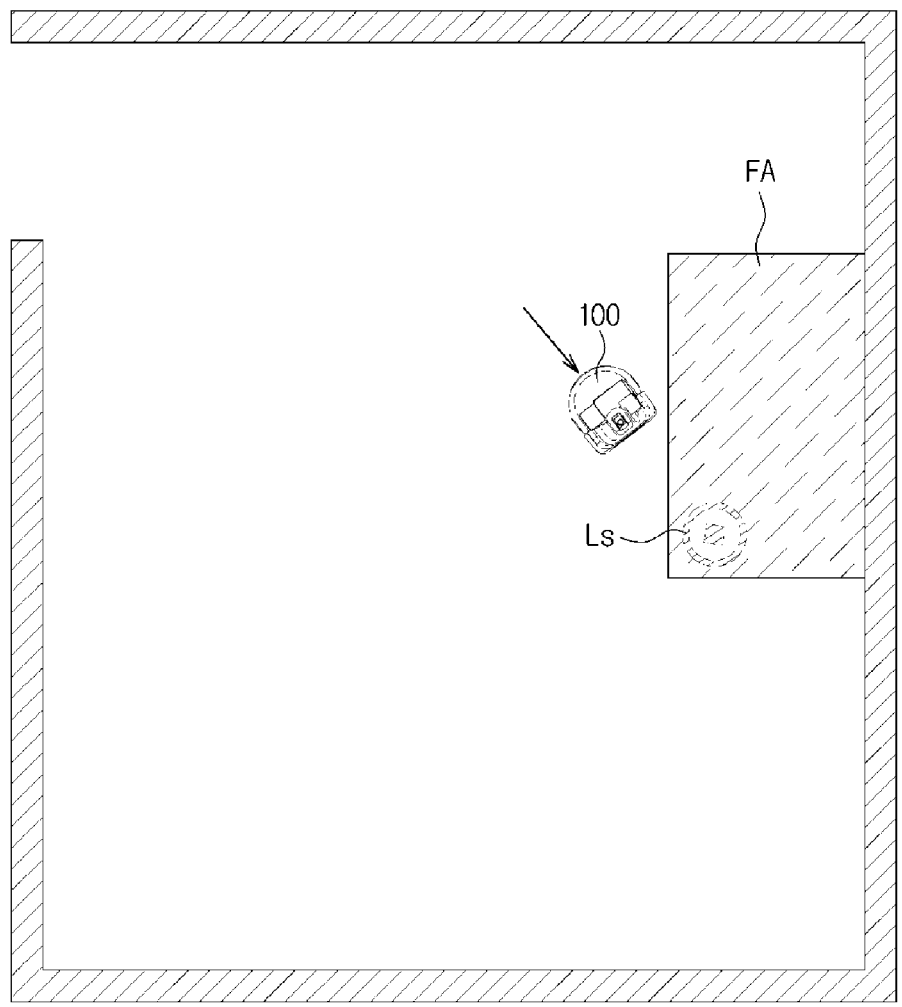
Figure 32C:
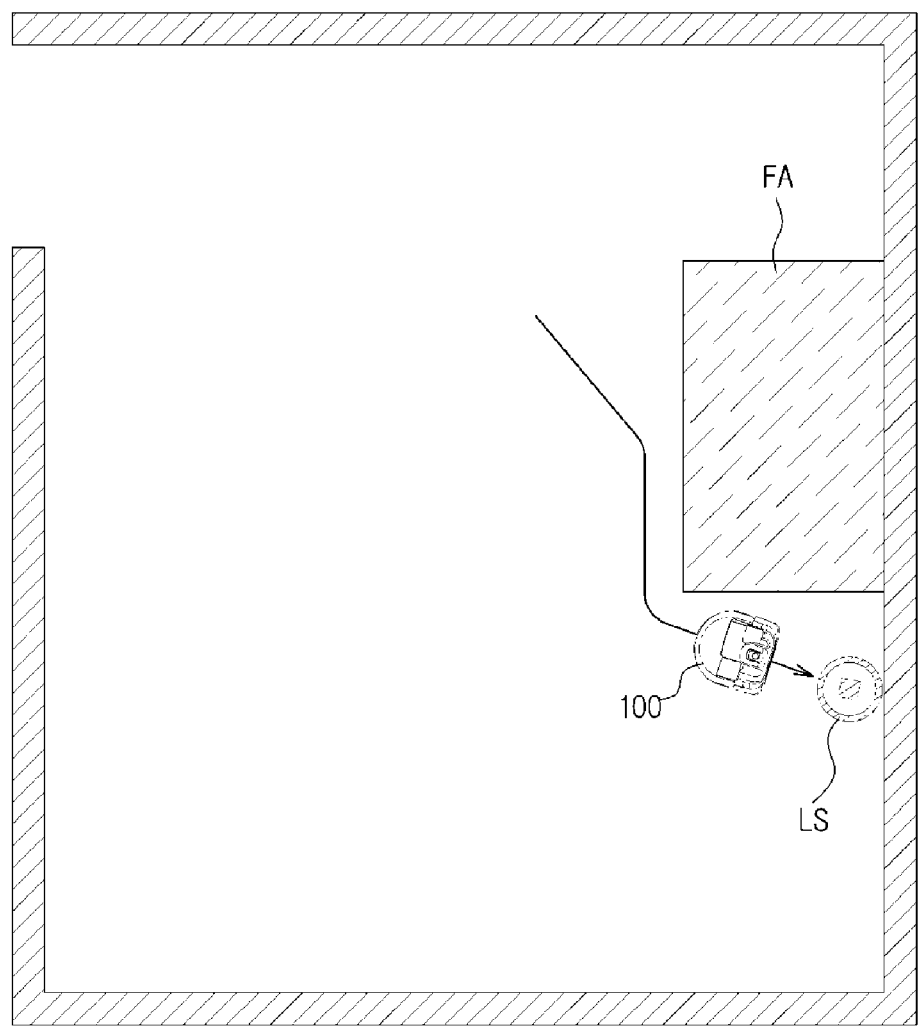

FIG. 31 illustrates a light spot tracking method in which the cleaning robot according to an embodiment tracks a light spot while avoiding an entry-forbidden area, and FIGS. 32A, 32B, and 32C illustrate an example of the cleaning robot according to an embodiment tracking the light spot while avoiding the entry-forbidden area.

The cleaning robot 100 moves along the movement path of the position indicated by the remote controller 200. That is, the cleaning robot 100 tracks the light spot LS formed by the remote controller 200. Also, when an entry-forbidden area FA is placed on the path along which the cleaning robot 100 will move, the cleaning robot 100 moves by avoiding the entry-forbidden area FA.

A light spot tracking method 1600 in which the cleaning robot 100 tracks the light spot LS while avoiding the entry-forbidden area FA will be described with reference to FIGS. 31, 32A, 32B, and 32C.

First, the cleaning robot 100 determines whether the drag command is received (operation 1610).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates an infrared ray in accordance with the drag command, and radiates the modulated infrared ray, together with the visible light, to the position to which the cleaning robot 100 will move.

Like this, the visible light and the infrared ray transmitted by the remote controller 200 form the light spot LS at the position to which the cleaning robot will move and are reflected from the floor of the cleaning area.

Here, the cleaning robot 100 may acquire the drag command by receiving the infrared ray reflected from the floor of the cleaning area through the light reception unit 180 and demodulating the received infrared ray.

When the drag command is not received (NO to S1610), the cleaning robot 100 continues an ongoing operation.

When the drag command is received (YES to S1610), the cleaning robot 100 detects the position of the light spot LS by the light reception unit 180 (operation 1620). For example, as illustrated in FIG. 32A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1630). For example, as illustrated in FIG. 32B, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and then straightly move toward the light spot LS.

In an example, the cleaning robot 100 may move in a curve without stopping to allow the first infrared ray receiver 181 and the sixth infrared ray receiver 186 to receive the infrared ray.

While tracking the light spot LS, the cleaning robot 100 determines whether the cleaning robot 100 will enter the entry-forbidden area FA (operation 1633).

For example, the cleaning robot 100 may calculate the movement path for tracking the light spot LS and determine whether the calculated movement path passes through the entry-forbidden area FA.

When predicted to enter the entry-forbidden area FA (YES to S1633), the cleaning robot 100 moves along a boundary line of the entry-forbidden area FA (operation 1635).

For example, as illustrated in FIG. 32C, when the cleaning robot 100 is predicted to enter the entry-forbidden area FA placed in front of the cleaning robot 100 while tracking the light spot LS, the cleaning robot 100 may track the light spot LS while maintaining a predetermined distance from the entry-forbidden area FA.

When the cleaning robot 100 continues to track the light spot LS while maintaining the predetermined distance from the entry-forbidden area FA, the cleaning robot 100 gets to move in parallel with the boundary line of the entry-forbidden area FA as illustrated in FIG. 32C.

When not predicted to enter the entry-forbidden area FA (NO to S1633), the cleaning robot 100 tracks the light spot LS via the shortest path from the light spot LS.

Then, the cleaning robot 100 determines whether the reception of the drag command is stopped (operation 1640). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1640), the cleaning robot 100 repeats the position detection of the light spot LS and the tracking of the light spot LS.

When the reception of the drag command is stopped (YES to S1640), the cleaning robot 100 stops moving (operation 1650).

Because it signifies that the cleaning robot 100 has reached the designated position or the user is indicating a position outside the infrared ray detection range of the cleaning robot 100 when the reception of the infrared ray including the drag command is stopped, the cleaning robot 100 stops moving and waits for the user's next command.

Figure 34A:
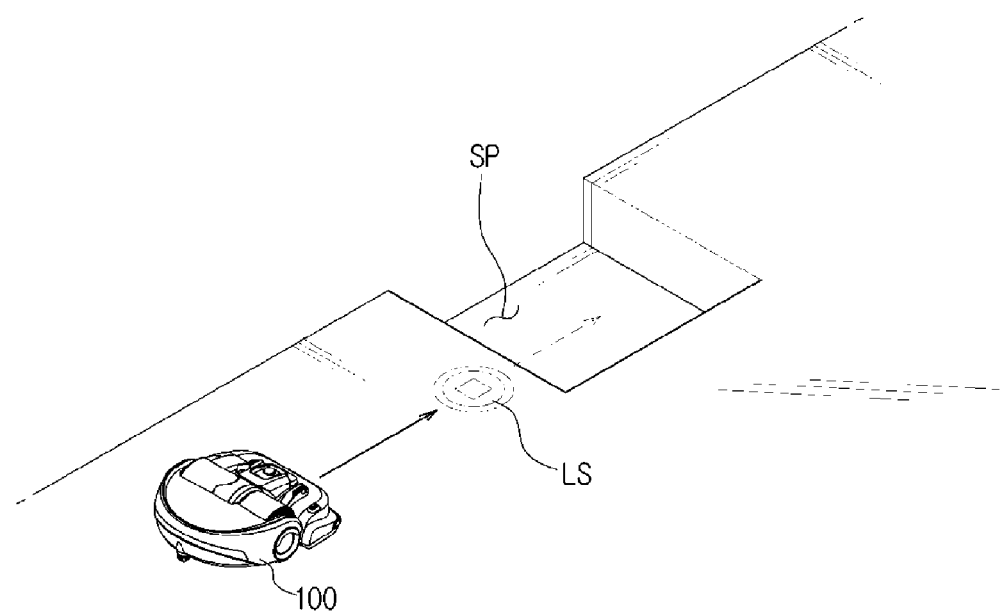
FIGS. 34A, 34B, and 34C illustrate an example of the cleaning robot according to an embodiment tracking a light spot while avoiding the step.
Figure 34B:
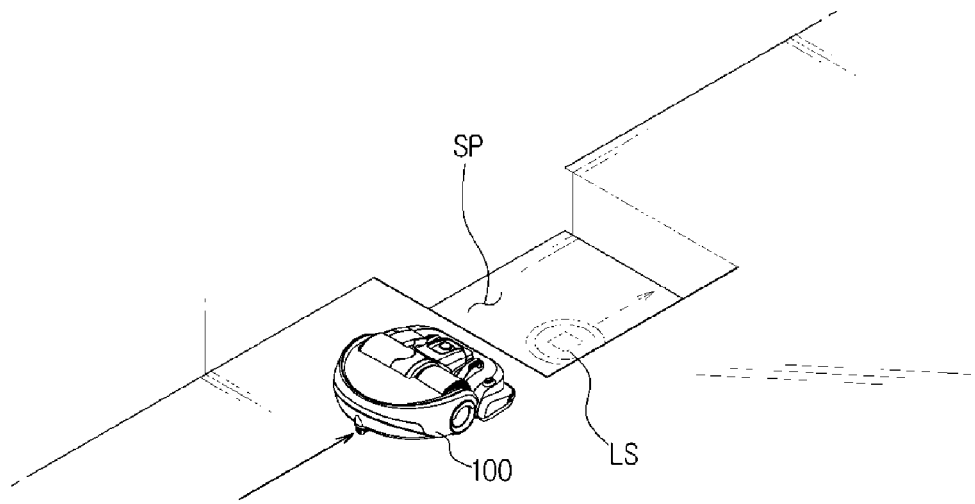
Figure 34C:
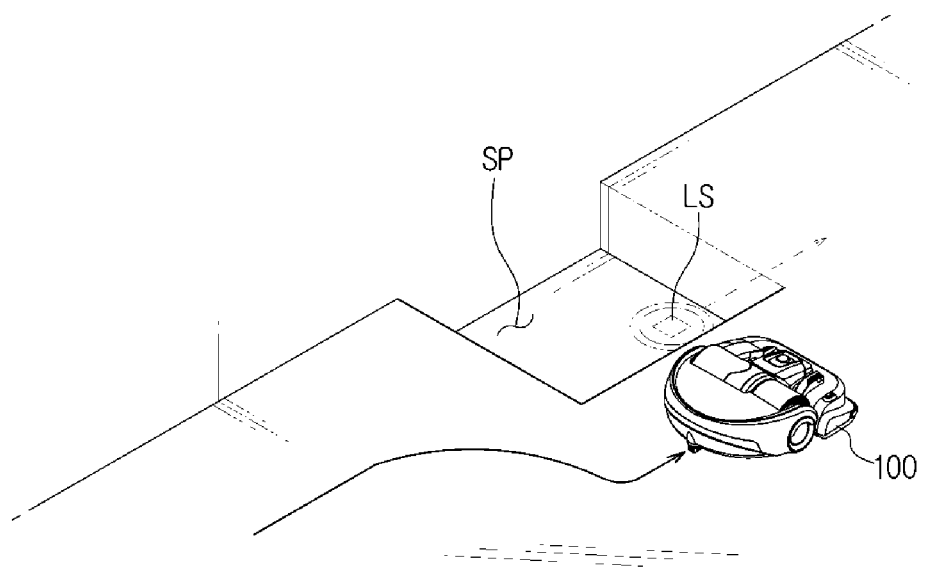

FIG. 33 illustrates a light spot tracking method in which the cleaning robot according to an embodiment tracks a light spot while avoiding a step, and FIGS. 34A, 34B, and 34C illustrate an example of the cleaning robot according to an embodiment tracking a light spot while avoiding the step.

The cleaning robot 100 moves along the movement path of the position indicated by the remote controller 200. That is, the cleaning robot 100 tracks the light spot LS formed by the remote controller 200. Also, when a step SP is placed on the path along which the cleaning robot 100 will move, the cleaning robot 100 moves by avoiding the step SP.

A light spot tracking method 1700 in which the cleaning robot 100 tracks the light spot LS while avoiding the step SP will be described with reference to FIGS. 33, 34A, 34B, and 34C.

First, the cleaning robot 100 determines whether the drag command is received (operation 1710).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates an infrared ray in accordance with the drag command, and radiates the modulated infrared ray, together with the visible light, to the position to which the cleaning robot 100 will move.

Like this, the visible light and the infrared ray transmitted by the remote controller 200 form the light spot LS at the position to which the cleaning robot will move and are reflected from the floor of the cleaning area.

Here, the cleaning robot 100 may acquire the drag command by receiving the infrared ray reflected from the floor of the cleaning area through the light reception unit 180 and demodulating the received infrared ray.

When the drag command is not received (NO to S1710), the cleaning robot 100 continues an ongoing operation.

When the drag command is received (YES to S1710), the cleaning robot 100 detects the position of the light spot LS by the light reception unit 180 (operation 1720). For example, as illustrated in FIG. 34A, the cleaning robot 100 may detect the relative position of the light spot LS with respect to the cleaning robot 100.

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

After detecting the relative position of the light spot LS, the cleaning robot 100 moves toward the detected light spot LS (operation 1730). For example, as illustrated in FIG. 34B, the cleaning robot 100 may move toward the light spot LS.

To move toward the light spot LS, the cleaning robot 100 may rotate at the same spot or move in a curve such that the position of the light spot LS is in front of the cleaning robot 100.

Specifically, the cleaning robot 100 may rotate or move in a curve such that the infrared ray transmitted by the remote controller 200 is received by the first infrared ray receiver 181 and the sixth infrared ray receiver 186 located at the front surface of the cleaning robot 100.

For example, the cleaning robot 100 may stop and rotate to allow the first infrared ray receiver 181 and the sixth infrared ray receiver 186 to receive the infrared ray, and then straightly move toward the light spot LS.

In an example, the cleaning robot 100 may move in a curve without stopping to allow the first infrared ray receiver 181 and the sixth infrared ray receiver 186 to receive the infrared ray.

While tracking the light spot LS, the cleaning robot 100 detects the step SP (operation 1733).

For example, the cleaning robot 100 transmits the infrared ray or the ultrasonic wave toward the bottom of the cleaning robot 100, and detects the infrared ray or the ultrasonic wave reflected from the floor of the cleaning area. If the infrared ray or the ultrasonic wave reflected from the floor of the cleaning area is not detected, the cleaning robot 100 may determine that the step SP exists.

When the step SP is detected (YES to S1733), the cleaning robot 100 moves along the boundary line of the step SP (operation 1735).

For example, as illustrated in FIG. 34C, when the step SP placed in front of the cleaning robot 100 is detected while the cleaning robot 100 tracks the light spot LS, the cleaning robot 100 may track the light spot LS while maintaining a predetermined distance from the step SP.

When the cleaning robot 100 continues to track the light spot LS while maintaining the predetermined distance from the step SP, the cleaning robot 100 gets to move in parallel with the boundary line of the step SP as illustrated in FIG. 34C.

When the step SP is not detected (NO to S1733), the cleaning robot 100 tracks the light spot LS via the shortest path from the light spot LS.

Then, the cleaning robot 100 determines whether the reception of the drag command is stopped (operation 1740). Specifically, the cleaning robot 100 determines whether the infrared ray including the drag command is detected by the light receiving unit 180.

The reception of the drag command may be stopped due to various reasons.

For example, when the cleaning robot 100 reaches the position of the light spot LS or the user commands a position outside the infrared ray reception range of the cleaning robot 100, the cleaning robot 100 may not be able to receive the infrared ray including the drag command.

When the reception of the drag command is continued (NO to S1740), the cleaning robot 100 repeats the position detection of the light spot LS and the tracking of the light spot LS.

When the reception of the drag command is stopped (YES to S1740), the cleaning robot 100 stops moving (operation 1750).

Because it signifies that the cleaning robot 100 has reached the designated position or the user is indicating a position outside the infrared ray detection range of the cleaning robot 100 when the reception of the infrared ray including the drag command is stopped, the cleaning robot 100 stops moving and waits for the user's next command.

Figure 35:
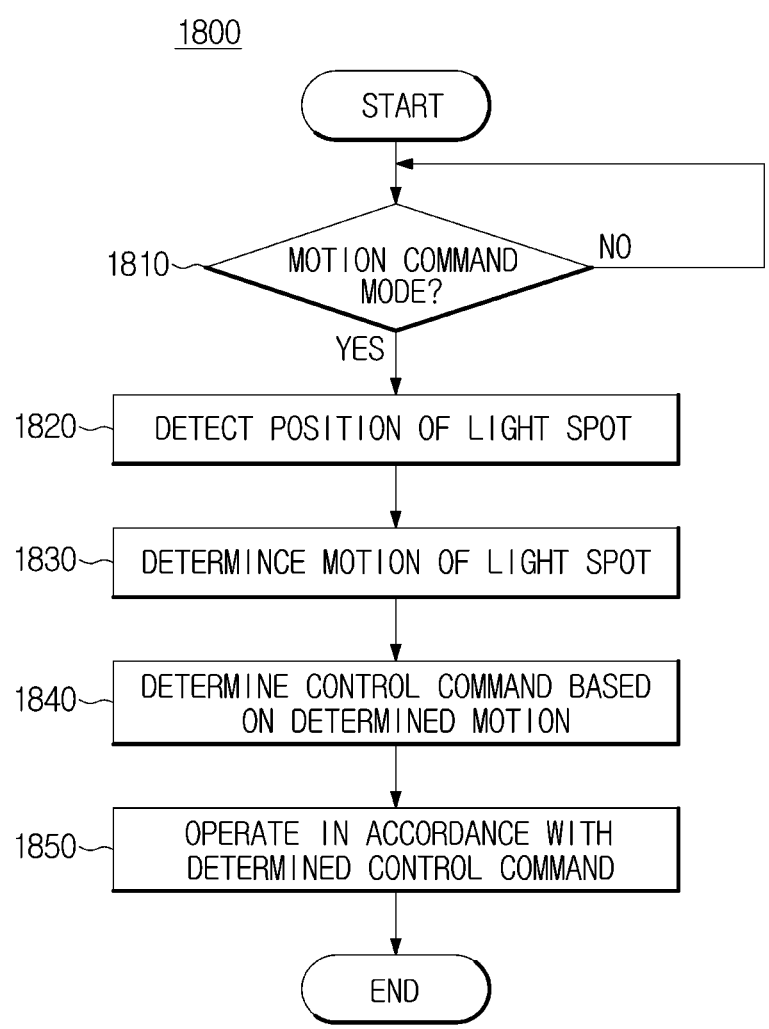
FIG. 35 illustrates a motion command reception method in which the cleaning robot according to an embodiment receives a control command from a user through a motion of a light spot.
Figure 36:
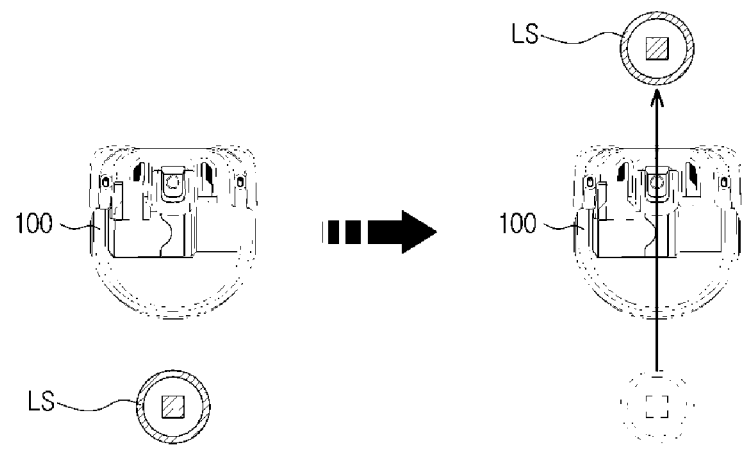
FIGS. 36, 37, and 38 illustrate an example of the cleaning robot according to an embodiment receiving a control command from a user through a motion of a light spot.
Figure 37:
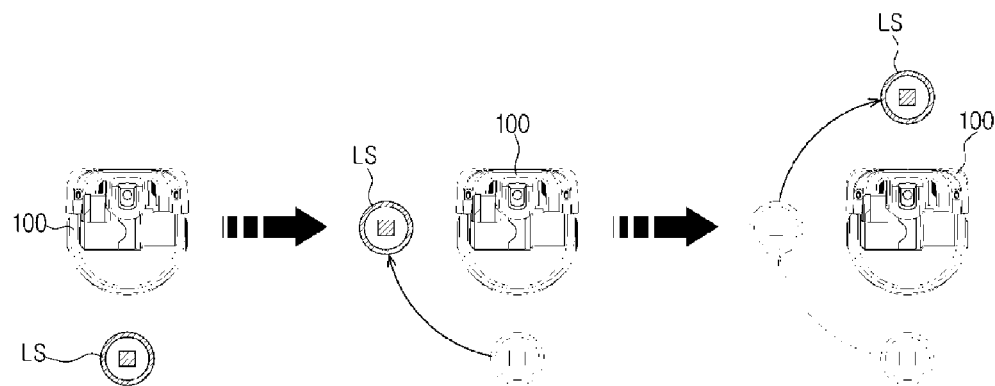
Figure 38:
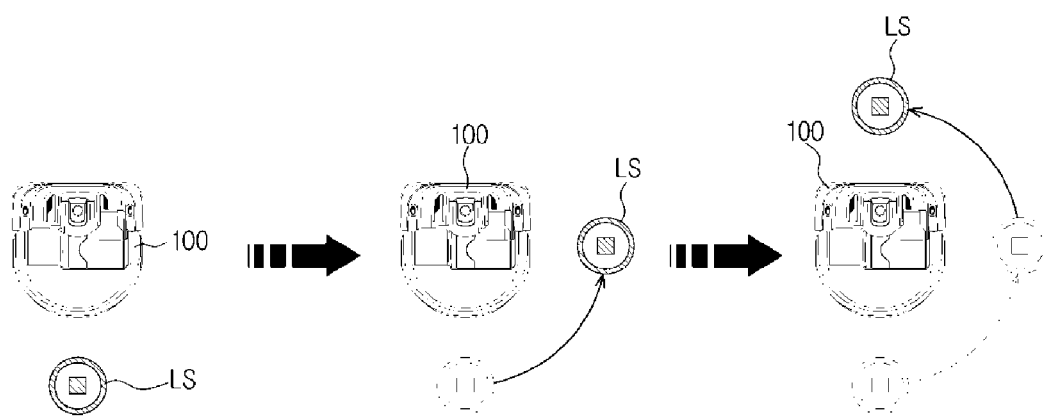

FIG. 35 illustrates a motion command reception method in which the cleaning robot according to an embodiment receives a control command from a user through a motion of a light spot, and FIGS. 36, 37, and 38 illustrate an example of the cleaning robot according to an embodiment receiving the control command from the user through the motion of the light spot.

As mentioned above, the cleaning robot 100 may detect the position indicated by the user with the remote controller 200, i.e. the position of the light spot LS.

In addition, the user may not only enable the cleaning robot 100 to move along the movement path of the light spot LS formed at the position indicated by the remote controller 200, but also input the control command to the remote controller 200 through a motion of the light spot LS.

Hereinafter, an operation mode in which the user may input the control command through the motion of the light spot LS will be referred to as a motion command mode.

A motion command reception method 1800 in which the cleaning robot 100 receives the user's control command in the motion command mode will be described with reference to FIGS. 35, 36, 37, and 38.

First, the cleaning robot 100 determines whether it is in the motion command mode (operation 1810).

As mentioned above, the motion command mode is the operation mode in which the user inputs the control command through the motion of the light spot LS formed at the position indicated by the remote controller 200.

When determined as being in the motion command mode (YES to S1810), the cleaning robot 100 detects the position of the light spot (operation 1820).

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity.

Then, the cleaning robot 100 determines the motion of the light spot LS based on the movement of the position of the light spot LS (operation 1830).

Specifically, the cleaning robot 100 may detect the movement of the position of the light spot LS based on changes in the infrared ray receiver that receives the infrared ray with the strongest intensity among the plurality of infrared ray receivers 181 to 186 that receive the infrared ray transmitted by the remote controller 200.

In addition, the cleaning robot 100 determines the user's control command based on the determined motion of the light spot LS (operation 1840).

Specifically, a table that matches the user's control command to the motion of the light spot LS may be pre-stored in the first storage unit 170, and the cleaning robot 100 may determine the user's control command from the motion of the light spot LS by referring to the table stored in the first storage unit 170.

For example, as illustrated in FIG. 36, when the user moves the light spot LS from the rear of the cleaning robot 100 to the front of the cleaning robot 100 by moving across the cleaning robot 100, the cleaning robot 100 may determine that the user has input an operation start command.

In another example, as illustrated in FIG. 37, when the user moves the light spot LS from the rear of the cleaning robot 100 to the front of the cleaning robot 100 along a left boundary line of the cleaning robot 100, the cleaning robot 100 may determine that the user has input an operation stop command.

As still another example, as illustrated in FIG. 38, when the user moves the light spot LS from the rear of the cleaning robot 100 to the front of the cleaning robot 100 along a right boundary line of the cleaning robot 100, the cleaning robot 100 may determine that the user has input an return command.

Then, the cleaning robot 100 performs an operation according to the determined control command (operation 1850).

For example, as illustrated in FIG. 36, when the user moves the light spot LS from the rear of the cleaning robot 100 to the front of the cleaning robot 100 by moving across the cleaning robot 100, the cleaning robot 100 starts the cleaning operation.

In an example, as illustrated in FIG. 37, when the user moves the light spot LS from the rear of the cleaning robot 100 to the front of the cleaning robot 100 along a left boundary line of the cleaning robot 100, the cleaning robot 100 stops the cleaning operation.

As an example, as illustrated in FIG. 38, when the user moves the light spot LS from the rear of the cleaning robot 100 to the front of the cleaning robot 100 along a right boundary line of the cleaning robot 100, the cleaning robot 100 returns to a charging station (not shown)

Figure 39:
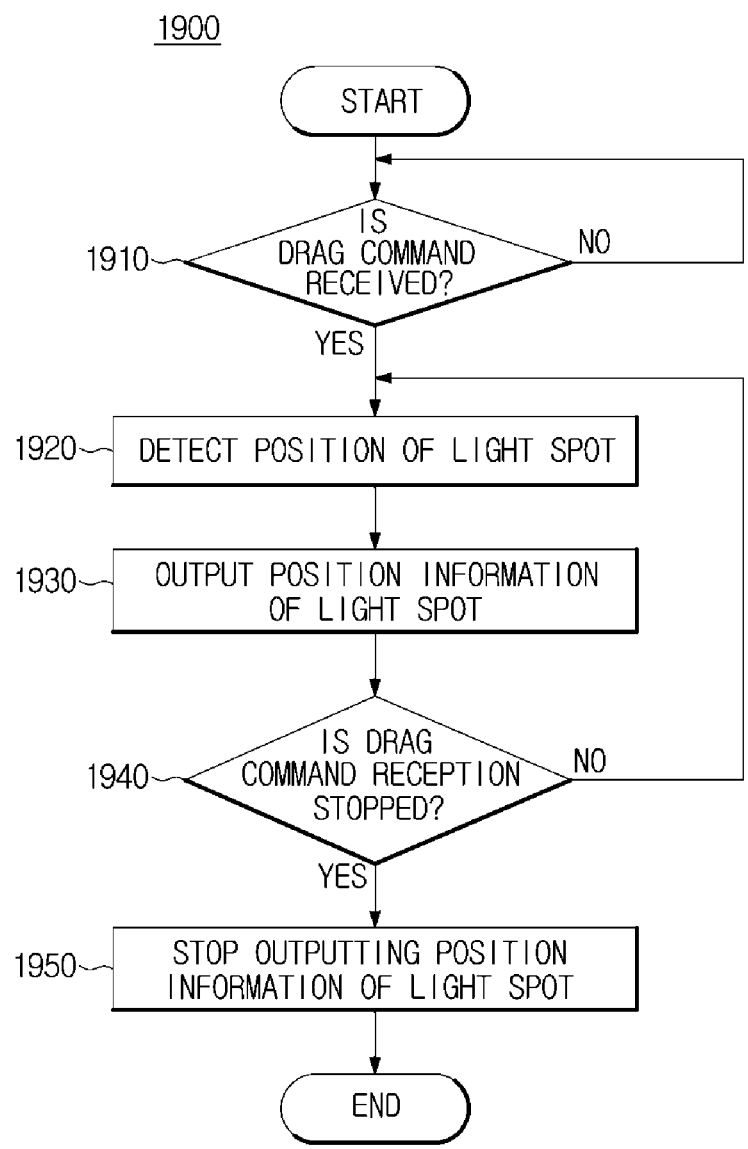
FIG. 39 illustrates a method of the cleaning robot according to an embodiment displaying a position at which a light spot is detected.

FIG. 39 illustrates a method of the cleaning robot according to an embodiment displaying a position at which a light spot is detected, FIGS. 40A, 40B, 40C, and 40D illustrate an example of the cleaning robot according to an embodiment displaying the position at which the light spot is detected, and FIGS. 41A, 41B, 41C, 42D and 41E illustrate an example of the cleaning robot according to an embodiment displaying the position at which the light spot is detected.

A method 1900 in which the cleaning robot 100 displays the position of the light spot LS will be described with reference to FIGS. 39, 40A, 40B, 40C, 40D, 41A, 41B, 41C, 41D and 41E.

First, the cleaning robot 100 determines whether the drag command is received from the remote controller 200 (operation 1910).

The user may input the drag command to the cleaning robot 100 through the second user interface 210 of the remote controller 200.

When the user inputs the drag command to the remote controller 200 while indicating the position (the floor of the cleaning area) to which the cleaning robot 100 will move, the remote controller 200 modulates the infrared ray in accordance with the drag command and radiates the modulated infrared ray, together with the visible light, to the position to which the cleaning robot 100 will move.

The visible light and the infrared ray transmitted by the remote controller 200 as above form the light spot LS at the position to which the cleaning robot will move and are reflected from the floor of the cleaning area.

Here, the cleaning robot 100 receives the infrared ray reflected from the floor of the cleaning area through the light reception unit 180, and demodulates the received infrared ray, thereby acquiring the drag command.

When the drag command is not received (NO to S1910), the cleaning robot 100 continues an ongoing operation.

When the drag command is received (YES to S1910), the cleaning robot 100 detects the position of the light spot LS by the light reception unit 180 (operation 1920).

As mentioned above, when the remote controller 200 radiates the infrared ray toward the floor of the cleaning area, the cleaning robot 100 receives the infrared ray reflected from the floor of the cleaning area through the light reception unit 180.

Here, the infrared ray receiver which is nearest to the light spot LS among the plurality of infrared ray receivers 181 to 186 included in the light reception unit 180 may receive the infrared ray with the strongest intensity.

The cleaning robot 100 may detect the relative position of the light spot LS based on the position of the infrared ray receiver that has received the infrared ray with the strongest intensity. For example, the cleaning robot 100 may determine that the light spot LS is positioned in front of the main body 101 when the first infrared ray receiver 181 and the sixth infrared ray receiver 186 installed at the front portion of the main body 101 receive the infrared ray with the strongest intensity, and the cleaning robot 100 may determine that the light spot LS is positioned at the right of the main body 101 when the second infrared ray receiver 182 installed at the right portion of the main body 101 receives the infrared ray with the strongest intensity. The cleaning robot 100 may determine that the light spot LS is positioned at the rear of the main body 101 when the third infrared ray receiver 183 and the fourth infrared ray receiver 184 installed at the rear portion of the main body 101 receive the infrared ray with the strongest intensity, and the cleaning robot 100 may determine that the light spot LS is positioned at the left of the main body 101 when the fifth infrared ray receiver 185 installed at the left portion of the main body 101 receive the infrared ray with the strongest intensity.

After detecting the relative position of the light spot LS, the cleaning robot 100 displays position information of the detected light spot LS (operation 1930).

For example, the cleaning robot 100 may visually display the position information of the light spot through the display 113.

Figure 40A:
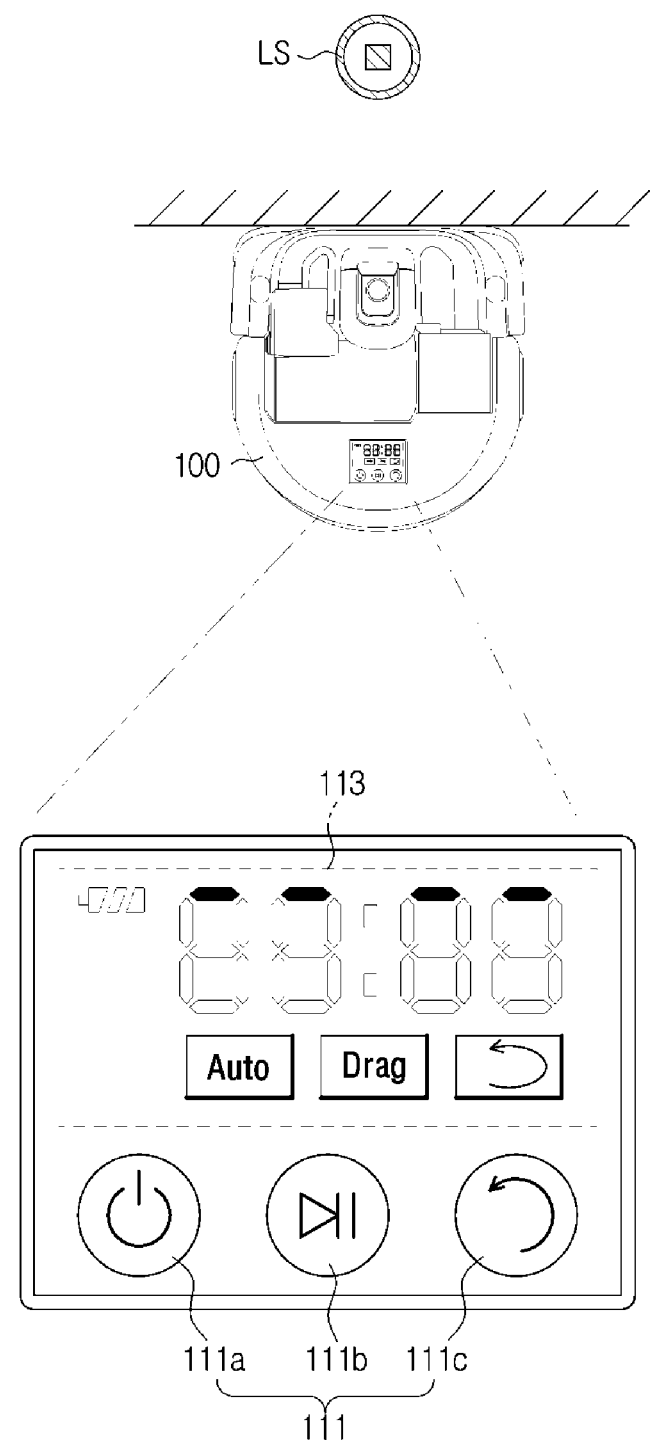
FIGS. 40A, 40B, 40C, and 40D illustrate an example of the cleaning robot according to an embodiment displaying a position at which a light spot is detected.
Figure 40B:
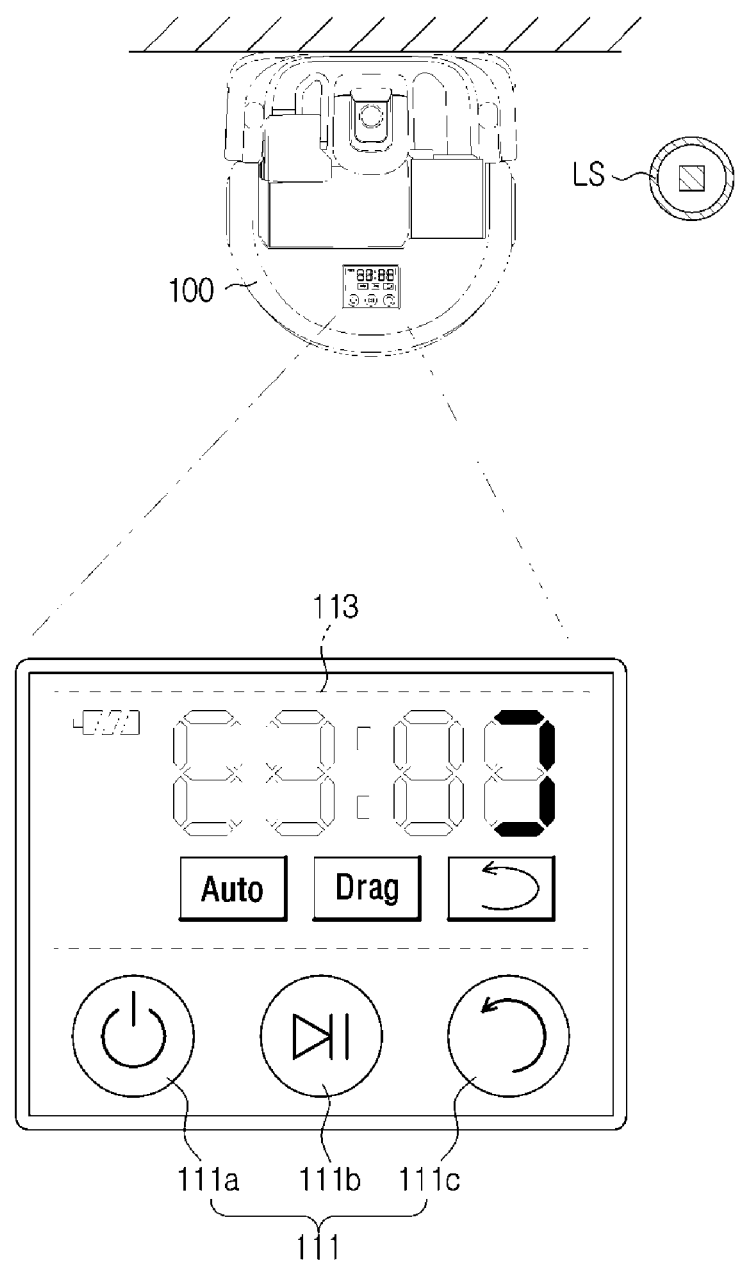
Figure 40C:
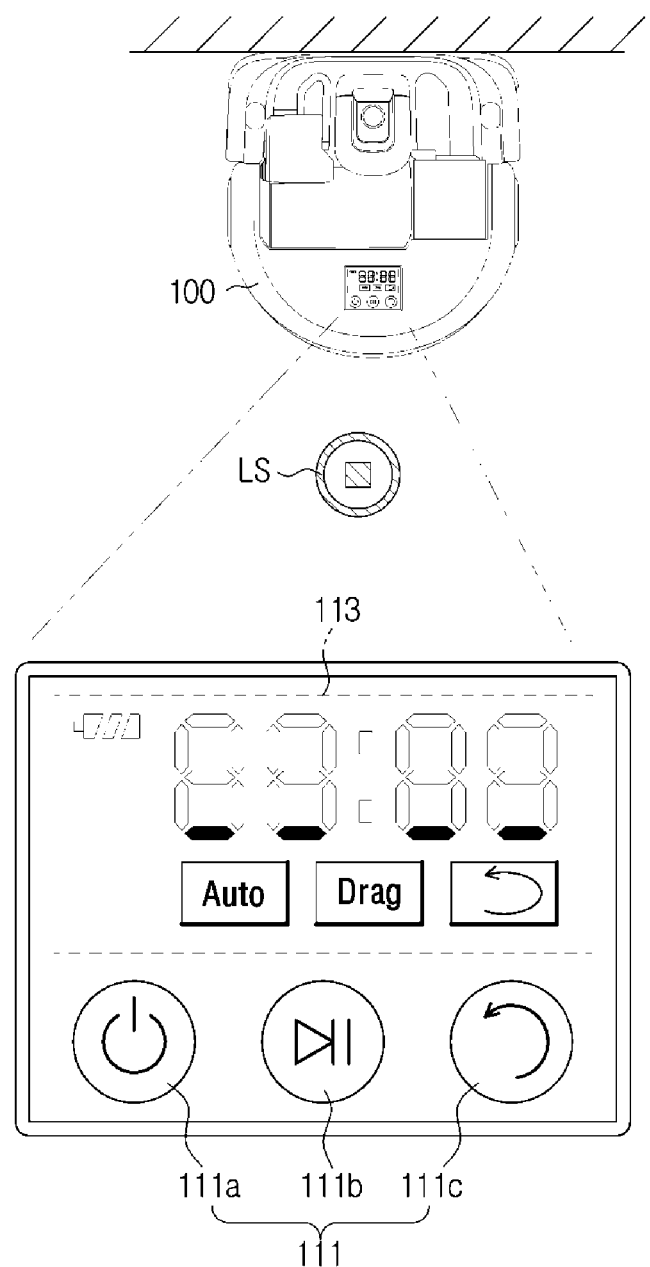
Figure 40D:
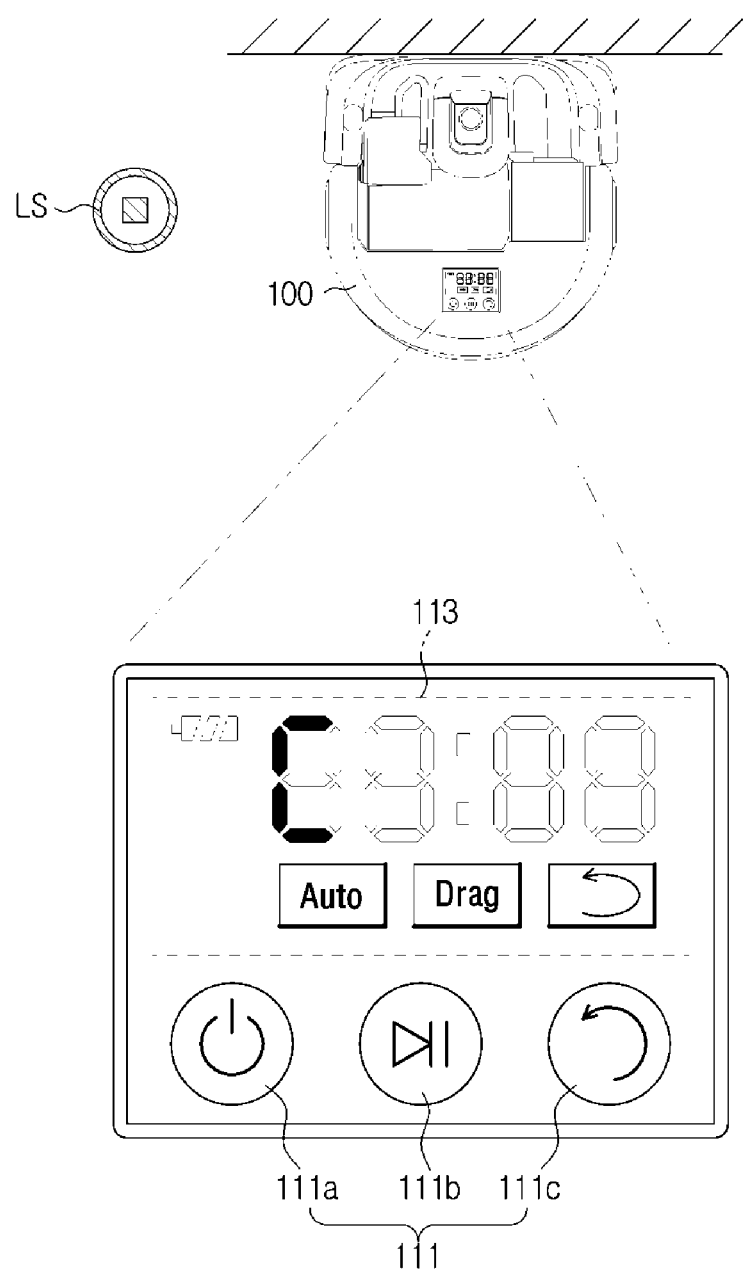

Specifically, when the light spot LS is determined to be positioned in front of the main body 101, the cleaning robot 100 may display a position display image of the first light spot on the display 113 as illustrated in FIG. 40A. Also, when the light spot LS is determined to be positioned at the right of the main body 101, the cleaning robot 100 may display a position display image of the second light spot on the display 113 as illustrated in FIG. 40B. Also, when the light spot LS is determined to be positioned at the rear of the main body 101, the cleaning robot 100 may display a position display image of a third light spot on the display 113 as illustrated in FIG. 40C. Also, when the light spot LS is determined to be positioned at the left of the main body 101, the cleaning robot 100 may display a position display image of the fourth light spot on the display 113 as illustrated in FIG. 40D.

Figure 41A:
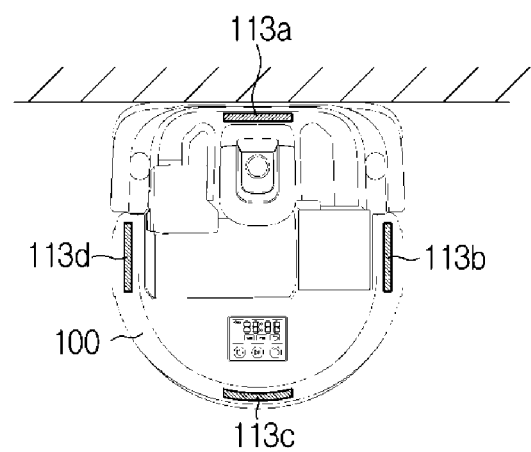
FIGS. 41A, 41B, 41C, 41D, and 41E illustrate an example of the cleaning robot according to an embodiment displaying a position at which a light spot is detected.

In an example, as illustrated in FIG. 41A, the cleaning robot 100 may include separate display modules 113a, 113b, 113c, and 113d for displaying light spot position information. The display modules 113a, 113b, 113c, and 113d may be provided at an upper side of the main body 101, and the display modules 113a, 113b, 113c, and 113d may include a first display module 113a provided at the front portion of the main body 101, a second display module 113b provided at the right portion of the main body 101, a third display module 113c provided at the rear portion of the main body 101, and a fourth display module 113*d* provided at the left portion of the main body 101.

The cleaning robot 100 may visually display the light spot position information through the display modules 113*a*, 113*b*, 113*c*, and 113*d*.

Figure 41B:
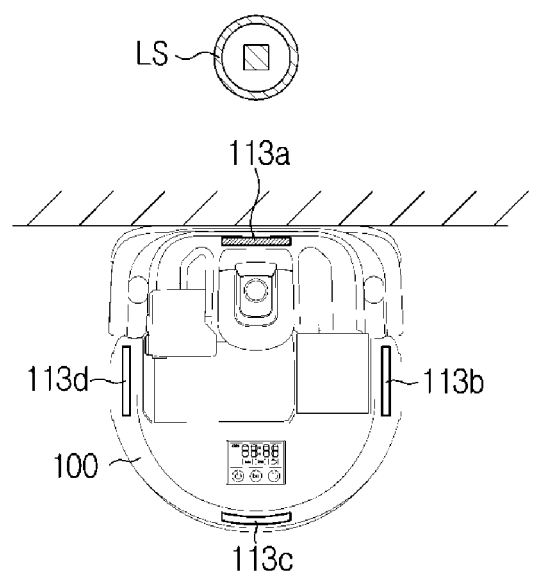
Figure 41C:
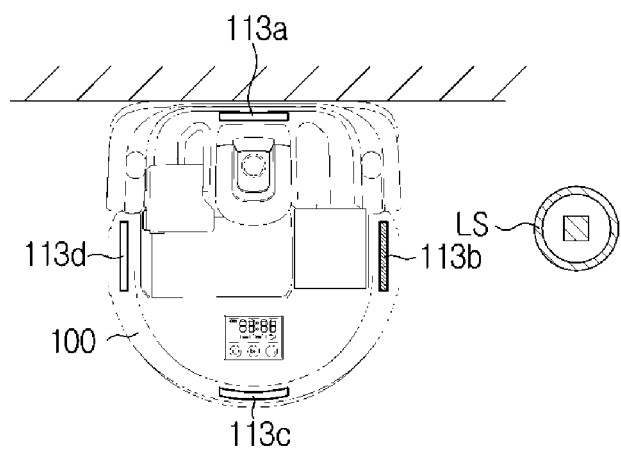
Figure 41D:
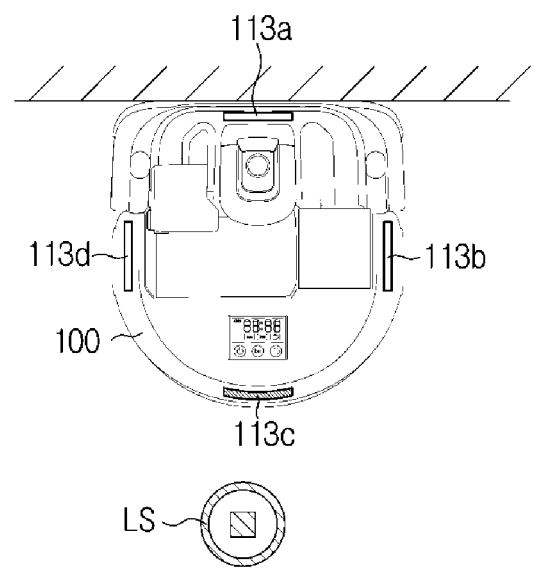
Figure 41E:
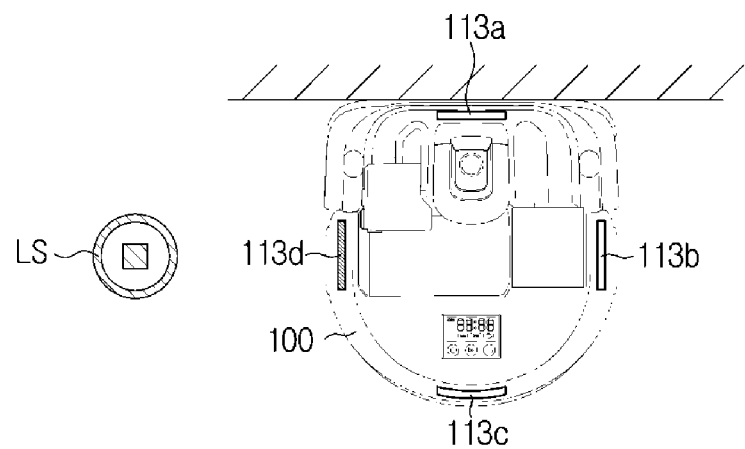

Specifically, when the light spot LS is determined to be positioned in front of the main body 101, the cleaning robot 100 may radiate the first display module 113*a* as illustrated in FIG. 41B. Also, when the light spot LS is determined to be positioned at the right of the main body 101, the cleaning robot 100 may radiate the second display module 113*b* as illustrated in FIG. 41C. Also, when the light spot LS is determined to be positioned at the rear of the main body 101, the cleaning robot 100 may radiate the third display module 113*c* as illustrated in FIG. 41D. Also, when the light spot LS is determined to be positioned at the left of the main body 101, the cleaning robot 100 may radiate the fourth display module 113*d* as illustrated in FIG. 41E.

In an example, the cleaning robot 100 may include a speaker (not shown) for displaying the light spot position information. Also, the cleaning robot 100 may aurally output the light spot position information through the speaker.

Specifically, the cleaning robot 100 may output a "first sound" through the speaker when the light spot LS is determined to be positioned in front of the main body 101, and the cleaning robot 100 may output a "second sound" through the speaker when the light spot LS is determined to be positioned at the right of the main body 101. Also, the cleaning robot 100 may output a "third sound" through the speaker when the light spot LS is determined to be positioned at the rear of the main body 101, and the cleaning robot 100 may output a "fourth sound" through the speaker when the light spot LS is determined to be positioned at the left of the main body 101.

Then, the cleaning robot 100 determines whether the reception of the drag command is stopped (operation 1940). Specifically, the cleaning robot 100 determines whether the infrared ray including the drag command is detected by the light receiving unit 180.

The reception of the drag command may be stopped due to various reasons.

For example, when the user stops the drag command, the cleaning robot 100 may not be able to receive the infrared ray including the drag command. The user may stop the drag command when the cleaning robot 100 has reached the position of the light spot LS. That is, the user may stop pressing the drag button 211*e* of the remote controller 200.

In an example, when the light spot LS deviates from the range in which the cleaning robot 100 may receive the infrared ray, the cleaning robot 100 may not be able to receive the infrared ray including the drag command. When the user rapidly moves the position indicated by the remote controller 200, the light spot LS deviates from the infrared ray reception range of the cleaning robot 100. Like this, when the light spot LS deviates from the infrared ray reception range of the cleaning robot 100, the cleaning robot 100 cannot receive the infrared ray including the drag command, and thus the reception of the drag command is stopped.

When the reception of the drag command is continued (NO to S1940), the cleaning robot 100 repeats the position detection of the light spot LS and the outputting the position information of the light spot LS.

When the reception of the drag command is stopped (YES to S1940), the cleaning robot 100 stops the outputting the position information of the light spot LS (operation 1950).

Also, the cleaning robot 100 may display a light spot undetected image showing that the position of the light spot LS is not detected on the display 113, or output a light spot undetected sound through the speaker.

When the drag command is received as mentioned above, the cleaning robot 100 may output the position information of the light spot LS. The user may determine the position commanded by the remote controller 200 based on the position information of the light spot LS output from the cleaning robot 100.

Hereinafter, an embodiment of a configuration of a cleaning robot system will be described with reference to FIG. 42.

FIG. 42 is a perspective view of a cleaning robot system according to an embodiment.

A cleaning robot system 2 outputs an infrared signal or an ultrasonic signal output from a remote controller 400, and a cleaning robot 300 receives the output infrared ray signal or ultrasonic wave signal to calculate a distance between the cleaning robot 300 and the remote controller 400 and a direction of the remote controller 400 from the cleaning robot 300. Also, the cleaning robot system 2 may detect a motion of the remote controller 400 to set a position of a designated area and move the cleaning robot 300 to the designated area.

Specifically, the cleaning robot system 2 may calculate the distance between the cleaning robot 300 and the remote controller 400 based on a difference of a time at which the infrared signal is received and a time at which the ultrasonic signal is received of the infrared signal and the ultrasonic signal simultaneously output from the remote controller 400 and a current temperature. Also, the cleaning robot system 2 may control the remote controller 400 to output a plurality of infrared signals that are different for each of predetermined distances, and may calculate the distance between the cleaning robot 300 and the remote controller 400 by receiving the output infrared rays and matching the infrared rays with predetermined distance data. Also, the cleaning robot system 2 may calculate the distance between the cleaning robot 300 and the remote controller 400 using an angle between the remote controller 400 and the ground at a predetermined height.

Figure 43:
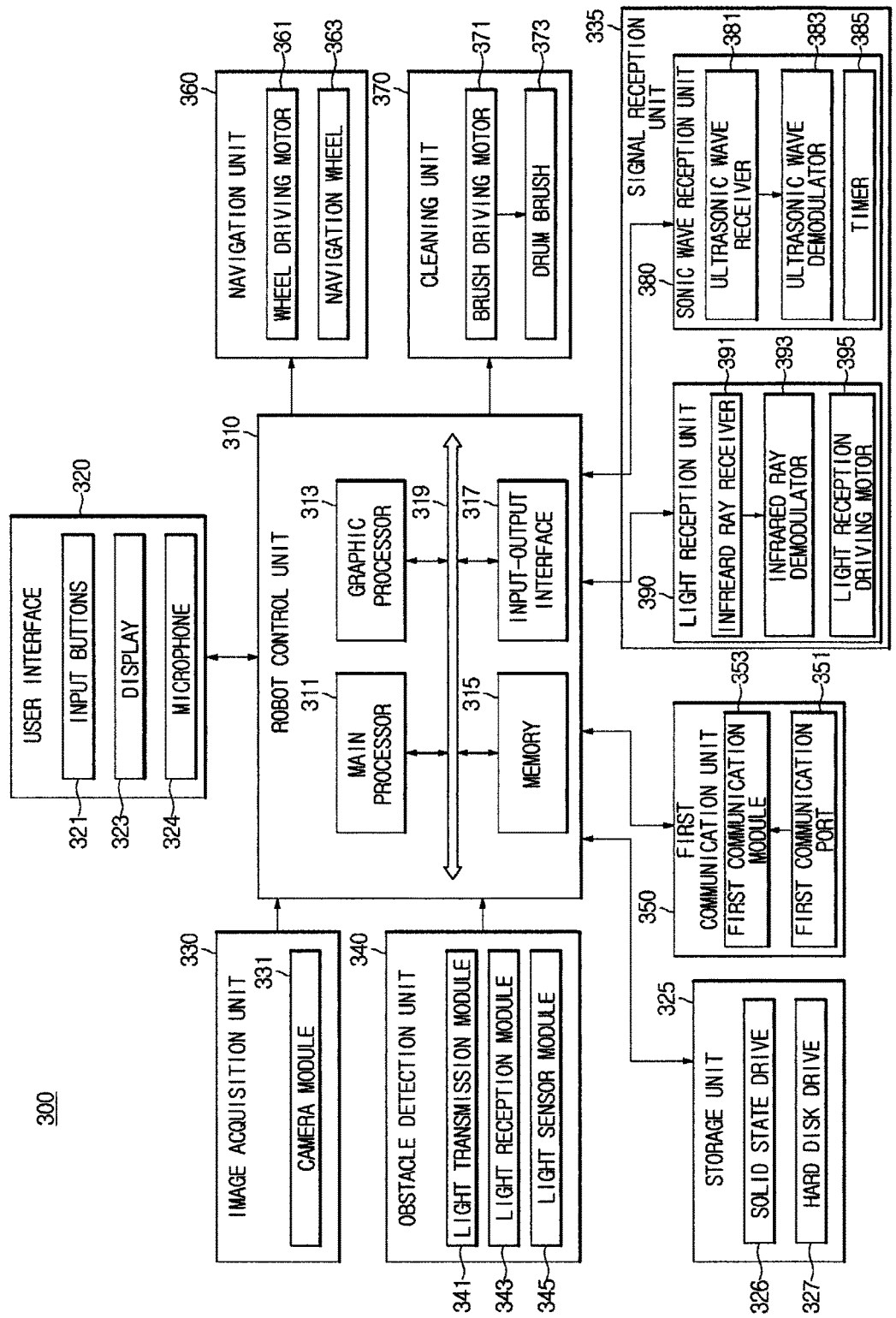
FIG. 43 is a block diagram of a cleaning robot according to an embodiment.

In addition, the cleaning robot system 2 may calculate the distance at which the remote controller 400 is located with respect to the cleaning robot 300 based on the intensity or the reception time of the ultrasonic signal detected by a plurality of sonic wave reception units 380 (refer to FIG. 43).

In addition, the cleaning robot system 2 may rotate a plurality of light reception units 390 until a particular light reception unit 390 of the plurality of light reception units 390 (refer to FIG. 43) receives the infrared signals output from the remote controller 400. That is, the cleaning robot system 2 may rotate the whole body of the cleaning robot 300 by a navigation unit 360 (refer to FIG. 43) of the cleaning robot 300 to rotate the plurality of light reception units 390 (refer to FIG. 43), and may fix a lower body by a light reception driving motor 395 (refer to FIG. 43) and rotate an upper body 303 (refer to FIG. 44) on which the plurality of light reception units 390 (refer to FIG. 43) are provided to rotate the plurality of light reception units 390 (refer to FIG. 43). Consequently, the cleaning robot system 2 may calculate the direction between the cleaning robot 300 and the remote controller 400.

In addition, the cleaning robot system 2 may detect a motion of the remote controller 400 at a time of indicating the cleaning robot 300 and a motion of the remote controller 400 at a time of indicating the designated area, set a position of an area to which the cleaning robot 300 will be moved based on the detected motions, and move the cleaning robot 300 to the set position.

In addition, the cleaning robot system 2 may include the cleaning robot 300 that performs cleaning while moving along the ground and receives infrared signals and ultrasonic signals to move to an area designated by a user U, and the remote controller 400 that outputs the infrared signals and the ultrasonic signals to the cleaning robot 300 and transmits detected motions to the cleaning robot 300.

The cleaning robot 300 will be described in detail with reference to FIGS. 43, 44, and 45. Also, the remote controller 400 will be described in detail with reference to FIGS. 46, 47, 48A, 48B, and 49.

Hereinafter, an embodiment of a configuration of a cleaning robot will be described with reference to FIGS. 43, 44, and 45.

Figure 44:
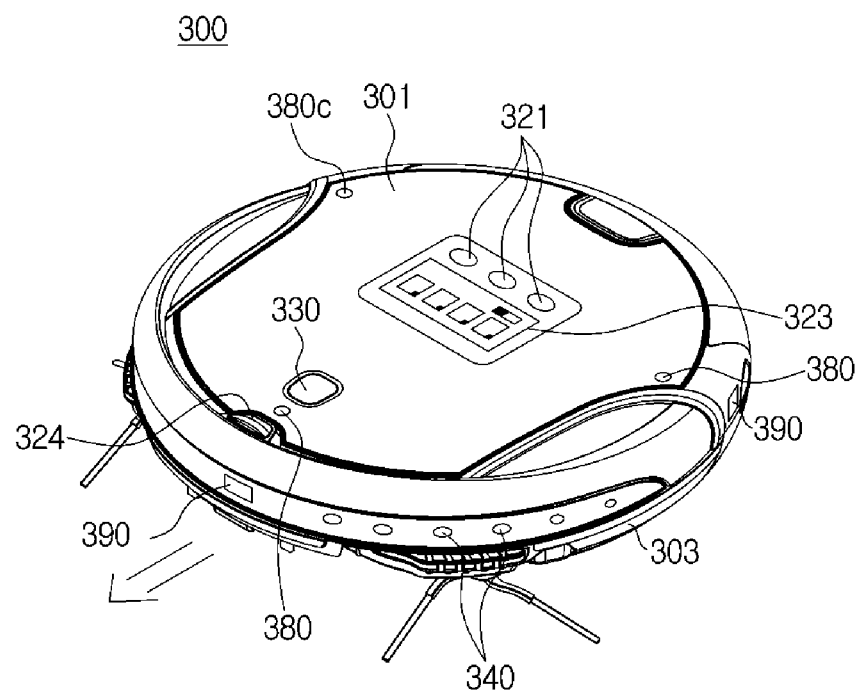
FIG. 44 is a perspective view of an upper portion of the cleaning robot according to an embodiment.
Figure 45:
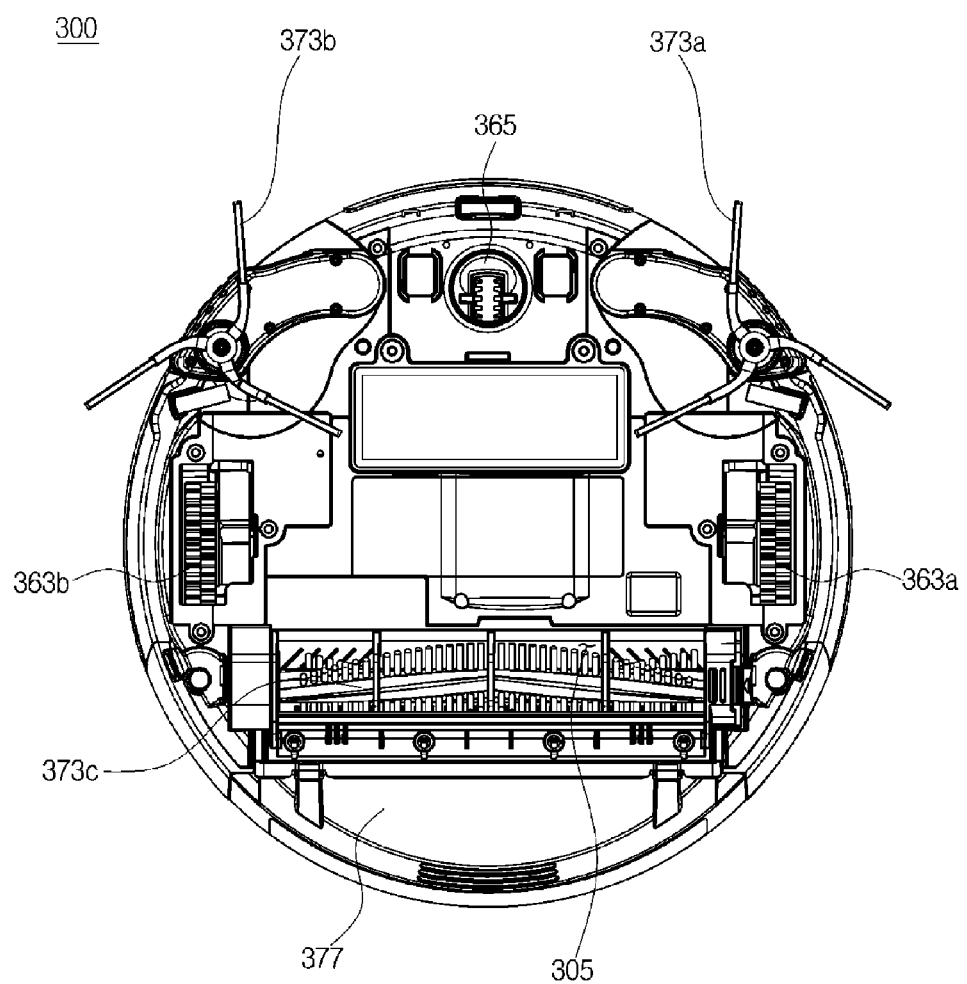
FIG. 45 is a perspective view of a lower portion of the cleaning robot according to an embodiment.

FIG. 43 is a block diagram of a cleaning robot according to an embodiment, FIG. 44 is a perspective view of an upper portion of the cleaning robot according to an embodiment, and FIG. 45 is a perspective view of a lower portion of the cleaning robot according to an embodiment.

Referring to FIGS. 43, 44, and 45, the cleaning robot 300 may be configured of a main body 301. Also, the main body 301 may have a circular form, and component parts for realizing a function of the cleaning robot 300 are provided at an inner portion and an outer portion of the main body 301. Also, the cleaning robot 300 may include the upper body 303 on which a signal reception unit 335 is provided and the lower body on which the navigation unit 360 is provided.

Specifically, the cleaning robot 300 may include a user interface 320 to interact with the user U, an image acquisition unit 330 to acquire an image around the cleaning robot 300, an obstacle detection unit 340 to detect an obstacle, a first communication unit 350 to receive data from the remote controller 400, the navigation unit 360 to move the cleaning robot 300, a cleaning unit 370 to clean a cleaning area, a storage unit 325 to store a program and various types of data, the signal reception unit 335 to receive the infrared signals and the ultrasonic signals output by the remote controller 400, and a robot control unit 310 to generally control an operation of the cleaning robot 300.

The user interface 320 may be provided at an upper surface of the upper body 303 of the cleaning robot 300, and may include input buttons 321 to receive a control command from the user U, a display 323 to display operation information of the cleaning robot 300, and a microphone 324 to recognize a voice command of the user U.

The input buttons 321 may include a power button to turn on or turn off the cleaning robot 300, an operation/stop button to operate or stop the cleaning robot 300, and a return button to return the cleaning robot 300 to a charging station.

In addition, each of the buttons included in the input buttons 321 may employ a push switch that detects pressing of the user U, a membrane switch, or a touch switch that detects a contact of a part of a body of the user U.

The display 323 displays information of the cleaning robot 300 corresponding to the control command input by the user U. For example, the display 323 may display an operation state, a power state, a cleaning mode selected by the user U, whether the cleaning robot 300 is returned to the charging station, etc. of the cleaning robot 300.

In addition, the display 323 may employ a light emitting diode (LED) and an organic light emitting diode (OLED) which are capable of self-radiation, or a liquid crystal display having a separate emitting source.

The microphone 324 outputs a voice signal of the user U to the robot control unit 310 by converting the voice signal to an electrical signal. Also, the microphone 324 may include a processor that changes a size of the acquired voice signal of the user U to a level that may be recognized by the robot control unit 310.

Although not illustrated in the drawings, according to an embodiment, the user interface 320 may include a touch screen panel (TSP) to receive the control command from the user U and display the operation information corresponding to the received control command. The TSP may include a display to display the operation information and control commands that may be input by the user U, a touch panel to detect coordinates at which a part of the body of the user U has come in contact, and a touch screen controller to determine the control command input by the user U based on the contact coordinates detected by the touch panel.

The image acquisition unit 330 may include a camera module 331 to acquire the image around the cleaning robot 300.

The camera module 331 may be provided at an upper surface of a sub-body included in the cleaning robot 300, and may include a lens to focus light emitted from the top of the cleaning robot 300, and an image sensor to convert the light into an electrical signal. The image sensor may employ a complementary metal oxide semiconductor (CMOS) sensor or a charge coupled device (CCD) sensor.

The camera module 331 converts the image around the cleaning robot 300 into the electrical signal that may be processed by the robot control unit 310, and transmits the electrical signal corresponding to the top image to the robot control unit 310. The image provided by the image acquisition unit 330 may be used in detecting a position of the cleaning robot 300 by the robot control unit 310.

The obstacle detection unit 340 detects an obstacle that obstructs a movement of the cleaning robot 300.

Here, the obstacle refers to everything that protrudes from the floor of the cleaning area and obstructs the movement of the cleaning robot 300, and corresponds not only to furniture such as a table, a sofa, etc. but also to wall surfaces that compartmentalize the cleaning area.

The obstacle detection unit 340 may include a light transmission module 341 to transmit light toward the front of the cleaning robot 300, a light reception module 343 to receive light reflected from an obstacle, and the like, and a light sensor module 345 to transmit light toward a side surface of the cleaning robot 300 and receive the light reflected from the obstacle.

The cleaning robot 300 according to an embodiment uses an infrared ray, and the like, to detect the obstacle, but embodiments are not limited thereto, and the cleaning robot 300 may also use an ultrasonic wave or an electric wave.

The first communication unit 350 receives data from the remote controller 400 to be used in the control of the cleaning robot 300 of the robot control unit 310. Also, the first communication unit 350 may include a first communication module 353 and a first communication port 351.

The first communication module 353 checks whether a session has been completed with a second communication module 451 (refer to FIG. 46) and receives a communication signal to receive data on a motion. Specifically, the first communication module 353 includes an antenna system, an RF transceiver, one or more amplifiers, a tuner, one or more oscillators, a digital signal processor, a CODEC chip set, a subscriber identity module (SIM) card, a memory, and the like, but not limited thereto, and may include a well-known circuit for performing the functions.

In addition, the first communication module 353 may communicate with the internet referred to as a World Wide Web (WWW), an intranet and a network and/or, a cellular phone network, a wireless network such as a wireless LAN and/or a metropolitan area network (MAN), as well as the second communication module 451 (refer to FIG. 46) and a network by a wireless communication.

The wireless communication may include protocols for a Global System for Mobile Communication (GSM), an Enhanced Data GSM Environment (EDGE), a wideband code division multiple access (WCDMA), a code division multiple access (CDMA), a time division multiple access (TDMA), a Bluetooth, a Bluetooth Low Energy (BLE), a Near Field Communication (NFC), Zigbee, Wireless Fidelity (Wi-Fi) (e.g. IEEE802.11a, IEEE802.11b, IEEE802.11g and/or IEEE802.11n), voice over Internet Protocol (VoIP), Wi-MAX, Wi-Fi Direct, (WFD), an ultra-wideband (UWB), an infrared Data Association (IrDA), an e-mail instant messaging and/or a short message service (SMS) or other different appropriate communication protocols. Various wireless communication methods other than the above may be used as an example of the wireless communication.

In addition, the first communication module 353 may use not just one of the above-mentioned wireless communication methods, but may use at least one of the above-mentioned wireless communication methods.

The first communication port 351 provides a path in which the second communication module 451 (refer to FIG. 46) transmits data to be transmitted to the first communication module 353.

The navigation unit 360 is a configuration that moves the cleaning robot 300, and the navigation unit 360 may include navigation wheels 363, wheel driving motors 361, and a castor wheel 365.

The navigation wheels 363 may be provided at left and right edges of a bottom surface of the main body 301, and may include a left navigation wheel 363b provided at a left side of the cleaning robot 300 and a right navigation wheel 363a provided at a right side of the cleaning robot 300 with respect to the front of the cleaning robot 300.

In addition, the navigation wheels 363 receive a rotary force from the wheel driving motor 361 to move the cleaning robot 300.

The wheel driving motors 361 generates the rotary force to rotate the navigation wheels 363, and may include a left driving motor to rotate the left navigation wheel 363b and a right driving motor to rotate the right navigation wheel 363a.

Each of the left driving motor and the right driving motor may receive a driving control signal from the robot control unit 310 to independently operate. Like this, the left navigation wheel 363b and the right navigation wheel 363a may rotate independently from each other by the left driving motor and the right driving motor which independently operate.

In addition, because the left navigation wheel 363b and the right navigation wheel 363a may independently rotate, the cleaning robot 300 is capable of various navigations such as a forward navigation, a backward navigation, a rotary navigation, and a same spot rotation.

For example, the cleaning robot 300 may straightly navigate forward (move forward) when both of the left and right navigation wheels 363a and 363b rotate along a first direction, and the main body 301 may straightly navigate backward (move backward) when both of the left and right navigation wheels 363a and 363b rotate along a second direction.

In addition, the cleaning robot 300 may rotate to the left or the right when both of the left and right navigation wheels 363a and 363b rotate along the same direction but rotate at different speeds, and the cleaning robot 300 may rotate clockwise or counterclockwise at the same spot when the left and right navigation wheels 363a and 363b rotate along different directions.

The castor wheel 365 may be installed at the bottom surface of the main body 301 such that a rotation shaft of the castor wheel 365 rotate along the moving direction of the cleaning robot 300. Like this, the castor wheel 365 having the rotation shaft thereof rotating along the moving direction of the cleaning robot 300 does not hinder the navigation of the cleaning robot 300 and enables the cleaning robot 300 to navigate while maintaining a stable posture.

In addition, other than the above, the navigation unit 360 may further include a motor driving circuit to supply a driving current to the wheel driving motors 361 in accordance with a control signal of the robot control unit 310, a power transmission module to transmit the rotary force of the wheel driving motors 361 to the navigation wheels 363, and a rotation detection sensor to detect rotational displacements or rotation speeds of the wheel driving motors 361 or the navigation wheels 363.

The cleaning unit 370 includes brushes 373 to scatter and guide dust of the cleaning area, a brush driving motor 371 to rotate the brushes 373, and a dust case 377 to suction and store the dust scattered by the brushes 373.

Specifically, the brushes 373 include a main brush 373c to scatter the dust of the cleaning area, and a pair of side brushes 373a and 373b to guide the dust of the cleaning area toward the main brush 373c.

The main brush 373c is provided at a dust inlet 305 formed at the bottom surface of the main body to scatter the dust of the cleaning area to an inner portion of the dust inlet 305 while rotating about the rotation shaft in a direction perpendicular to a direction along which the main body navigates.

The side brushes 373a and 373b are installed at front left and right edges of the bottom surface of the main body 301. That is, the brushes 373a and 373b are installed in front of the pair of navigation wheels 363. The side brushes 373a and 373b as above guide the dust of the cleaning area that cannot be cleaned by the main brush 373c toward the main brush 373c while rotating about the rotation shaft in a direction perpendicular to the bottom surface of the main body 301. Also, the side brushes 373a and 373b may not only rotate at the same spot, but may also expand the area cleaned by the cleaning robot 300 by being installed to be capable of protruding outward.

The brush driving motor 371 is provided adjacent to the brushes 373 to rotate the brushes 373 in accordance with a cleaning control signal of the robot control unit 310.

Although not illustrated in the drawings, the cleaning unit 370 may further include a motor driving circuit to supply a driving current to the brush driving motor 371 in accordance with a control signal of the robot control unit 310, and a power transmission module to transmit the rotary force of the brush driving motor 371 to the brushes 373.

The storage unit 325 may store a control program and control data for controlling the cleaning robot 300, and cleaning area map information acquired by the cleaning robot 300 while navigating.

The storage unit 325 may operate as an auxiliary memory device to assist a memory 315 included in the robot control unit 310 to be described below, and may be formed of a nonvolatile storage medium in which the stored data is not annihilated even when the power of the cleaning robot 300 is blocked.

The storage unit 325 as above may include a solid state drive 326 to store data in a semiconductor device and a hard disk drive 327 to store data in a magnetic disk.

In addition, the storage unit 325 may include a nonvolatile memory such as a ROM, a high speed RAM, a magnetic disk storage device, and a flash memory device or other non-volatile semiconductor memory devices.

For example, a secure digital (SD) memory card, a secure digital high capacity (SDHC) memory card, a mini SD memory card, a mini SDHC memory card, a Trans Flash (TF) memory card, a micro SD memory card, a micro SDHC memory card, a memory stick, a compact flash (CF), a multi-media card (MMC), an MMC micro, an eXtreme Digital (XD) card, etc. may be used as the semiconductor memory device in the storage unit 325.

In addition, the storage unit 325 may also include a network attached storage device that is accessed through the network.

The signal reception unit 335 receives the infrared signal or the ultrasonic signal output from the remote controller 400.

Specifically, the signal reception unit 335 may include the light reception unit 390 to receive the infrared signal, and the sonic wave reception unit 380 to receive the ultrasonic signal, which are provided in a plurality along an outer circumferential side of the main body 301.

The sonic wave reception unit 380 may be provided in the plurality at the outer circumferential side of the upper surface of the main boy 301 to detect the intensity or the reception time of the infrared signal output from the remote controller 400.

Specifically, the sonic wave reception unit 380 may include a plurality of ultrasonic wave receivers 381 to receive the ultrasonic signal output from the remote controller 400, an ultrasonic wave demodulator 383 to demodulate the ultrasonic signal received by the plurality of ultrasonic wave receivers 381, and a timer 385 to measure a time at which the ultrasonic wave is received.

The ultrasonic wave receivers 381 may be provided along the outer circumferential side at the upper surface of the cleaning robot 300 to convert a mechanical vibration of the ultrasonic signal transmitted from the remote controller 400 to an electrical signal.

The ultrasonic wave demodulator 383 demodulates the electrical signal converted by the ultrasonic wave receivers 381. Specifically, the ultrasonic wave demodulator 383 may digitalize and numeralize a value of the electrical signal in accordance with the intensity of the received ultrasonic signal.

The timer 385 measures the time at which the ultrasonic signal is received to provide the time to the robot control unit 310. Specifically, the timer 385 may set the time at which the infrared signal is received as a start time and set a time at which the ultrasonic signal is received as an end time and measure a time from the start time to the end time to use the time in calculating the distance from the remote controller 400. Also, the timer 385 may measure the times at which the plurality of ultrasonic wave receivers 381 received the ultrasonic signal to use the times in calculating the direction of the remote controller 400.

The light reception unit 390 may include a plurality of infrared ray receivers 391 to receive the infrared ray transmitted by the remote controller 400, an infrared ray demodulator 393 to demodulate the infrared ray received by the plurality of infrared ray receivers 391 in order to acquire the control command of the user U, and a light reception driving motor 395 to rotate the light reception unit 390 along a circumferential direction.

The plurality of infrared ray receivers 391 may be provided along the outer circumferential surface of the cleaning robot 300 to receive the infrared ray propagated from all directions. Specifically, the cleaning robot 300 may receive the infrared ray transmitted by being output from the remote controller 400 and reflected from the ground through the plurality of infrared ray receivers 391.

The infrared ray demodulator 393 demodulates the infrared ray received by the infrared ray receivers 391. An infrared ray modulator 495 included in the remote controller 400 modulates the infrared ray in accordance with the control command of the user U, and the infrared ray demodulator 393 of the cleaning robot 300 demodulates the infrared ray modulated by the remote controller 400 and acquires the control command of the user U.

In addition, the infrared ray demodulator 393 provides the acquired control command to the robot control unit 310.

The robot control unit 310 generally controls the operation of the cleaning robot 300.

Specifically, the robot control unit 310 may include an input-output interface 317 to mediate a data entry between various device components included in the cleaning robot 300 and the robot control unit 310, the memory 315 to store the program and the data, a graphic processor 313 to perform image processing, a main processor 311 to perform operations in accordance with the program and the data stored in the memory 315, and a system bus 319 to become a passage of data transmission and reception between the input-output interface 317, the memory 315, the graphic processor 313, and the main processor 311.

The input-output interface 317 receives the image received from the image acquisition unit 330, the obstacle detection result detected by the obstacle detection unit 340, and the contact detection result detected by the contact detection unit, and transmits the above via the system bus 319 to the main processor 311, the graphic processor 313, and the memory 315.

In addition, the input-output interface 317 may transmit various types of control signals output by the main processor 311 to the navigation unit 360 or the cleaning unit 370.

The memory 315 may load the control program and the control data for controlling the operation of the cleaning robot 300 from the storage unit 325 and store the same, or temporarily store the image acquired by the image acquisition unit 330 or the obstacle detection result detected by the obstacle detection unit 340.

The memory 315 may include the volatile memory such as an S-RAM and a D-RAM. However, embodiments are not limited thereto, and the memory 315 may include the nonvolatile memory such as the flash memory, the read-only memory, the erasable programmable read only memory (EPROM), and the electrically erasable programmable read only memory (EEPROM) according to circumstances.

The graphic processor 313 may convert the image acquired by the image acquisition unit 330 into a format capable of being stored in the memory 315 or the storage unit 325, or change the resolution or the size of the image acquired by the image acquisition unit 330.

In addition, the graphic processor 313 may convert a reflective light image acquired by the obstacle detection unit 340 into a format capable of being processed by the main processor 311.

The main processor 311 may process the detection results of the image acquisition unit 330, the obstacle detection unit 340, and the contact detection unit, or perform operations for controlling the navigation unit 360 and the cleaning unit 370 in accordance with the program and the data stored in the memory 315.

For example, the main processor 311 may calculate the position of the cleaning robot 300 based on the image acquired by the image acquisition unit 330, or calculate a direction, a distance, and a size of the obstacle based on the image acquired by the obstacle detection unit 340.

In addition, the main processor 311 may perform an operation for determining whether to avoid the obstacle or come in contact with the obstacle in accordance with the direction, the distance, and the size of the obstacle. The main processor 311 may calculate a navigation path to avoid the obstacle when determined to avoid the obstacle, and the main processor 311 may calculate a navigation path to align the obstacle with the cleaning robot 300 when determined to come in contact with the obstacle.

In addition, the main processor 311 may generate navigation control data to be provided to the navigation unit 360 such that the cleaning robot 300 moves along the calculated navigation path.

The robot control unit 310 as above may control the navigation unit 360 such that the cleaning robot 300 navigates a cleaning floor, and control the cleaning unit 370 such that the cleaning robot 300 cleans the cleaning floor while navigating.

In addition, the robot control unit 310 may detect the position and the size of the obstacle based on the obstacle detection signal of the obstacle detection unit 340.

In addition, the robot control unit 310 may calculate the distance from the remote controller 400 in accordance with the difference between the times at which the infrared signal and the ultrasonic signal are received, types of the received infrared signal, or the angle between the ground and the remote controller 400. Also, the robot control unit 310 may calculate the direction of the remote controller 400 based on the intensity or the reception time of the received ultrasonic signal, and calculate the direction of the remote controller 400 in accordance with the type of the light reception unit 390 that has received the infrared ray signal. Also, the robot control unit 310 may calculate coordinates of the point at which the remote controller 400 is located with the position of the cleaning robot 300 as an origin based on the calculated distance from the remote controller 400 and the direction of the remote controller 400.

In addition, the robot control unit 310 may receive the motion of the remote controller 400, and set coordinates of a designated ending area based on a motion value of a time at which the remote controller 400 points to a designated starting area and a motion value of a time at which the remote controller 400 points to the designated ending area. In addition, the robot control unit 310 may control the navigation unit 360 to move to the set coordinates.

Hereinafter, an embodiment of a configuration of a remote controller will be described with reference to FIGS. 46, 47, 48A, 48B, and 49.

Figure 46:
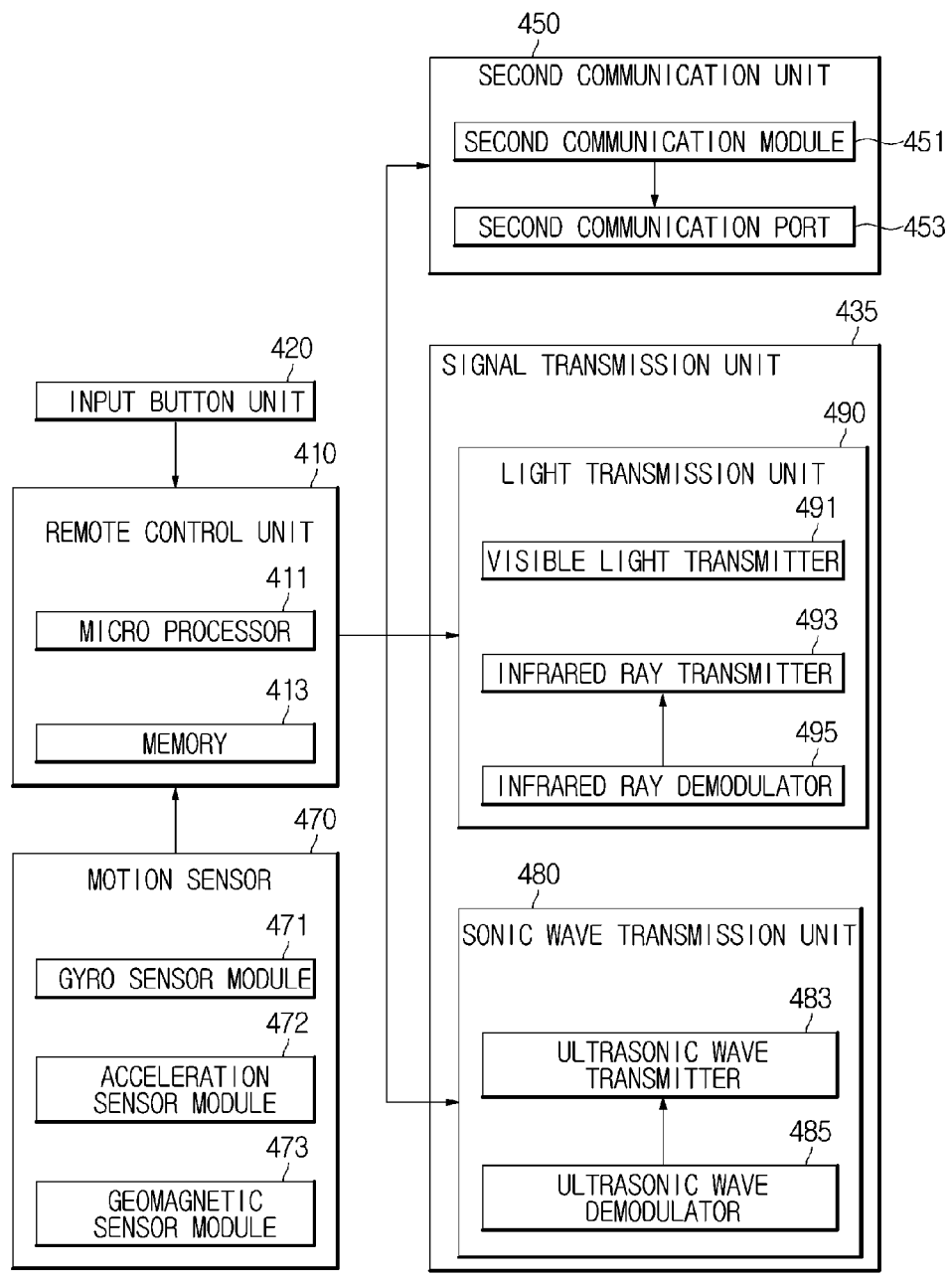
FIG. 46 is a block diagram of a remote controller according to an embodiment.
Figure 47:
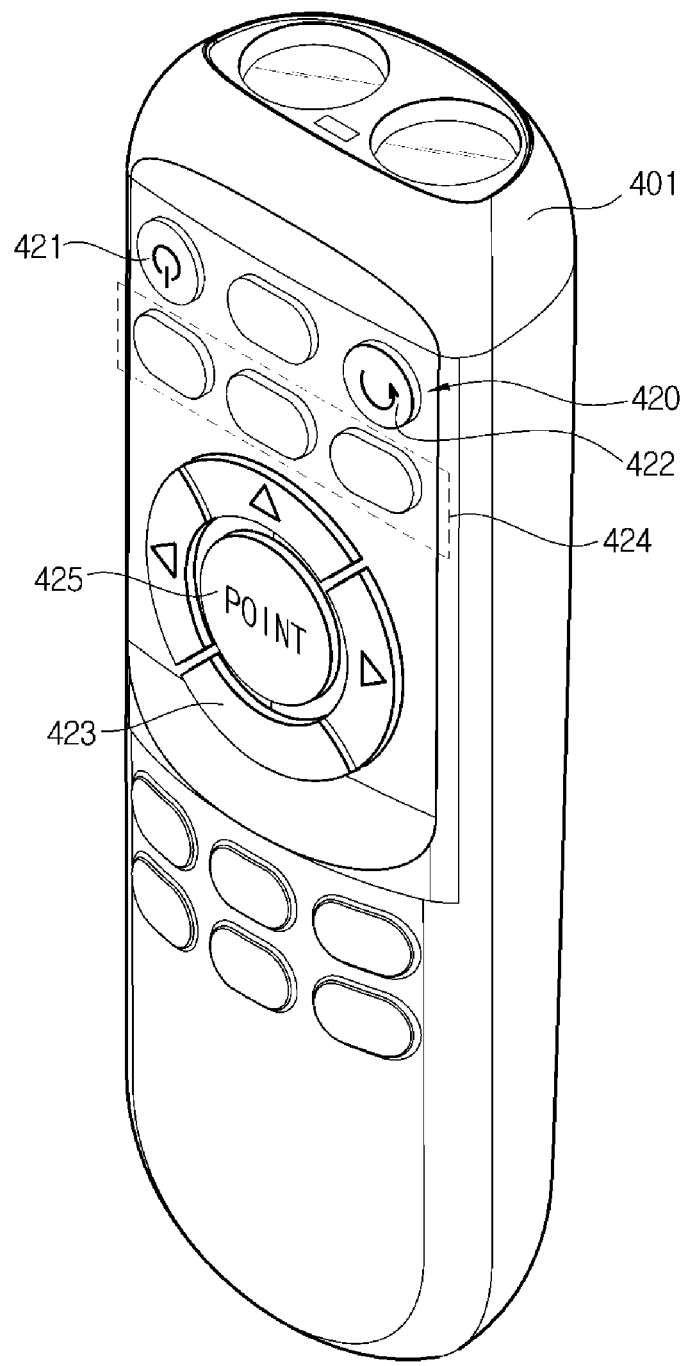
FIG. 47 is a perspective view of the remote controller according to an embodiment.

FIG. 46 is a block diagram of a remote controller according to an embodiment, and FIG. 47 is a perspective view of the remote controller according to an embodiment.

The remote controller 400 includes an input button unit 420 to receive the control command from the user U, a signal transmission unit 435 to output a signal of a sonic wave form or a signal of a light source form, a motion sensor 470 to detect a current motion of the remote controller 400, a second communication unit 450 to transmit data of the remote controller 400 to the cleaning robot 300, and a remote control unit 410 to control a light transmission unit 490 such that the visible light and the infrared ray are transmitted in accordance with the control command of the user U.

The input button unit 420 may receive the control command from the user U, and be provided at an upper surface of a main body 401 that forms an exterior of the remote controller 400.

The input button unit 420 may include a power button 421 to turn on or turn off the cleaning robot 300, a return button 422 to return the cleaning robot 300 to a charging station for charging the power, an operation/stop button 423 to operate or stop the cleaning robot 300, and a plurality of cleaning mode buttons 424 to select a cleaning mode of the cleaning robot 300. Particularly, the input button unit 420 includes a point button 425 to input a start point and an end point of a designated area commanded by the user U.

Each of the buttons included in the input button unit 420 may employ a push switch to detect pressing of the user U, a membrane switch, or a touch switch to detect a contact of a part of the body of the user U.

In addition, although not illustrated in FIG. 47, according to an embodiment, the remote controller 400 may further include a display to display operation information of the cleaning robot 300 in accordance with the control command input by the user U or a touch screen to receive the control command from the user U and display the operation information of the cleaning robot 300 in accordance with the input control command.

The signal transmission unit 435 outputs and transmits a signal of a sonic wave form or a signal of a light source form.

Specifically, the signal transmission unit 435 may output an infrared signal or an ultrasonic wave based on a control signal of the remote control unit 410 to transmit the infrared signal or the ultrasonic wave toward an area to be indicated by the user U. Also, the signal transmission unit 435 may include a sonic wave transmission unit 480 to output the ultrasonic wave and the light transmission unit 490 to output the infrared signal and the visible light.

The sonic wave transmission unit 480 may convert an electrical signal into a mechanical vibration in accordance with the control signal of the remote control unit 410 to generate the ultrasonic wave, output the ultrasonic wave, and transmit the ultrasonic wave to a particular area. Also, the sonic wave transmission unit 480 may include an ultrasonic wave modulator 485 and an ultrasonic wave transmitter 483.

The ultrasonic wave modulator 485 may receive the control command input by the user U or the control signal of the remote control unit 410, convert the control command or the control signal, and supply the control command or the control signal to the ultrasonic wave transmitter 483. Also, the ultrasonic wave modulator 485 may supply driving power corresponding to a frequency of the ultrasonic wave and adjust the magnitude of the driving power.

The ultrasonic wave transmitter 483 may receive the driving power supplied by the ultrasonic wave modulator 485, convert the electrical energy to mechanical energy, and generate the ultrasonic wave. Also, the ultrasonic wave transmitter 483 may measure a temperature when the ultrasonic wave is output and transmitted to transmit information of the temperature to the robot control unit 310 via the first communication unit 350 and the second communication unit 450.

The light transmission unit 490 modulates the infrared ray in accordance with the control command input by the user U, and transmits the modulated infrared ray. Also, the light transmission unit 490 may output and transmit infrared signals that are different for each predetermined distance. For example, the light transmission unit 490 may transmit a first infrared signal and a second infrared signal in a predetermined order in accordance with the control command.

Also, the light transmission unit 490 transmits the visible light to display the position indicated by the remote controller 400. The user U may use the remote controller 400 to command the position to which the cleaning robot 300 is to be moved, and the remote controller 400 transmits the visible light toward the position commanded by the user U.

The light transmission unit 490 may include a visible light transmitter 491 to transmit the visible light that may be recognized by the user U, an infrared ray transmitter 493 to transmit the infrared ray that may be recognized by the cleaning robot 300, and the infrared ray modulator 495 to modulate the infrared ray that will be transmitted by the infrared ray transmitter 493.

The infrared ray transmitted by the light transmission unit 490 is modulated by the control command input by the user U. For example, the light transmission unit 490 may transmit a pulse type infrared ray with a modulated pulse width in accordance with the control command input by the user U.

The motion sensor 470 detects a direction of the designated area with respect to the remote controller 400 and transmits the direction to the remote control unit 410.

Specifically, the motion sensor 470 may detect the motion of the remote controller 400 when the user U designates the designated area. That is, the motion sensor 470 may detect the motion of the remote controller 400 by measuring a yaw that is left and right directions of the remote controller 400, a roll of a curve with respect to an axis that passes through the remote controller 400, and a pitch which is perpendicular to the yaw value and is upper and lower directions of the remote controller 400. Also, the motion sensor 470 may measure the yaw, roll, and pitch values to measure the distance between the cleaning robot 300 and the remote controller 400 at the predetermined height.

In addition, the motion sensor 470 may include a gyro sensor module 471 to detect a rotation angle of the remote controller 400, an acceleration sensor module 472 to detect the displacement (moving distance and direction) of the remote controller 400, and a geomagnetic sensor module 473 to detect a direction of a magnetic field of the earth.

Also, the motion sensor 470 may be a 9-axis motion sensor (AHRS) or a 6-axis motion sensor (ARS). In this case, the 6-axis motion sensor may include the gyro sensor module 471 and the acceleration sensor module 472, and obtain reliability as the 9-axis motion sensor by resetting the yaw value as a predetermined time interval as 0. Conversely, the 9-axis motion sensor may include the gyro sensor module 471, the acceleration sensor module 472, and the geomagnetic sensor module 473.

Also, the motion sensor 470 may measure the yaw, roll, and pitch values when the user U points to the designated starting area by the remote controller 400, and may measure the yaw, roll, and pitch values when the user U points to the designated ending area by the remote controller 400.

The second communication unit 450 transmits the data generated in the remote controller 400 to the cleaning robot 300.

Specifically, the second communication unit 450 may transmit the temperature of the time at which the detected ultrasonic wave is output from the light transmission unit 490 and the yaw, roll, and pitch values detected by the motion sensor 470 to the first communication unit 350 of the cleaning robot 300. Also, the second communication unit 450 may transmit the distance between the cleaning robot 300 and the remote controller 400 calculated in the motion sensor 470 or the remote control unit 410 to the first communication unit 350 of the cleaning robot 300. Also, the second communication unit 450 may include the second communication module 451 and a second communication port 453.

The second communication module 451 and the second communication port 453 may be the same as or different from the above-mentioned first communication module 353 and first communication port 351.

The remote control unit 410 generally controls the operation of the remote controller 400.

Specifically, the remote control unit 410 controls the light transmission unit 490 to transmit the modulated infrared ray in accordance with the control command input by the user U.

For example, the remote control unit 410 may control the light transmission unit 490 to transmit the modulated infrared ray in accordance with the visible light and a designation area input command when the user U presses a pointing button, and the remote control unit 410 may control the light transmission unit 490 to transmit the modulated infrared ray in accordance with the operation/stop command when the user U inputs the operation/stop command.

In addition, the remote control unit 410 may calculate the distance between the cleaning robot 300 and the remote controller 400 using the angle between the ground and the remote controller 400 when the remote controller 400 designates the cleaning area while maintaining the predetermined height. For example, the predetermined height of the remote controller 400 may be assumed as a particular height between 1 [m]-1.5 [m] statistically, and a trigonometric function may be applied to the angle between the ground and the remote controller 400 to calculate the distance between the cleaning robot 300 and the remote controller 400.

The remote control unit 410 as above may include a memory 413 to store a control program and control data for controlling the operation of the remote controller 400, and a microprocessor 411 to perform operations in accordance with the control program and the control data stored in the memory 413.

The memory 413 may include the nonvolatile memory such as the flash memory, the erasable programmable read only memory (EPROM), and the electrically erasable programmable read only memory (EEPROM) that are capable of semi-permanently storing the control program and the control data, and the volatile memory such as the S-RAM and the D-RAM which temporarily stores the control program and the control data.

The microprocessor 411 performs the operations in accordance with the control program and the control data stored in the memory 413.

For example, the microprocessor 411 may process the electrical signal received from the input button unit 420, and output the control signal to the light transmission unit 490 in accordance with a result of the processing.

Figure 48A:
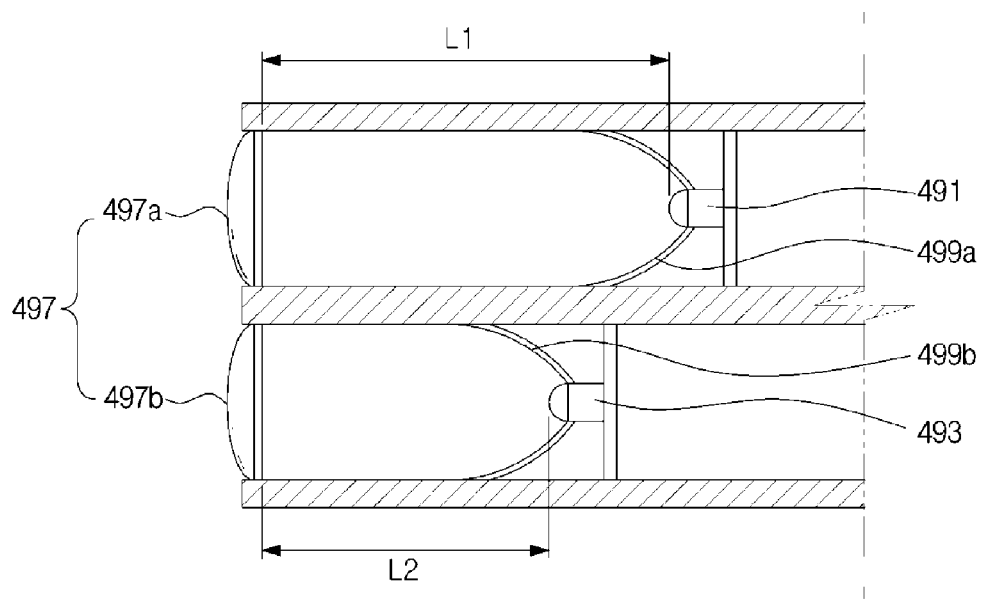
FIGS. 48A and 48B illustrate a light transmission unit included in the remote controller according to an embodiment.
Figure 48B:
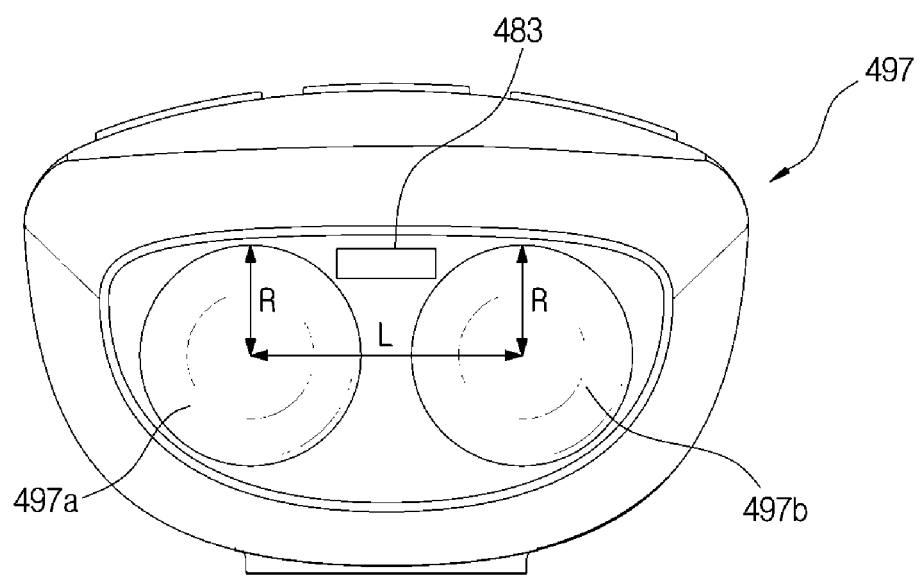
Figure 49:
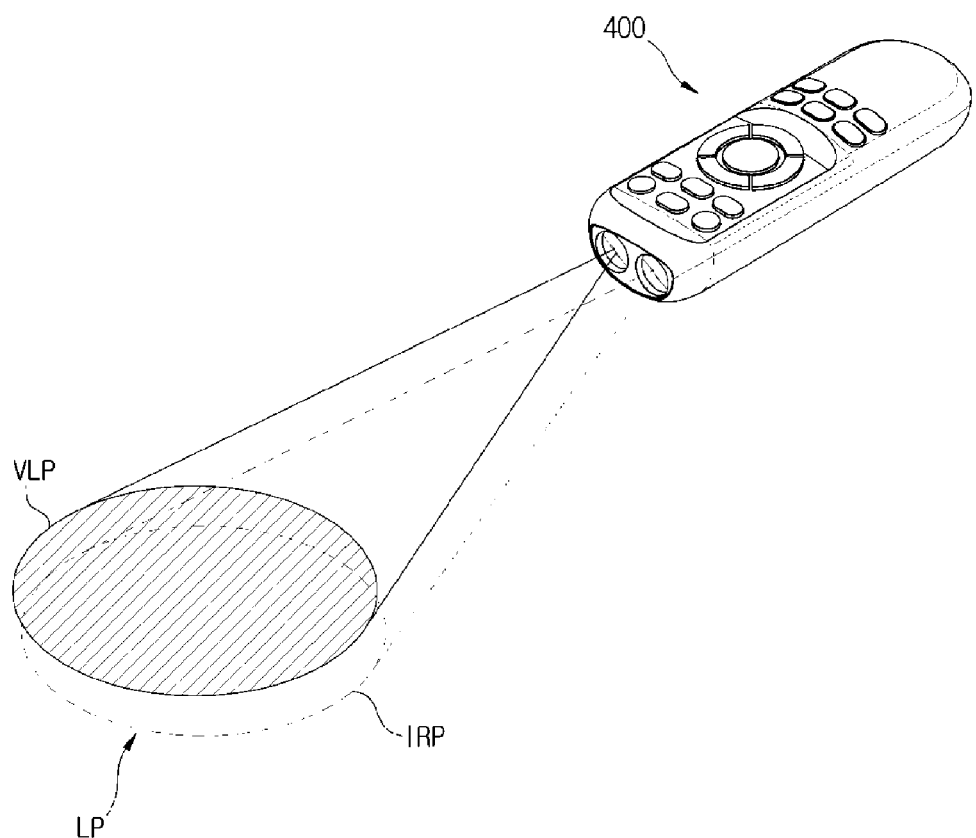
FIG. 49 is a conceptual view in which the remote controller according to an embodiment points to a designated area through the light transmission unit.

FIGS. 48A and 48B illustrate a light transmission unit included in the remote controller according to an embodiment, and FIG. 49 is a conceptual view in which the remote controller according to an embodiment points to a designated area through the light transmission unit.

The light transmission unit 490 may further include light collecting plates 499a and 499b and a lens module 497 in addition to the visible light transmitter 491, the infrared ray transmitter 493, and the infrared ray modulator 495 that have been described above.

The visible light transmitter 491 transmits the visible light in accordance with the control signal output by the remote control unit 410. The visible light transmitter 491 as above may employ a visible light LED or a visible light laser diode which transmit the visible light.

The infrared ray transmitter 493 transmits the modulated infrared ray in accordance with a modulation signal output by the infrared ray modulator 495. The infrared ray transmitter 493 as above may employ an infrared ray LED or an infrared ray laser diode which transmit the infrared ray.

The infrared ray modulator 495 outputs the modulation signal for modulating the infrared ray in accordance with the control command input by the user U.

Specifically, the infrared ray modulator 495 may generate a pulse width modulation signal for modulating the pulse width of the infrared ray in accordance with the control command input by the user U.

The infrared ray transmitter 493 may output a first infrared pulse having a first pulse width to transmit data "1", and here, the infrared ray modulator 495 may transmit the first modulation signal to the infrared ray transmitter 493 such that the first infrared pulse is output.

In addition, the infrared ray transmitter 493 may output a second infrared pulse having a second pulse width to transmit data "0", and here, the infrared ray modulator 495 may transmit the second modulation signal to the infrared ray transmitter 493 such that the second infrared pulse is output.

For example, when a signal corresponding to the control command is "0100", the infrared ray modulator 495 may output in order of the second modulation signal, the first modulation signal, the second modulation signal, and the second modulation signal.

In addition, the infrared ray modulator 495 may modulate different signals for each propagation distance such that different infrared signals are received for each predetermined distance, and output the signals in order. This will be described in detail with reference to FIGS. 53, 54, and 55 below.

The modulation of the infrared ray is not limited to the pulse width modulation, and the cleaning robot 300 may also modulate the intensity of the infrared ray or modulate the frequency of the infrared ray.

The light collecting plates 499a and 499b may include a first light collecting plate 499a that reflects the visible light such that the visible light transmitted by the visible light transmitter 491 is focused, and a second light collecting plate 499b that reflects the infrared ray such that the infrared ray transmitted by the infrared ray transmitter 493 is focused.

The light collecting plates 499a and 499b such as above may be formed in conical shapes with convex inclined surfaces such that cross-sections are formed in parabolic shapes, and may be formed of metal materials with superior efficiency of reflecting the visible light and the infrared ray.

The lens module 497 may include a first lens 497a that refracts the visible light to focus the visible light transmitted by the visible light transmitter 491, and a second lens 497b that refracts the infrared ray to focus the infrared ray transmitted by the infrared ray transmitter 493.

Each lens module 497 may employ a convex lens that focuses and outputs incident light.

The visible light transmitted by the visible light transmitter 491 may become the visible light of a beam form, and the infrared ray transmitted by the infrared ray transmitter 493 may become the infrared ray of a beam form by the light collecting plates 499a and 499b and the lens module 497.

When the light transmission unit 490 radiates the visible light and the infrared ray toward the floor of the cleaning area, the radiated visible light and infrared ray are projected on the floor of the cleaning area, and, as a result, a visible light area VLP and an infrared ray area IRP are formed as illustrated in FIG. 49.

The user U may recognize the position commanded by the remote controller 400 through the visible light area VLP, and the cleaning robot 300 may recognize the position of the remote controller 400 through the infrared ray area IRP.

In addition, the infrared ray transmitted by the light transmission unit 490 of the remote controller 400 is modulated by the control command of the user U, and the cleaning robot 100 may demodulate the modulated infrared ray to recognize the control command of the user U.

Because the infrared ray transmitted by the remote controller 400 includes information on the control command of the user U and information on the position indicated by the user U as described above, the remote controller 400 may transmit the two types of information simultaneously to the cleaning robot 300 using the infrared ray. As a result, the infrared ray transmitter 493 to transmit the control command of the user U and the infrared ray transmitter 493 to show the position indicated by the user U may not be provided separately.

In addition, the visible light area VLP and the infrared ray area IRP may overlap each other such that the position recognized by the user U and the position recognized by the cleaning robot 300 are the same, and the light spot area LSP is formed by the overlap of the visible light area VLP and the infrared ray area IRP. The user U and the cleaning robot 300 may recognize the position indicated by the remote controller 400 by the light spot area LSP formed as above.

In addition, a radius R of the first lens 497a and the second lens 497b, a distance L1 between the first lens 497a and the visible light transmitter 491, and a distance L2 between the second lens 497b and the infrared ray transmitter 493 may be adjusted such that the visible light area VLP and the infrared ray area IRP may be clearly identified by the user U and the cleaning robot 300, and the visible light area VLP and the infrared ray area IRP maximally overlap.

For example, the visible light area VLP and the infrared ray area IRP brighten whereas the size of the visible light area VLP and the infrared ray area IRP reduce as the radius R of the first lens 497a and the second lens 497b enlarges.

In addition, the visible light area VLP and the infrared ray area IRP brightens even more whereas the size of the visible light area VLP and the infrared ray area IRP reduce as the distance L1 between the first lens 497a and the visible light transmitter 491 and the distance L2 between the second lens 497b and the infrared ray transmitter 493 become farther.

The radius R of the first lens 497a and the second lens 497b may be approximately 15 mm or less to form the visible light area VLP and the infrared ray area IRP of proper brightness and proper size. Also, the distance L1 between the first lens 497a and the visible light transmitter 491 may be approximately 30 mm or less, and the distance L2 between the second lens 497b and the infrared ray transmitter 493 may be approximately 40 mm or less.

In addition, because the wavelength of the visible light and the wavelength of the infrared ray are different from each other, the distance L1 between the first lens 497a and the visible light transmitter 491 and the distance L2 between the second lens 497b and the infrared ray transmitter 493 may be different from each other.

To increase a ratio in which the visible light area VLP and the infrared ray area IRP overlap each other, a distance L between the center of the first lens 497*a* and the center of the second lens 497*b* may be adjusted.

When the radius R of the first lens 497*a* and the second lens 497*b*, the distance L1 between the first lens 497*a* and the visible light transmitter 491, and the distance L2 between the second lens 497*b* and the infrared ray transmitter 493 are set as mentioned above, the distance L between the center of the first lens 497*a* and the center of the second lens 497*b* may be set as approximately 20 mm or less.

When the distance D between the center of the first lens 497*a* and the center of the second lens 497*b* is set as approximately 20 mm or less as mentioned above, the ratio in which the visible light area VLP and the infrared ray area IRP overlap each other becomes approximately 90% or higher.

In addition, a sonic lens of the sonic wave transmission unit 480 may be provided at a central upper portion of a side surface of the remote controller 400 on which the first lens and the second lens are provided to adjust a focus of the ultrasonic signal that is output and transmitted.

In the above, the configuration of the cleaning robot system according to an embodiment was described.

Hereinafter, a method of controlling the cleaning robot system according to embodiments will be described.

Hereinafter, embodiments of calculating the distance from the remote controller will be described with reference to FIGS. 50, 51, 52, 53, 53, 54, 55, 56A, 56B, 57A, and 57B.

Figure 50:
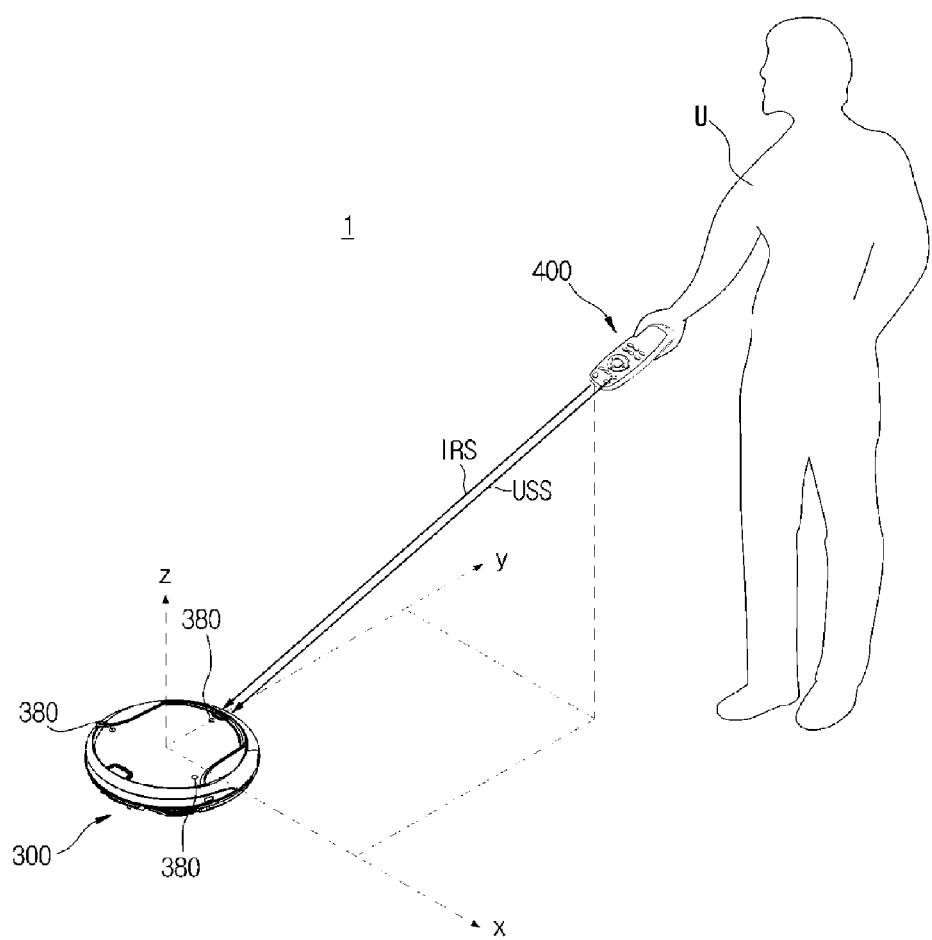
FIG. 50 is a conceptual view of calculating a distance from the remote controller according to an embodiment.

FIG. 50 is a conceptual view of calculating the distance from the remote controller according to an embodiment.

To calculate the distance between the remote controller 400 and the cleaning robot 300, the user U may transmit an input signal to the remote controller 400, and the remote controller 400 may output the infrared signal or the ultrasonic signal and transmit the same.

Specifically, the distance between the cleaning robot 300 and the remote controller 400 may be measured through a difference between a time at which an infrared signal IRS is received and a time at which an ultrasonic signal USS is received due to a speed difference of the infrared signal IRS and the ultrasonic signal USS. Also, a plurality of infrared signals IRS that are different for each predetermined distance may be output to measure the distance between the cleaning robot 300 and the remote controller 400 in accordance with the type of the received infrared signals IRS.

Figure 51:
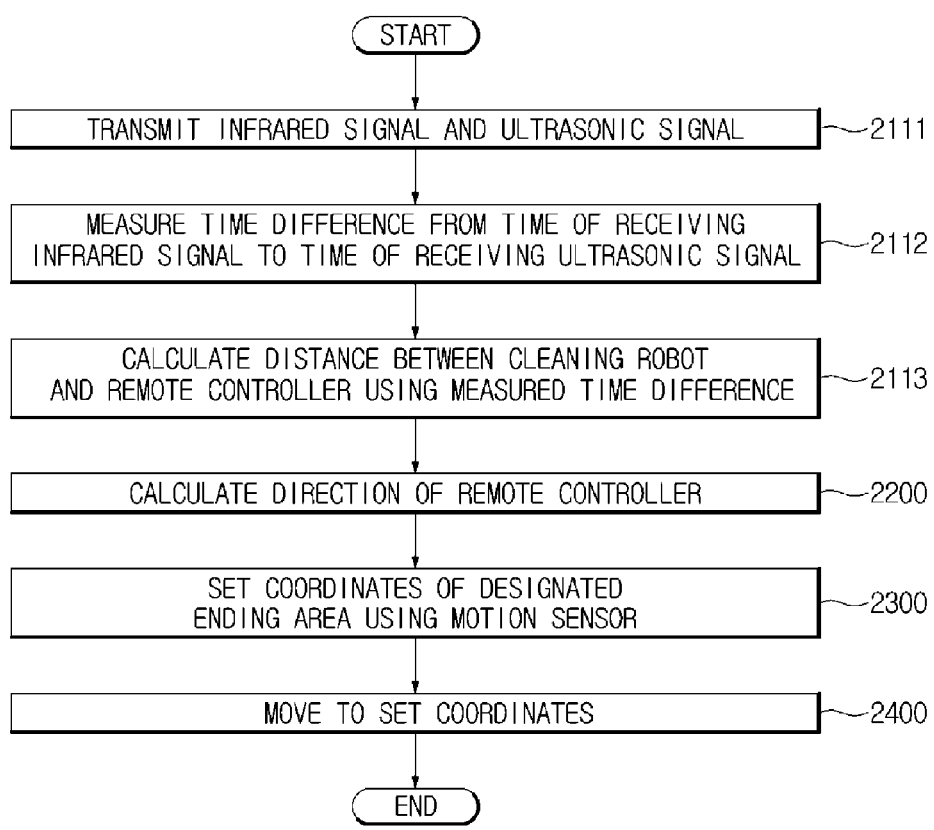
FIG. 51 is a flow chart of a method of calculating a distance from a remote controller according to an embodiment.

FIG. 51 is a flow chart of a method of calculating a distance from a remote controller according to an embodiment.

The remote controller outputs the infrared signal and the ultrasonic signal from the signal transmission unit and transmits the infrared signal and the ultrasonic signal (operation 2111) to transmit the infrared signal and the ultrasonic signal to the cleaning robot.

In addition, the signal transmission unit of the cleaning robot measures a time difference from a time at which the infrared signal output from the remote controller is received until a time at which the ultrasonic signal is received (operation 2112). The robot control unit calculates the distance between the cleaning robot and the remote controller based on the time difference from the time at which the measured infrared signal is received until the time at which the ultrasonic signal is received and a temperature of the time at which the ultrasonic signal is output (operation 2113).

The robot control unit calculates the direction of the remote controller based on at least one of the received infrared signal and ultrasonic signal (operation 2200), and when the user U points to the designated ending area using the remote controller, the motion sensor may measure the motion value at the time and transmit the motion value to the cleaning robot. The robot control unit of the cleaning robot sets coordinates of the designated ending area based on the transmitted motion value (operation 2300).

The robot control unit transmits the control signal to the navigation unit to move the cleaning robot to the set coordinates of the designated ending area (operation 2400).

Figure 52:
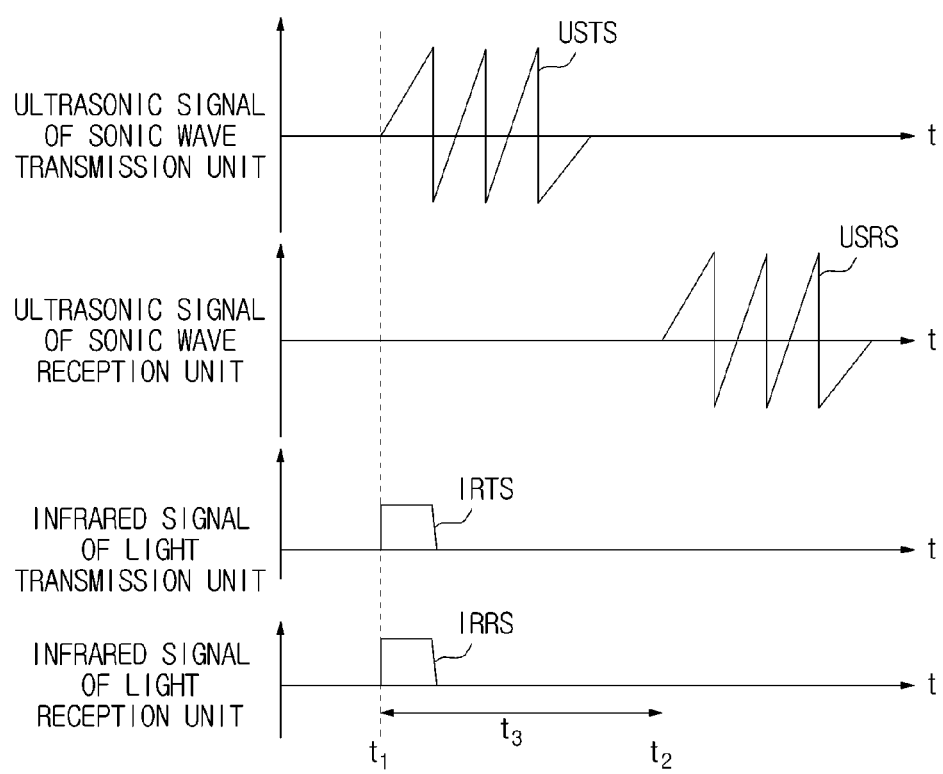
FIG. 52 is a graph in the method illustrated in FIG. 51.

FIG. 52 is a graph in the method illustrated in FIG. 51.

As illustrated in FIG. 52, because the infrared signal is a type of light, a transmission speed of the infrared signal is a speed of light. Because a velocity of light, which is a speed of light, is extremely rapid compared to a sonic speed, which is a speed of a sonic wave, a time t1 at which the infrared signal is transmitted from the remote controller 400 and the time t1 at which the infrared signal is received by the cleaning robot 300 are the same. However, because the sonic speed is slower than the velocity of light, a time difference t3 exists between the time t1 at which the ultrasonic signal is transmitted from the remote controller 400 and a time t2 at which the ultrasonic signal is received by the cleaning robot 300.

Consequently, the distance between the remote controller 400 and the cleaning robot 300 may be calculated by assuming the time t1 at which the infrared signal is received as the time t1 at which the ultrasonic signal is output, and multiplying the time from the time t1 at which the infrared signal is received until the time t2 at which the ultrasonic signal is received by the speed of the ultrasonic wave at a specific temperature.

When this is shown with mathematical expressions, it is as the following Equation 1, Equation 2, and Equation 3.

$$L = t * C \qquad \text{Equation 1}$$

Equation 1 is a mathematical expression for calculating the distance between the cleaning robot 300 and the remote controller 400. Among parameters of Equation 1, L refers to the distance between the cleaning robot 300 and the remote controller 400, t refers to a time difference from the infrared ray reception time until the ultrasonic wave reception time, and c refers to the speed of the ultrasonic signal.

In addition, in Equation 1, the speed of the ultrasonic wave is dependent on a component of a medium, a pressure and a temperature of the medium. Consequently, the speed of the ultrasonic wave at a specific temperature may be set as in Equation 2.

$$c = 20\sqrt{273+T} \qquad \text{Equation 2}$$

Equation 2 is a mathematical expression for calculating the speed of the ultrasonic wave at a specific temperature. Among parameters of Equation 2, T refers to a temperature. According to Equation 2, the speed of the ultrasonic wave increases as the temperature increases. Also, the speed of the ultrasonic wave is approximately 340 [m/s] in air of room temperature.

In addition, when Equation 2 is substituted into Equation 1, it may be expressed as Equation 3.

$$L = 20t\sqrt{273+T} \qquad \text{Equation 3}$$

Equation 3 is a mathematical expression for calculating the distance between the cleaning robot 300 and the remote controller 400. According to Equation 3, the distance between the cleaning robot 300 and the remote controller 400 is proportional to the time difference between the infrared ray reception time and the ultrasonic wave reception time, and the distance increases as the temperature increases.

Figure 53:
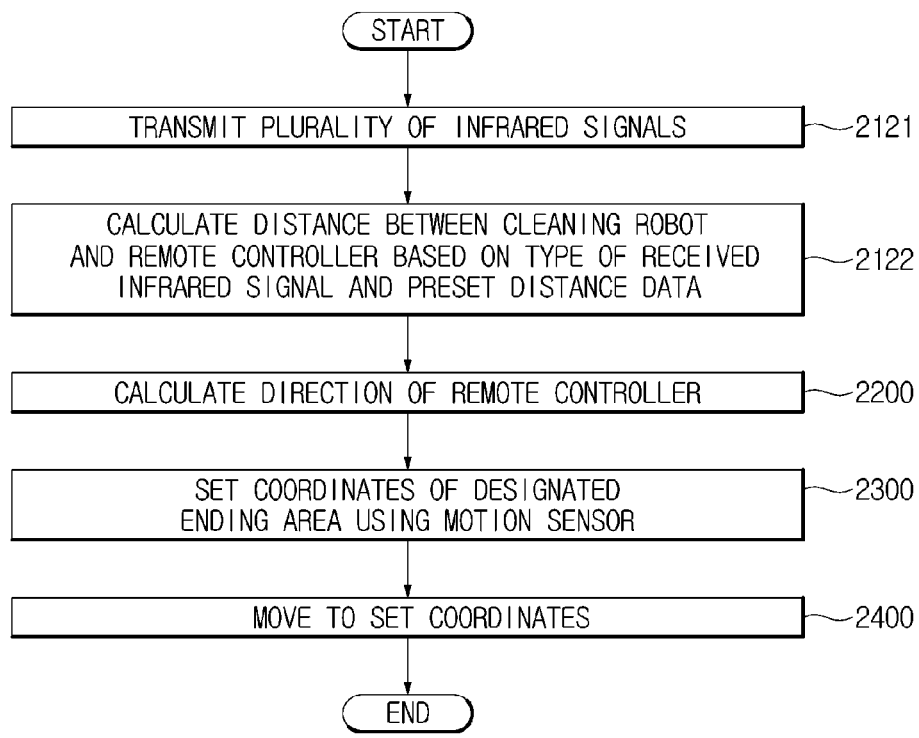
FIG. 53 is a flow chart of a method of calculating a distance from a remote controller according to an embodiment.

FIG. 53 is a flow chart of a method of calculating a distance from a remote controller according to an embodiment.

The remote controller outputs a plurality of infrared signals having different signal patterns or intensity for each predetermined distance from the signal transmission unit and transmits the plurality of infrared signals (operation 2121) to transmit the plurality of infrared signals to the cleaning robot. Here, the predetermined distance refers to a difference in a transmission radius of the plurality of infrared signals of different types, and the predetermined distance may be determined by the size of the cleaning robot, characteristics of the infrared ray, and a usable area of the cleaning robot.

In addition, the signal transmission unit of the cleaning robot receives the infrared signal output from the remote controller, determines a type of the received infrared signal, and matches the determined type of the infrared signal to the predetermined distance data in order to calculate the distance between the cleaning robot and the remote controller (operation 2122). Here, the predetermined distance data is information on the plurality of infrared rays of different types for each predetermined distance output from the signal transmission unit, and information on the radius of each of the infrared rays and the types of the infrared rays may be organized in a look-up table form.

The robot control unit calculates the direction of the remote controller (operation 2200) based on at least one of the received infrared signal and ultrasonic signal, and when the user points to the designated ending area using the remote controller, the motion sensor measures the motion value at the time and transmits the motion value to the cleaning robot. The robot control unit of the cleaning robot sets coordinates of the designated ending area based on the transmitted motion value (operation 2300).

The robot control unit transmits the control signal to the navigation unit to move the cleaning robot to the set coordinates of the designated ending area (operation 2400).

Figure 54:
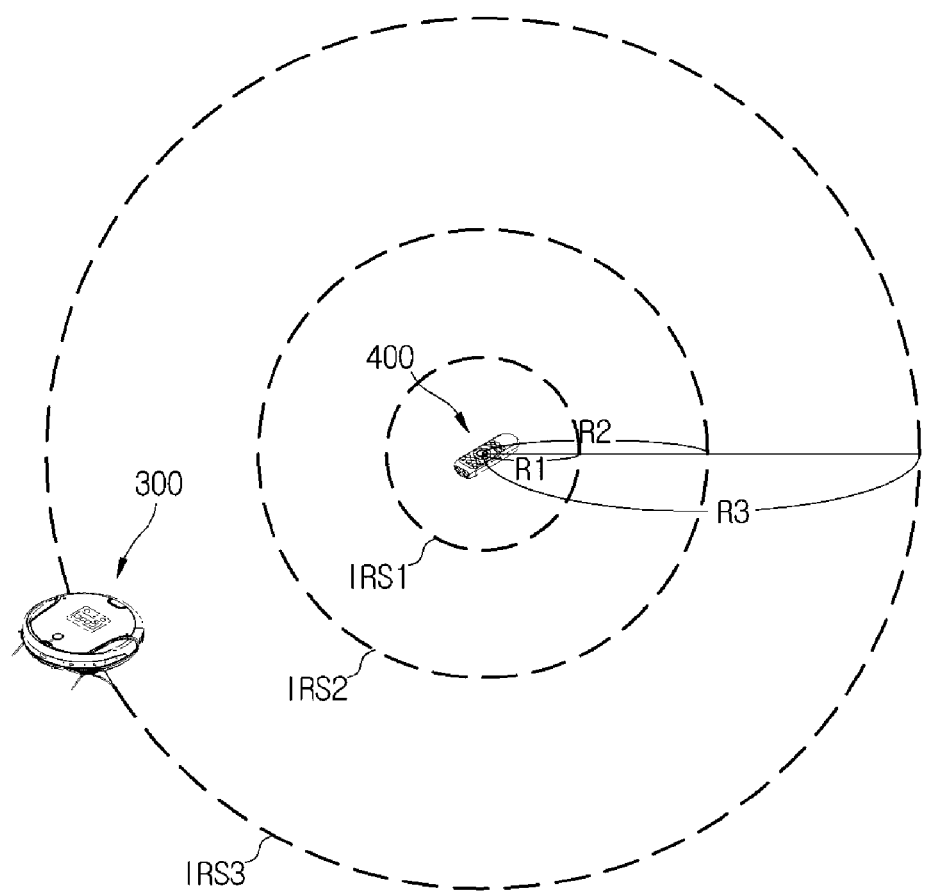
FIG. 54 is a conceptual view of the method illustrated in FIG. 53.

FIG. 54 is a conceptual view of the method illustrated in FIG. 53.

As illustrated in FIG. 54, the signal transmission unit 435 of the remote controller 400 may output and transmit the infrared signals having different radii and different signals, and the signal reception unit 335 of the cleaning robot 300 may determine the type of the received infrared signal to calculate the distance between the cleaning robot 300 and the remote controller 400.

Specifically, the remote controller 400 sets a pattern of a first infrared signal IRS1 having a first radius distance R1 as "0001" and outputs the pattern, sets a pattern of a second infrared signal IRS2 having a second radius distance R2 as "0010" and outputs the pattern, and sets a pattern of a third infrared signal IRS3 having a third radius distance R3 as "0100" and outputs the pattern.

In this case, when the cleaning robot 300 is located within the first radius distance R1 from the remote controller 400, the signal reception unit 335 receives the infrared signal having "0001" which is the pattern of the first infrared signal IRS1, and the robot control unit 310 determines the distance between the cleaning robot 300 and the remote controller 400 as the first radius distance R1.

In addition, when the cleaning robot 300 is located between the first radius distance R1 and the second radius distance R2 from the remote controller 400, the signal reception unit 335 receives the infrared signal having "0001" which is the pattern of the first infrared signal IRS1 and the infrared signal having "0010" which is the pattern of the second infrared signal IRS2, and the robot control unit 310 determines the distance between the cleaning robot 300 and the remote controller 400 as the second radius distance R2.

In addition, when the cleaning robot 300 is located between the second radius distance R2 and the third radius distance R3 from the remote controller 400, the signal reception unit 335 receives the infrared signal having "0001" which is the pattern of the first infrared signal IRS1, the infrared signal having "0010" which is the pattern of the second infrared signal IRS2, and the infrared signal having "0100" which is the pattern of the third infrared signal IRS3, and the robot control unit 310 determines the distance between the cleaning robot 300 and the remote controller 400 as the third radius distance R3.

Like this, the cleaning robot system 2 may output the plurality of infrared signals having different patterns and different radii for each predetermined distance, and may find a distance corresponding to the type of the received infrared ray among the predetermined distance data to calculate the distance between the cleaning robot 300 and the remote controller 400.

Figure 55:
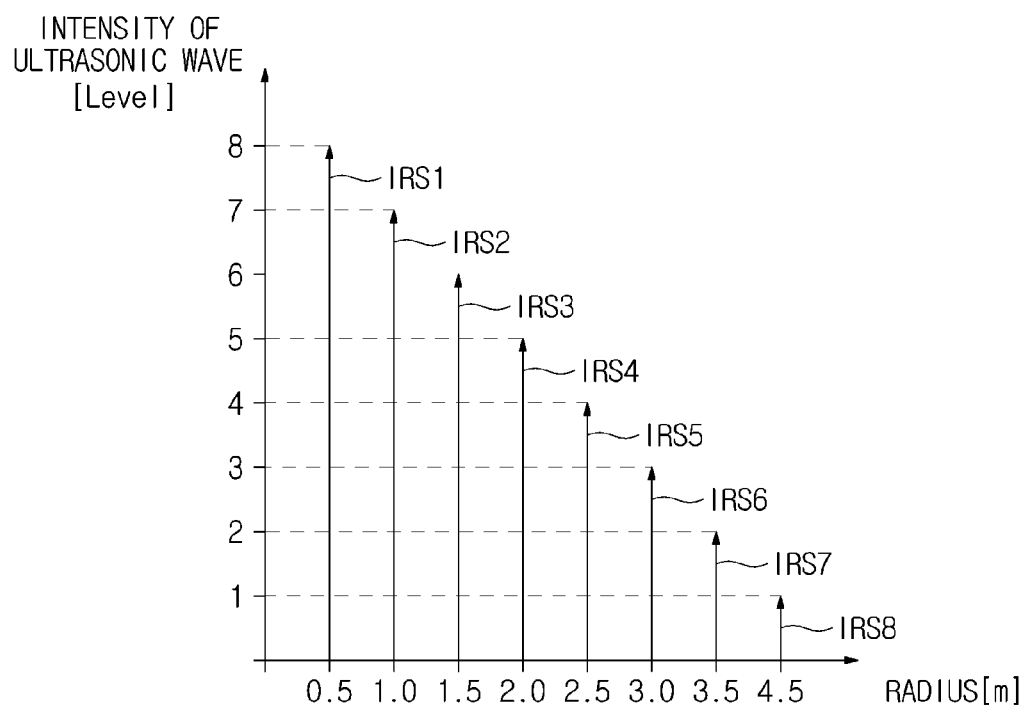
FIG. 55 is a graph of a plurality of different infrared signals in the method illustrated in FIG. 53.

FIG. 55 is a graph of a plurality of different infrared signals in the method illustrated in FIG. 53.

As illustrated in FIG. 55, the signal transmission unit 435 of the remote controller 400 may output and transmit the infrared signals having different radii and different intensities, and the signal reception unit 335 of the cleaning robot 300 may calculate the distance between the cleaning robot 300 and the remote controller 400 in accordance with the intensity of the received infrared signal.

Specifically, the remote controller 400 sets the intensity of the first infrared signal IRS1 having a radius distance of 0.5 [m] as 8[level] and outputs the first infrared signal IRS1, sets the intensity of the second infrared signal IRS2 having a radius distance of 1.0 [m] as 7[level] and outputs the second infrared signal IRS2, sets the intensity of the third infrared signal IRS3 having a radius distance of 1.5 [m] as 6[level] and outputs the third infrared signal IRS3, sets the intensity of the fourth infrared signal IRS4 having a radius distance of 2.0 [m] as 5[level] and outputs the fourth infrared signal IRS4, sets the intensity of the fifth infrared signal IRS5 having a radius distance of 2.5 [m] as 4[level] and outputs the fifth infrared signal IRS5, sets the intensity of the sixth infrared signal IRS6 having a radius distance of 3.0 [m] as 3[level] and outputs the sixth infrared signal IRS6, sets the intensity of the seventh infrared signal IRS7 having a radius distance of 3.5 [m] as 2[level] and outputs the seventh infrared signal IRS7, and sets the intensity of the eighth infrared signal IRS8 having a radius distance of 4.0 [m] as 1[level] and outputs the eighth infrared signal IRS8.

In this case, when the cleaning robot 300 is located within the radius distance of 0.5 [m] from the remote controller 400, the signal reception unit 335 receives the infrared signal having the 8[level] which is the intensity of the first infrared signal IRS1, and the robot control unit 310 determines the distance between the cleaning robot 300 and the remote controller 400 as 0.5 [m].

In addition, when the cleaning robot 300 is located between the radius distance of 0.5 [m] and the radius distance of 1.0 [m] from the remote controller 400, the signal reception unit 335 receives the infrared signal having the 8[level] which is the intensity of the first infrared signal IRS1 and the infrared signal having the 7[level] which is the intensity of the second infrared signal IRS2, and the robot control unit 310 determines the distance between the cleaning robot 300 and the remote controller 400 as 1.0 [m].

In addition, when the cleaning robot 300 is located between the radius distance of 1.0 [m] and the radius distance of 1.5 [m] from the remote controller 400, the signal reception unit 335 receives the infrared signal having the 8[level] which is the intensity of the first infrared signal IRS1, the infrared signal having the 7[level] which is the intensity of the second infrared signal IRS2, and the infrared signal having the 6[level] which is the intensity of the third infrared signal IRS3, and the robot control unit 310 determines the distance between the cleaning robot 300 and the remote controller 400 as 1.5 [m].

In addition, when the cleaning robot 300 is located between the radius distance of 1.5 [m] and the radius distance of 2.0 [m] from the remote controller 400, the signal reception unit 335 receives the infrared signal having the 8[level] which is the intensity of the first infrared signal IRS1, the infrared signal having the 7[level] which is the intensity of the second infrared signal IRS2, the infrared signal having the 6[level] which is the intensity of the third infrared signal IRS3, and the infrared signal having the 5[level] which is the intensity of the fourth infrared signal IRS4, and the robot control unit 310 determines the distance between the cleaning robot 300 and the remote controller 400 as 2.0 [m].

In addition, when the cleaning robot 300 is located between the radius distance of 2.0 [m] and the radius distance of 2.5 [m] from the remote controller 400, the signal reception unit 335 receives the infrared signal having the 8[level] which is the intensity of the first infrared signal IRS1, the infrared signal having the 7[level] which is the intensity of the second infrared signal IRS2, the infrared signal having the 6[level] which is the intensity of the third infrared signal IRS3, the infrared signal having the 5[level] which is the intensity of the fourth infrared signal IRS4, and the infrared signal having the 4[level] which is the intensity of the fifth infrared signal IRS5, and the robot control unit 310 determines the distance between the cleaning robot 300 and the remote controller 400 as 2.5 [m].

In addition, when the cleaning robot 300 is located between the radius distance of 2.5 [m] and the radius distance of 3.0 [m] from the remote controller 400, the signal reception unit 335 receives the infrared signal having the 8[level] which is the intensity of the first infrared signal IRS1, the infrared signal having the 7[level] which is the intensity of the second infrared signal IRS2, the infrared signal having the 6[level] which is the intensity of the third infrared signal IRS3, the infrared signal having the 5[level] which is the intensity of the fourth infrared signal IRS4, the infrared signal having the 4[level] which is the intensity of the fifth infrared signal IRS5, and the infrared signal having the 3[level] which is the intensity of the sixth infrared signal IRS6, and the robot control unit 310 determines the distance between the cleaning robot 300 and the remote controller 400 as 3.0 [m].

In addition, when the cleaning robot 300 is located between the radius distance of 3.0 [m] and the radius distance of 3.5 [m] from the remote controller 400, the signal reception unit 335 receives the infrared signal having the 8[level] which is the intensity of the first infrared signal IRS1, the infrared signal having the 7[level] which is the intensity of the second infrared signal IRS2, the infrared signal having the 6[level] which is the intensity of the third infrared signal IRS3, the infrared signal having the 5[level] which is the intensity of the fourth infrared signal IRS4, the infrared signal having the 4[level] which is the intensity of the fifth infrared signal IRS5, the infrared signal having the 3[level] which is the intensity of the sixth infrared signal IRS6, and the infrared signal having the 2[level] which is the intensity of the seventh infrared signal IRS7, and the robot control unit 310 determines the distance between the cleaning robot 300 and the remote controller 400 as 3.5 [m].

In addition, when the cleaning robot 300 is located between the radius distance of 3.5 [m] and the radius distance of 4.0 [m] from the remote controller 400, the signal reception unit 335 receives the infrared signal having the 8[level] which is the intensity of the first infrared signal IRS1, the infrared signal having the 7[level] which is the intensity of the second infrared signal IRS2, the infrared signal having the 6[level] which is the intensity of the third infrared signal IRS3, the infrared signal having the 5[level] which is the intensity of the fourth infrared signal IRS4, the infrared signal having the 4[level] which is the intensity of the fifth infrared signal IRS5, the infrared signal having the 3[level] which is the intensity of the sixth infrared signal IRS6, the infrared signal having the 2[level] which is the intensity of the seventh infrared signal IRS7, and the infrared signal having the 1[level] which is the intensity of the eighth infrared signal IRS8, and the robot control unit 310 determines the distance between the cleaning robot 300 and the remote controller 400 as 4.0 [m].

Like this, the cleaning robot system 2 may output the plurality of infrared signals having different intensities and different radii for each predetermined distance, and may find a distance corresponding to the type of the received infrared ray among the predetermined distance data to calculate the distance between the cleaning robot 300 and the remote controller 400.

Figure 56A:
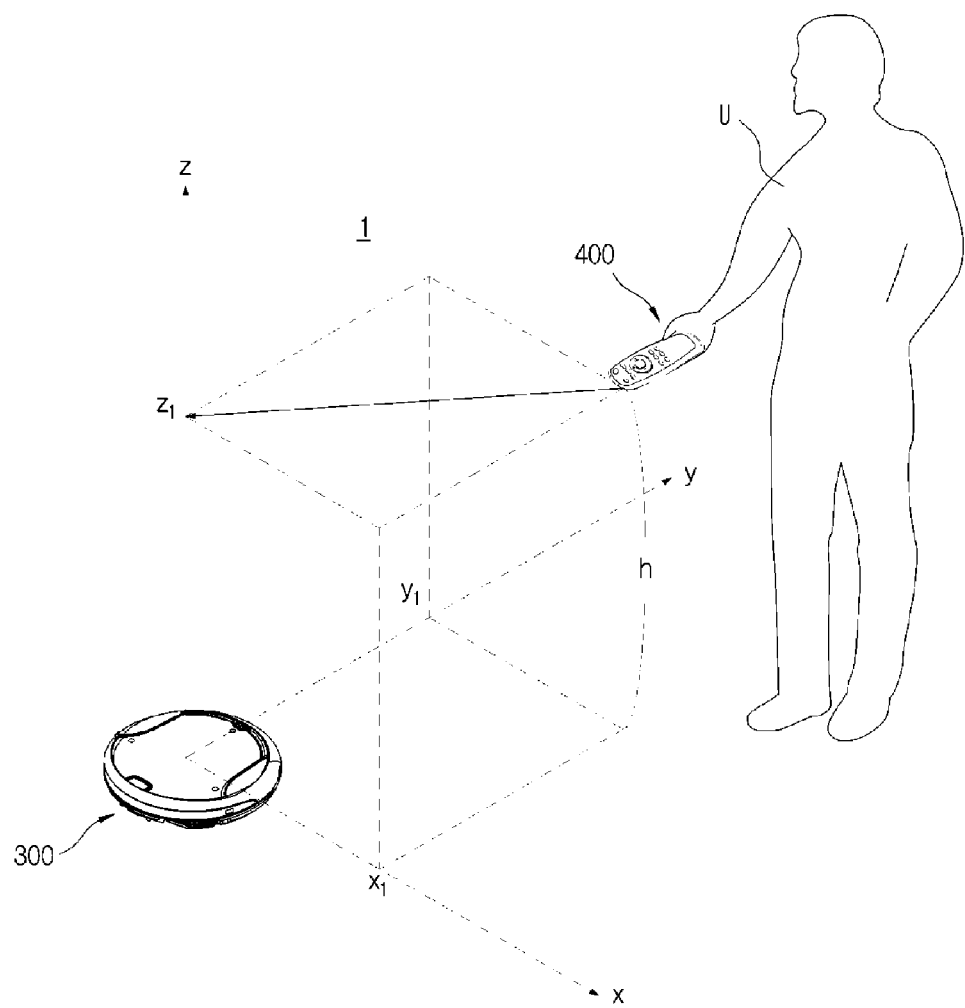
FIGS. 56A, 56B, 57A, and 57B are conceptual views of a method of calculating a distance from a remote controller according to an embodiment.
Figure 56B:
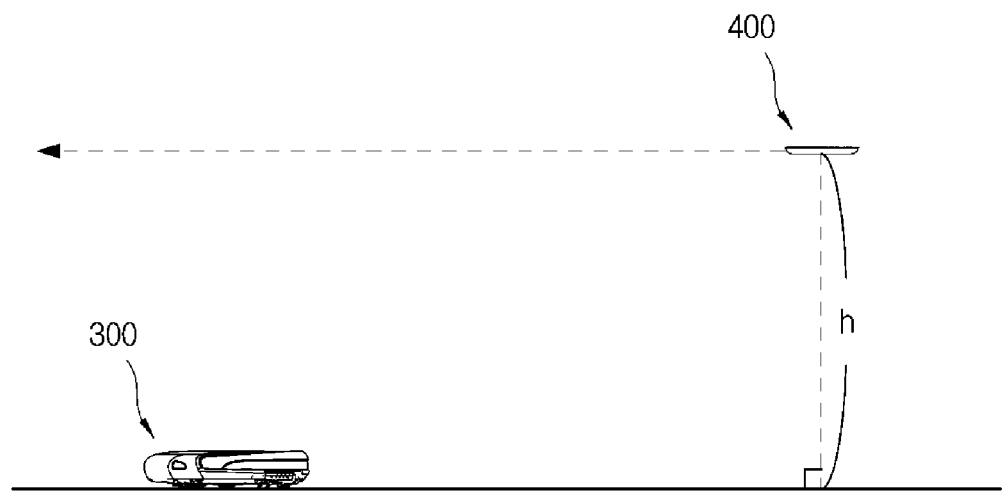

FIG. 56A three-dimensionally illustrates indicating with the remote controller to be horizontal to the ground according to an embodiment, and FIG. 56B two-dimensionally illustrates indicating with the remote controller to be horizontal to the ground according to an embodiment. Also, FIG. 57A three-dimensionally illustrates indicating the cleaning robot with the remote controller according to an embodiment, and FIG. 57B two-dimensionally illustrates indicating the cleaning robot with the remote controller according to an embodiment.

When the motion sensor 470 included in the remote controller 400 includes a 9-axis sensor that detects a geomagnetic field, a direction of the geomagnetic field is a direction horizontal to the ground. Consequently, as illustrated in FIGS. 56A and 56B, the remote controller 400 may be horizontal to the ground at a predetermined height h and set an extension line along a direction toward the cleaning robot 300 as a reference line.

Figure 57A:
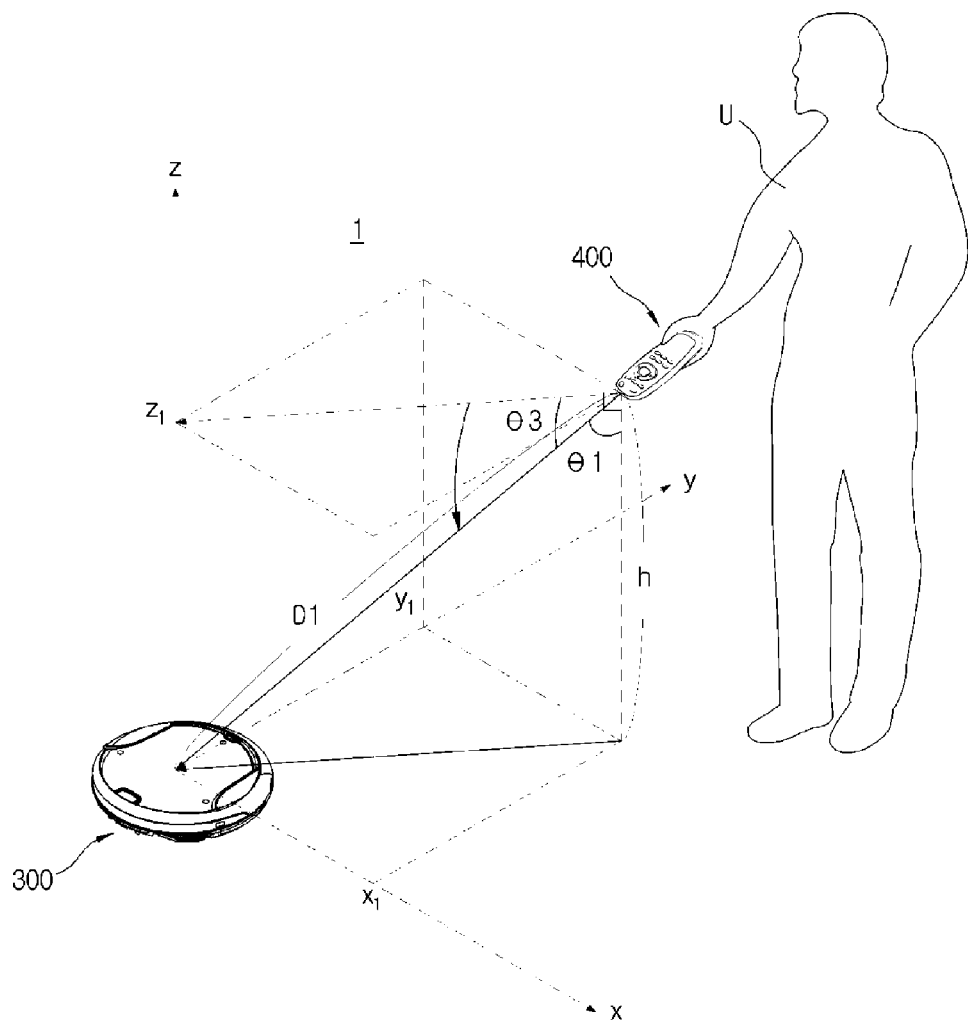

The user moves the remote controller 400 while maintaining the predetermined height h such that the remote controller 400 points to the cleaning robot 300 as illustrated in FIGS. 57A an 57B. In the case, the motion sensor 470 of the remote controller 400 measures an angle θ3 between the reference line of the geomagnetic axis and the extension line in which the remote controller 400 points to the cleaning robot 300. Also, because the reference line is parallel to the ground, the reference line may form a right angle with a line perpendicular to the ground. Consequently, an angle θ1 between the extension line and the line perpendicular to the ground may be calculated when the measured angle θ3 between the reference line and the extension line is subtracted from 90[deg].

Figure 57B:
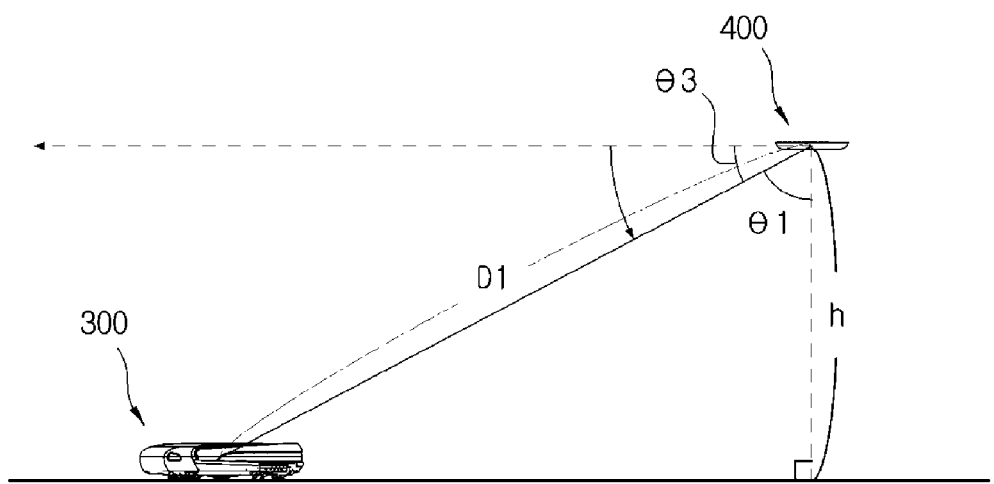

In addition, as illustrated in FIG. 57B, three points of the cleaning robot 300, the remote controller 400, and the ground at which the remote controller 400 is orthogonally projected may form a right triangle. Consequently, if the height of the remote controller 400 is a predetermined height, the distance between the cleaning robot 300 and the remote controller 400 may be calculated. This will be described with reference to Equation 4 below.

$$D1 = \frac{h}{\cos\theta 1} \qquad \text{Equation 4}$$

Equation 4 is a mathematical expression for calculating the distance between the cleaning robot and the remote controller based on the motion of the remote controller. In Equation 4, D1 may refer to the distance between the cleaning robot and the remote controller, h may refer to the height of the remote controller, and θ1 may refer to the angle between the line perpendicular to the ground and the line in which the remote controller points to the cleaning robot.

In Equation 4, the height h of the remote controller may be statistically set as a value in a range of 1 [m] to 1.5 [m] based on the height of the user. Consequently, when the height h of the remote controller is fixed to a predetermined height h which is a specific value, the motion of the remote controller may be measured to calculate the angle θ1 between the line perpendicular to the ground and the line in which the remote controller points to the cleaning robot and calculate the distance D1 between the cleaning robot and the remote controller.

At least one of the three embodiments of calculating the distance between the cleaning robot 300 and the remote controller 400 described above with reference to FIGS. 50, 51, 52, 53, 54, 55, 56A, 56B, 57A, and 57B may be used. Specifically, although one of the above-described embodiments may be used in the cleaning robot system 2, the distance may also be measured using the plurality of embodiments to increase reliability of the measured distance between the cleaning robot 300 and the remote controller 400.

Hereinafter, embodiments of calculating the direction of the remote controller will be described with reference to FIGS. 58, 59, 60, 61, 62, and 63.

Figure 58:
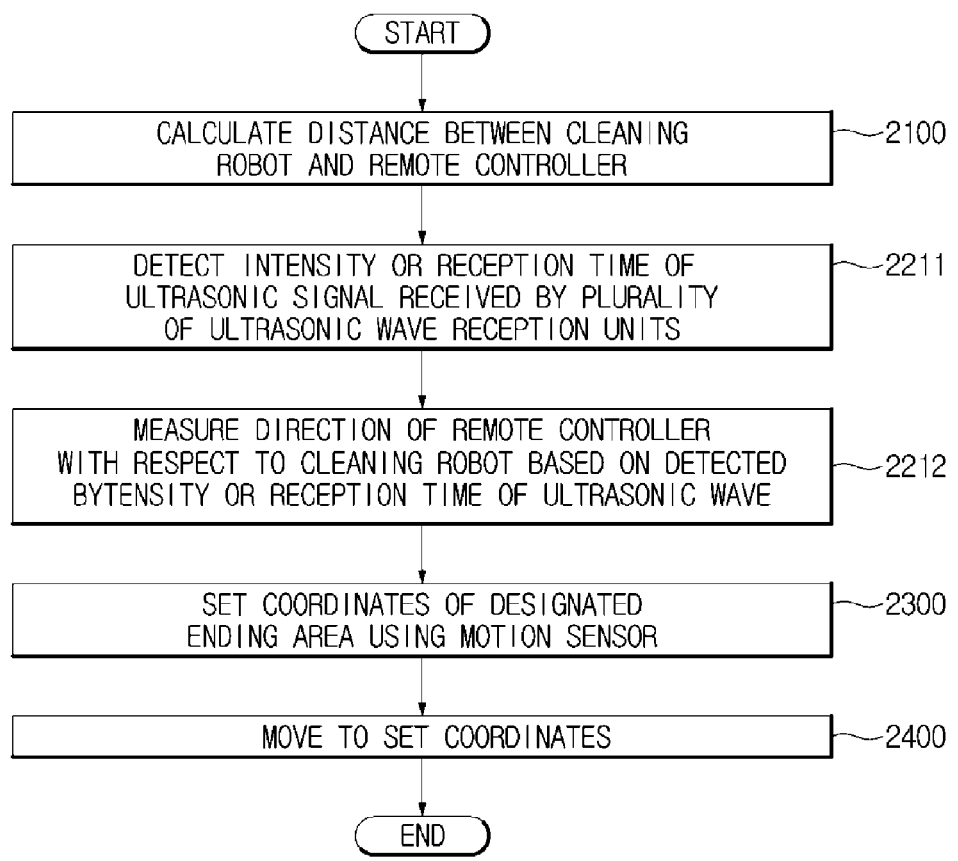
FIG. 58 is a flow chart of a method of calculating a direction of a remote controller according to an embodiment.

FIG. 58 illustrates a flow chart of a method of calculating a direction of a remote controller according to an embodiment.

The remote controller calculates the distance between the cleaning robot and the remote controller (operation 2100) by outputting at least one of the infrared signal and the ultrasonic signal from the signal transmission unit and receiving the at least one of the infrared signal and the ultrasonic signal by the signal reception unit.

In addition, the signal reception unit detects times at which the ultrasonic signal is received by each of a plurality of signal reception units or the intensity of the received ultrasonic signal (operation 2211). Also, the robot control unit calculates the direction of the remote controller based on the times at which the ultrasonic signal is received by each of a plurality of signal reception units or the intensity of the received ultrasonic signal detected by the signal reception unit (operation 2212).

Specifically, the ultrasonic signal is attenuated by the resistance of air, which is a medium, as the moving distance is longer. Consequently, the cleaning robot may determine that the remote controller is at a direction of the signal reception unit that has received the ultrasonic signal of great ultrasonic intensity based on the intensity of the ultrasonic signal received by the plurality of signal reception units in accordance with the degree of attenuation.

In addition, because the ultrasonic signal is transmitted by the sonic speed instead of the velocity of light, the reception time is longer as the moving distance is longer. Consequently, the cleaning robot may determine that the remote controller is at a direction of the signal reception unit that has the shortest reception time among the reception times of the ultrasonic signal received by the plurality of signal reception units.

Then, when the user points to the designated ending area using the remote controller, the motion sensor measures the motion value at the time and transmits the motion value to the cleaning robot. The robot control unit of the cleaning robot sets the coordinates of the designated ending area based on the transmitted motion value (operation 2300).

The robot control unit transmits the control signal to the navigation unit to move the cleaning robot to the set coordinates of the designated ending area (operation 2400).

Figure 59:
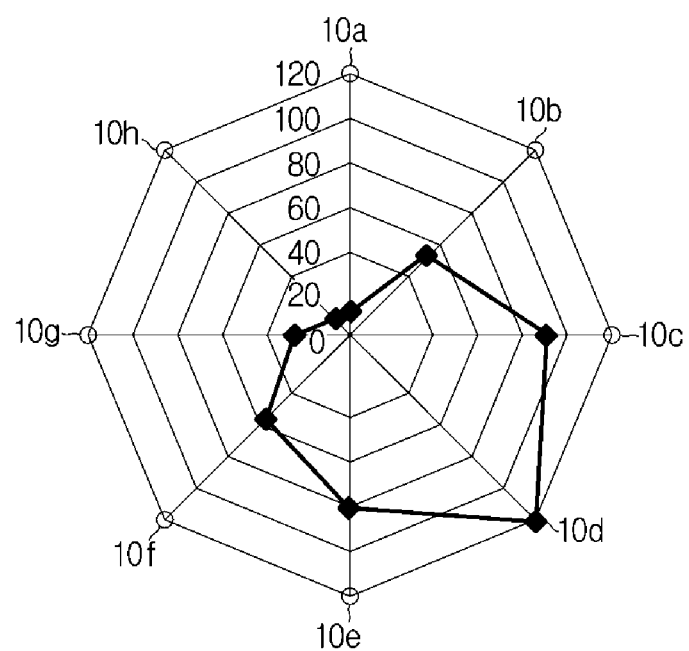
FIGS. 59 and 60 are conceptual views of the method illustrated in FIG. 58.
Figure 60:
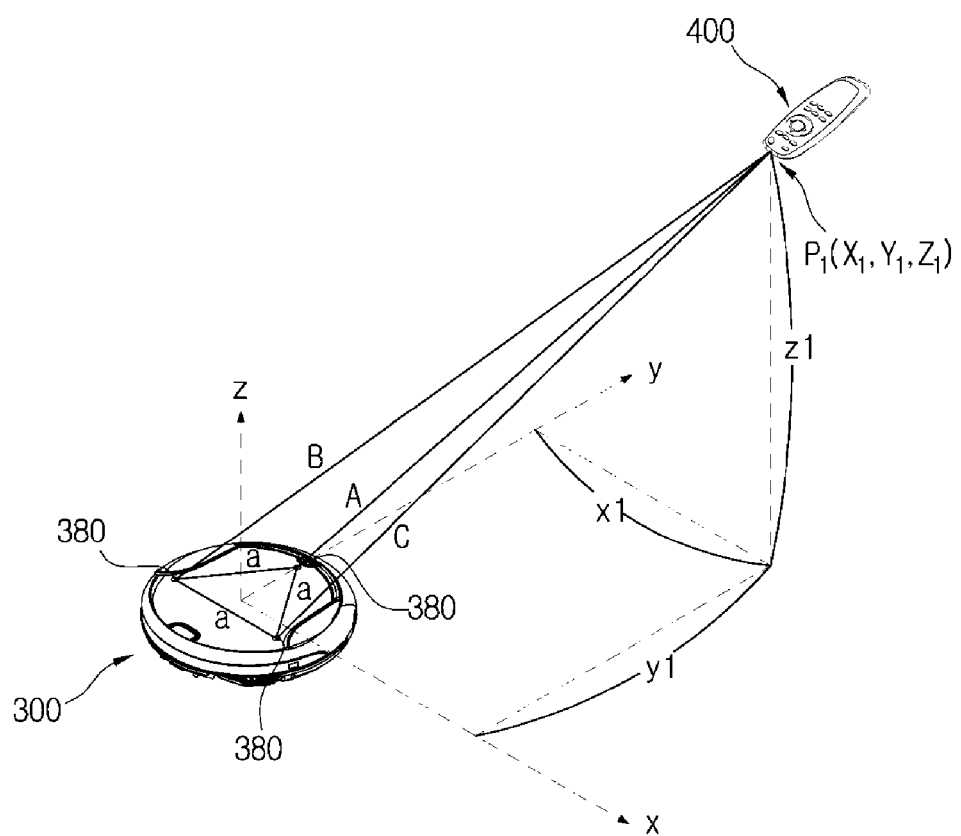

FIGS. 59 and 60 are conceptual views of the method illustrated in FIG. 58.

As illustrated in FIG. 59, when eight signal reception units 335 are provided at the outer circumferential side of the cleaning robot 300, the direction in which the remote controller 400 is located may be determined with respect to the cleaning robot 300 by comparing the intensities of the ultrasonic signals received by each of the signal reception units 335.

For example, it is assumed that the intensity of the ultrasonic signal received by a first signal reception unit 335a is 10, the intensity of the ultrasonic signal received by a second signal reception unit 335b is 50, the intensity of the ultrasonic signal received by a third signal reception unit 335c is 90, the intensity of the ultrasonic signal received by a fourth signal reception unit 335d is 120, the intensity of the ultrasonic signal received by a fifth signal reception unit 335e is 80, the intensity of the ultrasonic signal received by a sixth signal reception unit 335f is 60, the intensity of the ultrasonic signal received by a seventh signal reception unit 335g is 30, and the intensity of the ultrasonic signal received by an eighth signal reception unit 335h is 10. In this case, it may be determined that the remote controller 400 is located at a direction of the fourth signal reception unit 335d in which the degree of attenuation is the lowest and the intensity of the received signal is the greatest.

In addition, as illustrated in FIG. 60, when three signal reception units 335 calculate the distance between each of the signal reception units 335 and the remote controller 400 based on the infrared signal and the ultrasonic signal, coordinates of the remote controller 400 in a coordinate system with the cleaning robot 300 as the origin may be calculated using a triangulation method by Equation 5, Equation 6, and Equation 7.

$$X1 = \frac{-A^2 + C^2}{2a} \qquad \text{Equation 5}$$

Equation 5 is a mathematical expression for calculating a coordinate of X1. In Equation 5, X1 refers to an x-axis coordinate of the remote controller 400, A refers to a first distance between the first signal reception unit 335 and the remote controller 400, C refers to a third distance between the signal reception unit 335 and the remote controller 400, and a refers to a distance between the first, second, and third signal reception units 335.

$$Y1 = \frac{A^2 - 2B^2 + C^2}{2\sqrt{3}\,a} \qquad \text{Equation 6}$$

Equation 6 is a mathematical expression for calculating a coordinate of Y1. In Equation 6, Y1 refers to a y-axis coordinate of the remote controller 400, and B refers to a second distance between the second signal reception unit 335 and the remote controller 400.

$$Z1 = \frac{\sqrt{A^2B^2 + B^2C^2 + C^2A^2 + a^2(A^2 + B^2 + C^2) - A^4 - B^4 - C^4 - a^4}}{\sqrt{3}\,a} \qquad \text{Equation 7}$$

Equation 7 is a mathematical expression for calculating a coordinate of Z1. In Equation 7, Z1 refers to a z-axis coordinate of the remote controller 400.

Like this, the coordinates of the remote controller 400 with respect to the cleaning robot 300 as the origin may be calculated using the distances between the three signal reception units 335 and the remote controller 400 and the triangulation method in order to calculate the distance from the remote controller 400 and the direction of the remote controller 400.

Figure 61:
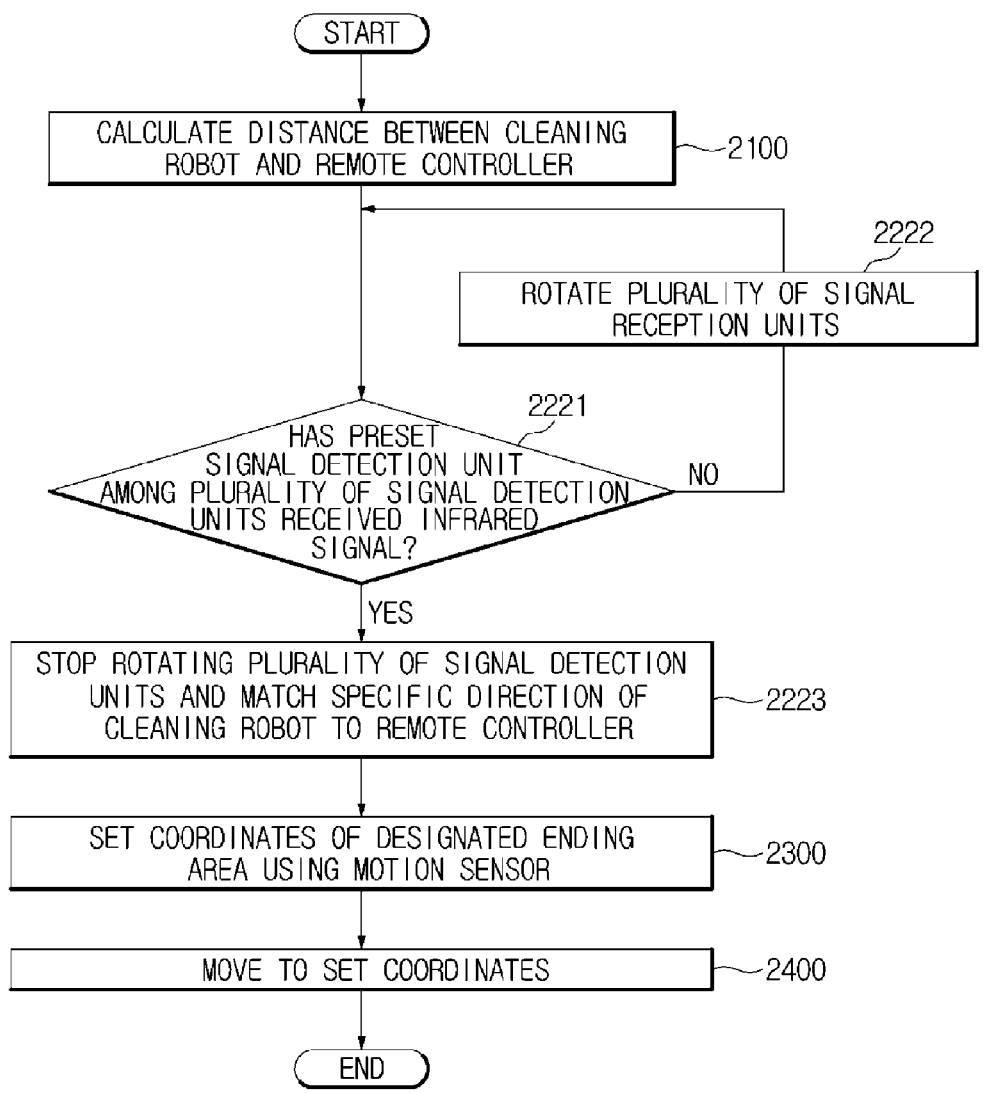
FIG. 61 is a flow chart of a method of calculating a direction of a remote controller according to an embodiment.

FIG. 61 is a flow chart of a method of calculating a direction of a remote controller according to an embodiment.

First, the remote controller calculates the distance between the cleaning robot and the remote controller (operation 2100) by outputting at least one of the infrared signal and the ultrasonic signal from the signal transmission unit and receiving the at least one of the infrared signal and the ultrasonic signal by the signal reception unit.

In addition, the robot control unit determines whether a predetermined signal detection unit among the plurality of signal reception units has received the infrared signal (operation 2221).

If the predetermined signal detection unit has not received the infrared signal, the robot control unit supplies power to the light reception driving motor to rotate the upper body at which the plurality of signal detection units are provided (operation 2222).

Conversely, if the predetermined signal detection unit has received the infrared signal, the robot control unit stops supplying the power to the light reception driving motor to stop the rotation of the upper body at which the plurality of signal detection units are provided and match a specific direction of the cleaning robot with the remote controller (operation 2223).

Then, when the user points to the designated ending area using the remote controller, the motion sensor measures the motion value at the time and transmits the motion value to the cleaning robot. The robot control unit of the cleaning robot sets the coordinates of the designated ending area based on the transmitted motion value (operation 2300).

At last, the robot control unit transmits the control signal to the navigation unit to move the cleaning robot to the set coordinates of the designated ending area (operation 2400).

Figure 62:
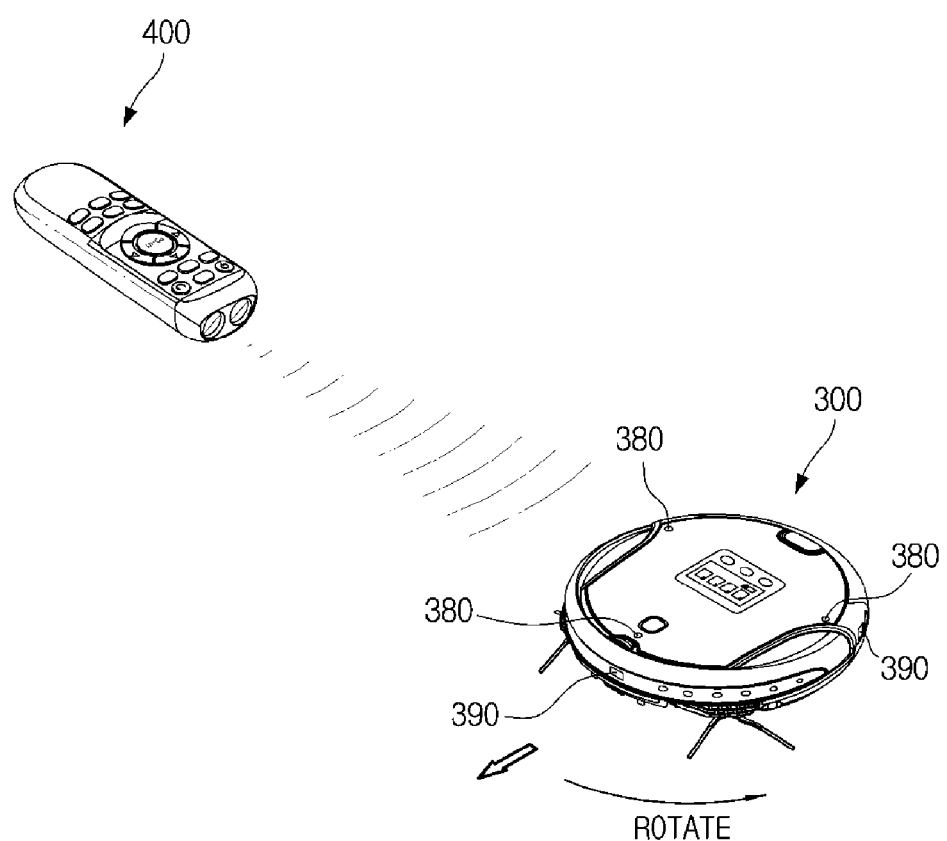
FIGS. 62 and 63 are conceptual views of the method illustrated in FIG. 61.
Figure 63:
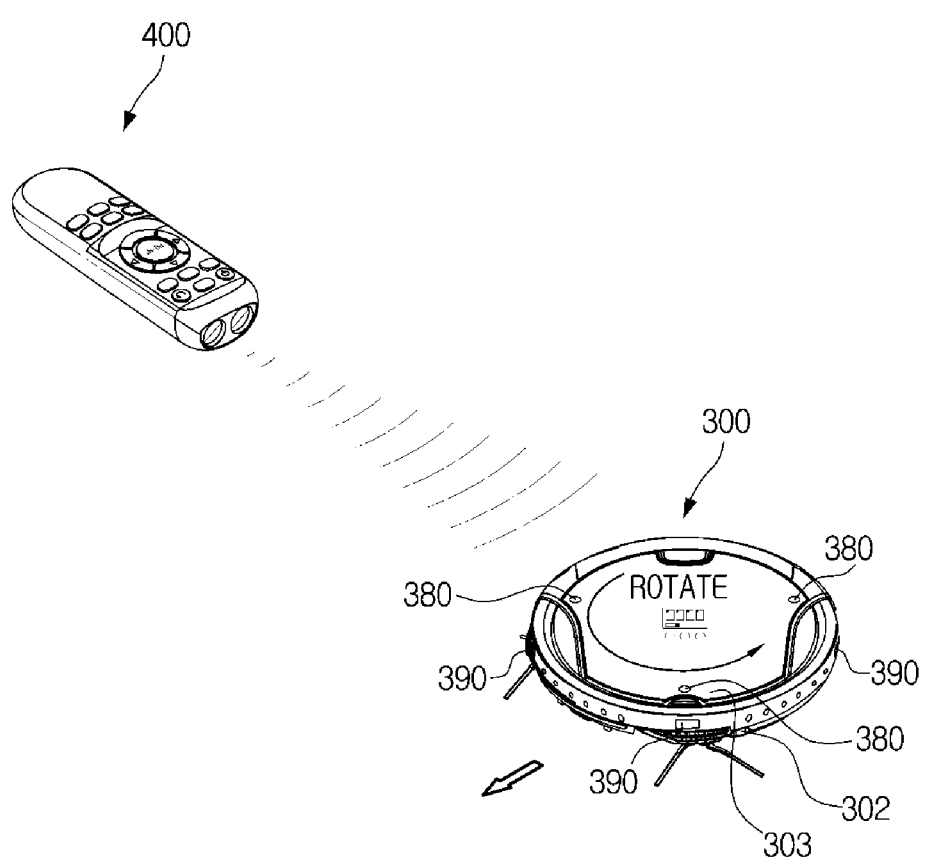

FIGS. 62 and 63 illustrate concepts of the method illustrated in FIG. 61

As illustrated in FIG. 62, the cleaning robot 300 may rotate the cleaning robot 300 counterclockwise until the predetermined signal reception unit 335 among the plurality of signal reception units 335 receives the infrared signal output from the signal transmission unit 435 of the remote controller 400.

Specifically, the signal transmission unit 435 of the remote controller 400 may reflect the infrared signal from the ground such that the infrared signal is transmitted to the cleaning robot 300, and the robot control unit 310 may transmit the control signal such that the main body 301 at which the plurality of signal reception units 335 are provided at the navigation unit 360 rotates counterclockwise until the predetermined signal reception unit 335 among the plurality of signal reception units 335 receives the infrared signal output from the signal transmission unit 435 of the remote controller 400.

In addition, as illustrated in FIG. 63, the cleaning robot 300 may rotate the upper body 303 of the cleaning robot 300 counterclockwise until the predetermined signal reception unit 335 among the plurality of signal reception units 335 receives the infrared signal output from the signal transmission unit 435 of the remote controller 400.

Specifically, the signal transmission unit 435 of the remote controller 400 may reflect the infrared signal from the ground such that the infrared signal is transmitted to the cleaning robot 300, and the robot control unit 310 may transmit the control signal such that the upper body 303 at which the plurality of signal reception units 335 are provided at the light reception driving motor 395 rotates counterclockwise until the predetermined signal reception unit 335 among the plurality of signal reception units 335 receives the infrared signal output from the signal transmission unit 435 of the remote controller 400.

In addition, although not illustrated, the cleaning robot 300 may realize a direction of the particular signal reception unit 335 that has received the infrared signal among the plurality of signal reception units 335, and determine that the remote controller 400 is located at the direction of the particular signal reception unit 335.

Figure 64:
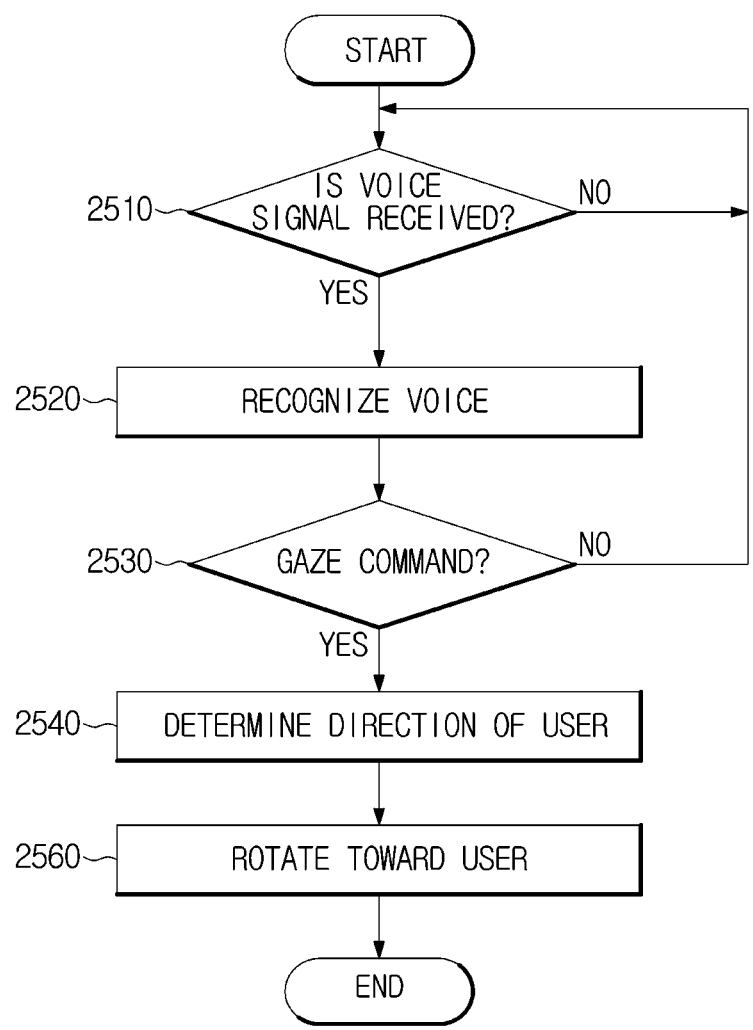
FIG. 64 is a flow chart of a method of determining a direction of a user.

FIG. 64 is a flow chart of a method of determining a direction of a user, and FIGS. 65, 66A, 66B and 66C are conceptual views of the method illustrated in FIG. 64.

A method of determining a direction of the user U by the cleaning robot 300 will be described with reference to FIGS. 64, 65, 66A, 66B, and 66C.

The cleaning robot 300 may not only determine the position of the remote controller 400, but also directly determine a position of the user U. The cleaning robot 300 may receive a voice command of the user via a plurality of microphones 309*a*, 309*b*, and 309*c*, and determine a direction in which the received voice command is phonated.

Specifically, the cleaning robot 300 determines whether a voice signal of the user U is received (operation 2510).

The user U may input a gaze command to the cleaning robot 300 by the voice signal. For example, as illustrated in FIG. 65, the user U may input the gaze command to the cleaning robot 300 using predetermined spoken phrases such as "Robot! Look here." or "Robot! Come here."

The cleaning robot 300 may include the plurality of microphones 309*a*, 309*b*, and 309*c* to receive the voice signal of the user U. Here, the plurality of microphones 309*a*, 309*b*, and 309*c* may be equidistantly disposed along the outer edge of the main body 301, and the plurality of microphones 309*a*, 309*b*, and 309*c* may include a first microphone 309*a* provided at a front portion of the main body 301, a second microphone 309*b* provided at a right portion of the main body 301, and a third microphone 309*c* provided at a left portion of the main body 301.

When the voice signal of the user U is received (YES to S2510), the cleaning robot 300 performs voice command recognition with respect to the voice signal of the user U (operation 2520).

The cleaning robot 300 may analyze the voice signal of the user U to recognize the control command of the user U. For example, the cleaning robot 300 may determine the control command corresponding to the voice signal of the user U by comparing the voice signal of the user U with voice signals in accordance with a plurality of control commands.

Then, the cleaning robot 300 determines whether the gaze command is received (operation 2530). The cleaning robot 300 may analyze the voice signal of the user U to determine whether the acquired control command is the gaze command.

When the gaze command is received (YES to S2530), the cleaning robot 300 determines a direction in which the user U is positioned (operation 2540).

The cleaning robot 300 may determine the direction in which the user U is positioned based on the reception time or the size of the voice signal received through the plurality of microphones 309a, 309b, and 309c. Specifically, the cleaning robot 300 may determine the position of the user U based on a position of the microphone that has received the user's voice signal for the first time and a difference between a time at which the voice signal of the user U is received for the first time and a time at which another microphone received the voice signal.

Figure 66A:
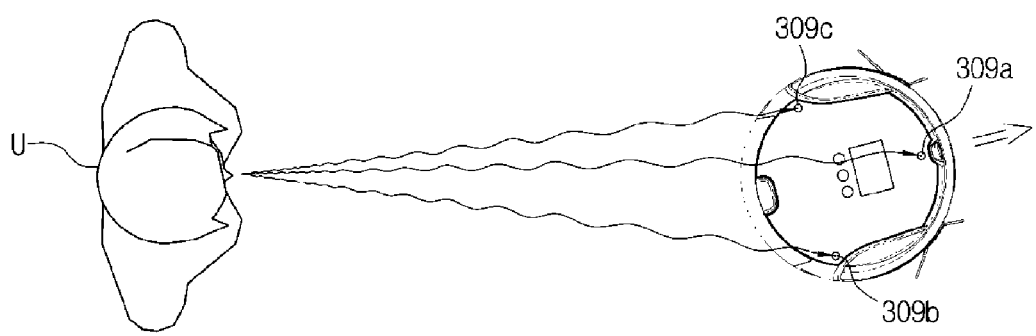
Figure 66B:
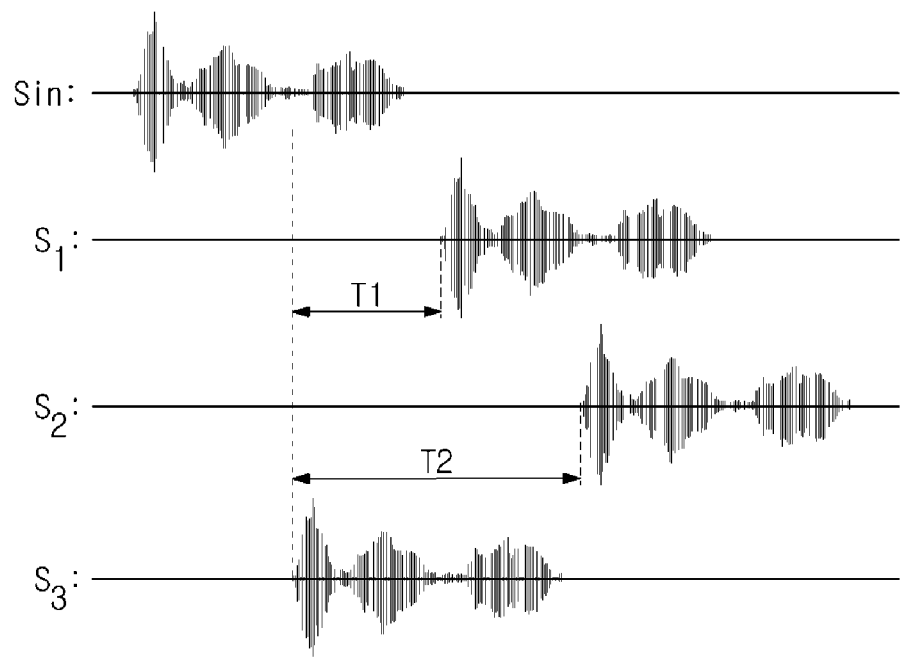

For example, as illustrated in FIG. 66A, when the user U positioned at a rear left side of the cleaning robot 300 phonates a voice signal Sin, the cleaning robot 300 may receive voice signals S1, S2, and S3 illustrated in FIG. 66B.

Specifically, the third microphone 309c installed at the left portion of the main body 301 receives the third voice signal S3 for the first time. The first microphone 309a installed at the front portion of the main body 301 receives the first voice signal S1 after a first time T1, and the second microphone 309b installed at the right portion of the main body 301 receives the second voice signal S2 after a second time T2.

The cleaning robot 300 may determine that the user U is positioned at the rear left side of the main body 301 based on the position of the third microphone 309c, the first time T1, and the second time T2.

Then, the cleaning robot 300 rotates toward the user U (operation 2560).

As illustrated in FIG. 66C, the cleaning robot 300 may rotate such that the user U is positioned in front of the main body 301. Hereinafter, embodiments of setting the coordinates of the designated ending area will be described with reference to FIGS. 67, 68, and 69.

Figure 67:
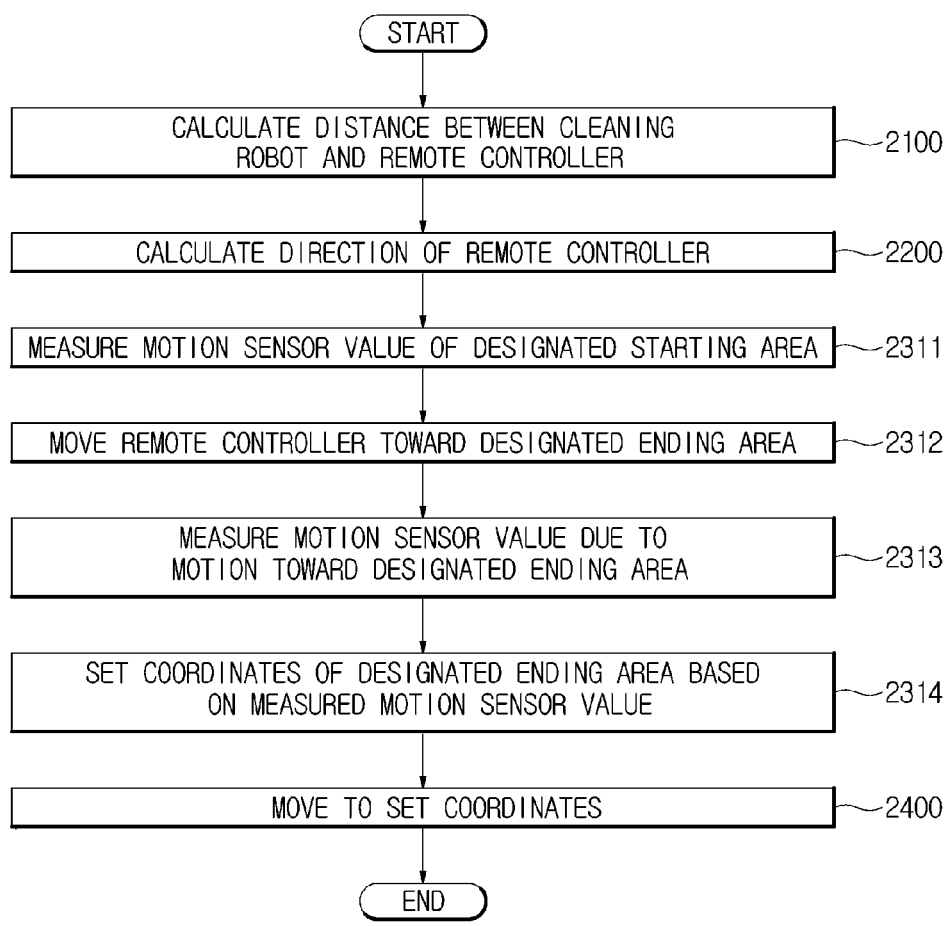
FIG. 67 is a flow chart of a method of setting coordinates of a designated ending area according to an embodiment.

FIG. 67 illustrates a flow chart of a method of setting coordinates of a designated ending area according to an embodiment.

The remote controller calculates the distance between the cleaning robot and the remote controller (operation 2100) by outputting at least one of the infrared signal and the ultrasonic signal from the signal transmission unit and receiving the at least one of the infrared signal and the ultrasonic signal by the signal reception unit.

In addition, the robot control unit calculates the direction of the remote controller based on at least one of the received infrared signal and ultrasonic signal (operation 2200).

The user makes the remote controller to indicate the designated starting area, and here, the motion sensor measures a motion sensor value when the designated starting area is indicated (operation 2311). Also, the user moves the remote controller such that the remote controller points to the designated ending area (operation 2312). Here, the motion sensor measures a motion sensor value when the designated ending area is indicated (operation 2313). Also, the second communication unit of the remote controller transmits the motion sensor value when the designated starting area is indicated and the motion sensor value when the designated ending area is indicated to the first communication unit of the cleaning robot.

In addition, the robot control unit of the cleaning robot sets the coordinates of the designated ending area with the cleaning robot as the origin based on the motion sensor value when the designated starting area is indicated and the motion sensor value when the designated ending area is indicated (operation 2314).

At last, the robot control unit transmits the control signal to the navigation unit to move the cleaning robot to the set coordinates of the designated ending area (operation 2400).

Figure 68:
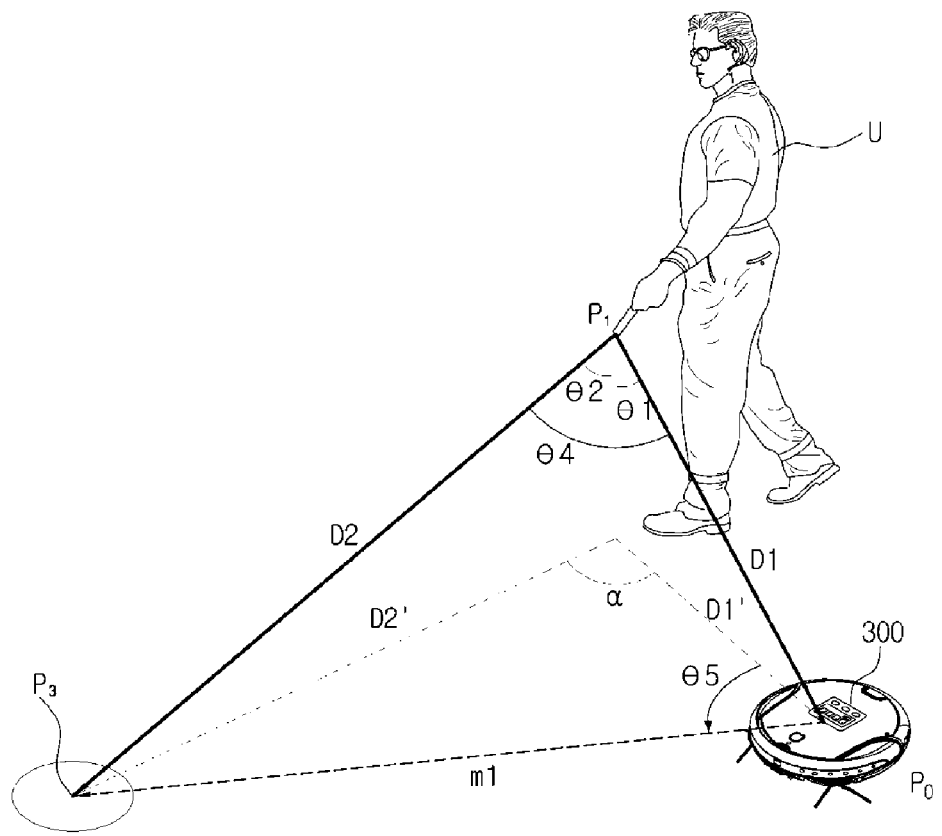
FIGS. 68 and 69 are conceptual views of the method illustrated in FIG. 67.
Figure 69:
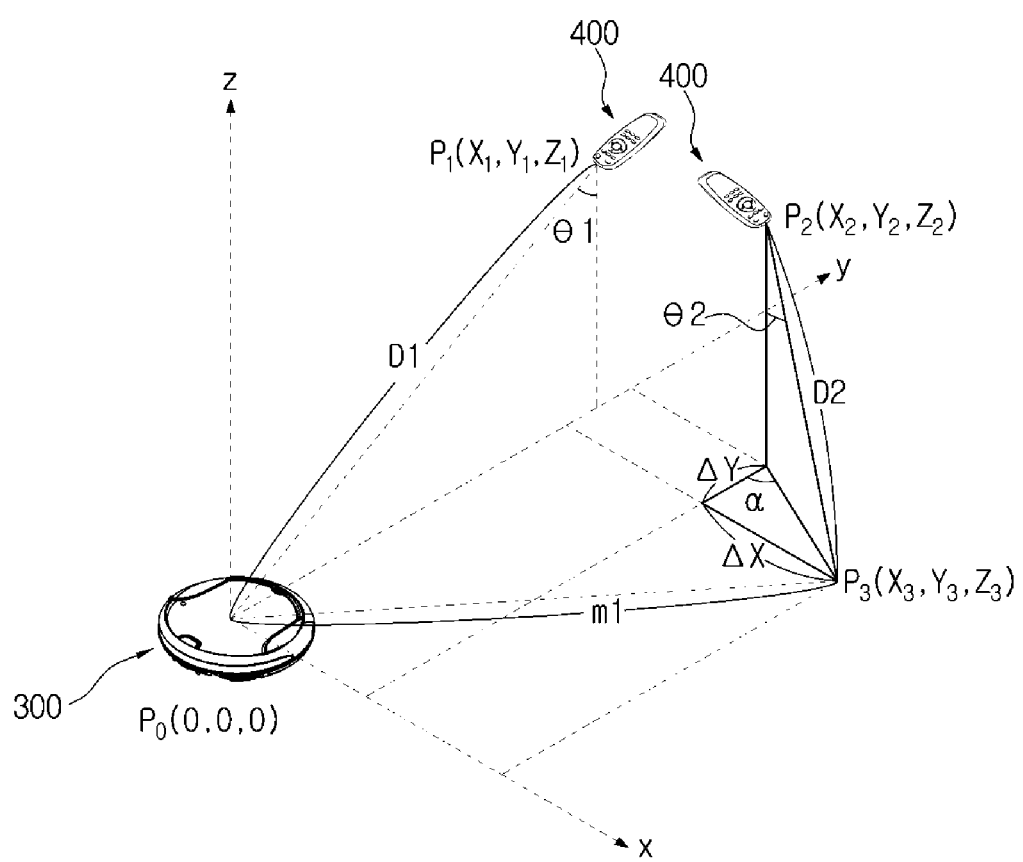

FIGS. 68 and 69 are conceptual views of the method illustrated in FIG. 67.

As illustrated in FIG. 68, the distance D1 between the remote controller 400 and the cleaning robot 300 and the direction of the remote controller 400 with respect to the cleaning robot 300 may be calculated using at least one of the ultrasonic signal and the infrared signal output from the remote controller 400, and the angle θ1 between the line from the remote controller 400 toward the ground and the line from the remote controller 400 toward the cleaning robot 300 may be calculated based on the motion sensor value when the remote controller 400 points to a designated starting area P0, which is the cleaning robot 300.

In this case, the robot control unit 310 may receive from the second communication unit 450 of the remote controller 400 the motion sensor value when the remote controller 400 points to a designated ending area P3 because the remote controller 400 is moved by the user U, and may set coordinates of the designated ending area P3 based on the motion sensor value.

Specifically, the robot control unit 310 may calculate an extension line indicated by the remote controller 400 when indicating the designated ending area P3 based on the motion sensor value when the remote controller 400 points to the designated starting area P0 and the motion sensor value when the remote controller 400 points to the designated ending area (e.g. a rotation angle α of the remote controller 400). Also, the robot control unit 310 may set a point where the calculated extension line indicated by the remote controller 400 and the ground intersect as coordinates of the designated ending area P3.

In addition, the coordinates of the designated ending area P3 may be set, and a distance D2 between the designated ending area and the remote controller 400 and a distance m1 between the designated ending area and the cleaning robot 300 may be calculated based on the coordinates of the designated ending area P3.

Here, the distance from the remote controller to the designated starting area and a distance from the remote controller to the designated ending area may be a distance from user's shoulders including an arm length of the user to the designated starting area and a distance from the user's shoulders to the designated ending area. For example, D1 may be a value resulting from adding 0.7 [m], which is an average arm length of humans, to the distance from the remote controller to the designated starting area, and D2 may be a value resulting from adding 0.7 [m], which is the average arm length of humans, to the distance from the remote controller to the designated ending area.

In addition, the robot control unit 310 may calculate the distance and the direction from the designated starting area to the designated ending area without the coordinate setting.

Specifically, the robot control unit 310 may use Equation 8 and Equation 9 to calculate the distance from the designated starting area to the designated ending area, which is a distance to be moved by the cleaning robot. Also, the robot control unit may use Equation 10, Equation 11, and Equation 12 to calculate an angle by which the cleaning robot should rotate.

An angle ( ) between an extension line in which the remote controller points to a designated starting area ( ) and an extension line in which the remote controller points to a designated ending area ( ) may be calculated by Equation 8.

$$\theta 4 = \sqrt{\Delta Pitch^2 + \Delta Yaw^2} \qquad \text{Equation 8}$$

Equation 8 is a mathematical expression for calculating an angle between the designated starting area and the designated ending area when the remote controller points to the designated starting area and the designated ending area based on the motion of the remote controller. Among parameters of Equation 8, θ4 refers to the angle between the extension line in which the remote controller points to a designated starting area and the extension line in which the remote controller points to a designated ending area, Yaw refers to a change amount of a yaw value which is left and right directions of the remote controller, and Pitch refers to a change amount of a pitch value which is perpendicular to the yaw value and is upper and lower directions of the remote controller.

As in Equation 8, the angle between the designated starting area and the designated ending area when the remote controller points to the designated starting area and the designated ending area may be a square root of a value resulting from adding a square of the change amount of the pitch value to a square of the change amount of the yaw value.

The distance from the designated starting area to the designated ending area, which is the distance to be moved by the cleaning robot, may be calculated as Equation 9 using the angle calculated by Equation 8, and distances from the remote controller to the designated starting area and the designated ending area.

$$m1 = \sqrt{D1^2 + D2^2 - 2*D1*D2*\cos\theta 4} \qquad \text{Equation 9}$$

Equation 9 is a mathematical expression for calculating the distance from the designated starting area to the designated ending area. In Equation 9, m1 may refer to the distance from the designated starting area to the designated ending area, D1 may refer to the distance from the remote controller to the designated starting area, and D2 may refer to the distance from the remote controller to the designated ending area.

As illustrated in FIG. 68, a triangle having a point at which the remote controller is located, the designated starting area, and the designated ending area as three points may be set. Consequently, the distance from the designated starting area to the designated ending area may be calculated using the second cosine rule.

Next, the angle by which the cleaning robot should rotate will be calculated. A first orthogonal projection line that has projected the extension line in which the remote controller points to the designated starting area on the ground may be calculated by Equation 10.

$$D1' = \sqrt{D1^2 - h^2} \qquad \text{Equation 10}$$

Equation 10 is a mathematical expression for calculating the first orthogonal projection line. Among parameters of Equation 10, D1' may refer to a length of the first orthogonal projection line, and h may refer to the height at which the remote controller is located.

Because the triangle including the extension line in which the remote controller points to the designated starting area, the first orthogonal projection line, and the line perpendicular to the ground has a form of a right triangle, the first orthogonal projection line may be calculated as Equation 10 by the Pythagorean theorem.

A second orthogonal projection line that has projected the extension line in which the remote controller points to the designated ending area on the ground may be calculated by Equation 11.

$$D2' = \sqrt{D2^2 - h^2} \qquad \text{Equation 11}$$

Equation 11 is a mathematical expression for calculating the second orthogonal projection line. Among parameters of Equation 11, D2' may refer to a length of the second orthogonal projection line.

Because the triangle including the extension line in which the remote controller points to the designated ending area, the second orthogonal projection line, and the line perpendicular to the ground has the form of a right triangle, the second orthogonal projection line may be calculated as Equation 11 by the Pythagorean theorem.

The angle by which the cleaning robot should rotate may be calculated by Equation 12.

$$\theta 5 = \cos^{-1}\left(\frac{D1'^2 + m1^2 - D2'^2}{2*D1'*m1}\right) \qquad \text{Equation 12}$$

Equation 12 is a mathematical expression for calculating the angle by which the cleaning robot heading the remote controller should rotate to move to the designated ending area. Among parameters of Equation 12, θ5 may refer to the angle by which the cleaning robot should rotate.

As illustrated in FIG. 68, the orthogonally projected triangle including the first orthogonal projection line, the second orthogonal projection line, and the line along which the cleaning robot should move may be set. In the set orthogonally projected triangle, an inner angle of an area in which the designated starting area is located is an angle by which the cleaning robot should rotate, and this may be calculated as Equation 12 by the second cosine rule.

In addition, as illustrated in FIG. 69, when a position of the remote controller 400 when indicating the designated starting area and a position thereof when indicating the designated ending area are different, setting the coordinates of the designated ending area is also possible.

Specifically, the distance D1 between the remote controller 400 and the cleaning robot 300 and the direction of the remote controller 400 with respect to the cleaning robot 300 are calculated using at least one of the ultrasonic signal and the infrared signal output from the remote controller 400. Also, the robot control unit 310 calculates coordinates x1, y1, and z1 of the remote controller 400 at the time when the remote controller 400 points to the designated starting area P0 when the cleaning robot 300 is set as the origin.

In addition, the second communication unit 450 of the remote controller 400 receives the motion sensor value when the remote controller 400 points to the designated starting area P0 and the motion sensor value when the remote controller 400 points to the designated ending area P3. The robot control unit 310 calculates coordinates x3, y3, and z3 of the remote controller 400 which points to the designated ending area P3 and calculates the extension line in which the remote controller 400 points to the designated ending area P3 based on the received motion sensor value when the remote controller 400 points to the designated starting area P0 and motion sensor value when the remote controller 400 points to the designated ending area P3.

In this case, the robot control unit 310 may set the point at which the calculated extension line and the ground intersect as the designated ending area P3. Hereinafter, an embodiment of setting coordinates of a plurality of designated ending areas will be described with reference to FIG. 70.

Figure 70:
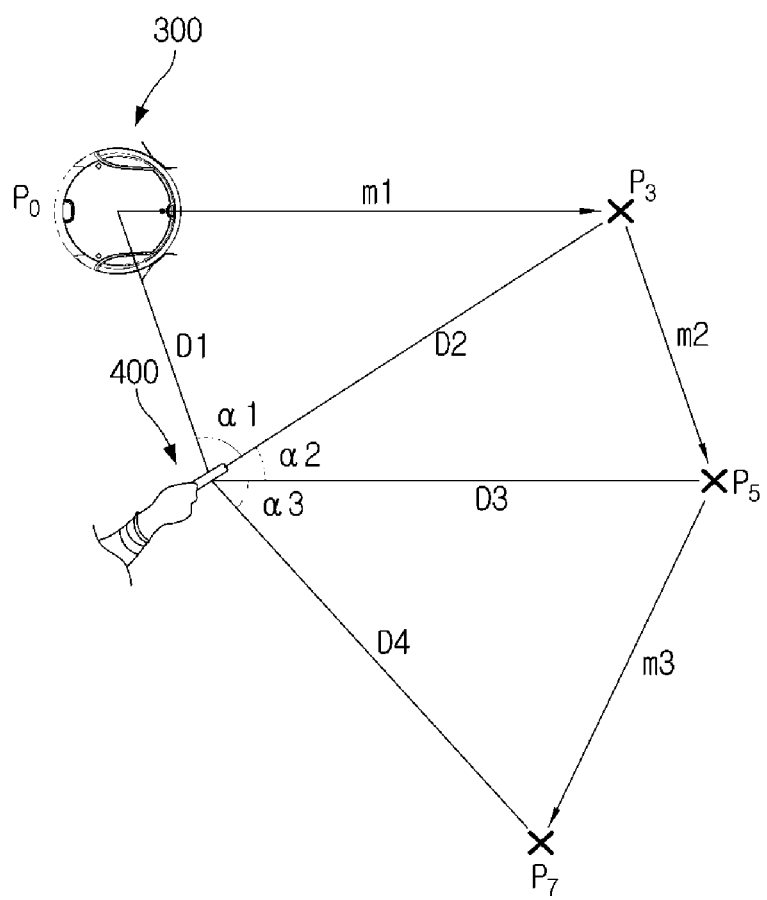
FIG. 70 is a conceptual view of a method of setting coordinates of a plurality of designated ending areas according to an embodiment.

FIG. 70 is a conceptual view of a method of setting coordinates of a plurality of designated ending areas according to an embodiment.

The cleaning robot system 2 is not limited to setting the cleaner as the designated starting area and setting the designated ending area using the remote controller 400 to move the cleaning robot 300 as described above.

Specifically, the remote controller 400 may indicate a first designated starting area P0, and the user U may move the remote controller 400 such that the remote controller 400 points to a first designated ending area P3 to enable the cleaning robot system 2 to set coordinates of the first designated ending area P3 at the time.

Then, when the remote controller 400 points to a second designated ending area P5, the cleaning robot system 2 sets coordinates of the second designated ending area P5 based on data used when calculating the first designated ending area P3 by setting the first designated ending area P3 as the second designated starting area P3 and data acquired when the remote controller 400 points to the second designated ending area P5.

In addition, when the remote controller 400 points to a third designated ending area P7, the cleaning robot system 2 sets coordinates of the third designated ending area P7 based on data used when calculating the second designated ending area P5 by setting the second designated ending area P5 as the third designated starting area P5 and data acquired when the remote controller 400 points to the third designated ending area P7.

By this, the user U may move the cleaning robot 300 by setting the plurality of designated ending areas instead of moving the cleaning robot 300 by setting only one designated ending area.

Figure 71:
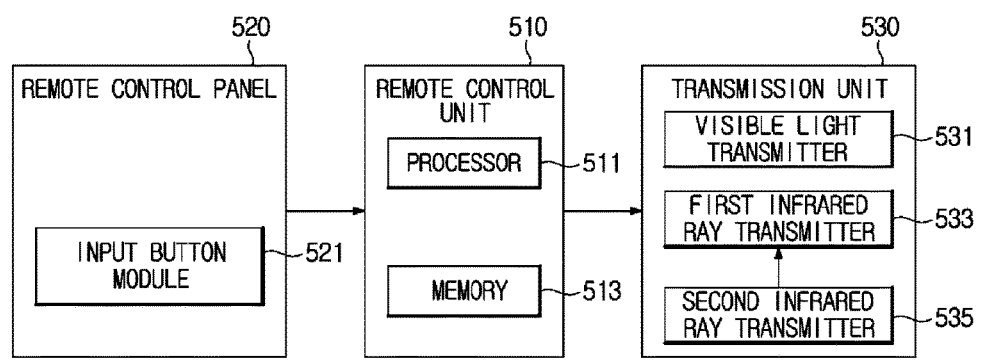
FIG. 71 illustrates a control configuration of a remote controller according to an embodiment.
Figure 72:
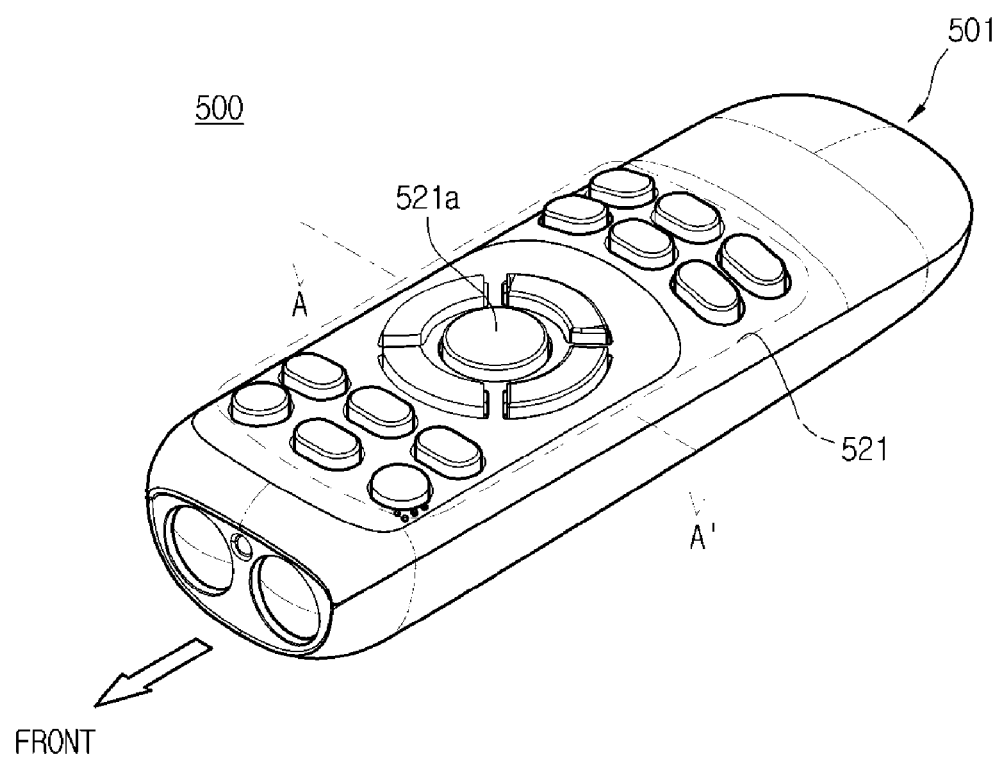
FIG. 72 illustrates an exterior of the remote controller according to an embodiment.

FIG. 71 illustrates a control configuration of a remote controller according to an embodiment, and FIG. 72 illustrates an exterior of the remote controller according to an embodiment.

Referring to FIGS. 71 and 72, a remote controller 500 includes a main body 501 that forms an exterior, and at the main body 501, a remote control panel 520 to receive a control command from a user, a transmission unit 530 to transmit the user's control command to the cleaning robot 100 (refer to FIG. 1), and a remote control unit 510 to generally control an operation of the remote controller 500 are provided.

The remote control panel 520 includes an input button module 521 to receive the control command from the user. The input button module 521 is provided at an upper surface of the main body 501 of the remote controller 500, and may include a power button to turn on or off the cleaning robot 100 (refer to FIG. 1), a return button to return the cleaning robot 100 (refer to FIG. 1) to a charging station for charging the power, an operation button to operate or stop the cleaning robot 100 (refer to FIG. 1), a cleaning mode button to select a cleaning mode of the cleaning robot 100 (refer to FIG. 1), etc.

Particularly, the input button module 521 may include a drag button 521a to input a drag command for moving the cleaning robot 100 (refer to FIG. 1) along the movement path of the light spot LS.

The input button module 521 as above may employ a microswitch that detects a user's pressure, a membrane switch, or a touch switch that detects a user's contact.

In addition, according to an embodiment, the remote control panel 520 may further include a display (not shown) or a touch screen (not shown). The display or the touch screen may display operation information of the cleaning robot 100 (refer to FIG. 1 in accordance with the control command input by the user. For example, the display or the touch screen may display the operation state, the power state, the cleaning mode selected by the user, the malfunction state, etc. of the cleaning robot 100 (refer to FIG. 1).

Particularly, the touch screen may be provided by the integration of a touch panel to detect contact coordinates of the user and a display panel to display the operation information of the cleaning robot 100 (refer to FIG. 1). Specifically, the touch screen may display a plurality of control commands that may be input by the user, and receive the control command selected by the user among the plurality of displayed control commands. Specifically, the touch screen may detect coordinates touched by the user, and compare the detected touch coordinates to coordinates at which the control commands are displayed to recognize the control command input by the user.

The transmission unit 530 transmits the visible light and the infrared ray in accordance with the user's control command. Particularly, the control command input by the user is included in infrared ray transmitted by the transmission unit 530. Specifically, the transmission unit 530 transmits a modulated infrared ray in accordance with the control command input by the user.

The transmission unit 530 may include a visible light transmitter 531 to transmit the visible light, a first infrared ray transmitter 533 to transmit a first infrared ray, and a second infrared ray transmitter 535 to transmit a second infrared ray.

The visible light transmitter 531 transmits the visible light toward the front in accordance with the user's drag command, and the first infrared ray transmitter 533 transmits the infrared ray in which the user's drag command is included. Also, the second infrared ray transmitter 535 transmits the second infrared ray in which a control command besides the drag command such as a power command, a return command, an operation command, and a cleaning mode selection command is included.

Particularly, the first infrared ray transmitter 533 may transmit a modulated infrared ray (hereinafter, referred to as the first infrared ray) in accordance with the drag command, and the second infrared ray transmitter 535 may transmit a modulated infrared ray (hereinafter, referred to as the second infrared ray) in accordance with the control command of the drag command.

In addition, because the cleaning robot 100 (refer to FIG. 1) tracks the light spot LS (refer to FIG. 7) formed by the visible light and the first infrared ray, the visible light transmitter 531 and the first infrared ray transmitter 533 may transmit a focused beam (the visible light, the first infrared ray) toward the front. On the other hand, because the control command besides the drag command is transmitted to the cleaning robot 100 (refer to FIG. 1) regardless of a direction commanded by the remote controller 500, the second infrared ray transmitter 535 may transmit light (the second infrared ray) diffused to all directions.

Figure 73:
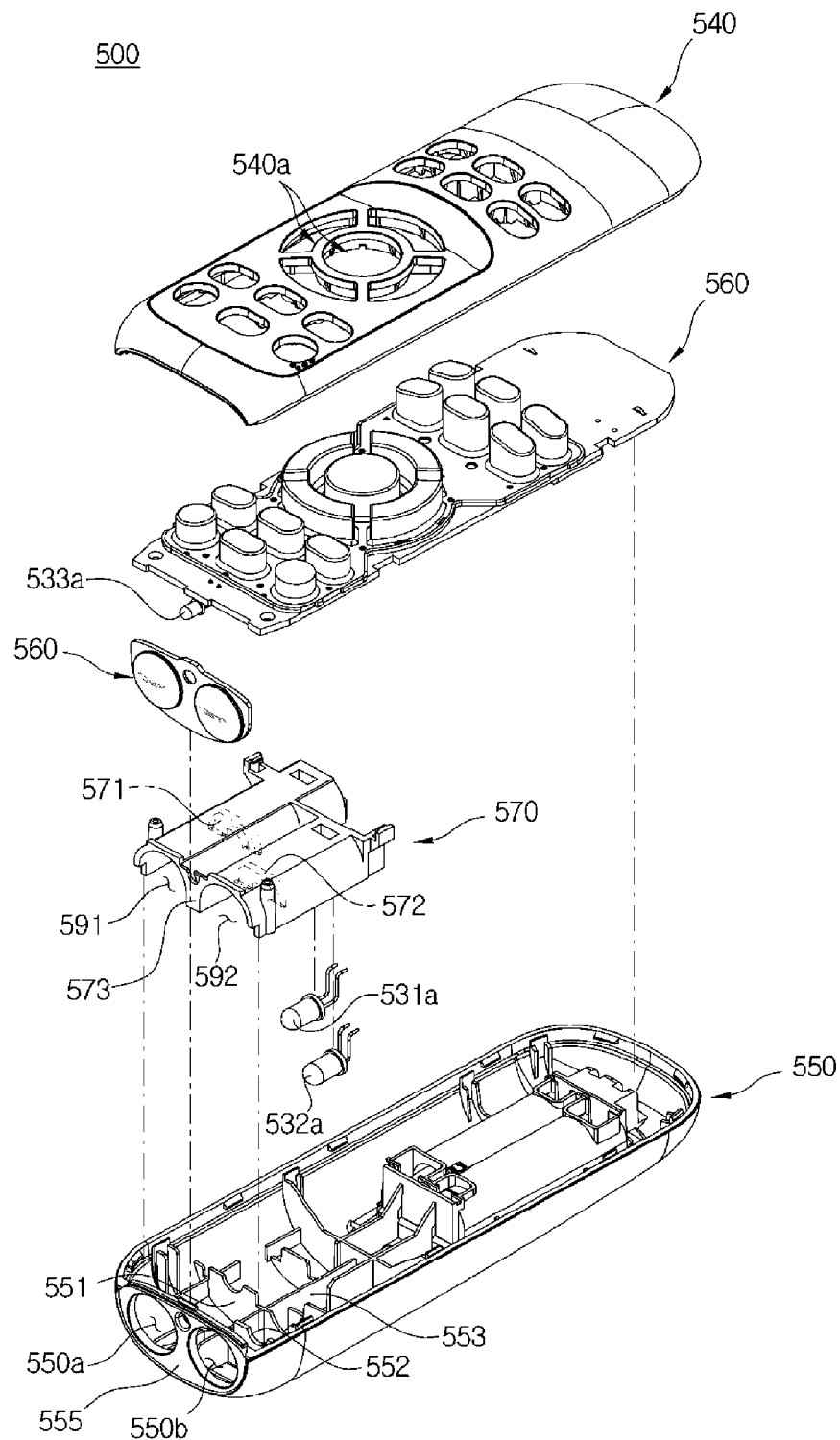
FIG. 73 illustrates an exploded view of the remote controller according to an embodiment.

The visible light transmitter 531 may include visible light source 531a (refer to FIG. 73) to output the visible light, and a driving circuit (not shown) to drive the visible light source 531a (refer to FIG. 73). The first infrared ray transmitter 533 may include a first infrared ray light source 533a (refer to FIG. 73) to output the first infrared ray, and a driving circuit (not shown) to drive the first infrared ray light source 533a (refer to FIG. 73). The second infrared ray transmitter 535 may include a second infrared ray light source 535a (refer to FIG. 73) to output the second infrared ray, and a driving circuit (not shown) to drive the second infrared ray light source 535a (refer to FIG. 73).

In addition, each of the light sources 531a, 533a, and 535a may include a light emitting diode (LED) that transmits the visible light or the infrared ray, a light amplification by the stimulated emission of radiation (LASER), or a lamp.

The remote control unit 510 may include a memory 513 to store a program and data for controlling the remote controller 500, and a processor 511 to process the data in accordance with the program stored in the memory 513.

The memory 513 may store the control program and control data for controlling the remote controller 500, or store the user's control command input through the remote control panel 520 and the control signal output by the processor 511.

In addition, the memory 513 may include a volatile memory (not shown) such as the S-RAM, the D-RAM, and the like and a nonvolatile memory (not shown) such as the flash memory, the ROM, the EPROM, the EEPROM, and the like.

The nonvolatile memory may operate as an auxiliary memory device of the volatile memory, and may store the control program and the control data for controlling the operation of the remote controller 500. Also, the nonvolatile memory may maintain the stored data even when the power of the remote controller 500 is blocked.

The volatile memory may load the control program and the control data from the nonvolatile memory and temporarily store them, or temporarily store the user's control command input through the remote control panel 520 and the control signal output by the processor 511. Different from the nonvolatile memory, the volatile memory may lose the stored data when the power of the remote controller 500 is blocked.

Although the volatile memory and the nonvolatile memory have been described above, the memory 513 is not limited to including both of the volatile memory and the nonvolatile memory, and the memory 513 may include only the nonvolatile memory.

The processor 511 may process the user's control command in accordance with the control program stored in the memory 513, and output a communication signal to be transmitted to the cleaning robot 100 (refer to FIG. 1) through the transmission unit 530. For example, when the user inputs the drag command, the processor 11 may process the drag command received through the remote control panel 520 and output an infrared communication signal corresponding to the user's drag command.

The processor 511 may employ the application specific integrated circuit (ASIC) ordered and manufactured for a specific use, and the field programmable gate array (FPGA) including a programmable logic element and a programmable inner line, and may include a memory with small storage capacity.

Although the processor 511 and the memory 513 have been differentiated and described in the above, embodiments are not limited thereto, and the processor 511 and the memory 513 may be configured as one chip.

Figure 74A:
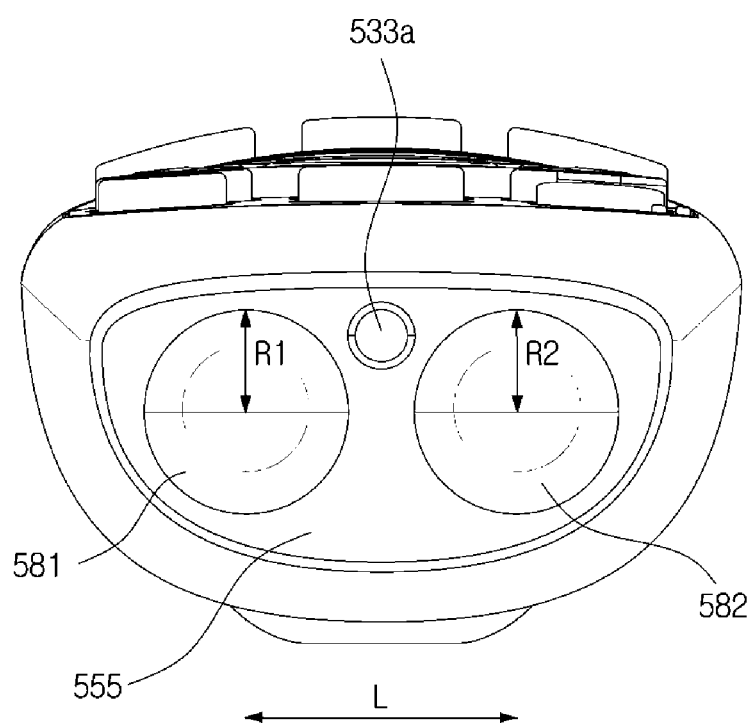
FIGS. 74A and 74B illustrate a lens module included in the remote controller according to an embodiment.
Figure 74B:
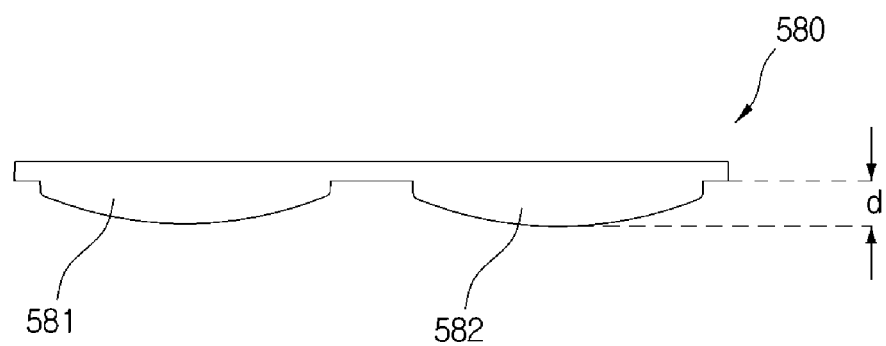

FIG. 73 illustrates an exploded view of the remote controller according to an embodiment, and FIGS. 74A and 74B illustrate a lens module included in the remote controller according to an embodiment.

Referring to FIGS. 73, 74A and 74B, the remote controller 500 includes a housing 550 with an open upper surface, a top cover 540 to block the opened upper surface of the housing 550, a substrate 560 provided between the housing 550 and the top cover 540, a middle cover 570 provided at a front portion of the housing 550, and a lens module 580 provided at a front surface of the housing 550.

The housing 550 accommodates various types of component parts included in the remote controller 500 to protect the various types of component parts included in the remote controller 400 from an external impact.

In addition, a first optical path 591 from which the visible light is output and a second optical path 592 from which the first infrared ray is output are generated by the housing 550 and the middle cover 570, and a housing partition 553 that divides the first optical path 591 and the second optical path 592 is formed at the housing 550.

A first housing stop rib 551 that removes an optical noise due to reflection of light generated inside is formed at the first optical path 591, and a second housing stop rib 552 that removes an optical noise due to reflection of light generated inside is formed at the second optical path 592.

The first housing stop rib 551 and the second housing stop rib 552 will be described in detail below.

A first through-hole 550a coming in communication with the first optical path 591 and a second through-hole 550b coming in communication with the second optical path 592 are formed at the front surface of the housing 550. The visible light is output forward by passing through the first through-hole 550a, and the first infrared ray is output forward by passing through the second through-hole 550b.

In addition, a lens guard 555 to protect the lens module 580 from the external impact is formed near the first through-hole 550a and the second through-hole 550b. The lens guard 555 may protrude forward past the lens module 580 to prevent scratches from being generated at the lens module 580 due to the external impact.

The top cover 540 is provided at the open upper surface of the housing 550 to protect the various types of component parts included in the remote controller 500 from the external impact together with the housing 550. Also, a plurality of holes 540a may be formed at the top cover 540, and the input button module 521 may be exposed outside the top cover 540 by passing through the plurality of holes 540a.

The substrate 560 may include a printed circuit board (PCB) on which various types of processors and memories, etc. are mounted. Specifically, the input button module 521, the visible light source 531a, the first infrared ray light source 533a, the second infrared ray light source 535a, the processor 511, and the memory 513 may be mounted on the substrate 560.

The middle cover 570, together with the housing 550, generate the first optical path 591 from which the visible light is output and the second optical path 592 from which the first infrared ray is output, and a cover partition 573 to divide the first optical path 591 and the second optical path 592 is formed at the middle cover 570.

A first cover stop rib 571 that removes the optical noise due to the reflection of light generated inside is formed at the first optical path 591, and a second cover stop rib 572 that removes the optical noise due to the reflection of light generated inside is formed at the second optical path 592.

The first cover stop rib 571 and the second cover stop rib 572 will be described in detail below.

As illustrated in FIG. 74A, the lens module 580 includes a first lens 581 to focus the visible light output from the visible light transmission unit 531, and a second lens 582 to focus the first infrared ray output from the first infrared ray transmission unit 533. Here, the first lens 581 and the second lens 582 are integrally provided.

As illustrated in FIG. 74B, the first lens 581 and the second lens 582 may have a shape of a convex lens with a convex front surface and a flat rear surface, the first lens 581 may be inserted into the first through-hole 550a of the housing 550, and the second lens 582 may be inserted into the second through-hole 550b of the housing 550.

A thickness d of the convex portions of the first lens 581 and the second lens 582 is thinner than the thickness of the lens guard 555. Consequently, the first lens 581 and the second lens 582 may be protected by the lens guard 555 of the housing 550.

Because the user determines the position commanded by the remote controller 500 through the visible light, and the cleaning robot 100 (refer to FIG. 1) determines the position commanded by the remote controller 500 through the first infrared ray, the visible light and the first infrared ray output by the remote controller 500 overlap as much as possible.

The radius R of the first lens 581 and the second lens 582 may be adjusted such that the light spot LS (refer to FIG. 7) by the visible light and the first infrared ray is clearly formed. For example, the light spot LS brightens whereas the size of the light spot LS reduces as the radius R of the first lens 581 and the second lens 582 enlarges. The radius R of the first lens 581 and the second lens 582 may be approximately 15 mm or less such that the light spot LS of proper brightness and proper size is formed.

In addition, to increase a ratio in which the visible light and the first infrared ray overlap each other, a distance L between the center of the first lens 581 and the center of the second lens 582 may be adjusted. For example, when the distance L between the center of the first lens 581 and the center of the second lens 582 is set as approximately 20 mm or less, the ratio in which the visible light and the first infrared ray overlap each other becomes approximately 90% or higher.

The second infrared ray light source 535a is provided at the front surface of the housing 550. As described above, the second infrared ray light source 535a outputs the second infrared ray which is modulated by the control command besides the drag command. Here, the second infrared ray output from the second infrared ray light source 535a is radiated in several directions, and is not focused to a specific direction. In the above, the configuration of the remote controller 500 has been described.

Hereinafter, travelling of the visible light and the first infrared ray generated by the remote controller 500 will be described.

Figure 75:
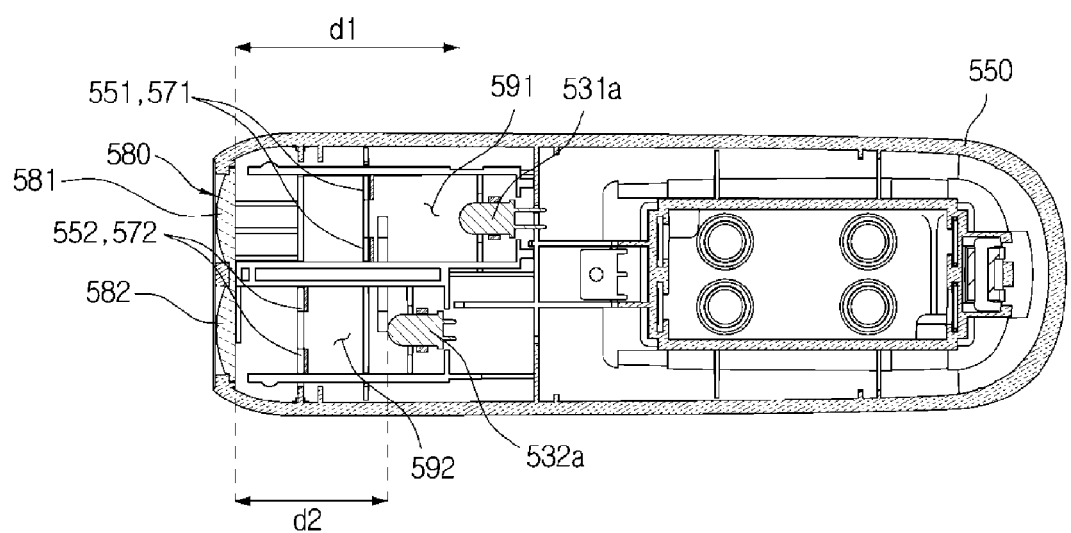
FIG. 75 illustrates a cross section taken along the line A-A' illustrated in FIG. 72.

FIG. 75 illustrates a cross section taken along line A-A' illustrated in FIG. 72, and FIGS. 76A, 76B, 77A, and 77B illustrate a traveling path of light in the remote controller according to an embodiment.

Referring to FIG. 75, the visible light output from the visible light source 531a passes through the first optical path 591, reaches the first lens 581, is focused by the first lens 581, and output to the outside of the housing 550. Here, to improve the focusing of the light, the center of the visible light source 531a and the center of the first lens 581 may be located on one straight line.

In addition, the first infrared ray output from the first infrared ray light source 533a passes through the second optical path 592, reaches the second lens 582, is focused by the second lens 582, and output to the outside of the housing 550. Here, to improve the focusing of the light, the center of the first infrared ray light source 533a and the center of the second lens 582 may be located on one straight line.

A distance d1 between the first lens 581 and the visible light source 531a and a distance d2 between the second lens 582 and the first infrared ray light source 533a may be adjusted such that the light spot LS is clearly formed. For example, although the light spot LS brightens as the distance d1 between the first lens 581 and the visible light source 531a and the distance d2 between the second lens 582 and the first infrared ray light source 533a become farther, the size of the light spot LS enlarges to a proper level or higher.

Thus, the distance d1 between the first lens 581 and the visible light source 531a may be approximately 30 mm or less, and the distance d2 between the second lens 582 and the first infrared ray light source 533a may be approximately 40 mm or less. Because the wavelength of the visible light and the wavelength of the infrared ray are different from each other, the distance d1 between the first lens 581 and the visible light source 531a and the distance d2 between the second lens 582 and the first infrared ray light source 533a may be different from each other.

In addition, the first housing stop rib 551 and the first cover stop rib 571 (Hereinafter, referred to as first stop ribs) to remove the optical noise are installed on the first optical path 591, and the second housing stop rib 552 and the second cover stop rib 572 (Hereinafter, referred to as second stop ribs) to remove the optical noise are installed on the second optical path 592.

Figure 76A:
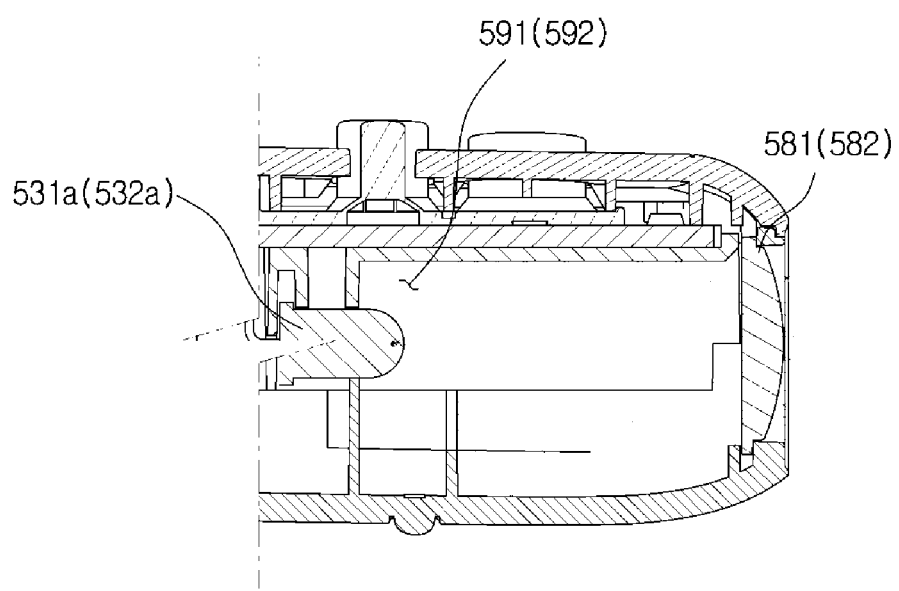
FIGS. 76A, 76B, 77A, and 77B illustrate a traveling path of light in the remote controller according to an embodiment.

When the first stop ribs 551 and 571 are not installed, the light spot LS may not be clearly generated due to the optical noise. For example, as illustrated in FIG. 76A, a part of light (the visible light or the first infrared ray) output from the light sources 531a and 533a may be reflected inside the optical paths 591 and 592, not focused by the lenses 581 and 582, and radiated to several directions.

Figure 76B:
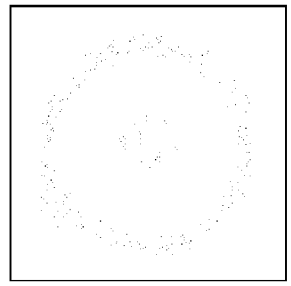

As a result, as illustrated in FIG. 76B, the light spot LS that is unclear may be generated. Also, the cleaning robot 100 (refer to FIG. 1) is unable to accurately track the light spot LS due to the optical noise.

Figure 77A:
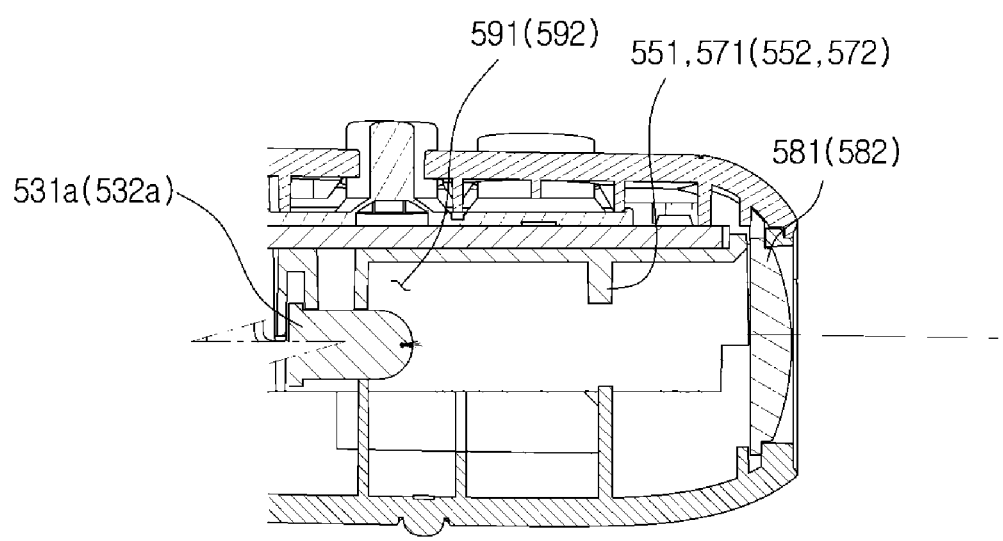

When the first stop ribs 551 and 571 are installed, the optical noise is removed such that the light spot LS is clearly generated. For example, as illustrated in FIG. 77A, light reflected from inner portions of the optical paths 591 and 592 is blocked by the stop ribs 551, 552, 571, and 572.

Figure 77B:
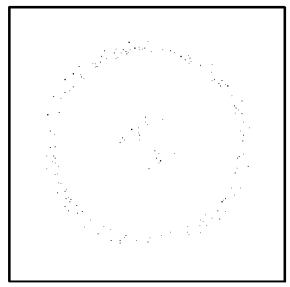

As a result, as illustrated in FIG. 77B, the light spot LS that is clear may be generated, and the cleaning robot 100 (refer to FIG. 1) is able to accurately track the light spot LS.

Although an embodiment of the disclosed disclosure has been illustrated and described in the above, the disclosed disclosure is not limited to the above-mentioned particular embodiments, various modified embodiments are possible by those of ordinary skill in the art to which the disclosed disclosure pertains without departing from the gist claimed in the claims, and the modified embodiments cannot be separately understood from the disclosed disclosure.

The invention claimed is:

1. A cleaning robot comprising:
   a main body;
   a navigator configured to move the main body of the cleaning robot;
   a light receiver configured to receive a modulated infrared ray output from a remote controller, the remote controller being configured to output, in accordance with a control command of a user, the modulated infrared ray and to output visible light to thereby form a light spot; and
   a controller configured to control the navigator such that:
      the main body moves along an automatic cleaning path,
      in response to receiving the modulated infrared ray, the main body leaves the automatic cleaning path and tracks the light spot, and
      in response to not receiving the modulated infrared ray after leaving the automatic cleaning path, the main body returns to a position where the main body left the automatic cleaning path.

2. The cleaning robot according to claim 1, wherein the remote controller comprises:
   a user interface configured to receive the control command; and
   an optical transmitter configured to modulate the infrared ray in accordance with the received control command, the modulated infrared ray output by the remote controller.

3. The cleaning robot according to claim 2, wherein the optical transmitter comprises:
   an infrared ray modulator configured to generate a modulation signal in accordance with the received control command,
   an infrared ray transmitter configured to transmit the modulated infrared ray in accordance with the generated modulation signal; and
   a visible light transmitter configured to transmit the visible light to form the light spot.

4. The cleaning robot according to claim 1, wherein the light receiver comprises:
   a plurality of infrared ray receivers configured to receive the modulated infrared ray; and
   an infrared ray demodulator configured to acquire the control command by demodulating the received modulated infrared ray.

5. The cleaning robot according to claim 4, wherein the plurality of infrared ray receivers comprise:
   a first infrared ray receiver disposed in a front of the main body; and
   at least two infrared ray receivers disposed along an outer edge of the main body.

6. The cleaning robot according to claim 5, wherein
   at least one of the plurality of infrared ray receivers receives the modulated infrared ray, and
   the controller determines a position of the light spot in accordance with the at least one of the infrared ray receiver that receives the modulated infrared ray among the plurality of infrared ray receivers.

7. The cleaning robot according to claim 6, wherein the controller moves the main body such that the first infrared ray receiver receives the modulated infrared ray.

8. The cleaning robot according to claim 7, wherein the controller rotates the main body such that the first infrared ray receiver receives the modulated infrared ray and moves the main body in a straight line toward the light spot.

9. The cleaning robot according to claim 7, wherein the controller moves the main body in a curve such that the first infrared ray receiver receives the modulated infrared ray.

10. The cleaning robot according to claim 1, wherein, when a drag command is received from the remote controller while moving along the automatic cleaning path, the controller controls the navigator such that the main body moves along a movement path of the light spot.

11. The cleaning robot according to claim 10, wherein, when the reception of the drag command stops, the controller stops the movement of the main body and controls the navigator such that the main body returns to the automatic cleaning path.

12. The cleaning robot according to claim 1, wherein, when a path save command is received, the controller controls the main body to move along a movement path of the light spot and stores a movement path of the main body.

13. The cleaning robot according to claim 12, wherein, when an automatic cleaning command is received, the controller controls the navigator such that the main body moves along the stored movement path of the main body.

14. The cleaning robot according to claim 12, wherein, when an intensive cleaning command is received, the controller controls the navigator such that the main body moves within the stored movement path of the main body.

15. The cleaning robot according to claim 12, wherein, when an entry forbiddance command is received, the controller controls the navigator such that the main body remains outside the stored movement path of the main body.

16. A method for controlling a cleaning robot, the method comprising:
   moving the cleaning robot along an automatic cleaning path;
   controlling the cleaning robot to leave the automatic cleaning path and track a light spot in response to receiving a modulated infrared ray output from a remote controller, the remote controller being configured to output the modulated infrared ray and to output visible light to thereby form the light spot; and
   controlling the cleaning robot to return to a position where the cleaning robot left the automatic cleaning path in response to not receiving the modulated infrared ray after leaving the automatic cleaning path.

17. The method according to claim 16, further comprising storing a movement path where the cleaning robot tracks the light spot.

18. The method according to claim 17, further comprising moving the cleaning robot along the movement path of the cleaning robot.

19. The method according to claim 17, further comprising moving the cleaning robot within the movement path of the cleaning robot.

20. The method according to claim 17, further comprising moving the cleaning robot outside the movement path of the cleaning robot.

* * * * *